US008388439B2

(12) United States Patent
Kato

(10) Patent No.: US 8,388,439 B2
(45) Date of Patent: Mar. 5, 2013

(54) GAMING SYSTEM FOR COMPETING FOR PRIZE OF PROGRESSIVE BONUS AT PLURAL TERMINALS

(75) Inventor: Yoichi Kato, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 670 days.

(21) Appl. No.: 12/403,811

(22) Filed: Mar. 13, 2009

(65) Prior Publication Data

US 2009/0233708 A1 Sep. 17, 2009

Related U.S. Application Data

(60) Provisional application No. 61/042,157, filed on Apr. 3, 2008, provisional application No. 61/039,650, filed on Mar. 26, 2008, provisional application No. 61/036,724, filed on Mar. 14, 2008.

(51) Int. Cl.
*A63F 9/24* (2006.01)
*A63F 13/00* (2006.01)
*G06F 17/00* (2006.01)
*G06F 19/00* (2006.01)

(52) U.S. Cl. ................................ 463/27; 463/20; 463/42

(58) Field of Classification Search .................... 463/20, 463/27, 42

See application file for complete search history.

(56) References Cited

U.S. PATENT DOCUMENTS 4,283,709 A 8/1981 Lucero et al.
4,624,459 A 11/1986 Kaufman
4,669,731 A 6/1987 Clarke
4,837,728 A 6/1989 Barrie et al.
4,964,638 A 10/1990 Ishida
5,280,909 A 1/1994 Tracy
5,564,700 A 10/1996 Celona
5,611,730 A 3/1997 Weiss
5,639,088 A 6/1997 Schneider et al.
5,695,402 A 12/1997 Stupak
5,702,303 A 12/1997 Takemoto et al.
5,770,533 A 6/1998 Franchi
5,820,459 A 10/1998 Acres et al.
5,836,817 A 11/1998 Acres et al.
5,890,963 A 4/1999 Yen (Continued)

FOREIGN PATENT DOCUMENTS

CN 1600403 A 3/2005
CN 1745401 A 3/2006

(Continued)

OTHER PUBLICATIONS

International Search Report issued Aug. 19, 2010, in Application code: I/000949(084), (filed Apr. 3, 2009, with English translation).

(Continued)

*Primary Examiner* — Fernando L Toledo
*Assistant Examiner* — Karen Kusumakar
(74) *Attorney, Agent, or Firm* — Lexyoume IP Meister, PLLC.

(57) ABSTRACT

In a gaming system, a part of a bet is accumulated in a progressive bonus counter in a case of executing a slot game in each of slot machines. Then, in a case where an accumulated count value of the progressive bonus counter has reached a predetermined value, an event game which the plurality of slot machines participate in is executed, and a progressive bonus corresponding to a part or entirety of the accumulated count value is provided to a player who has won the event game. Moreover, in a case where the accumulated count value of the progressive bonus counter has reached the predetermined value when the slot game is being executed only in one slot machine, a mystery bonus is generated. Accordingly, a profit can be returned to players who execute the slot game.

18 Claims, 69 Drawing Sheets

U.S. PATENT DOCUMENTS

| | | | | |
|---|---|---|---|---|
| 5,910,048 | A | 6/1999 | Feinberg | |
| 6,001,016 | A | 12/1999 | Walker et al. | |
| 6,003,013 | A | 12/1999 | Boushy et al. | |
| 6,089,980 | A | 7/2000 | Gauselmann | |
| 6,224,482 | B1 | 5/2001 | Bennett | |
| 6,234,896 | B1 | 5/2001 | Walker et al. | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,695,697 | B1 | 2/2004 | Okada | |
| 6,932,704 | B2 | 8/2005 | Walker et al. | |
| 6,932,707 | B2 | 8/2005 | Duhamel | |
| 2003/0069073 | A1 | 4/2003 | Okada | |
| 2003/0104854 | A1* | 6/2003 | Cannon | 463/16 |
| 2004/0038741 | A1 | 2/2004 | Gauselmann | |
| 2004/0204226 | A1* | 10/2004 | Foster et al. | 463/20 |
| 2004/0235552 | A1* | 11/2004 | Gauselmann | 463/16 |
| 2006/0019744 | A1* | 1/2006 | Roemer | 463/26 |
| 2006/0073897 | A1* | 4/2006 | Englman et al. | 463/42 |
| 2006/0121971 | A1* | 6/2006 | Slomiany et al. | 463/16 |
| 2007/0105609 | A1 | 5/2007 | Okada | |
| 2007/0105620 | A1* | 5/2007 | Cuddy et al. | 463/26 |
| 2008/0039191 | A1 | 2/2008 | Cuddy | |
| 2008/0045312 | A1 | 2/2008 | Kato | |
| 2008/0058070 | A1 | 3/2008 | Kato | |
| 2008/0076494 | A1 | 3/2008 | Kato | |
| 2008/0305851 | A1 | 12/2008 | Kato | |

FOREIGN PATENT DOCUMENTS

| | | | |
|---|---|---|---|
| DE | 32 42 890 | | 5/1984 |
| DE | 37 12 841 | | 11/1988 |
| DE | 41 37 010 | | 8/1992 |
| DE | 100 49 444 | | 11/2001 |
| EP | 0 497 562 | A2 | 8/1992 |
| EP | 0 631 798 | | 1/1995 |
| EP | 0 840 264 | | 5/1998 |
| EP | 1 192 975 | | 4/2002 |
| EP | 1 302 914 | | 4/2003 |
| EP | 1 351 180 | | 10/2003 |
| EP | 1 477 947 | | 11/2004 |
| EP | 1 513 115 | A2 | 3/2005 |
| EP | 1 544 811 | | 6/2005 |
| GB | 2 326 830 | | 1/1999 |
| JP | 2007-229277 | | 9/2007 |
| WO | WO 03/083795 | | 10/2003 |
| WO | WO 2004/051587 | A1 | 6/2004 |
| WO | WO 2004/095383 | | 11/2004 |
| WO | WO 2005/016471 | A1 | 2/2005 |

OTHER PUBLICATIONS

Office Action issued Aug. 19, 2010, in State Intelllectual Property Office of the P.R.C.,Application code: I/000949(084), (filed Apr. 3, 2009, with English translation).

U.S. Appl. No. 12/206,460, filed Sep. 8, 2008, Kato.

U.S. Appl. No. 12/404,778, filed Mar. 16, 2009, Kato.

U.S. Appl. No. 12/474,935, filed May 29, 2009, Kato, et al.

Official Gazette issued Jul. 20, 2011, from Macau Intellectual Property Office and the English translation thereof.

Official Examination and Analysis made on Jun. 22, 2011 in the Macau Intellectual Property Office Application No. I/000935(248) and the English Translation thereof.

Official Action sent from State Intellectual Property Office to Macau Intellectual Property Office issued on Mar. 10, 2011, Application No. I/000935(248) and the English translation thereof.

* cited by examiner

FIG. 8

PROVISION TABLE (PROVISION WITH RESPECT TO 1 BET)

| SYMBOL | NUMBER OF APPEARING SYMBOLS | | |
|---|---|---|---|
| | 3 | 4 | 5 |
| 7 | 30 | 60 | BONUS TRIGGER |
| A | 20 | 40 | 60 |
| K | 10 | 20 | 30 |
| Q | - | 10 | 20 |
| J | - | - | 10 |

| SYMBOL | ACQUIRED POINTS |
|---|---|
|  BLUE 7 | 300 |
|  RED 7 | 150 |
| BAR BAR BAR 3 BAR | 30 |
| BAR BAR 2 BAR | 20 |
| BAR 1 BAR | 10 |

FIG. 36

PROVISION TABLE (PROVISION WITH RESPECT TO 1 BET)

| SYMBOL | NUMBER OF APPEARING SYMBOLS | | |
|---|---|---|---|
| | 3 | 4 | 5 |
| 7 | 30 | 60 | BONUS TRIGGER |
| A | 20 | 40 | 60 |
| K | 10 | 20 | 30 |
| Q | - | 10 | 20 |
| J | - | - | 10 |

| SYMBOL | ACQUIRED POINTS |
|---|---|
|  BLUE 7 | 300 |
|  RED 7 | 150 |
|  3 BAR | 30 |
|  2 BAR | 20 |
|  1 BAR | 10 |

FIG. 64

PROVISION TABLE (PROVISION WITH RESPECT TO 1 BET)

| SYMBOL | NUMBER OF APPEARING SYMBOLS | | |
|---|---|---|---|
| | 3 | 4 | 5 |
| 7 | 30 | 60 | BONUS TRIGGER |
| A | 20 | 40 | 60 |
| K | 10 | 20 | 30 |
| Q | - | 10 | 20 |
| J | - | - | 10 |

FIG. 69

| SYMBOLS | ACQUIRED POINTS |
|---|---|
| 7<br>BLUE 7 | 300 |
| 7<br>RED 7 | 150 |
| BAR<br>BAR<br>BAR<br>3 BAR | 30 |
| BAR<br>BAR<br>2 BAR | 20 |
| BAR<br>1 BAR | 10 |

GAMING SYSTEM FOR COMPETING FOR PRIZE OF PROGRESSIVE BONUS AT PLURAL TERMINALS

CROSS-REFERENCE TO RELATED APPLICATION

This application is based upon and claims the benefit of U.S. Provisional Patent Application Ser. No. 61/036,724, filed on Mar. 14, 2008, U.S. Provisional Patent Application Ser. No. 61/042,157, filed on Apr. 3, 2008 and U.S. Provisional Patent Application Ser. No. 61/039,650, filed on Mar. 26, 2008; the entire contents of the above Applications are incorporated herein by reference for all purposes.

BACKGROUND OF THE INVENTION

1. Field of the Invention

The present invention relates to a gaming system that includes a plurality of gaming terminals and executes an event game for competing for acquisition of a progressive bonus at the respective gaming terminals when a count value of a progressive bonus counter, which is accumulated by executing games at the respective gaming terminals, has reached a predetermined value.

2. Description of the Related Art

As gaming machines such as slot machines, there are known those described in U.S. Pat. No. 5,820,459, U.S. Pat. No. 6,695,697, US Patent Published Application No. 2003/0069073, European Patent Published Application No. 1192975, U.S. Pat. No. 6,254,483, U.S. Pat. No. 5,611,730, U.S. Pat. No. 5,639,088, U.S. Pat. No. 6,257,981, U.S. Pat. No. 6234896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, European Patent Published Application No. 0631798, German Patent Published Application No. 4137010, UK Patent Published Application No. 2326830, German Patent Published Application No. 3712841, U.S. Pat. No. 4,964,638, U.S. Pat. No. 6,089,980, U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, European Patent Published Application No. 1302914, U.S. Pat. No. 4,624,459, U.S. Pat. No. 5,564,700, International Publication No. 03/083795, German Patent Published Application No. 3242890, European Patent Published Application No. 0840264, German Patent Published Application No. 10049444, International Publication No. 04/095383, European Patent Published Application No. 1544811, U.S. Pat. No. 5,890,963, European Patent Published Application No. 1477947, and European Patent Published Application No. 1351180.

In a facility where the gaming machines as described above are placed, a player makes a bet by coins and credits to the gaming machine, and thereby can play a game provided by the gaming machine concerned.

For example, every time when the player makes the bet to a slot machine as an example of the gaming machine and presses a START switch, the slot machine executes a slot game in which a plurality of symbols arranged on a display are rearranged. Then, in the case where a combination of the symbols rearranged on the display has become a predetermined winning combination, the slot machine provides an award corresponding to this winning combination.

Moreover, the slot machine also provides a jackpot (progressive bonus). Specifically, the slot machine reserves, as a bet for the jackpot, a part of the bet such as the coins and the credits, which is made to the slot machine. Then, the slot machine decides whether or not to provide a bet for the jackpot at predetermined timing, and in the case of having decided to provide the bet, provides the entirety or a part of the reserved bet for the jackpot to the player.

However, the conventional gaming machine as described above only provides the bet for the jackpot when the jackpot is won, and it is desired that a gaming system provided with a new entertainment factor appears.

SUMMARY OF THE INVENTION

A first aspect of the present invention is a gaming system, including: a plurality of gaming terminals; a common display; and a progressive bonus counter, wherein each of the gaming terminals includes: a terminal display that displays thereon an image regarding a progress of a game; and a controller configured to: (A) execute the game by receiving a bet, and accumulate a part of the bet in the progressive bonus counter; (B) display an image on the common display and execute an event game which the plurality of gaming terminals participate in when the game is being executed in the plurality of gaming terminals and an accumulated count value of the progressive bonus counter has reached a predetermined value; and (C) provide an award corresponding to a part or entirety of the accumulated count value to the gaming terminal that has won the event game.

A second aspect of the present invention is a gaming system, including: a plurality of gaming terminals; a common display; and a progressive bonus counter, wherein each of the gaming terminals has: a terminal display that displays thereon an image regarding a progress of a game; and a controller configured to execute: (A) processing for executing the game upon receiving a bet, and accumulating a part of the bet in the progressive bonus counter; (B) processing for determining whether or not the game is being executed in the plurality of gaming terminals; (C) processing for determining whether or not an accumulated count value of the progressive bonus counter has reached a predetermined value; (D) processing for displaying an image on the common display and deciding execution of an event game in which the plurality of gaming terminals participate in a case where it is determined that the game is being executed in the plurality of gaming terminals in the processing for determining whether or not the game is being executed in the plurality of gaming terminals, and it is determined that the accumulated count value of the progressive bonus counter has reached the predetermined value in the processing for determining whether or not an accumulated count value of the progressive bonus counter has reached a predetermined value; (E) processing for determining a number of continuation times for continuing the event game based on an external input; (F) processing for cumulatively adding up points in each of the gaming terminals in response to symbols rearranged in the event game, the points being set individually for the symbols; (G) processing for determining whether or not each of the gaming terminals wins the event game in accordance with the points individually added up in each of the gaming terminals; and (H) processing for providing an award corresponding to a part or entirety of the accumulated count value to the gaming terminal that has won the event game.

A third aspect of the present invention is a gaming system, which includes: a plurality of gaming terminals, each of which has: a controller that executes a game upon receiving a bet and then generates an award based on a result of the game; and a terminal display that displays thereon an image regarding a progress of the game; and a main controller that is connected to the controllers of the plurality of gaming terminals, and has: a progressive bonus counter; and a set operating ratio storage unit that stores a set operating ratio. The main controller executes: (A) processing for accumulating a part of the bet of each of the plurality of gaming terminals or a part of the award of each of the plurality of gaming terminals in the progressive bonus counter; (B) processing for determining whether or not an accumulated count value of the progressive bonus counter has reached a predetermined value; (C) processing for determining whether or not two or more of the gaming terminals exist, the gaming terminals being under operation, in which operating ratios are the set operating ratio or more, when it has been determined that the accumulated count value of the progressive bonus counter has reached the predetermined value; and (D) processing, in a case where the two or more of gaming terminals exist, the gaming terminals being under operation, in which the operating ratios are the set operating ratio or more, for issuing an execution command of an event game for competing for a prize with the two or more of gaming terminals.

BRIEF DESCRIPTION OF THE DRAWINGS

FIG. 8 is a view showing a provision table of a slot game executed by the slot machine according to the embodiment.

FIG. 36 is a view showing a provision table of a slot game executed by the slot machine according to the other embodiment.

FIG. 64 is a view showing a provision table of a slot game executed by the slot machine according to the further embodiment.

FIG. 69 is a diagram showing relationships between symbols and acquired points in an event game according to the further embodiment.

DETAILED DESCRIPTION OF THE EMBODIMENT

Figure 1:
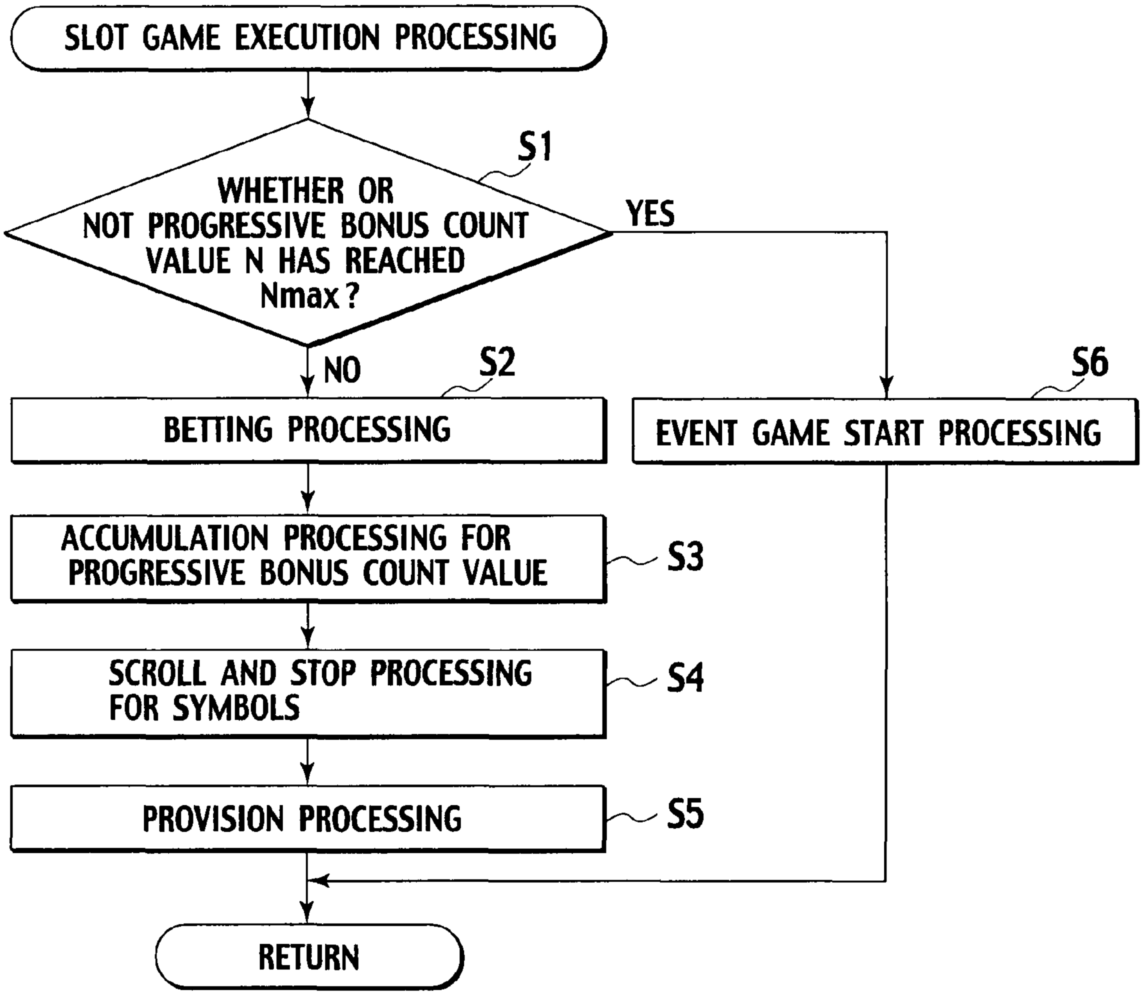
FIG. 1 is a flowchart showing a schematic processing procedure of a slot game executed by a gaming system according to an embodiment.
Figure 4:
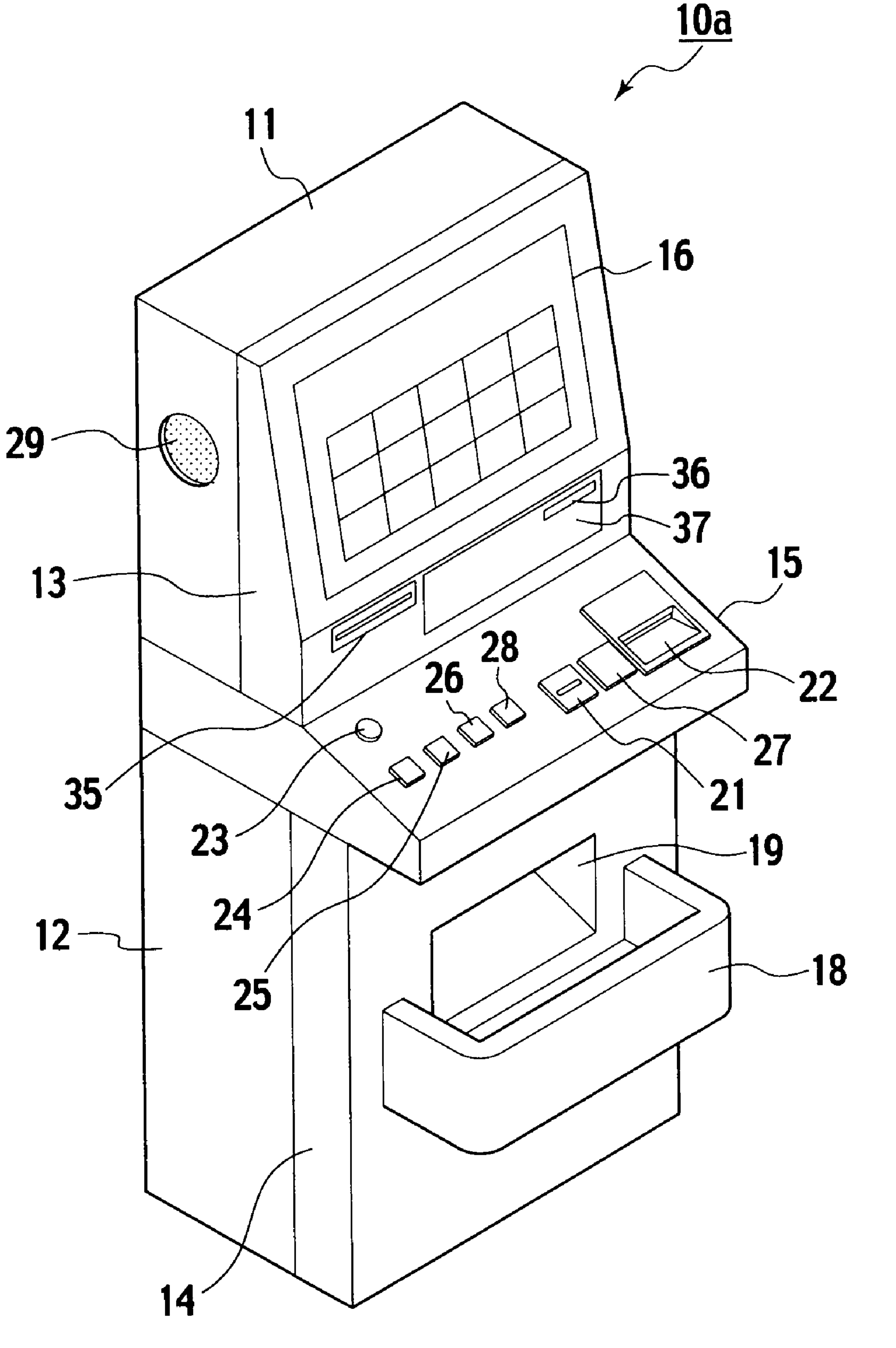
FIG. 4 is an entire configuration view of a slot machine for use in the gaming system according to the embodiment.
Figure 5:
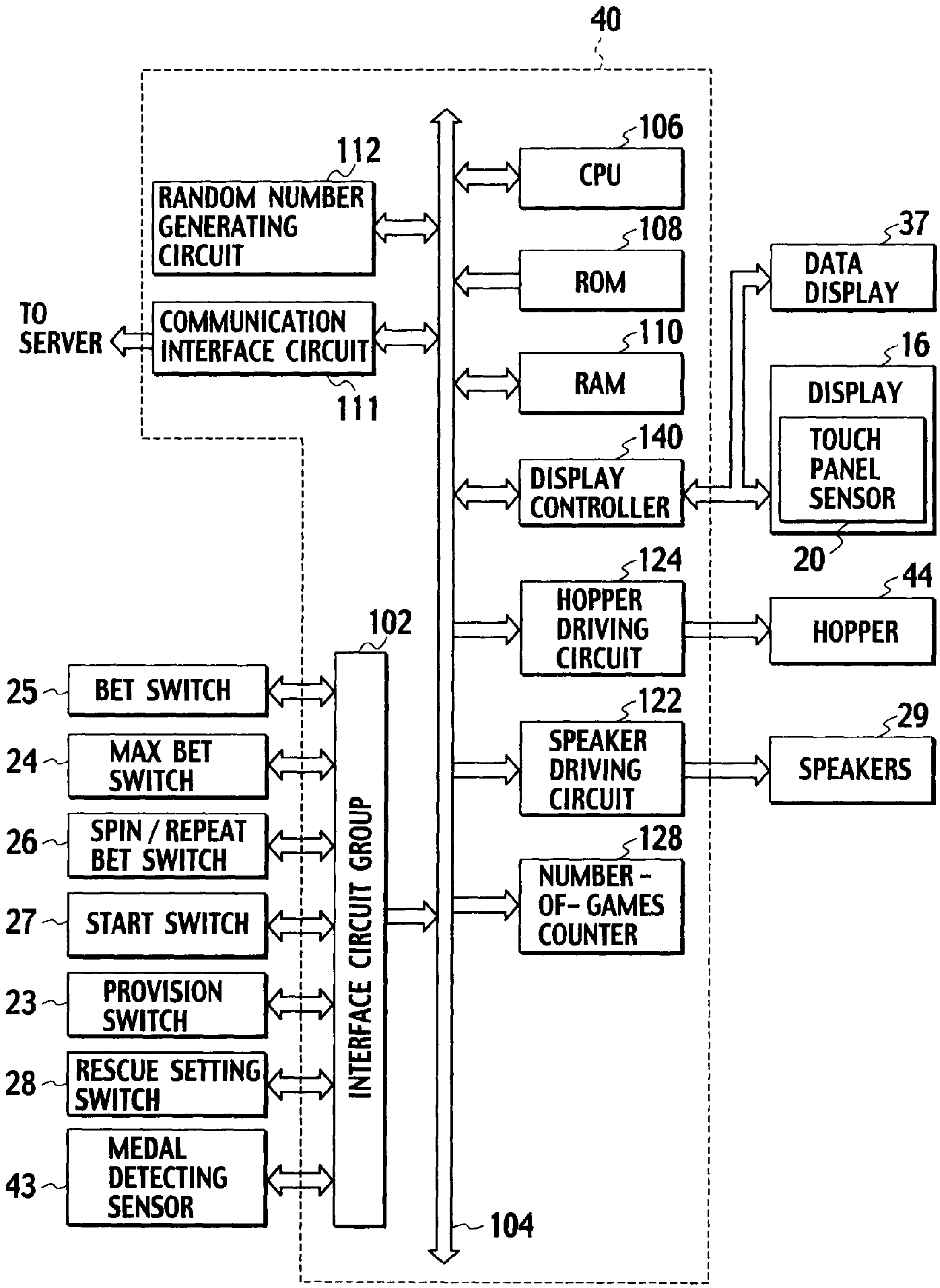
FIG. 5 is a block diagram showing an internal configuration of the slot machine for use in the gaming system according to the embodiment.

FIG. 1 is a flowchart showing a schematic processing procedure of slot game execution processing executed by a slot machine provided in a gaming system according to the embodiment, FIG. 4 is an exterior appearance view of the slot machine 10, a plurality (10*a* to 10*e*) of which is provided in the gaming system according to the embodiment, and FIG. 5 is a block diagram showing an internal configuration of the slot machine 10 (10*a* to 10*e*). A description will be made below of the schematic processing procedure in the gaming system according to the embodiment with reference to the respective drawings.

First, a controller 40 (refer to FIG. 5) determines whether or not an accumulated count value N of a progressive bonus counter 77 (refer to FIG. 6), which is accumulated following execution of slot games, has reached a predetermined value Nmax (Step S1). Then, in the case where the accumulated count value N has not reached Nmax (NO in Step S1), the controller 40 executes a usual slot game. Specifically, the controller 40 receives betting made by a player (Step S2), and accumulates a part of a bet thus made to the progressive bonus counter 77 (Step S3).

Moreover, the controller 40 scrolls a plurality of symbols on a display 16 (refer to FIG. 5), and thereafter stops the symbols thereon (Step S4). Then, based on a combination of the stopped symbols, the controller 40 determines whether or not a winning is established. In the case where the winning is established, provision processing for providing medals or credits to the player is performed (Step S5).

Meanwhile, in the case where the accumulated count value N of the progressive bonus counter 77 has reached the predetermined value Nmax (YES in Step S1), event game start processing is executed in the slot machines 10 in each of which such a play is being executed among the respective slot machines 10 (10*a* to 10*e*) (Step S6).

In the event game start processing, an event game is executed in the case where a plurality of the players participate in the slot game. Moreover, in the case where only one player participates in the slot game, a mystery bonus is generated in the slot machine of this player. Note that a determination as to whether or not each player participates in the slot game is made based on a behavior in each of such gaming terminals. For example, in the case where a START switch 27 is pressed, it is determined that the player participates in the slot game by the gaming terminal until a predetermined time thereafter elapses.

In the case where the event game is executed, as will be described later, a game for acquiring a progressive bonus is executed by each slot machine 10 that participates therein. Specifically, an award corresponding to a part or entirety of the accumulated count value N of the progressive bonus counter 77 is provided to the slot machine 10 that has won the event game among the slot machines 10 which have participated therein.

Then, the above-described event game is executed, thus making it possible to allow each player to enhance interest in executing the slot game, and possible to enhance an entertainment factor of the gaming system.

Figure 2:
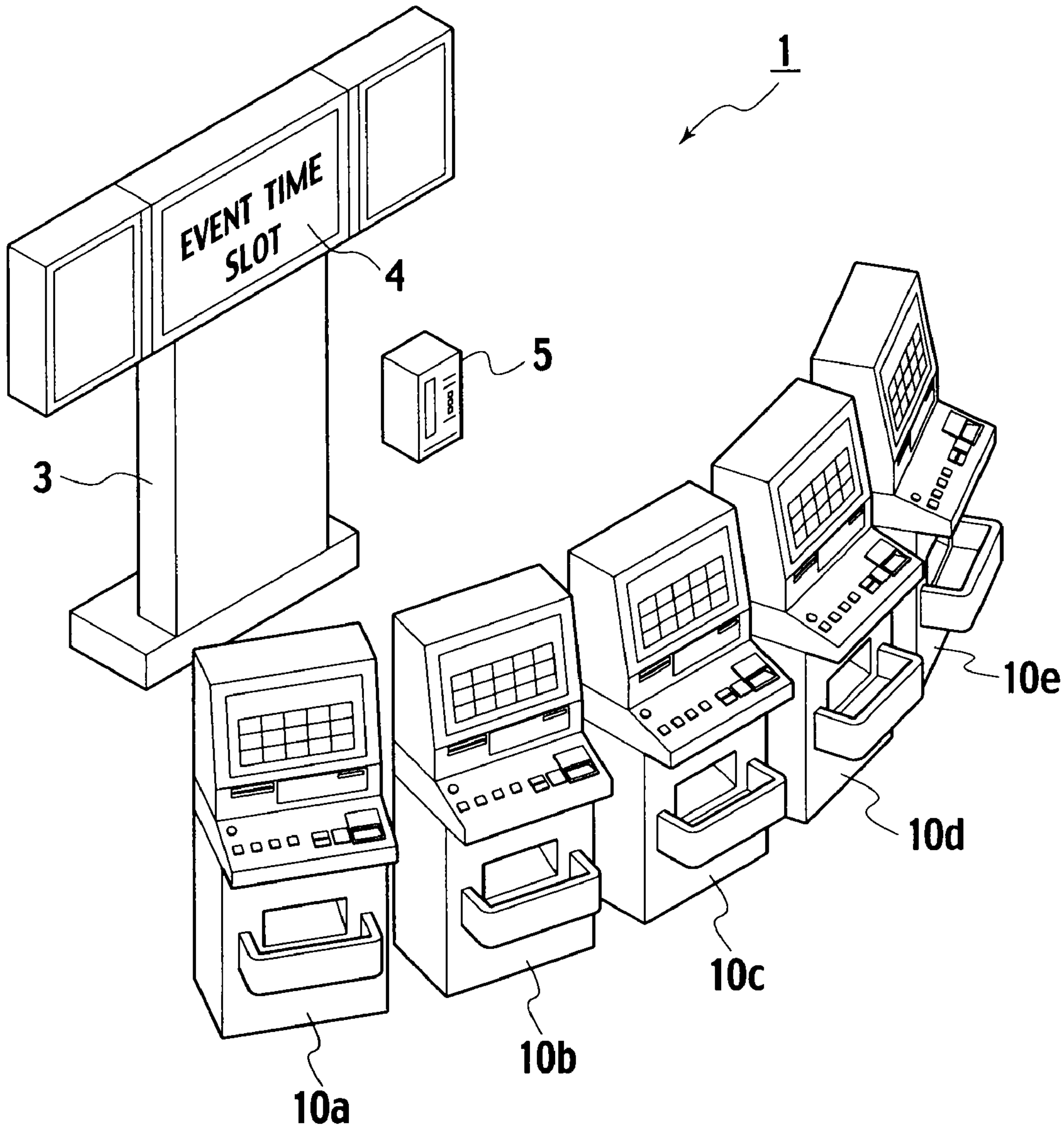
FIG. 2 is an entire configuration view of a gaming system according to the embodiment.

Next, a description will be made of the gaming system 1 according to this embodiment. As shown in FIG. 2, in the gaming system 1 according to this embodiment, a common display 4 is provided on a support member 3, and further, the plurality (five in the drawing) of slot machines 10 (10*a* to 10*e*) are arranged so as to surround the common display 4 concerned. Moreover, a server 5 that comprehensively controls the respective slot machines 10 (10*a* to 10*e*) and performs a display control for the common display 4 is provided.

Each of the slot machines 10 is adapted to be capable of executing the slot game, and as will be described later, in the case where the accumulated count value N of the progressive bonus counter 77 provided commonly to the respective slot machines 10 becomes the predetermined value Nmax, and a plurality of the players participate in the slot game, the event game common to the respective slot machines 10 is executed.

Figure 3:
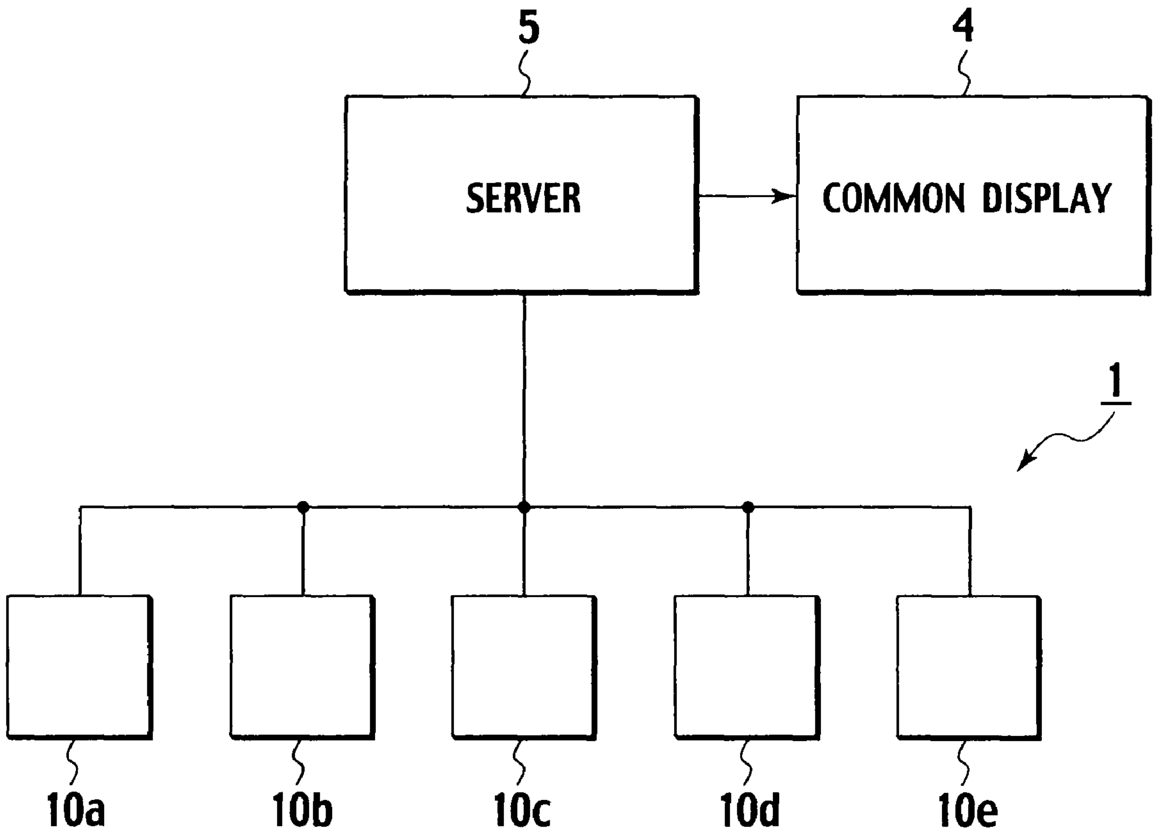
FIG. 3 is a network connection diagram of the gaming system according to the embodiment.

FIG. 3 is a network connection diagram of the gaming system 1 according to this embodiment. As shown in FIG. 3, the plurality of slot machines 10 (10*a* to 10*e*) are connected through a network to the server 5. Moreover, the server 5 is connected to the common display 4.

Next, a description will be made of a configuration of the slot machine 10 with reference to FIG. 4. Note that the respective slot machines 10 (10*a* to 10*e*) have the same configuration, and accordingly, the description will be made by taking the slot machine 10*a* as an example. As shown in FIG. 4, the slot machine 10*a* according to this embodiment includes: an upper cabinet 11; a lower cabinet 12; and an operation table 15 provided so as to protrude forward between the upper cabinet 11 and the lower cabinet 12.

An upper door 13 is provided on the upper cabinet 11, and is adapted to be openable and closable by a hinge (not shown). In a similar way, a lower door 14 is provided on the lower cabinet 12, and is adapted to be openable and closable by a hinge (not shown). At a usual time, the slot game is executed in a state where the upper door 13 and the lower door 14 are closed, and at the time when a failure occurs in the slot machine 10 and the slot machine 10 is maintained, the upper door 13 and the lower door 14 are opened and closed by an administrator who owns an exclusive key.

Moreover, in the upper cabinet 11, there are provided a variety of constituent members including: the controller 40 (refer to FIG. 5) for electrically controlling this slot machine 10; a hopper 44 (refer to FIG. 5) for controlling insertion, storage and provision of the medals; and the like. Furthermore, on side surfaces of the upper cabinet 11, speakers 29 for outputting an effect sound that follows the execution of the slot game are provided.

The display 16 is provided on a front surface of the upper door 13, which faces to the player. On the display 16, images regarding the game are displayed. Specifically, in the slot machine 10*a* for use in this embodiment, totally 15 symbols with a matrix of three rows and five columns are displayed, and when the slot game is executed, the respective symbols start to be scrolled, and are then stopped after a predetermined time has elapsed. Then, it is determined whether or not winning is established in response to the combination of the stopped symbols, and a predetermined amount of provision will be generated in the case where the winning is generated. Moreover, besides the above-described symbols, a variety of effect images are displayed on the display 16 as the slot game advances.

Moreover, on a surface of the display 16, a touch panel sensor 20 (refer to FIG. 5) that detects a touching operation performed by the player is provided. By using the touch panel sensor 20, the player can perform an input operation by touching the image displayed on the display 16.

Furthermore, below the display 16, a ticket printer 35, a card reader 36 and a data display 37 are provided.

The ticket printer 35 prints, on a ticket, a bar code in which respective data such as the number of credits, a date and an identification number of the slot machine 10*a* are encoded, and outputs the ticket as a bar code-added ticket. The player allows another slot machine to read the bar code-added ticket, and thereby can play the game on the slot machine concerned, or can exchange the bar code-added ticket with bills and the like at a predetermined spot (for example, a cashier in a casino) of a game facility.

The card reader 36 is capable of receiving a smart card, and reads data from the smart card thus inserted thereinto, and writes data into the smart card. The smart card is a card carried by the player, in which data for identifying the player, data regarding a history of the games played by the player, and the like are stored.

On the data display 37, a variety of data regarding the slot game is displayed. For example, data on such a play history, the number of credits, the number of provision and the like is displayed on the data display 37.

Note that, though the medals are mentioned as an example of the bet for use in the case of executing the game in this embodiment, the bet is not limited to the medals. For example, coins, tokens, electronic money, or electronic valuable information (credits) equivalent to these can be mentioned.

Moreover, on the operation table 15, there are provided: a PROVISION switch 23; a MAX BET switch 24; a BET switch 25; a SPIN/REPEAT BET switch 26; the START switch 27; and a RESCUE SETTING switch 28. Moreover, on the operation table 15, there are provided: a medal insertion slot 21 for inserting therethrough the medals for use in the case of executing the game; and a bill validator 22 for identifying whether or not the bills are real ones and receiving the real bills.

The PROVISION switch 23 is a switch for providing the inserted medals. The medals to be provided are discharged from a medal provision port 19 open on a front surface of the lower door 14. The medals thus provided are accumulated in a medal tray 18.

The MAX BET switch 24 is a switch for betting, by one operation, the maximum number (for example, equivalent to 10 medals) of credits bettable in one slot game. Note that it is possible to change the maximum number of credits bettable in one slot game by an operation of the administrator. For example, a setting can also be made so that, for example, betting equivalent to 50 medals to the maximum can be enabled.

The BET switch 25 is a switch for deciding the number of credits to be bet on the slot game executed on the display 16. Every time when the BET switch 25 is pressed, a credit equivalent to one medal is bet.

The SPIN/REPEAT BET switch 26 is a switch for betting credits again without changing the number of credits bet by the above-described BET switch 25 in the game executed last time, thereby playing the slot game.

The START switch 27 is a switch for starting the slot game on the display 16 after the credits are bet. When the START switch 27 is pressed after the medals are inserted into the medal insertion slot 21 or after the credits are bet by the BET switch 25, the slot game is started, in which the symbols are stopped after being scrolled on the respective display areas with the matrix of three rows and five columns on the display 16.

The RESCUE SETTING switch 28 is a switch for joining "rescue pay (insurance pay)". The rescue pay is a function to compensate for losses of the player by generating a predetermined amount of provision when the player does not win a bonus trigger continuously for a predetermined number of games (for example, 1000 times) at the time of executing the slot games. In the rescue pay, for example, one medal is collected with respect to betting of 10 medals, and at the time when the rescue pay is generated, for example, 2000 medals are provided. The player can determine by him/herself whether or not to join the rescue pay.

FIG. 5 is a block diagram showing an electric configuration of the controller 40 provided in the slot machine 10*a* according to this embodiment, and of the variety of instruments connected to the controller 40. The controller 40 shown in FIG. 5 is a microcomputer, and includes: an interface circuit group 102; an input/output bus 104; a CPU 106; a ROM 108; a RAM 110; a communication interface circuit 111; a random number generating circuit 112; a speaker driving circuit 122; a hopper driving circuit 124; a number-of-games counter 128; and a display controller 140.

The interface circuit group 102 is connected to the input/output bus 104. The input/output bus 104 transfers a data signal or an address signal with the CPU 106.

The START switch 27 is connected to the interface circuit group 102. A starting signal outputted from the START switch 27 is converted into a predetermined signal in the interface circuit group 102, and is then transmitted to the CPU 106 through the input/output bus 104.

Moreover, to the interface circuit group 102, there are connected: the BET switch 25; the MAX BET switch 24; the SPIN/REPEAT BET switch 26; the PROVISION switch 23; and the RESCUE SETTING switch 28. The respective switching signals outputted from the respective switches 25, 24, 26, 23 and 28 are supplied to the interface circuit group 102, are converted into predetermined signals in the interface circuit group 102, and are then transmitted to the CPU 106 through the input/output bus 104.

In addition, a medal detecting sensor 43 is connected to the interface circuit group 102. The medal detecting sensor 43 is a sensor for detecting the medals inserted into the medal insertion slot 21, and is provided in a medal insertion spot of the medal insertion slot 21. A detection signal outputted from the medal detecting sensor 43 is supplied to the interface circuit group 102, is converted into a predetermined signal by the interface circuit group 102, and is then transmitted to the CPU 106 through the input/output bus 104.

To the input/output bus 104, there are connected: the ROM 108 in which a system program is stored; and the RAM 110 for storing a variety of data. Moreover, to the input/output bus 104, there are connected: the random number generating circuit 112; the communication interface circuit 111; the display controller 140; the hopper driving circuit 124; the speaker driving circuit 122; and the number-of-games counter 128.

On an occasion that such a starting operation for the game has been received by the START switch 27, the CPU 106 reads out a game execution program, and executes the slot game. The game execution program is a program for executing the slot game on the display 16 through the display controller 140.

Specifically, the game execution program is programmed so as to execute the slot game that generates the provision when the totally 15 symbols are scrolled on the display areas of the display 16 and are thereafter stopped, and symbols which form a winning combination consequently come from among the stopped symbols.

The communication interface circuit 111 is connected to the server 5 through the network, and transmits, to the server 5, the data on the play history of the games executed by this slot machine 10*a*. Moreover, the communication interface circuit 111 receives a variety of data transmitted from the server 5.

The random number generating circuit 112 generates random numbers for deciding whether or not to generate the winning combination in the slot game executed on the display 16.

The number-of-games counter 128 is a counter for counting the number of times that the slot games are executed. The number-of-games counter 128 starts to count the number on an occasion that the rescue pay is turned on, and resets a count value in the case where a bonus game to be described later is executed. Then, in the case where the count value has reached the predetermined value (for example, 1000), the rescue pay is generated. Note that it is also possible to set the number-of-games counter 128 in the RAM 110.

The speaker driving circuit 122 outputs an audio signal to the speakers 29. Specifically, the CPU 106 reads out the audio data stored in the ROM 108, and transmits the audio data to the speaker driving circuit 122 through the input/output bus 104. In such a way, a predetermined effect sound is emitted from the speakers 29.

The hopper driving circuit 124 outputs a provision signal to the hopper 44 when provision occurs. Specifically, upon receiving a provision signal from the PROVISION switch 23, the CPU 106 outputs a drive signal to the hopper driving circuit 124 through the input/output bus 104. In such a way, the hopper 44 provides the medals of the number equivalent to the remaining number of credits at that point of time, which is stored in a predetermined memory area of the RAM 110.

The display controller 140 performs a display control to execute the slot game on the display 16. Specifically, the CPU 106 generates a signal of an image display command, which corresponds to a state of the slot game and a result of the slot game, and outputs the signal of the image display command to the display controller 140 through the input/output bus 104. Upon receiving the signal of the image display command, which is outputted from the CPU 106, the display controller 140 generates a drive signal for driving the display 16 based on the image display command concerned, and outputs the generated drive signal to the display 16. In such a way, a variety of images such as the effect images and an image that explains the game are displayed on the display 16. Moreover, the display controller 140 performs a display control for the data display 37. Furthermore, the display controller 140 outputs, to the CPU 106, an operation signal inputted from the touch panel sensor 20.

Next, a description will be made of an electric configuration of the server 5 with reference to a block diagram shown in FIG. 6. The server 5 performs controls to accumulate, in the progressive bonus counter 77, the count values of the progressive bonuses generated by executing the slot games by the respective slot machines 10 (10*a* to 10*e*), and to display a variety of information regarding the event game on the common display 4 when the event game is executed. Moreover, the server 5 performs a control to provide the award, which corresponds to the accumulated count value N of the progressive bonus counter 77, to the slot machine 10 that has won the event game.

Figure 6:
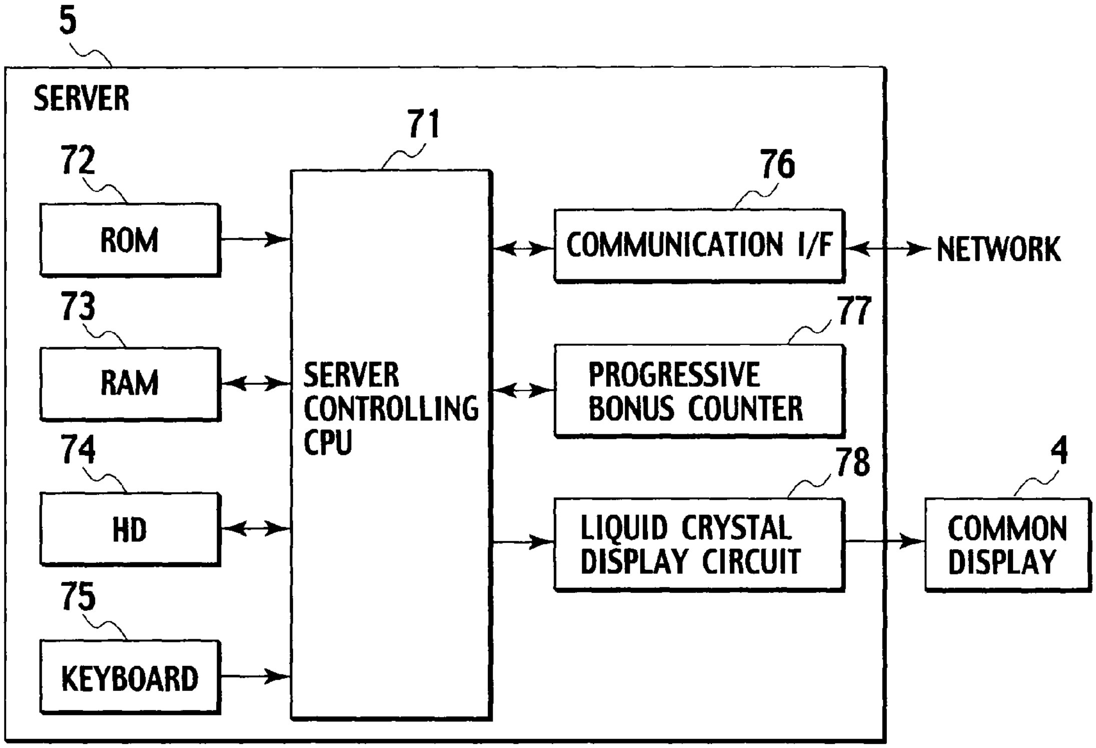
FIG. 6 is a block diagram showing an internal configuration of a server for use in the gaming system according to the embodiment.

As shown in FIG. 6, the server 5 includes: a server controlling CPU 71 that comprehensively controls the slot game; a ROM 72; a RAM 73; a hard disk 74 in which a variety of data such as image data displayed on the common display 4 and a program are stored; a keyboard 75 that receives an operation input of the administrator; a communication I/F 76 that communicates with the respective slot machines 10 (10*a* to 10*e*) through the network; the progressive bonus counter 77 that accumulates and stores the count values of the progressive bonuses; and a liquid crystal driving circuit 78 that performs a display control for the common display 4.

The RAM 73 is one to store a variety of data regarding the control performed by the server controlling CPU 71, and stores the predetermined value Nmax of the accumulated count value N when the value Nmax is decided. Specifically, the predetermined value Nmax of the accumulated count value N can be appropriately changed in such a manner that the administrator operates the keyboard 75, and the set predetermined value Nmax is stored in the RAM 73. Moreover, the players of the respective slot machines 10 are not usually notified of the set predetermined value Nmax and the accumulated count value N of the progressive bonuses.

Figure 7:
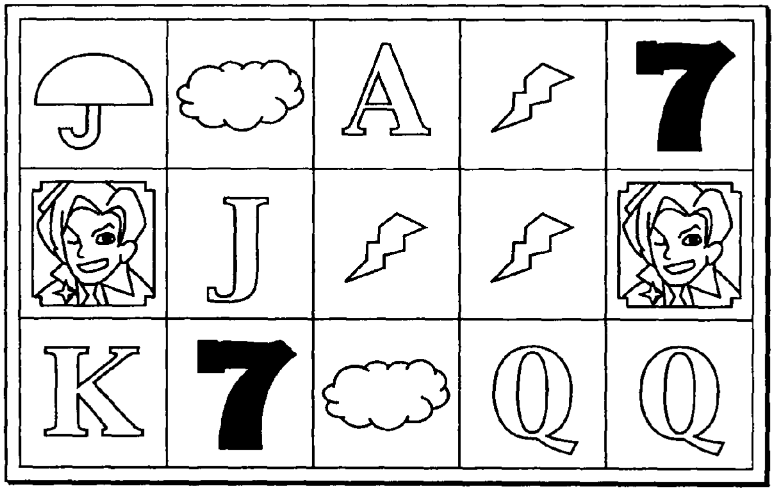
FIG. 7 is an explanatory view of symbols displayed on a display of the slot machine according to the embodiment.

Next, a description will be made of the provision of the slot game executed by each of the slot machines 10 (10*a* to 10*e*) with reference to FIG. 7 and FIG. 8. FIG. 7 is an explanatory view showing an example of the symbols displayed on the totally 15 areas with the matrix of three rows and five columns, which are set on the display 16. As shown in FIG. 7, symbols of "A", "K", "Q", "J", "7" and the like are displayed on the respective display areas. Then, a provision amount is decided in response to the number of the variety of symbols displayed on the 15 display areas.

Specifically, as shown in FIG. 8, in the case where three symbols of "7" have appeared, provision of 30 medals is generated with respect to one bet. In the case where four symbols of "7" have appeared, provision of 60 medals is generated. In the case where five symbols of "7" have appeared, such an appearance becomes a bonus trigger, and the bonus game is executed. Details of the bonus game will be described later.

In a similar way, provision of 20 medals is generated in the case where three symbols of "A" have appeared, provision of 40 medals is generated in the case where four symbols of "A" have appeared, and provision of 60 medals is generated in the case where five symbols of "A" have appeared.

Next, a description will be made of execution processing for the slot game executed by the respective slot machines 10 (10*a* to 10*e*) of the gaming system 1 according to the first embodiment with reference to a flowchart shown in FIG. 9. Since the execution processing for the slot games by the respective slot machines 10 (10*a* to 10*e*) is similar thereamong, a description will be made of the execution processing for the slot game in the slot machine 10*a*.

The controller 40 shown in FIG. 5 determines whether or not the accumulated count value N of the progressive bonus counter has reached the predetermined value Nmax (Step S31). Then, in the case where the accumulated count value N has reached the predetermined value Nmax (YES in Step S31), the controller 40 shifts the processing to the event game start processing (Step S45). Details of the event game start processing will be described later.

Meanwhile, in the case where the accumulated count value N has not reached the predetermined value Nmax (NO in Step S31), the controller 40 determines whether a bonus flag B1 set in the RAM 110 is "0" or "1" (Step S32). In the case where the bonus flag B1 is "1", the controller 40 shifts the processing to bonus game execution processing (Step S46). Details of the bonus game execution processing will be described later. Note that the bonus flag B1 is initially "0".

In the case where the bonus flag B1 is "0", the controller 40 receives a betting operation performed by the player (Step S33). Specifically, the controller 40 receives the betting operation performed in such a manner that the medals are inserted from the medal insertion slot 21, or that any of the MAX BET switch 24, the BET switch 25 and the SPIN/REPEAT BET switch 26 is pressed.

Then, in the case where the betting operation is received (YES in Step S34), the controller 40 performs subtraction processing for the credits. Specifically, the controller 40 performs processing for subtracting the number of bet credits from the number of current credits (Step S35).

To the server 5, the controller 40 transmits a predetermined ratio (for example, 2%) of the number of bets as the count value of the progressive bonus. The server 5 accumulates the transmitted count value of the progressive bonus in the progressive bonus counter 77 (Step S36). Here, by an operation of the administrator, it is possible to appropriately change the ratio of the collected number of bets as the count value of the progressive bonus from the bets.

The controller 40 determines whether or not the START switch 27 is switched on (Step S37). Then, in the case where the START switch 27 is switched on (YES in Step S37), the controller 40 scrolls the 15 symbols displayed on the display 16 (Step S38).

The controller 40 determines whether or not a predetermined time (for example, five seconds) has elapsed since the scroll of the symbols was started (Step S39), and stops the symbols (Step S40) when the predetermined time has elapsed (YES in Step S39).

Based on the stopped 15 symbols, the controller 40 determines whether or not the bonus trigger is established (Step S41). Specifically, as shown in FIG. 8, the controller 40 determines whether or not five symbols of "7" appear, and sets the bonus flag B1 at "1" (Step S42) in the case where the five symbols of "7" appear (YES in Step S41). Thereafter, the controller 40 ends this processing.

Meanwhile, in the case where the bonus trigger is not established, that is, in the case where the five symbols of "7" do not appear (NO in Step S41), the controller 40 determines whether or not a winning is established by the stopped 15 symbols. Specifically, the controller 40 determines whether or not any of the winnings shown in the provision table of FIG. 8 is established (Step S43). Then, in the case where the winning is established (YES in Step S43), the controller 40 performs the provision processing (Step S44). Specifically, the controller 40 provides the medals of which number is based on the provision table. Meanwhile, in the case where the winning is not established (NO in Step S43), the controller 40 ends this processing without performing the provision processing.

As described above, when the slot game is executed, a part (for example, 2%) of the bets is accumulated as the count value of the progressive bonus in the progressive bonus counter 77 provided in the server 5. In the case where the accumulated count value N has reached the predetermined value Nmax, the event game is started. Moreover, in the case where the bonus flag B1 has become "1", the bonus game is executed.

Next, a description will be made of the event game start processing shown in Step S45 of FIG. 9 with reference to a flowchart shown in FIG. 10.

When the accumulated count value N of the progressive bonus counter 77 has reached the predetermined value Nmax, the controller 40 monitors behaviors of the other slot machines 10*b* to 10*e* in order to determine whether or not the slot games are executed therein (Step S50). For example, the controller 40 monitors whether or not it is a point of time within a predetermined time after the START switch 27 was pressed. Besides this, for each of the other slot machines 10*b* to 10*e*, the controller 40 monitors behaviors such as to whether or not a predetermined value (for example, equivalent to 20 medals) or more is credited, whether or not a medal insertion operation is performed, whether or not the player is present, and the like. The behavior as to whether or not the player is present is monitored by using a sensor and the like.

Subsequently, the controller determines whether or not the slot game is being executed in any of the other slot machines 10*b* to 10*e* (Step S51). In this processing, based on the above-described behaviors, the controller 40 determines that the player participates in the slot game by the other slot machine concerned, for example, in the case where it is the point of time within the predetermined time after the START switch 27 was pressed. In the case where the predetermined time or more has elapsed after the START switch 27 was pressed, the controller 40 determines that the player does not participate in the slot game by the other slot machine concerned.

Figure 13:
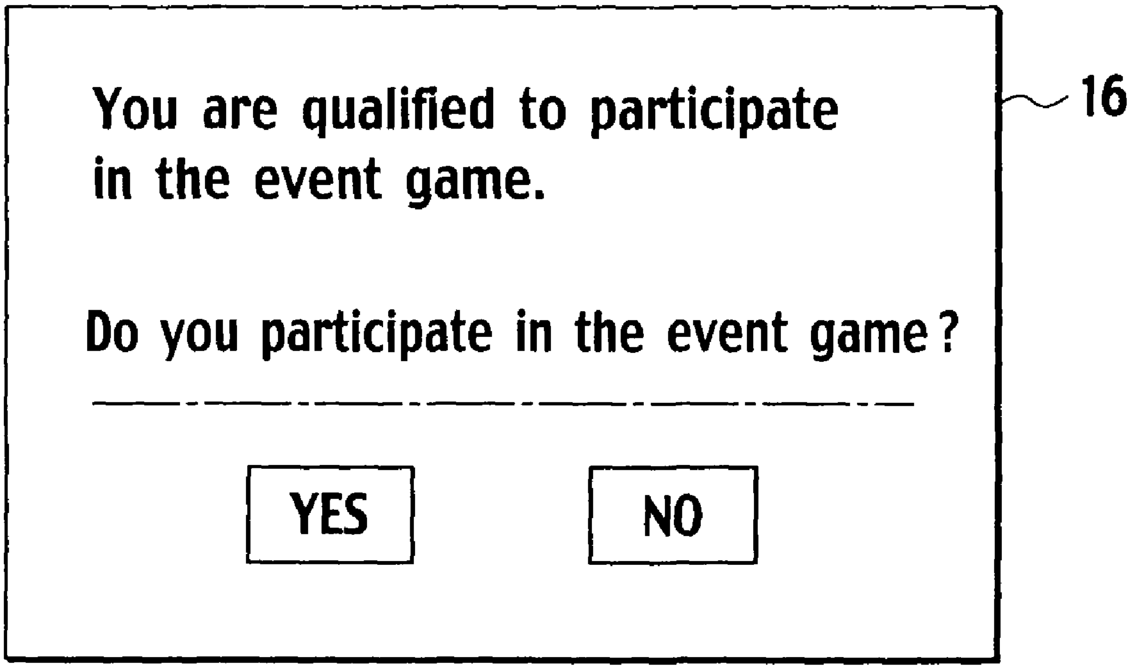
FIG. 13 is an explanatory view showing a display example of a display according to the first embodiment.

Then, in the case where the slot game is being executed in any of the other slot machines 10*b* to 10*e* (YES in Step S51), the controller 40 receives a selection input as to whether or not the player is to participate in the event game. For example, as shown in FIG. 13, the controller 40 displays sentences saying "You are qualified to participate in the event game. Do you participate in the event game?", displays images of "YES" and "NO", and receives an input operation made by means of the touch panel sensor 20 (Step S52).

Figure 9:
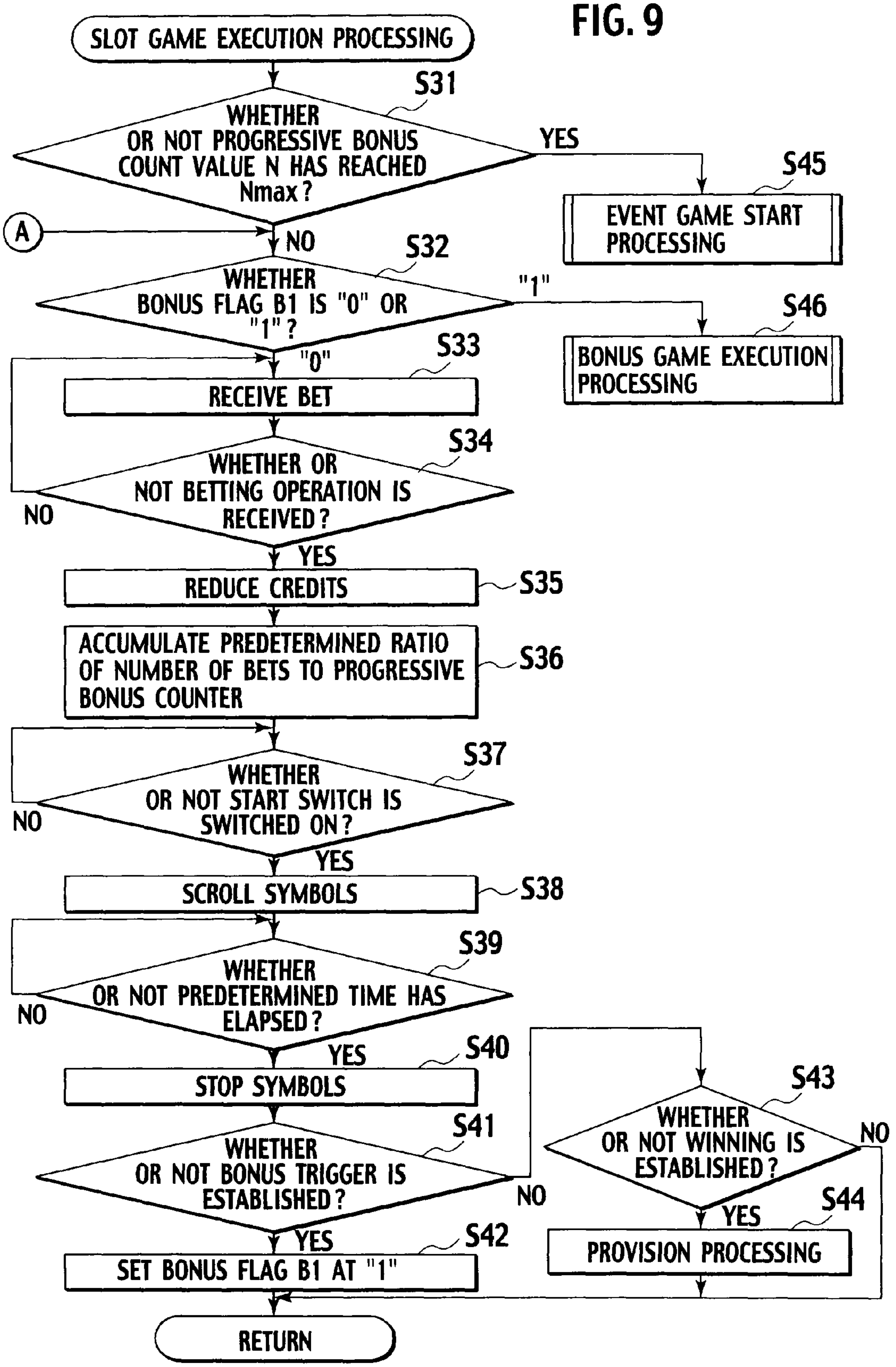
FIG. 9 is a flowchart showing slot game execution processing according to a first embodiment.
Figure 10:
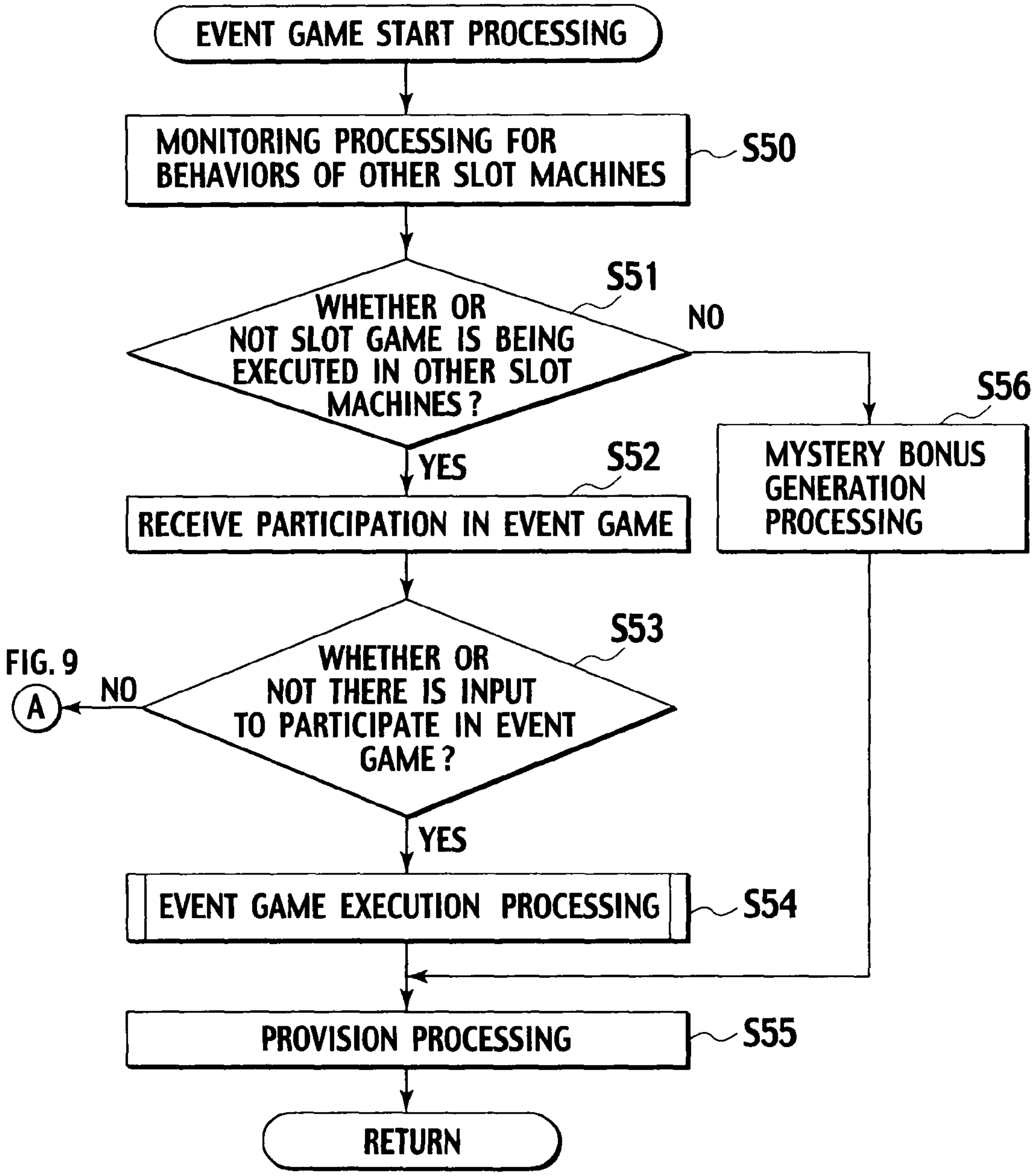
FIG. 10 is a flowchart showing event game start processing according to the first embodiment.

Then, in the case where "NO" is selected (NO in Step S53), the controller 40 shifts to the processing of Step S32 of FIG. 9, and performs the slot game execution processing.

Meanwhile, in the case where "YES" is selected (YES in Step S53), the controller 40 performs event game execution processing (Step S54). Details of the event game execution processing will be described later.

Moreover, in the case where the slot game is not executed in any of the other slot machines 10*b* to 10*e*, that is, in the case where the accumulated count value N of the progressive bonus counter 77 has reached the predetermined value Nmax when the slot game is being executed only in the slot machine 10*a* (NO in Step S51), mystery bonus generation processing is executed (Step S56). In a mystery bonus, when the slot game is being executed in the slot machine 10*a*, the winning is established regardless of the combination of the stopped symbols, and the award corresponding to a part or entirety of the accumulated count value N of the progressive bonus counter 77 is generated.

Thereafter, the provision processing for providing the award generated by executing the event game and the award generated by the mystery bonus is executed (Step S55).

Figure 11:
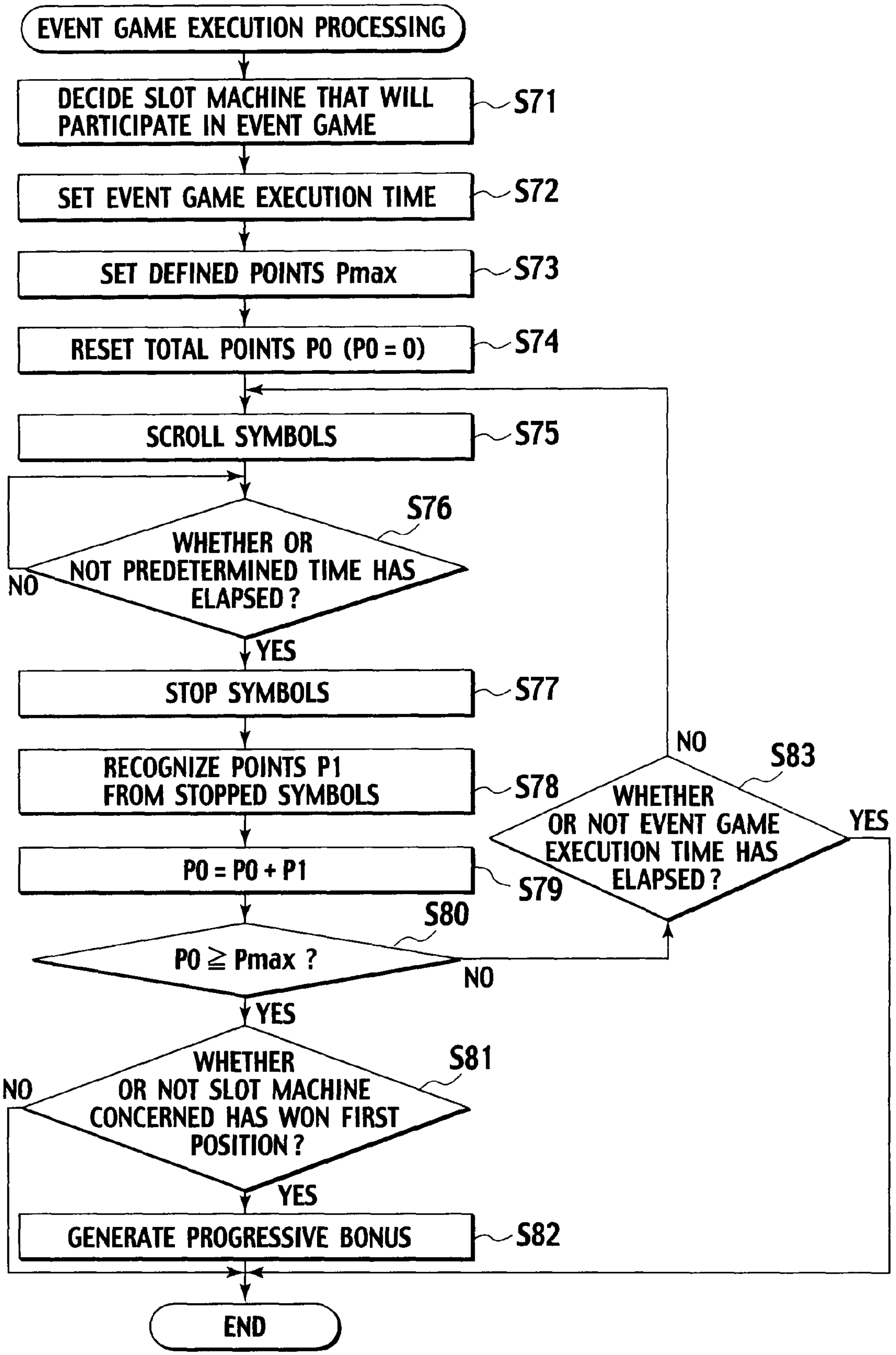
FIG. 11 is a flowchart showing event game execution processing according to the first embodiment.

Next, a description will be made of the event game execution processing shown in Step S54 of FIG. 10 with reference to FIG. 11.

First, the server controlling CPU 71 (refer to FIG. 6) decides the slot machines 10 (some of 10*a* to 10*e*) which will participate in the event game (Step S71). As described above, the slot machines, in each of which the slot game is being executed when the accumulated count value N of the progressive bonus counter 77 has reached the predetermined value Nmax, and the input operation for participating in the event game is performed, are decided as the slot machines 10 which will participate in the event game.

Subsequently, the server controlling CPU 71 sets an execution time of the event game (Step S72). The execution time of the event game is randomly selected from a plurality of time ranges (for example, three minutes, five minutes, seven minutes and 10 minutes). Moreover, the execution time may be always set at the same time range (for example, five minutes).

The server controlling CPU 71 sets a defined number of points Pmax for the event game (Step S73). The defined number of points Pmax is the number of points, which is necessary to win the event game.

Moreover, the server controlling CPU 71 resets a total number of points P0, which is set for each of the slot machines 10 which will participate in the event game (Step S74). The total number of points P0 is a total value of points generated by executing the event game, and details thereof will be described later.

Subsequently, when the START switch 27 is pressed by the player, the controller 40 of each of the slot machines 10 scrolls the symbols on the display 16 (Step S75), and stops the symbols (Step S77) after a predetermined time elapsed (YES in Step S76). Specifically, in the event game, the medals or the credits are not lost since it is not necessary to bet the medals or the credits.

Figure 14:
FIG. 14 is a diagram showing relationships between symbols and acquired points in an event game according to the embodiment.
Figure 14:

In the event game, the symbols which appear therein differ from those in the usual slot game, and five sorts of symbols, which are "BLUE 7", "RED 7", "3 BAR", "2 BAR" and "1 BAR", will appear as shown in FIG. 14. Then, the points to be generated are decided by the symbols stopped on a centerline L1 (refer to FIG. 15). Specifically, as shown in FIG. 14, the points become 300 points when the "BLUE 7" is stopped on the centerline L1, become 150 points when the "RED 7" is stopped thereon, become 30 points when the "3 BAR" is stopped thereon, become 20 points when the "2 BAR" is stopped thereon, become 10 points when the "1 BAR" is stopped thereon, and become 0 point when any of the symbols is not stopped thereon.

Figure 15A:
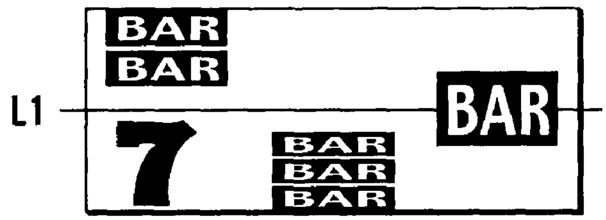
FIGS. 15A, 15B and 15C are display examples of the event game according to the embodiment.
Figure 15B:
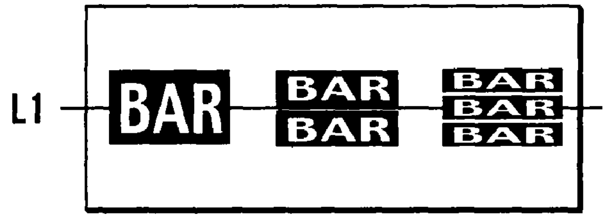
Figure 15C:
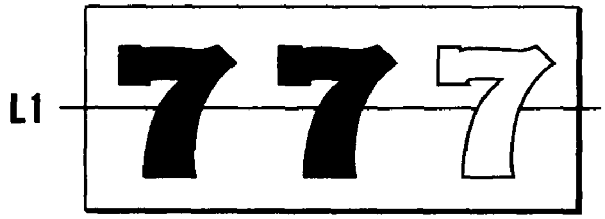

The controller 40 recognizes points P1 from the stopped symbols (Step S78). For example, as shown in FIG. 15A, when the symbols are stopped in a pattern of "None, None, 1 BAR", the points P1 become 10 points. As shown in FIG. 15B, when the symbols are stopped in a pattern of "1 BAR-2 BAR-3 BAR", the points P1 become 60 points. As shown in FIG. 15C, when the symbols are stopped in a pattern of "RED 7-RED 7-BLUE 7", the points P1 become 600 points.

Figure 16:
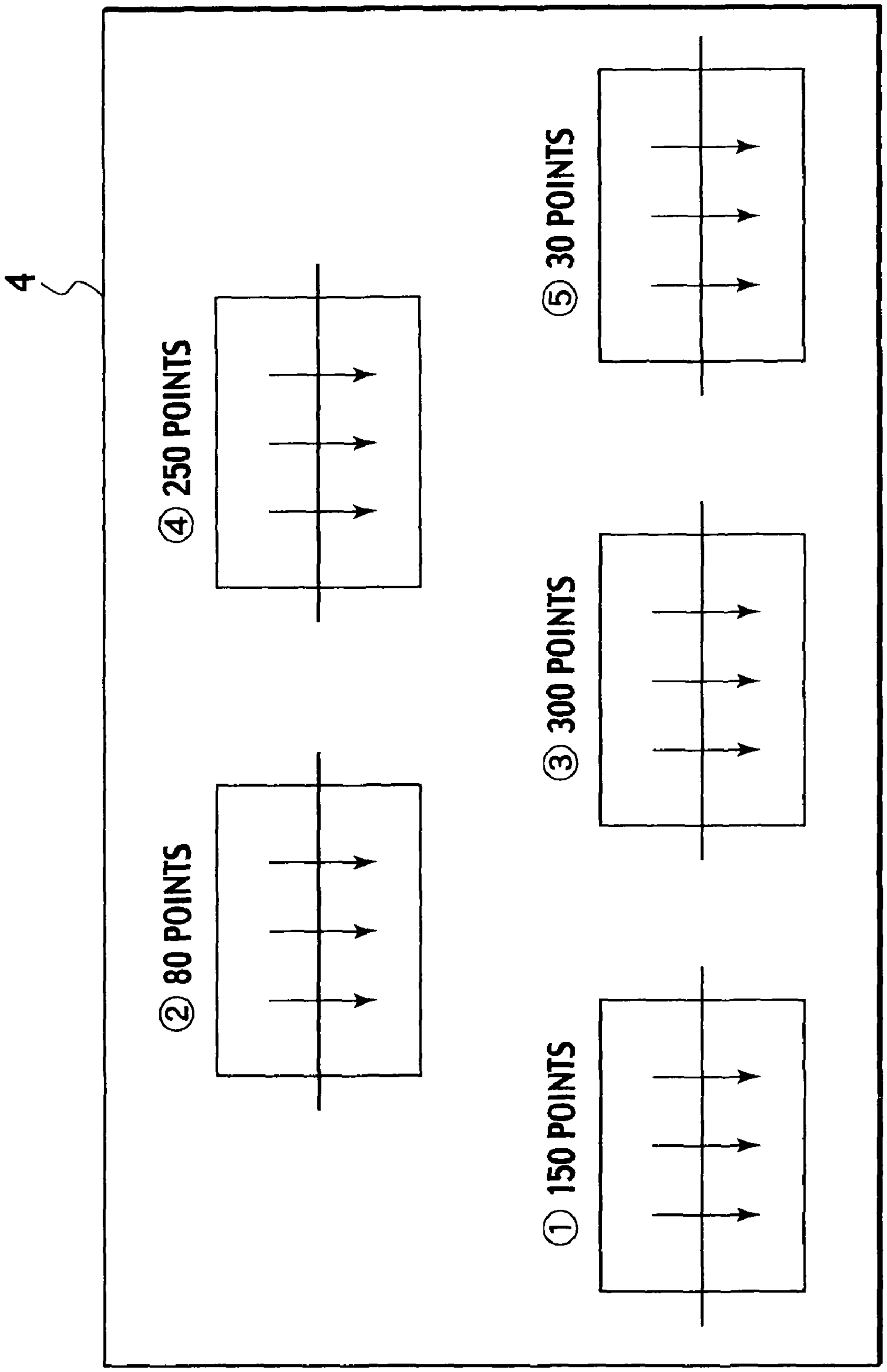
FIG. 16 is a display example of a common display according to the first embodiment.

The controller 40 adds the recognized points P1 to the total number of points P0 (Step S79). In this case, the server controlling CPU 71 of the server 5 displays, on the common display 4, the symbols and total points of the respective slot machines 10 which are participating in the event game, and notifies the respective players of the symbols and the total points. For example, as shown in FIG. 16, images of "No. 1, 150 points", "No. 2, 80 points", "No. 3, 300 points", "No. 4, 250 points" and "No. 5, 30 points" are displayed on the common display 4. Note that Nos. 1 to 5 correspond to the slot machines 10*a* to 10*e*. Hence, the players of the respective slot machines 10 can recognize their current ranks by seeing the number of points, which is displayed on the common display 4.

Thereafter, the controller 40 of each of the slot machines 10 determines whether or not the total number of points P0 has reached the defined number of points Pmax (for example, "8000 points") set by the processing of Step S73 (Step S80). Then, in the case where the total number of points P0 has not reached the defined number of points Pmax (NO in Step S80), the controller 40 determines whether or not the execution time of the event game has elapsed (Step S83), and returns to the processing of Step S75 in the case where the execution time of the event game has not elapsed (NO in Step S83).

Meanwhile, in the case where the execution time of the event game has elapsed (YES in Step S83), the controller 40 ends the event game execution processing.

Moreover, in the case where the total number of points P0 has reached the defined number of points Pmax in the processing of Step S80 (YES in Step S80), the server controlling CPU 71 determines whether or not the slot machine 10 (10*a*) concerned therewith has won the first position among the respective slot machines 10 which are participating in the event game (Step S81).

Then, in the case where it is determined that the slot machine 10*a* has won the first position, that is, in the case where the total number of points P0 of the slot machine 10*a* has reached the defined number of points Pmax earliest among the slot machines 10 which are participating in the event game (YES in Step S81), the controller 40 generates the progressive bonus for the slot machine 10*a* (Step S82). In the case where the progressive bonus is generated, the credits or the medals, which correspond to a part or entirety of the accumulated count value N accumulated in the progressive bonus counter 77, are provided. For example, in the case where the accumulated count value N is $100, the credits or the medals, which are equivalent to $100, are provided.

Figure 17:
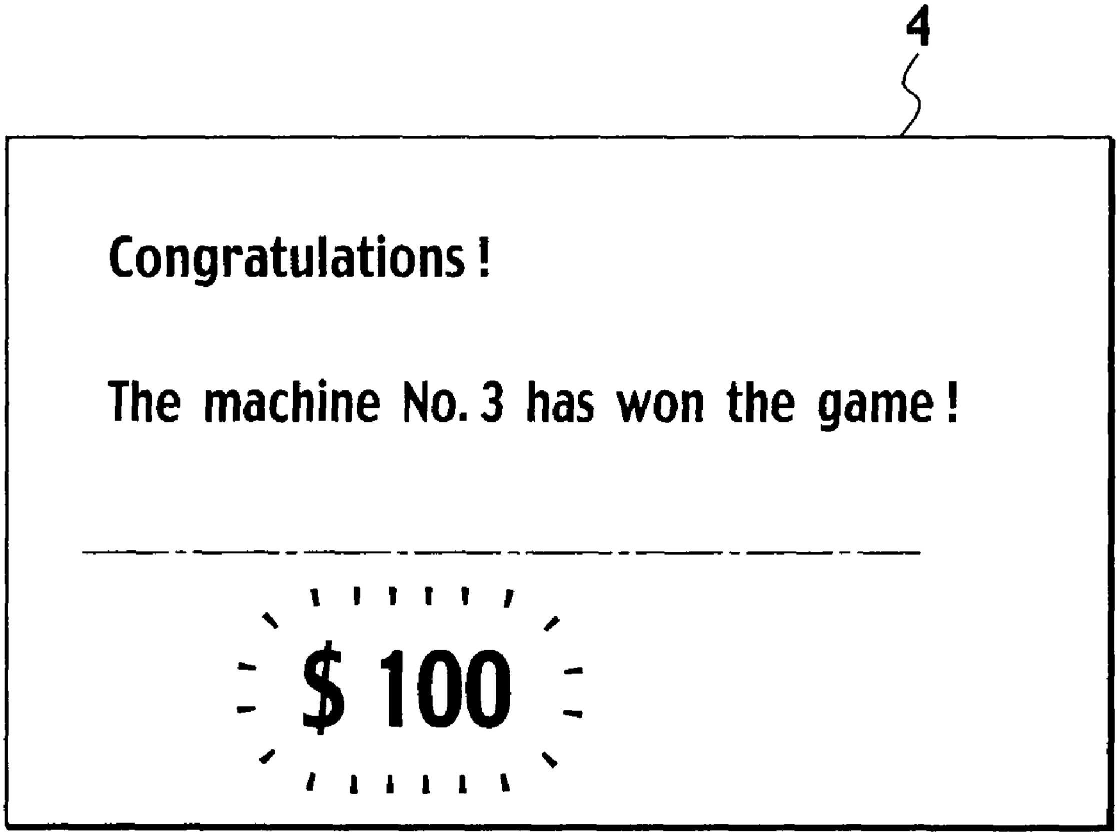
FIG. 17 is a display example of the common display according to the first embodiment.

As a result, for example, in the case where the player of "No. 3" has won the game, as shown in FIG. 17, sentences saying "Congratulations! The machine No. 3 has won the game!" and letters of "$100" as an amount to be provided are displayed on the common display 4.

In such a way, the event game is executed. Moreover, in the event game, the progressive bonus is provided only to the slot machine 10 in which the total number of points P0 has reached the defined number of points Pmax earliest among the plurality of slot machines 10, and accordingly, the player can be allowed to be interested in the matter that the event game takes place.

Moreover, in the case where the slot machine 10 that is participating in the event game is only one, the mystery bonus is generated in the case where the accumulated count value N of the progressive bonus counter 77 has reached the predetermined value Nmax, and accordingly, a profit made in such a manner that the accumulated count value N is accumulated can be returned to the player.

Figure 12:
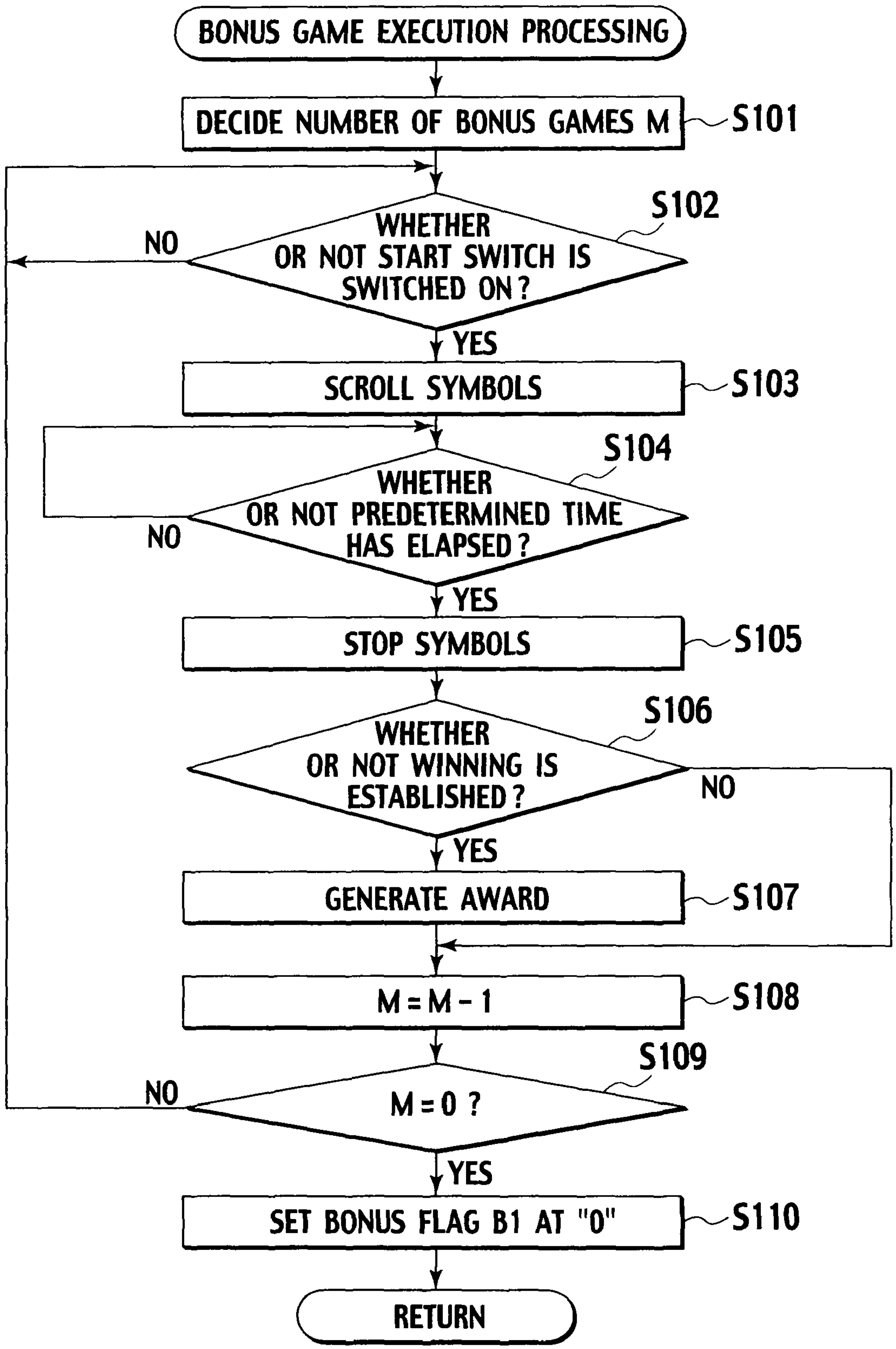
FIG. 12 is a flowchart showing bonus game execution processing according to the first embodiment.

Next, a description will be made of the bonus game execution processing shown in Step S46 of FIG. 9 with reference to FIG. 12.

First, the controller 40 decides the number of bonus games M (Step S101). The number of bonus games M is randomly set, for example, from among 10 games, 20 games, 30 games and 50 games. Moreover, the number of bonus games M may be always set at the same number (for example, 30 games).

The controller 40 determines whether or not the START switch 27 is pressed (Step S102). Then, in the case where the START switch 27 is pressed (YES in Step S102), the controller 40 starts to scroll the symbols on the display 16 (Step S103).

Thereafter, the controller 40 determines whether or not a predetermined time has elapsed (Step S104), and stops the symbols (Step S105) in the case where the predetermined time has elapsed (YES in Step S104). As a result, for example as shown in FIG. 7, the variety of symbols are stopped on the respective 15 display areas.

The controller 40 determines whether or not the winning is established based on the symbols stopped on the respective display areas (Step S106). Then, in the case where the winning is established, that is, in the case where the symbols defined in the provision table of FIG. 8 have appeared (YES in Step S106), the controller 40 generates the award (Step S107).

Thereafter, the controller 40 reduces the number of bonus games M. Specifically, the controller 40 makes such a reduction as: M=M−1 (Step S108).

The controller 40 determines whether or not the number of bonus games M is equal to 0 (Step S109). In the case where M is not equal to 0, that is, in the case where all of the bonus games of which number of times is set at M are not ended (NO in Step S109), the controller 40 returns to the processing of Step S102. Meanwhile, in the case where M is equal to 0 (YES in Step S109), the controller 40 sets the bonus flag B1 at "0", and ends the bonus game execution processing.

In such a way, the bonus games of which number of times is M are executed in the case where the bonus trigger is established in the usual game. In this bonus game, the betting is unnecessary, and accordingly, the medals or the credits are not lost, and it can be expected that a large amount of provision will be obtained.

As described above, in the gaming system 1 according to the first embodiment, a part of the bets is accumulated as the count value of the progressive bonus at the time when the usual game is being executed. In the case where the accumulated count value N has reached the predetermined value Nmax, the event game in which the plurality of slot machines 10 participate is executed. Then, the progressive bonus is provided to the slot machine 10 that has won the event game. Hence, the player can be allowed to be interested in the matter that the event game will be started.

Figure 18:
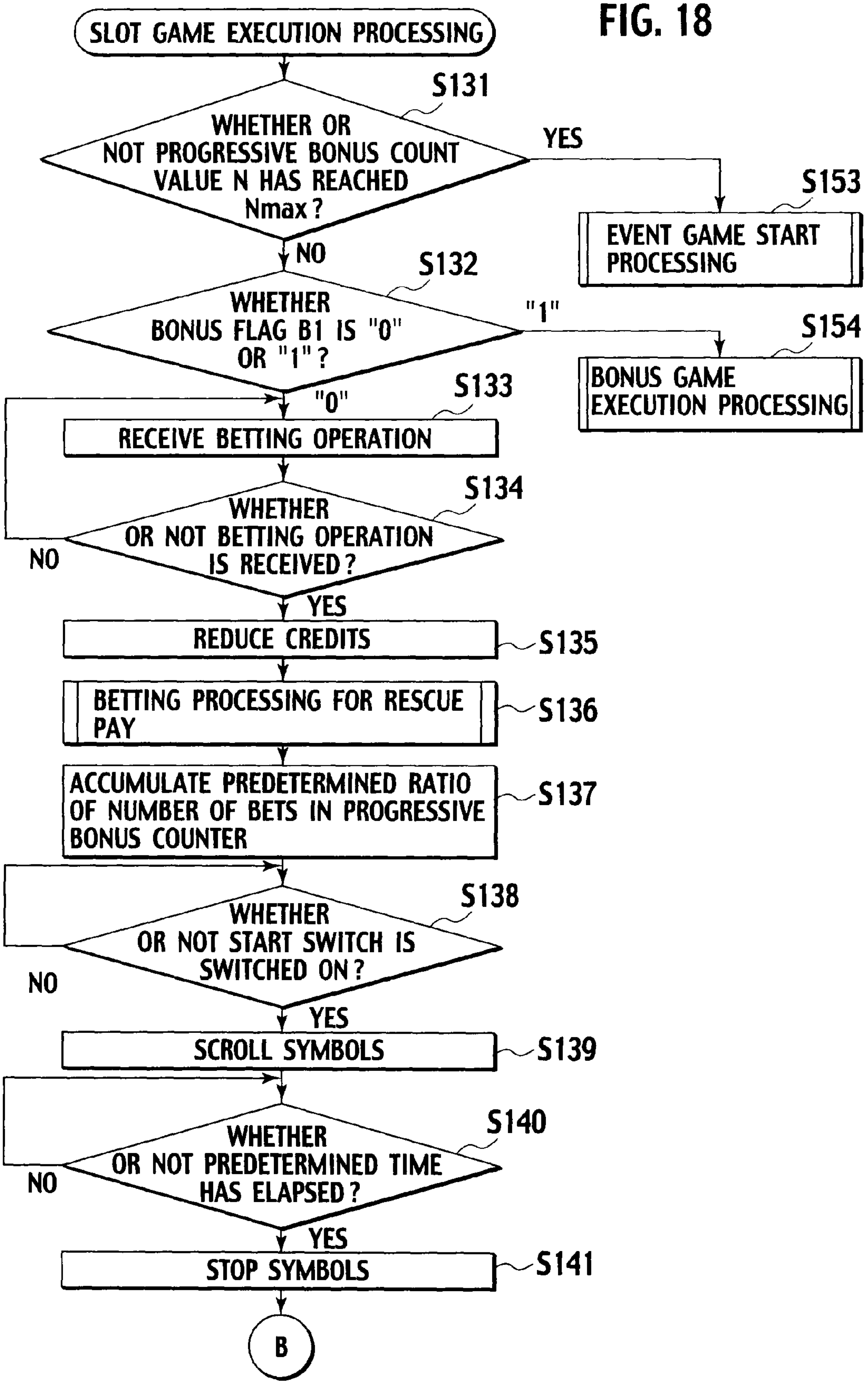
FIG. 18 is a flowchart showing slot game execution processing according to a second embodiment.
Figure 19:
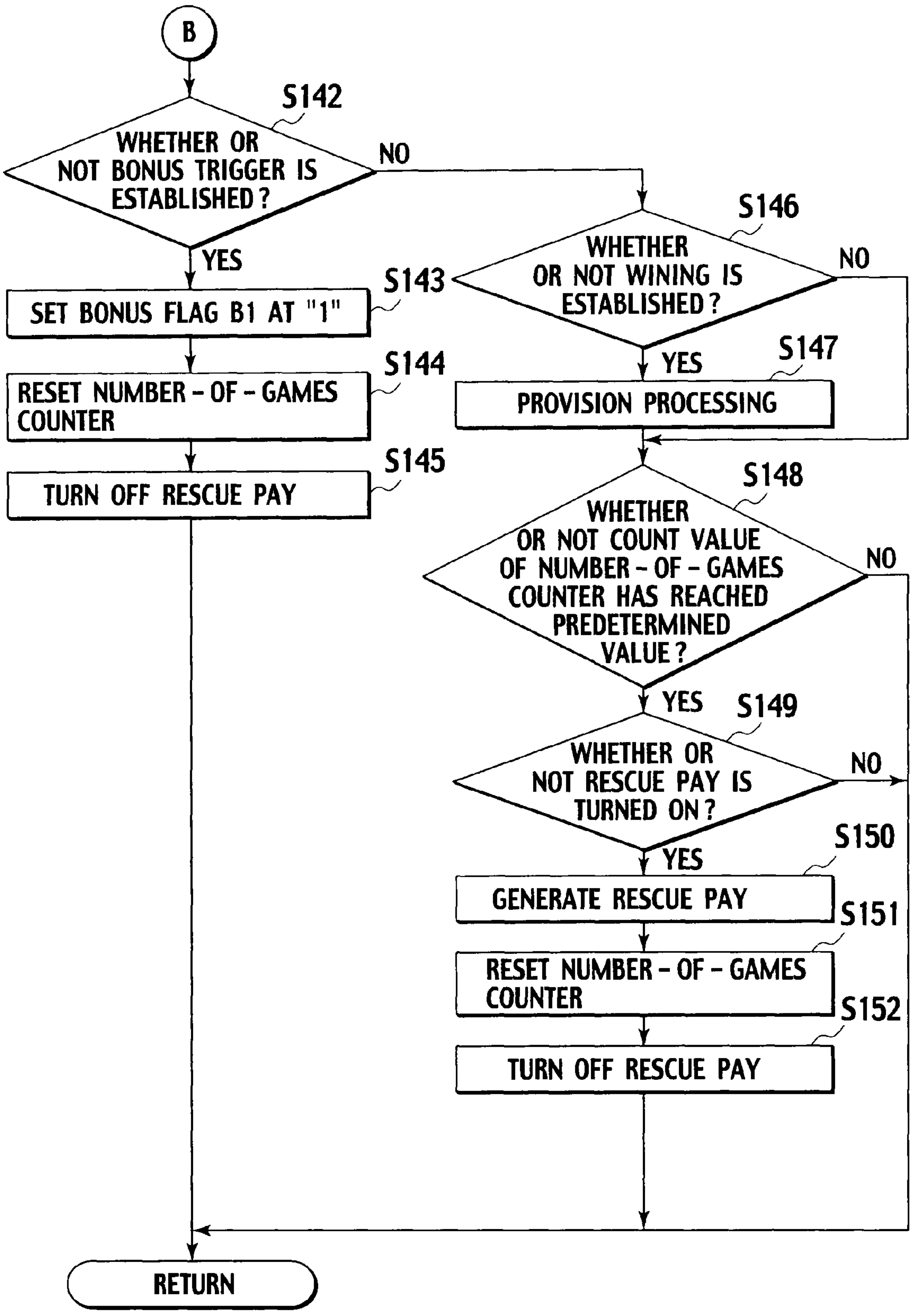
FIG. 19 is a flowchart showing the slot game execution processing according to the second embodiment.

Next, a description will be made of a second embodiment of the gaming system 1. FIG. 18 and FIG. 19 are flowcharts showing slot game execution processing according to the second embodiment. In comparison with the processing of FIG. 9, which is described in the above-mentioned first embodiment, in the second embodiment, there is a difference in that a function of the rescue pay (insurance pay) is added thereto. Details will be described below.

First, the controller 40 shown in FIG. 5 determines whether or not the accumulated count value N of the progressive bonus counter 77 has reached the predetermined value Nmax (Step S131). Then, in the case where the accumulated count value N has reached the predetermined value Nmax (YES in Step S131), the controller 40 shifts the processing to event game start processing (Step S153). Details of the event game start processing are similar to those of the processing mentioned above with reference to FIG. 10, and accordingly, a description thereof will be omitted.

Meanwhile, in the case where the accumulated count value N has not reached the predetermined value Nmax, the controller 40 determines whether the bonus flag B1 set in the RAM 110 is "0" or "1" (Step S132). In the case where the bonus flag B1 is "1", the controller 40 shifts the processing to bonus game execution processing (Step S154). Details of the bonus game execution processing are similar to those of the processing mentioned above with reference to FIG. 12, and accordingly, a description thereof will be omitted.

In the case where the bonus flag B1 is "0", the controller 40 receives a betting operation performed by the player (Step S133). Specifically, the controller 40 receives the betting operation performed in such a manner that the medals are inserted from the medal insertion slot 21, or that any of the MAX BET switch 24, the BET switch 25 and the SPIN/REPEAT BET switch 26 is pressed.

Then, in the case where the betting operation is received (YES in Step S134), the controller 40 performs subtraction processing for the credits. Specifically, the controller 40 performs processing for subtracting the number of bet credits from the number of current credits (Step S135).

Subsequently, the controller 40 executes betting processing for the rescue pay (Step S136). The rescue pay is a function to receive a side bet different from the usual bet at the time when the slot game is being executed, and to generate a fixed amount of provision in order to compensate for the losses of the player in the case where the side bet is made and in the case where the bonus trigger is not won continuously for a predetermined number of games. Moreover, according to a preference of the player, it can be appropriately selected whether the rescue pay is to be turned on or off.

Figure 20:
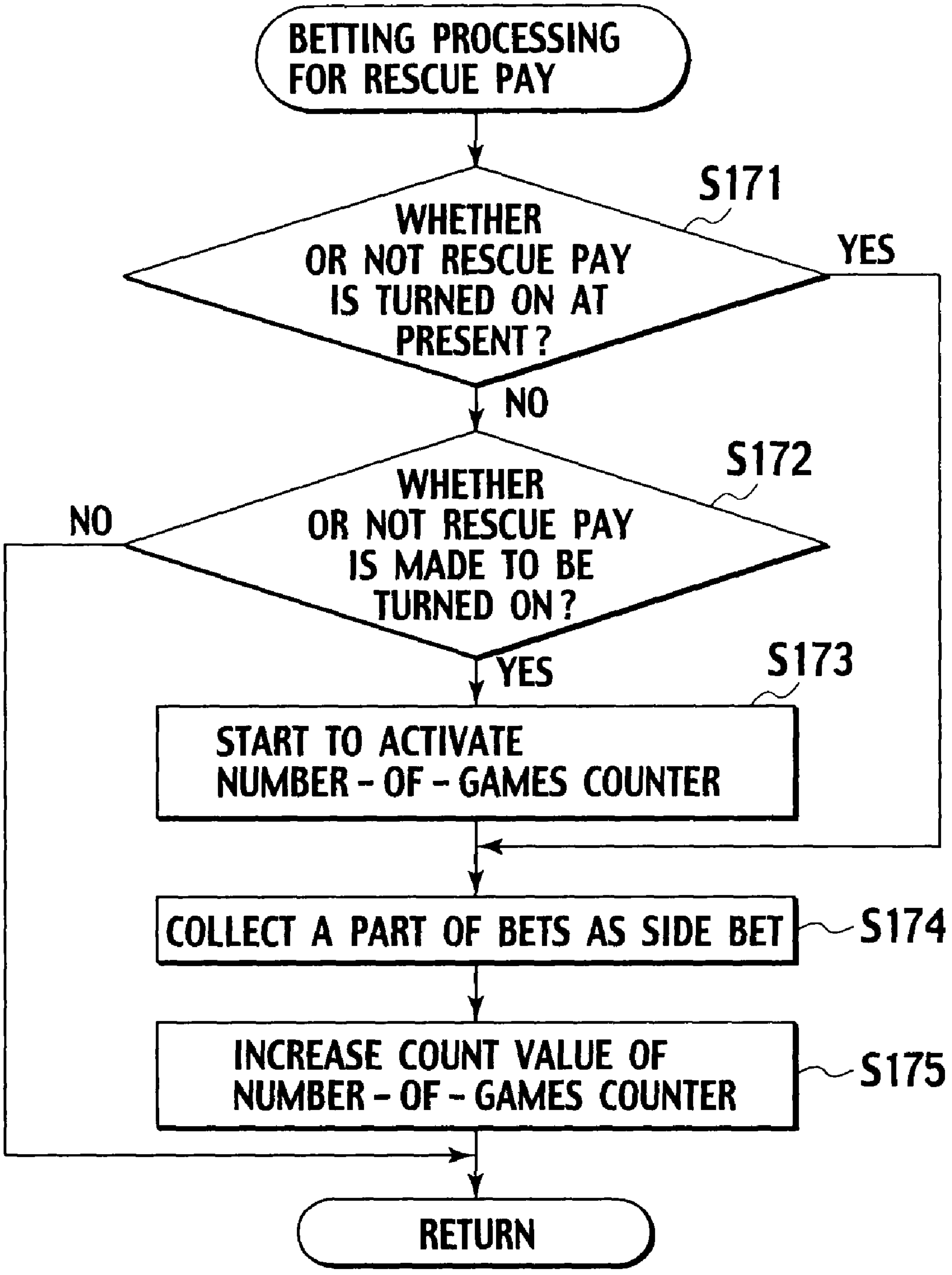
FIG. 20 is a flowchart showing bet processing for rescue pay according to the second embodiment.

Here, a description will be made of details of the betting processing for the rescue pay with reference to FIG. 20. The controller 40 determines whether or not the rescue pay is turned on at present (Step S171). In the case where the rescue pay is turned on (YES in Step S171), the controller 40 shifts the processing to Step S174.

Figure 26:
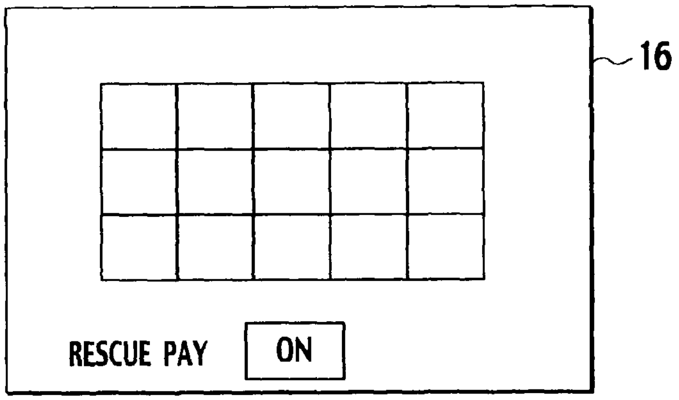
FIG. 26 is a display example of a display according to the second embodiment.

Moreover, in the case where the rescue pay is not turned on (NO in Step S171), the controller 40 determines whether or not the rescue pay is made to be turned on (Step S172). As shown in FIG. 26, an image showing "ON" of the rescue pay is displayed on a lower portion of the display 16. The player touches the image of "ON", and such a touching operation is detected by the touch panel sensor 20, thus making it possible to turn on the rescue pay.

In the case where the rescue pay is not made to be turned on (NO in Step S172), the controller 40 maintains such a state where the rescue pay is off, and ends this processing.

Moreover, in the case where the rescue pay is made to be turned on (YES in Step S172), the controller 40 activates the number-of-games counter 128 shown in FIG. 5 (Step S173). Specifically, every time when one slot game is executed, the controller 40 executes processing for increasing the count value of the number-of-games counter 128 by one.

The controller 40 collects, as the side bet, a part of the bets made in the event of executing the game (Step S174). For example, in the case where 10 medals are bet, the controller 40 collects, as the side bet, one of the medals thus bet. In this case, the betting made on the slot game becomes equivalent to 9 medals.

Thereafter, the controller 40 increases the count value of the number-of-games counter 128 by one (Step S175), and ends this processing.

Returning to FIG. 18, the controller 40 transmits a predetermined ratio (for example, 2%) of the number of bets as the count value of the progressive bonus to the server 5. The server 5 accumulates the transmitted count value of the progressive bonus in the progressive bonus counter 77 (Step S137).

The controller 40 determines whether or not the START switch 27 is switched on (Step S138). Then, in the case where the START switch 27 is switched on (YES in Step S138), the controller 40 scrolls the 15 symbols displayed on the display 16 (Step S139).

The controller 40 determines whether or not a predetermined time (for example, five seconds) has elapsed since the scroll of the symbols was started (Step S140), and stops the symbols (Step S141) when the predetermined time has elapsed (YES in Step S140).

Based on the stopped 15 symbols, the controller 40 determines whether or not the bonus trigger is established (Step S142 of FIG. 19). Specifically, as shown in FIG. 8, the controller 40 determines whether or not five symbols of "7" appear, and sets the bonus flag B1 at "1" (Step S143) in the case where the five symbols of "7" appear (YES in Step S142).

Subsequently, the controller 40 resets the number-of-games counter 128 (Step S144). Moreover, the controller 40 turns off the rescue pay (Step S145). Specifically, in the case where the bonus trigger is established when the rescue pay is turned on and the number-of-games counter 128 counts the number of execution times of the slot games, the controller 40 resets the number-of-games counter 128, and turns off the rescue pay. Thereafter, the controller 40 ends this processing.

Meanwhile, in the case where the bonus trigger is not established, that is, in the case where the five symbols of "7" do not appear (NO in Step S142), the controller 40 determines whether or not a winning is established by the stopped 15 symbols. Specifically, the controller 40 determines whether or not any of the winnings shown in the provision table of FIG. 8 is established (Step S146). Then, in the case where the winning is established (YES in Step S146), the controller 40 performs the provision processing (Step S147). Specifically, the controller 40 provides the medals of which number is based on the provision table.

Meanwhile, in the case where the winning is not established (NO in Step S147), and in the case where the provision processing is ended, the controller 40 determines whether or not the count value of the number-of-games counter 128 has reached the predetermined value (for example, "1000") (Step S148). In the case where the count value has reached the predetermined value (YES in Step S148), the controller 40 determines whether on not the rescue pay is turned on at present (Step S149), and in the case where the rescue pay is turned on (YES in Step S149), the controller 40 generates the rescue pay (Step S150). Specifically, the controller 40 generates the rescue pay for the player who is turning on the rescue pay and has not won the bonus trigger for a long period, thereby compensating for some losses thereto.

Thereafter, the controller 40 resets the number-of-games counter 128 (Step S151), and further, turns off the rescue pay (Step S152). Thereafter, the controller 40 ends this processing.

As described above, in the gaming system 1 according to the second embodiment, similar effects to those of the above-mentioned first embodiment can be achieved. Moreover, in the case where the rescue pay is turned on, the predetermined amount of the bets is collected as the side bet, and instead of this, the fixed number of medals are provided in the case where the bonus trigger is not established continuously for the predetermined number of times (for example, 1000 times). Hence, the losses of the player can be reduced.

Figure 21:
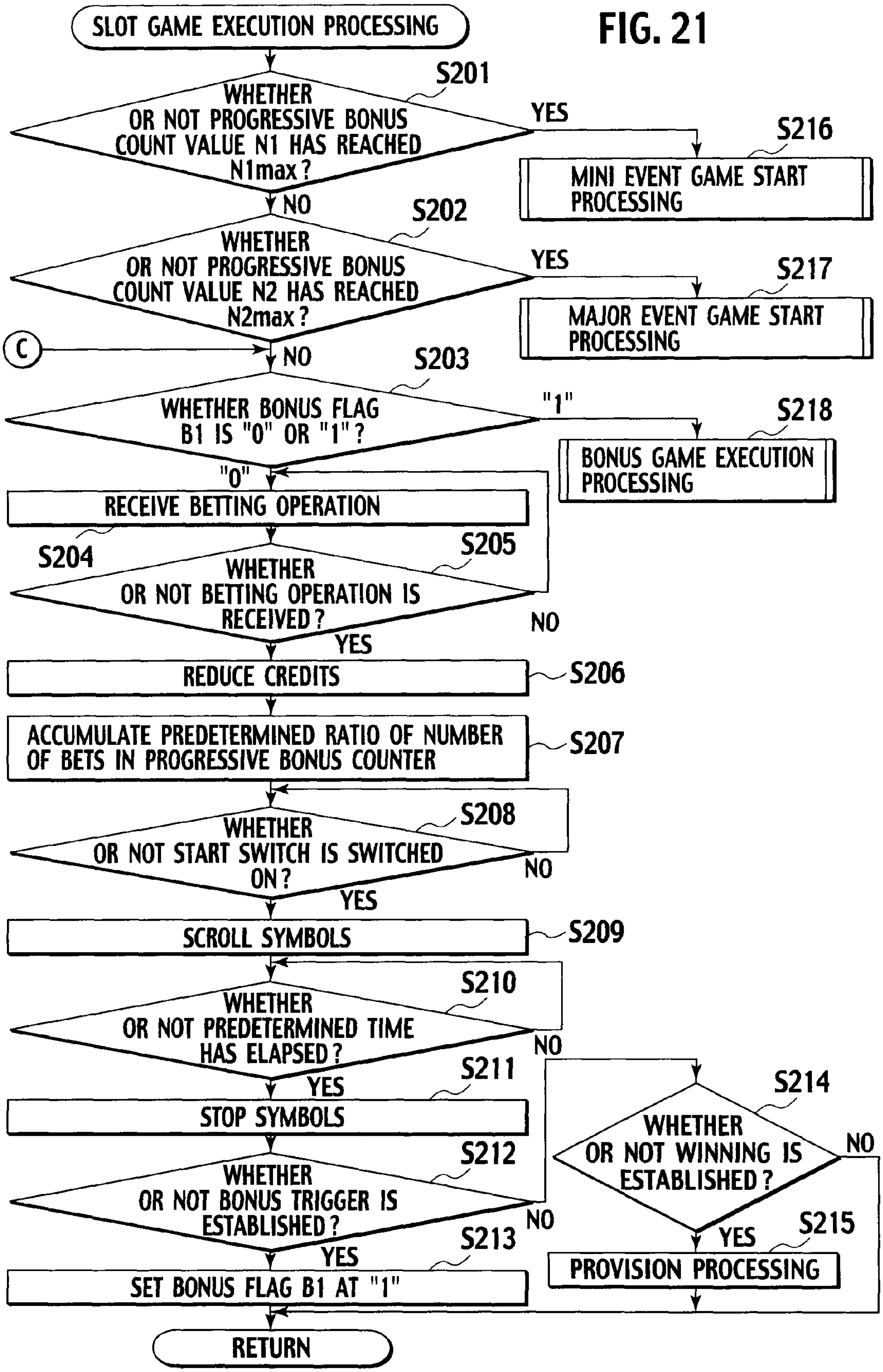
FIG. 21 is a flowchart showing slot game execution processing according to a third embodiment.

Next, a description will be made of a third embodiment of the gaming system 1 with reference to FIG. 21. FIG. 21 is a flowchart showing slot game execution processing according to the third embodiment. In the third embodiment, the progressive bonus counter 77 counts both of a first count value and a second count value, which are different from each other. Then, in the case where a first accumulated count value N1 as an accumulated value of the first count value has reached a predetermined value N1max, a mini event game is executed, and in the case where a second accumulated count value N2 as an accumulated value of the second count value has reached a predetermined value N2max (where N2max>N1max), a major event game is executed. Specifically, the third embodiment is different from the above-mentioned first embodiment in that two event games exist. Details will be described below.

The controller 40 shown in FIG. 5 determines whether or not the first accumulated count value N1 of the progressive bonus counter 77 has reached the predetermined value N1max (Step S201). Then, in the case where the first accumulated count value N1 has reached the predetermined value N1max (YES in Step S201), the controller 40 shifts the processing to mini event game start processing (Step S216). Details of the mini event game start processing will be described later.

Meanwhile, in the case where the first accumulated count value N1 has not reached the predetermined value N1max (NO in Step S201), the controller 40 determines whether or not the second accumulated count value N2 of the progressive bonus counter 77 has reached the predetermined value N2max (where N2max>N1max) (Step S202). Then, in the case where the second accumulated count value N2 has reached the predetermined value N2max (YES in Step S202), the controller 40 shifts the processing to major event game start processing (Step S217). Details of the major event game start processing will be described later.

In the case where the second accumulated count value N2 has not reached the predetermined value N2max (NO in Step S202), the controller 40 determines whether the bonus flag B1 set in the RAM 110 is "0" or "1" (Step S203). In the case where the bonus flag B1 is "1", the controller 40 shifts the processing to bonus game execution processing (Step S218). Details of the bonus game execution processing are similar to those of the processing mentioned above with reference to FIG. 12, and accordingly, a description thereof will be omitted.

In the case where the bonus flag B1 is "0", the controller 40 receives a betting operation performed by the player (Step S204). Specifically, the controller 40 receives the betting operation performed in such a manner that the medals are inserted from the medal insertion slot 21, or that any of the MAX BET switch 24, the BET switch 25 and the SPIN/REPEAT BET switch 26 is pressed.

Then, in the case where the betting operation is received (YES in Step S205), the controller 40 performs subtraction processing for the credits. Specifically, the controller 40 performs processing for subtracting the number of bet credits from the number of current credits (Step S206).

To the server 5, the controller 40 transmits a predetermined ratio (for example, 2%) of the number of bets as the count value of the progressive bonus. Specifically, the controller 40 transmits 1.5% of the number of bets as a first count value to the server 5, and transmits 0.5% of the number of bets as a second count value to the server 5. Hence, in the progressive bonus counter 77 of the server 5, 1.5% of the number of bets is accumulated in the first accumulated count value N1, and 0.5% of the number of bets is accumulated in the second accumulated count value N2 (Step S207). Note that these ratios are not limited to 1.5% and 0.5%, and are appropriately changeable.

The controller 40 determines whether or not the START switch 27 is switched on (Step S208). Then, in the case where the START switch 27 is switched on (YES in Step S208), the controller 40 scrolls the 15 symbols displayed on the display 16 (Step S209).

The controller 40 determines whether or not a predetermined time (for example, five seconds) has elapsed since the scroll of the symbols was started (Step S210), and stops the symbols (Step S211) when the predetermined time has elapsed (YES in Step S210).

Based on the stopped 15 symbols, the controller 40 determines whether or not the bonus trigger is established (Step S212). Specifically, as shown in FIG. 8, the controller 40 determines whether or not five symbols of "7" appear, and sets the bonus flag B1 at "1" (Step S213) in the case where the five symbols of "7" appear (YES in Step S212). Thereafter, the controller 40 ends this processing.

Meanwhile, in the case where the bonus trigger is not established, that is, in the case where the five symbols of "7" do not appear (NO in Step S212), the controller 40 determines whether or not a winning is established by the stopped 15 symbols. Specifically, the controller 40 determines whether or not any of the winnings shown in the provision table of FIG. 8 is established (Step S214). Then, in the case where the winning is established (YES in Step S214), the controller 40 performs the provision processing (Step S215). Specifically, the controller 40 provides the medals of which number is based on the provision table. Meanwhile, in the case where the winning is not established (NO in Step S214), the controller 40 ends this processing.

As described above, when the slot game is executed, a part (for example, 1.5%) of the bets is accumulated as the first count value of the progressive bonus in the progressive bonus counter 77 provided in the server 5. In addition, a part (for example, 0.5%) of the bets is accumulated as the second count value of the progressive bonus in the progressive bonus counter 77 provided in the server 5.

Then, in the case where the first accumulated count value N1 has reached the predetermined value N1max, the mini event game is started, and in the case where the second accumulated count value N2 has reached the predetermined value N2max, the major event game is started. Moreover, in the case where the bonus flag B1 has become "1", the bonus game is executed.

Figure 22:
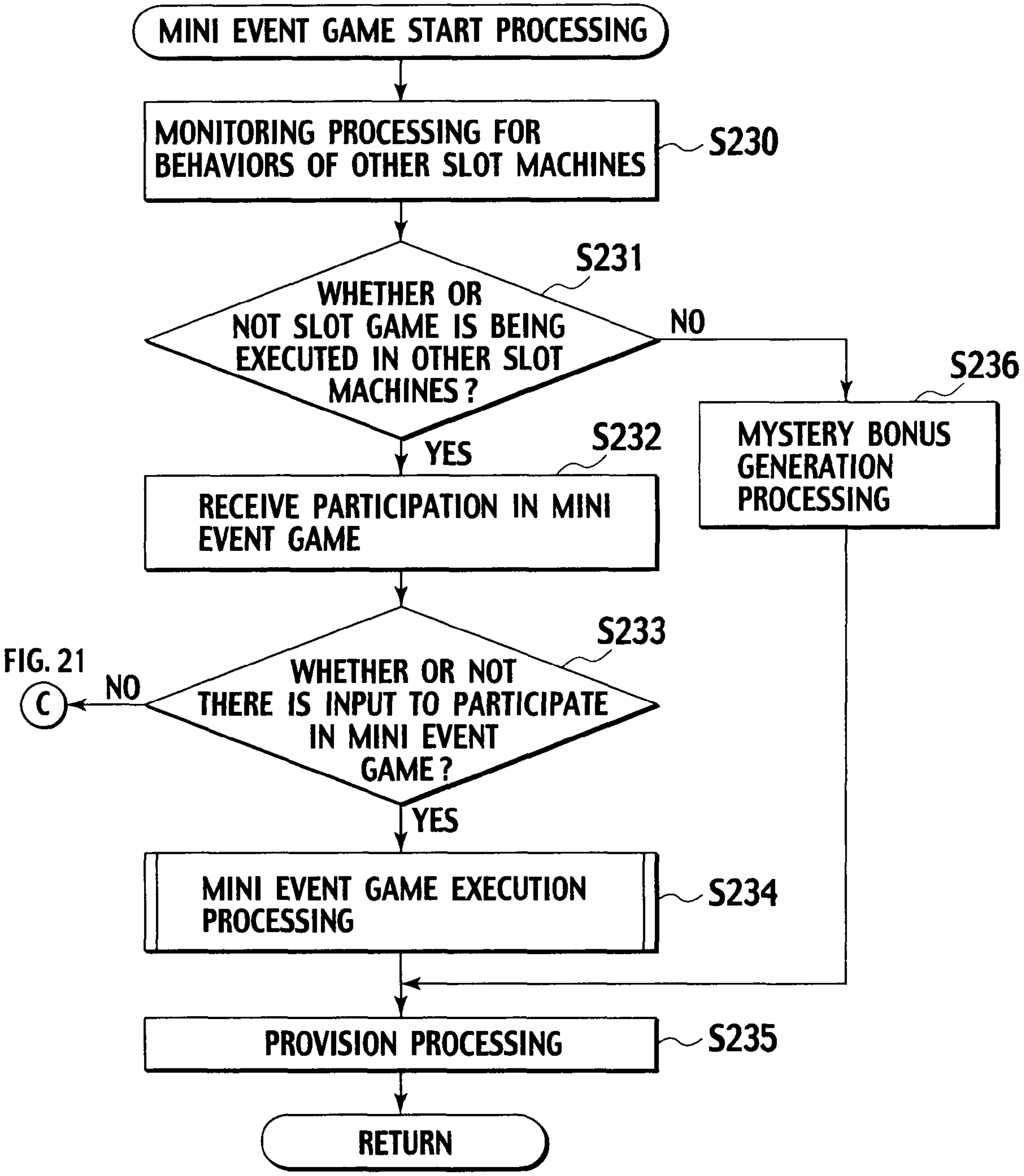
FIG. 22 is a flowchart showing mini event game start processing according to the third embodiment.

Next, a description will be made of the mini event game start processing shown in Step S216 of FIG. 21 with reference to a flowchart shown in FIG. 22.

When the first accumulated count value N1 of the progressive bonus counter 77 has reached the predetermined value N1max, the controller 40 performs monitoring processing for the behaviors in the other slot machines 10*b* to 10*e*. Specifically, as mentioned above, the controller 40 monitors such behaviors as to whether or not the START switches 27 have been pressed (Step S230).

Subsequently, based on the above-described behaviors, the controller 40 determines whether or not the slot game is being executed in any of the other slot machines 10*b* to 10*e* (Step S231).

Figure 27:
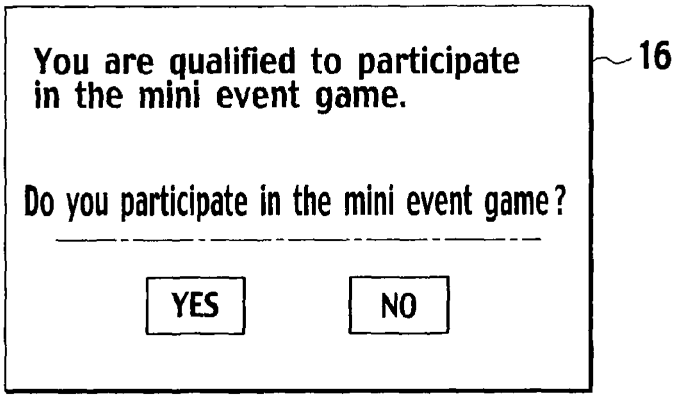
FIG. 27 is a display example of a display according to the third embodiment.

Then, in the case where the slot game is being executed in any of the other slot machines 10*b* to 10*e* (YES in Step S231), the controller 40 receives a selection input as to whether or not the player is to participate in the mini event game. For example, as shown in FIG. 27, the controller 40 displays sentences saying "You are qualified to participate in the mini event game. Do you participate in the mini event game?", displays images of "YES" and "NO", and receives an input operation made by means of the touch panel sensor 20 (Step S232).

Then, in the case where "NO" is selected (NO in Step S233), the controller 40 shifts to the processing of Step S203 of FIG. 21, and returns to the slot game execution processing.

Meanwhile, in the case where "YES" is selected (YES in Step S233), the controller 40 performs mini event game execution processing (Step S234). Details of the mini event game execution processing will be described later.

Moreover, in the case where the slot game is not executed in any of the other slot machines 10*b* to 10*e*, that is, in the case where the first accumulated count value N1 of the progressive bonus counter 77 has reached the predetermined value N1max when the slot game is being executed only in the slot machine 10*a* (NO in Step S231), mystery bonus generation processing is executed (Step S236). In a mystery bonus, when the slot game is being executed in the slot machine 10*a*, the winning is established regardless of the combination of the stopped symbols, and an award corresponding to a part or entirety of the first accumulated count value N1 of the progressive bonus counter 77 is generated.

Thereafter, the provision processing for providing the award generated by executing the mini event game and the award generated by the mystery bonus is executed (Step S235).

Figure 23:
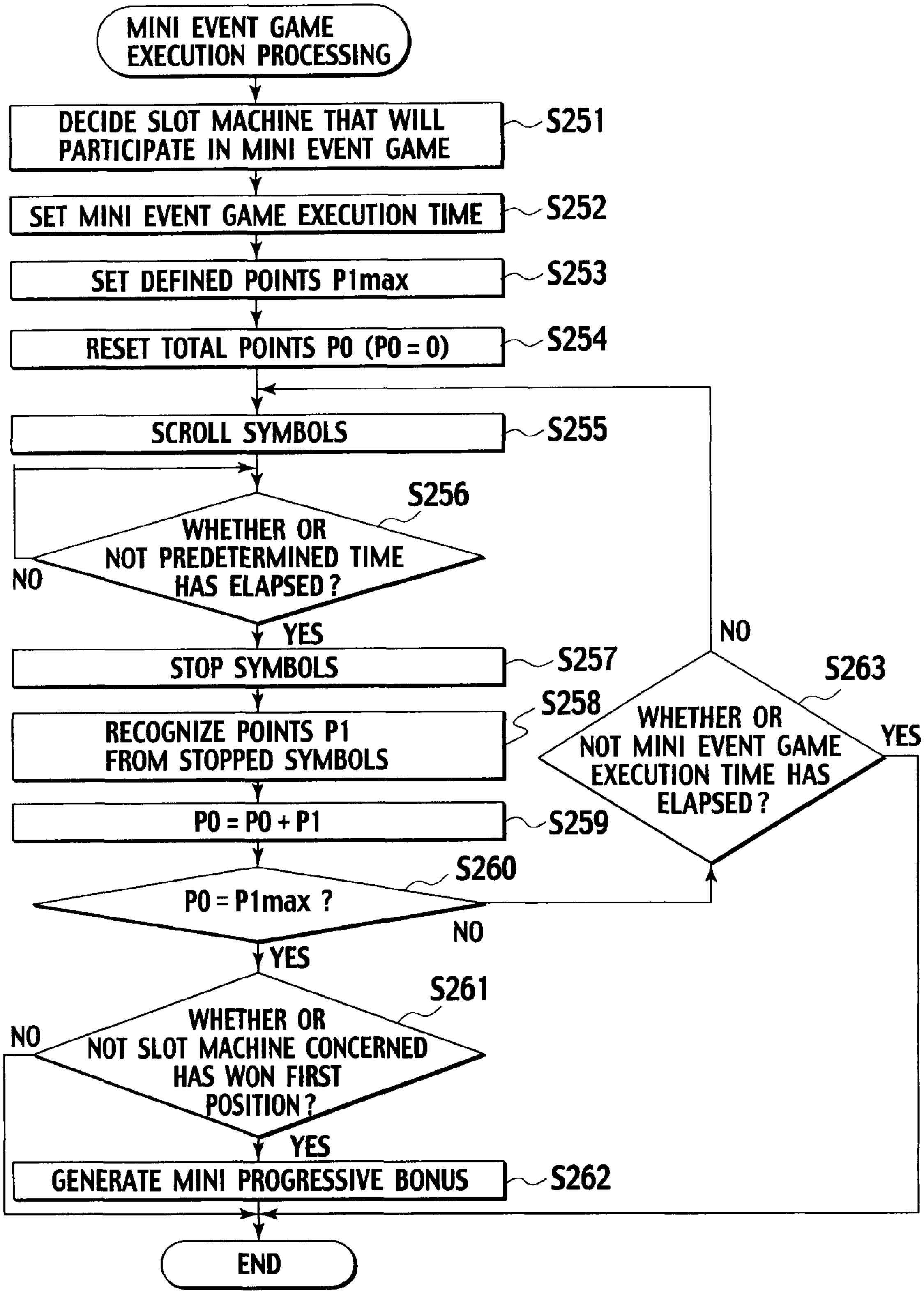
FIG. 23 is a flowchart showing mini event game execution processing according to the third embodiment.

Next, a description will be made of the mini event game execution processing shown in Step S234 of FIG. 22 with reference to FIG. 23.

First, the server controlling CPU 71 (refer to FIG. 6) decides the slot machines 10 (some of 10*a* to 10*e*) which will participate in the mini event game (Step S251). As described above, the slot machines, in each of which the slot game is being executed when the first accumulated count value N1 of the progressive bonus counter 77 has reached the predetermined value N1max, and the input operation for participating in the mini event game is performed, are decided as the slot machines 10 which will participate in the mini event game.

Subsequently, the server controlling CPU 71 sets an execution time of the mini event game (Step S252). The execution time of the mini event game is randomly selected from a plurality of time ranges (for example, three minutes, five minutes, seven minutes and 10 minutes). Moreover, the execution time may be always set at the same time range (for example, five minutes).

The server controlling CPU 71 sets a defined number of points P1max for the mini event game (Step S253). The defined number of points P1max is the number of points, which is necessary to win the mini event game.

Moreover, the server controlling CPU 71 resets a total number of points P0, which is set for each of the slot machines 10 which will participate in the mini event game (Step S254). The total number of points P0 is a total value of points generated by executing the mini event game.

Subsequently, when the START switch 27 is pressed by the player, the controller 40 of each of the slot machines 10 scrolls the symbols on the display 16 (Step S255), and stops the symbols (Step S257) after a predetermined time elapsed (YES in Step S256).

In the mini event game, the symbols which appear therein differ from those in the usual slot game, and five sorts of symbols, which are "BLUE 7", "RED 7", "3 BAR", "2 BAR" and "1 BAR", will appear as shown in FIG. 14. Then, the points to be generated are decided by the symbols stopped on the centerline L1. Specifically, as shown in FIG. 14, the points become 300 points when the "BLUE 7" is stopped on the centerline L1, become 150 points when the "RED 7" is stopped thereon, become 30 points when the "3 BAR" is stopped thereon, become 20 points when the "2 BAR" is stopped thereon, become 10 points when the "1 BAR" is stopped thereon, and become 0 point when any of the symbols is not stopped thereon.

The controller 40 recognizes the points P1 from the stopped symbols (Step S258). For example, as shown in FIG. 15A, in the case where the symbols are stopped in the pattern of "None, None, 1 BAR", the points P1 become 10 points. As shown in FIG. 15B, in the case where the symbols are stopped in the pattern of "1 BAR-2 BAR-3 BAR", the points P1 become 60 points. As shown in FIG. 15C, in the case where the symbols are stopped in the pattern of "RED 7-RED 7-BLUE 7", the points P1 become 600 points.

The controller 40 adds the recognized points P1 to the total number of points P0 (Step S259). In this case, the server controlling CPU 71 of the server 5 displays, on the common display 4, the symbols and the total points of the respective slot machines 10 which are participating in the mini event game, and notifies the respective players of the symbols and the total points. A specific display example is as shown in FIG. 16. Hence, the players of the respective slot machines 10 can recognize their current ranks by seeing the number of points, which is displayed on the common display 4.

Thereafter, the controller 40 of each of the slot machines 10 determines whether or not the total number of points P0 has reached the defined number of points P1max (for example, "8000 points") set by the processing of Step S253 (Step S260). Then, in the case where the total number of points P0 has not reached the defined number of points P1max (NO in Step S260), the controller 40 determines whether or not the execution time of the mini event game has elapsed (Step S263), and returns to the processing of Step S255 in the case where the execution time of the mini event game has not elapsed (NO in Step S263).

Meanwhile, in the case where the execution time of the mini event game has elapsed (YES in Step S263), the controller 40 ends the mini event game execution processing.

Moreover, in the case where the total number of points P0 has reached the defined number of points P1max in the processing of Step S260 (YES in Step S260), the server controlling CPU 71 determines whether or not the slot machine 10 (10*a*) concerned therewith has won the first position among the respective slot machines 10 which are participating in the mini event game (Step S261).

Then, in the case where it is determined that the slot machine 10*a* has won the first position, that is, in the case where the total number of points P0 of the slot machine 10*a* has reached the defined number of points P1max earliest among the plurality of slot machines 10 (YES in Step S261), the controller 40 generates a mini progressive bonus (Step S262). In the mini progressive bonus, the credits or the medals, which correspond to a part or entirety of the first accumulated count value N1 accumulated in the progressive bonus counter 77, are provided. For example, in the case where the first accumulated count value N1 is $100, the credits or the medals, which are equivalent to $100, are provided. In such a way, the mini event game is executed.

Figure 24:
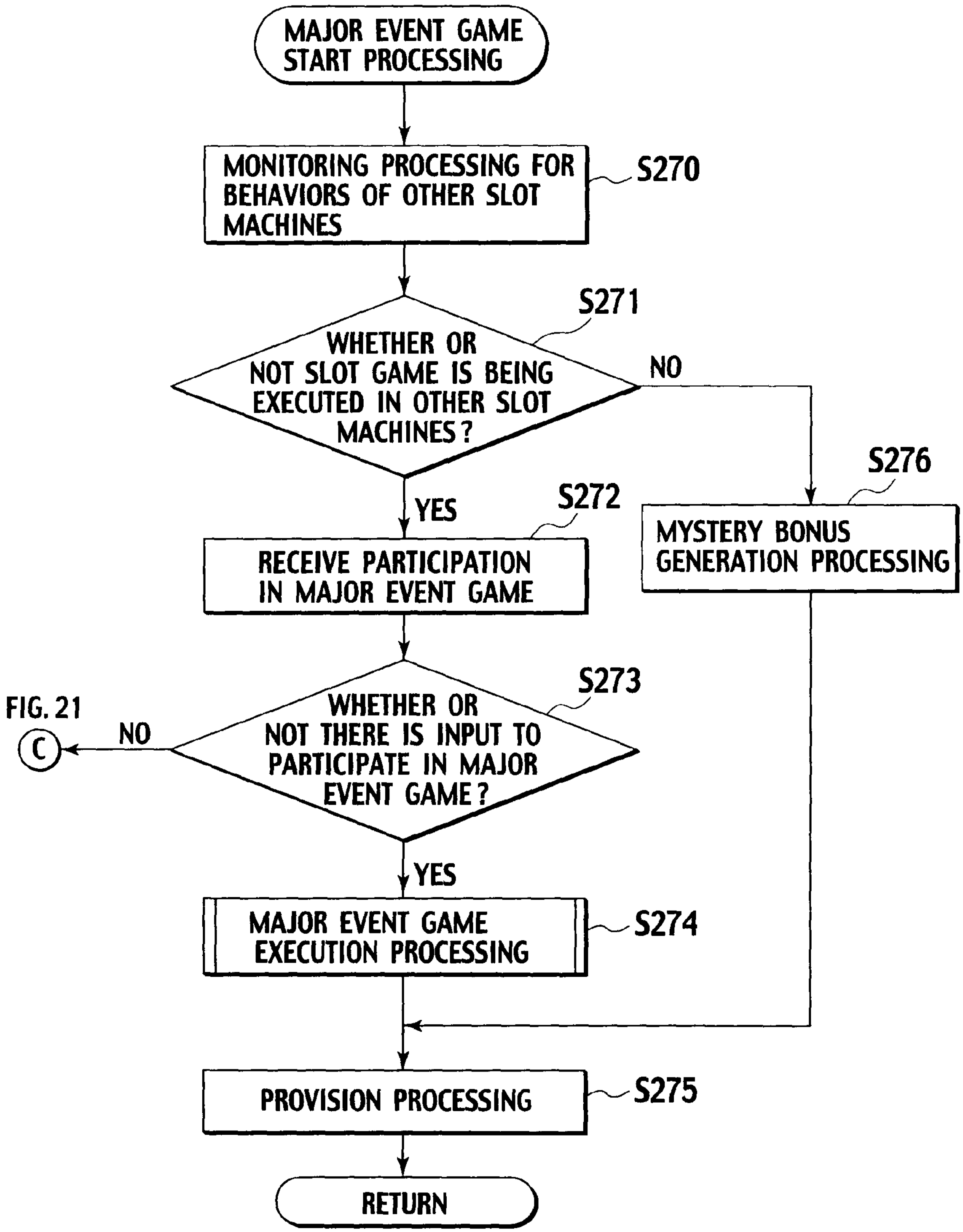
FIG. 24 is a flowchart showing major event game start processing according to the third embodiment.

Next, a description will be made of the major event game start processing shown in Step S217 of FIG. 21 with reference to a flowchart shown in FIG. 24.

When the second accumulated count value N2 of the progressive bonus counter 77 has reached the predetermined value N2max, the controller 40 performs the monitoring processing for the behaviors in the other slot machines 10*b* to 10*e*. Specifically, as mentioned above, the controller 40 monitors such behaviors as to whether or not the START switches 27 have been pressed (Step S270).

Subsequently, based on the above-described behaviors, the controller 40 determines whether or not the slot game is being executed in any of the other slot machines 10*b* to 10*e* (Step S271).

Figure 28:
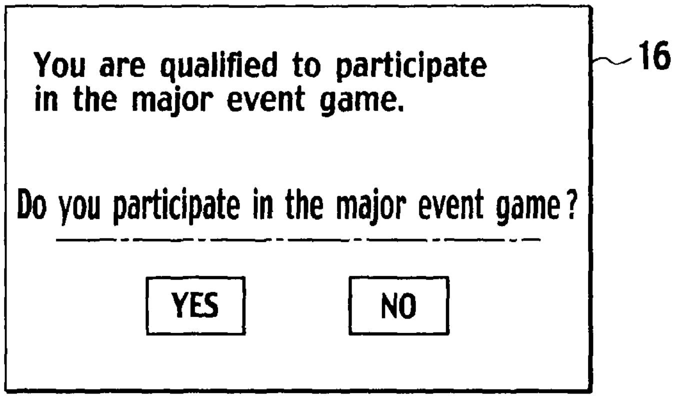
FIG. 28 is a display example of the display according to the third embodiment.

Then, in the case where the slot game is being executed in any of the other slot machines 10*b* to 10*e* (YES in Step S271), the controller 40 receives a selection input as to whether or not the player is to participate in the major event game. For example, as shown in FIG. 28, the controller 40 displays sentences saying "You are qualified to participate in the major event game. Do you participate in the major event game?", displays images of "YES" and "NO", and receives an input operation made by means of the touch panel sensor 20 (Step S272).

Then, in the case where "NO" is selected (NO in Step S273), the controller 40 shifts to the processing of Step S203 of FIG. 21, and returns to the slot game execution processing.

Meanwhile, in the case where "YES" is selected (YES in Step S273), the controller 40 performs major event game execution processing (Step S274). Details of the major event game execution processing will be described later.

Moreover, in the case where the slot game is not executed in any of the other slot machines 10*b* to 10*e*, that is, in the case where the second accumulated count value N2 of the progressive bonus counter 77 has reached the predetermined value N2max when the slot game is being executed only in the slot machine 10*a* (NO in Step S271), mystery bonus generation processing is executed (Step S276). In a mystery bonus, when the slot game is being executed in the slot machine 10*a*, the winning is established regardless of the combination of the stopped symbols, and an award corresponding to a part or entirety of the second accumulated count value N2 of the progressive bonus counter 77 is generated.

Thereafter, the provision processing for providing the award generated by executing the major event game and the award generated by the mystery bonus is executed (Step S275).

Figure 25:
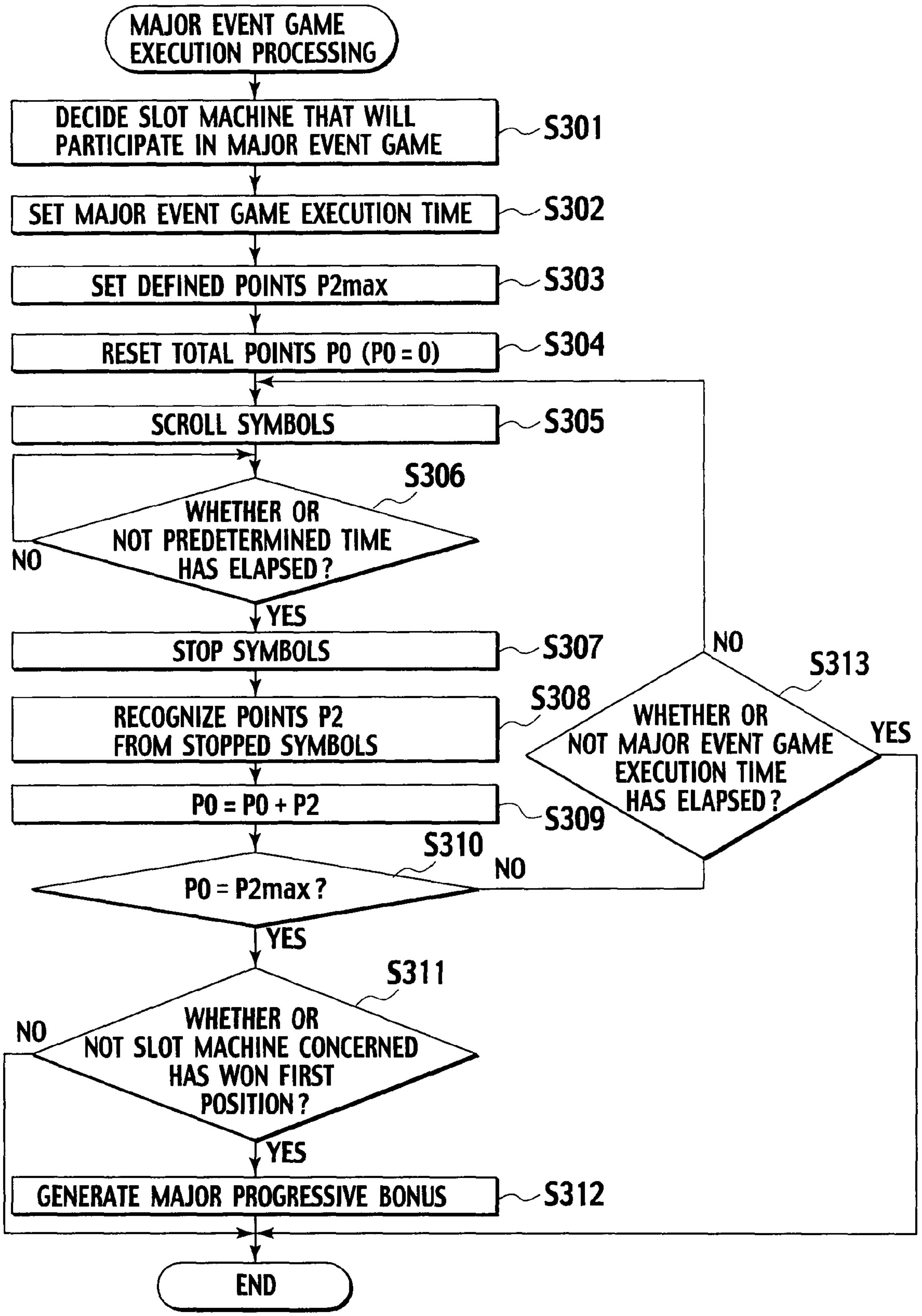
FIG. 25 is a flowchart showing major event game execution processing according to the third embodiment.

Next, a description will be made of the major event game execution processing shown in Step S274 of FIG. 24 with reference to FIG. 25.

First, the server controlling CPU 71 (refer to FIG. 6) decides the slot machines 10 (some of 10*a* to 10*e*) which will participate in the major event game (Step S301). As described above, the slot machines, in each of which the slot game is being executed when the second accumulated count value N2 of the progressive bonus counter 77 has reached the predetermined value N2max, and the input operation for participating in the major event game is performed, are decided as the slot machines 10 which will participate in the major event game.

Subsequently, the server controlling CPU 71 sets an execution time of the major event game (Step S302). The execution time of the major event game is randomly selected from a plurality of time ranges (for example, three minutes, five minutes, seven minutes and 10 minutes). Moreover, the execution time may be always set at the same time range (for example, five minutes).

The server controlling CPU 71 sets a defined number of points P2max for the major event game (Step S303). The defined number of points P2max is the number of points, which is necessary to win the major event game.

Moreover, the server controlling CPU 71 resets a total number of points P0, which is set for each of the slot machines 10 which will participate in the major event game (Step S304). The total number of points P0 is a total value of points generated by executing the major event game.

Subsequently, when the START switch 27 is pressed by the player, the controller 40 of each of the slot machines 10 scrolls the symbols on the display 16 (Step S305), and stops the symbols (Step S307) after a predetermined time elapsed (YES in Step S306).

In the major event game, the symbols which appear therein differ from those in the usual slot game, and five sorts of symbols, which are "BLUE 7", "RED 7", "3 BAR", "2 BAR" and "1 BAR", will appear as shown in FIG. 14. Then, the points to be generated are decided by the symbols stopped on the centerline L1. Specifically, as shown in FIG. 14, the points become 300 points when the "BLUE 7" is stopped on the centerline L1, become 150 points when the "RED 7" is stopped thereon, become 30 points when the "3 BAR" is stopped thereon, become 20 points when the "2 BAR" is stopped thereon, become 10 points when the "1 BAR" is stopped thereon, and become 0 point when any of the symbols is not stopped thereon.

The controller 40 recognizes the points P2 from the stopped symbols (Step S308). For example, as shown in FIG. 15A, in the case where the symbols are stopped in the pattern of "None, None, 1 BAR", the points P2 become 10 points. As shown in FIG. 15B, in the case where the symbols are stopped in the pattern of "1 BAR-2 BAR-3 BAR", the points P2 become 60 points. As shown in FIG. 15C, in the case where the symbols are stopped in the pattern of "RED 7-RED 7-BLUE 7", the points P2 become 600 points.

The controller 40 adds the recognized points P2 to the total number of points P0 (Step S309). In this case, the server controlling CPU 71 of the server 5 displays, on the common display 4, the symbols and the total points of the respective slot machines 10 which are participating in the major event game, and notifies the respective players of the symbols and the total points. A specific display example is as shown in FIG. 16. Hence, the players of the respective slot machines 10 can recognize their current ranks by seeing the number of points, which is displayed on the common display 4.

Thereafter, the controller 40 of each of the slot machines 10 determines whether or not the total number of points P0 has reached the defined number of points P2max (for example, "8000 points") set by the processing of Step S303 (Step S310). Then, in the case where the total number of points P0 has not reached the defined number of points P2max (NO in Step S310), the controller 40 determines whether or not the execution time of the major event game has elapsed (Step S313), and returns to the processing of Step S305 in the case where the execution time of the major event game has not elapsed (NO in Step S313).

Meanwhile, in the case where the execution time of the major event game has elapsed (YES in Step S313), the controller 40 ends the major event game execution processing.

Moreover, in the case where the total number of points P0 has reached the defined number of points P2max in the processing of Step S310 (YES in Step S310), the server controlling CPU 71 determines whether or not the slot machine 10 (10*a*) concerned therewith has won the first position among the respective slot machines 10 which are participating in the major event game (Step S311).

Then, in the case where it is determined that the slot machine 10*a* has won the first position, that is, in the case where the total number of points P0 of the slot machine 10*a* has reached the defined number of points P2max earliest among the plurality of slot machines 10 (YES in Step S311), the controller 40 generates a major progressive bonus (Step S312). In the major progressive bonus, the credits or the medals, which correspond to a part or entirety of the second accumulated count value N2 accumulated in the progressive bonus counter 77, are provided. For example, in the case where the second accumulated count value N2 is $5000, the credits or the medals, which are equivalent to $5000, are provided. In such a way, the major event game is executed.

Then, in the above-described mini event game and major event game, the progressive bonuses are provided only to the slot machine 10 in which the total number of points P0 has reached the defined number of points P1max and the defined number of points P2max earliest among the plurality of slot machines 10, and accordingly, the player can be allowed to be interested in the matter that the event game takes place.

Moreover, in the case where the slot machine 10 that is participating in the event game is only one, the mini event game or the major event game is not executed, but instead, the mystery bonus is generated. Accordingly, the profit made in such a manner that the accumulated count values of the progressive bonus counter 77 are accumulated can be returned to the player.

The description has been made above of the embodiments. However, the embodiments merely illustrate specific examples, and do not particularly limit the present invention. It is possible to appropriately change designs of specific configurations of the respective means and the like. Moreover, the effects described in the embodiments merely list the most suitable effects generated from the present invention, and the effects by the present invention are not limited to those described in the embodiments.

Moreover, in the detailed description mentioned above, characteristic portions have been mainly described so that the present invention can be understood more easily. The present invention is not limited to the embodiments described in the detailed description mentioned above, and can be applied to other embodiments, and an application range of the present invention is various. Furthermore, the terms and the idioms, which are used in this specification, are used for properly describing the present invention, and are not used for limiting the interpretation of the present invention. Furthermore, it is considered easy for those skilled in the art to contrive other configurations, systems, methods and the like, which are included in the concept of the present invention, from the concept of the invention described in this specification. Hence, the description of the scope of claims must be regarded as one including equilibrium configurations within the range without departing from the scope of the technical idea of the present invention. Moreover, the object of the abstract is to enable the patent offices, general public institutions, engineers who belong to this technical field and are not fully conversant in the patent and legal terms or the technical terms, and the like to rapidly determine the technical contents of this application and the essence thereof by a simple investigation. Hence, the abstract is not intended to limit the scope of the invention to be evaluated by the description of the scope of claims. Moreover, in order that the object of the present invention and the effects intrinsic to the present invention can be fully understood, it is desired that the present invention be interpreted in full consideration for the already disclosed documents and the like.

The above-mentioned detailed description includes the processing executed by a computer. The above description and expression are described for the purpose of allowing those skilled in the art to understand the present invention most efficiently. In this specification, the respective steps for use in deriving one result should be understood as processes in which no self-contradiction is inherent. Moreover, in the respective steps, electric or magnetic signals are transmitted/received, recorded, and so on. In the processes in the respective steps, such signals are expressed by bits, values, symbols, characters, terms, numeric characters, and the like; however, it is necessary to note that these are used since they are convenient for the description. Furthermore, in some case, the processes in the respective steps are described by expressions common to those for human actions; however, in principle, the processes described in this specification are executed by a variety of devices. Furthermore, other configurations required for performing the respective steps will be self-evident from the above-description.

The above-described first to third embodiments may contain the subject matter of a future divisional application or an invention that may be newly presented or introduced by future amendment. Examples are shown as follows.

(1) A gaming system, comprising:

a plurality of gaming terminals;

a common display; and a progressive bonus counter, wherein each of the gaming terminals includes:

a terminal display that displays thereon an image regarding a progress of a slot game;

a number-of-games counter that is counted following execution of the slot game and is reset when a specific game result is obtained; and a controller configured to:

(a) execute the slot game by receiving a bet, and accumulate a part of the bet in the progressive bonus counter;

(b) receive a side bet that becomes a condition for obtaining insurance pay;

(c) generate the insurance pay when the side bet is performed and the number-of-games counter has reached a predetermined value;

(d) display an image on the common display and execute an event game when the slot game is being executed in the plurality of gaming terminals and an accumulated count value of the progressive bonus counter has reached a predetermined value; and (e) provide an award corresponding to a part or entirety of the accumulated count value to the gaming terminal that has won the event game.

(2) The gaming system according to the above-mentioned (1), wherein, in a case where the slot game is executed only in one gaming terminal, and the accumulated count value of the progressive bonus counter has reached the predetermined value, the controller determines whether or not a mystery bonus is won at a time when the slot game is being executed, and provides the award corresponding to a part or entirety of the accumulated count value to the gaming terminal when the mystery bonus is won.

(3) The gaming system according to the above-mentioned (1), wherein the controller monitors a behavior of the gaming terminal, and determines that the slot game is being executed in the gaming terminal in a case of having detected an input operation by a player.

(4) The gaming system of claim according to the above-mentioned (1), wherein the controller changes a ratio of the bet to be accumulated in the progressive bonus counter.

(5) The gaming system according to the above-mentioned (1), wherein the controller executes the event game without performing betting.

(6) The gaming system according to the above-mentioned (1), wherein the controller does not perform a counting operation in the number-of-games counter at a time when the event game is being executed.

(7) A control method of a gaming system including a plurality of gaming terminals, a common display, and a progressive bonus counter, comprising the steps of:

executing a game by receiving a bet, and accumulating a part of the bet in the progressive bonus counter;

displaying an image on the common display and executing an event game which the plurality of gaming terminals participate in when the game is being executed in the plurality of gaming terminals and an accumulated count value of the progressive bonus counter has reached a predetermined value; and providing an award corresponding to a part or entirety of the accumulated count value to the gaming terminal that has won the event game.

(8) The control method of a gaming system according to the above-mentioned (7), wherein the game is a slot game, and in a case where the slot game is executed only in one gaming terminal, and the accumulated count value of the progressive bonus counter has reached the predetermined value, it is determined whether or not a mystery bonus is won at a time when the slot game is being executed, and the award corresponding to a part or entirety of the accumulated count value is provided to the gaming terminal when the mystery bonus is won.

(9) The control method of a gaming system according to the above-mentioned (7), wherein a behavior of the gaming terminal is monitored, and it is determined that the slot game is being executed in the gaming terminal in a case where an input operation by a player is detected.

(10) The control method of a gaming system according to the above-mentioned (7), wherein a ratio of the bet to be accumulated in the progressive bonus counter is changed.

(11) The control method of a gaming system according to the above-mentioned (7), wherein the event game is executed without performing betting.

Figure 29:
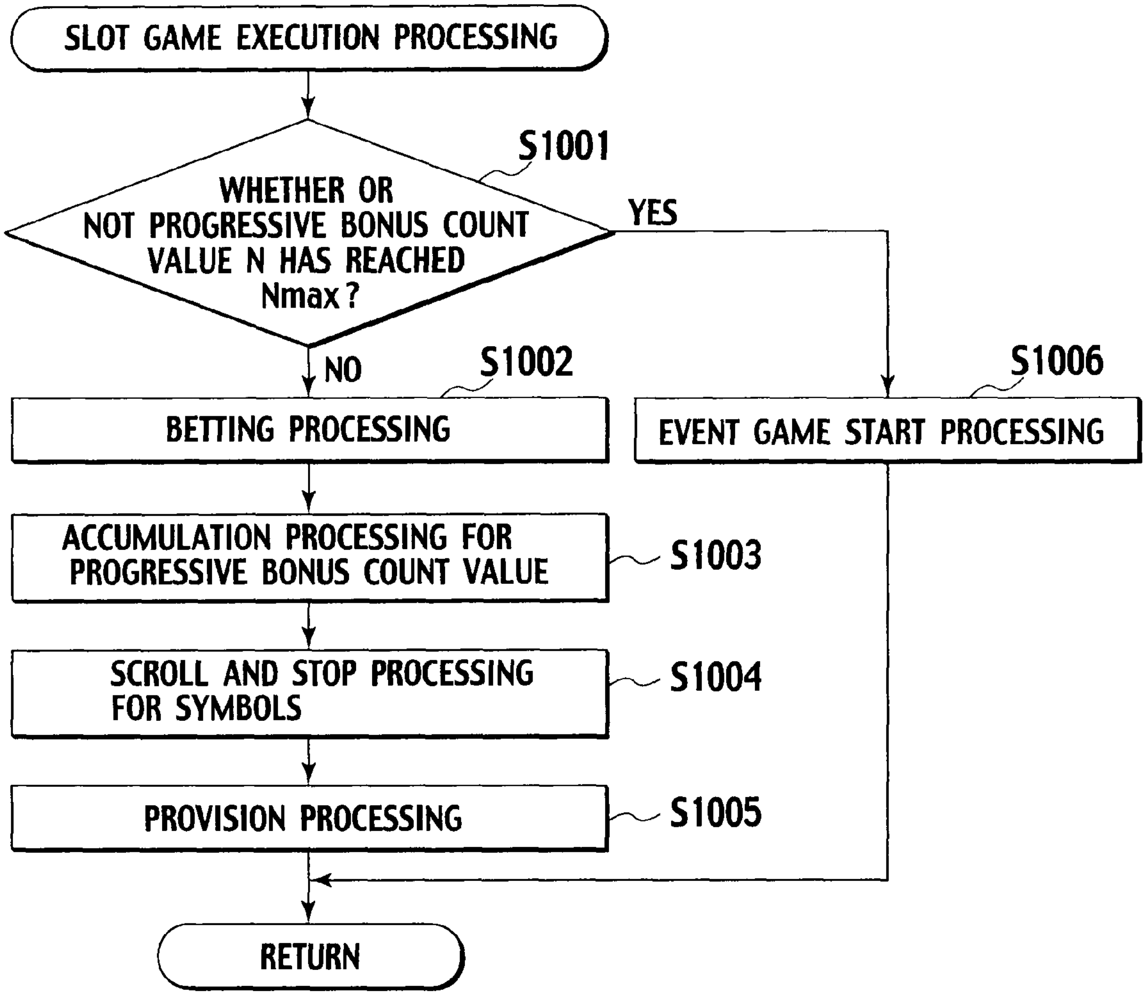
FIG. 29 is a flowchart showing a schematic processing procedure of a slot game executed by a gaming system according to another embodiment.
Figure 32:
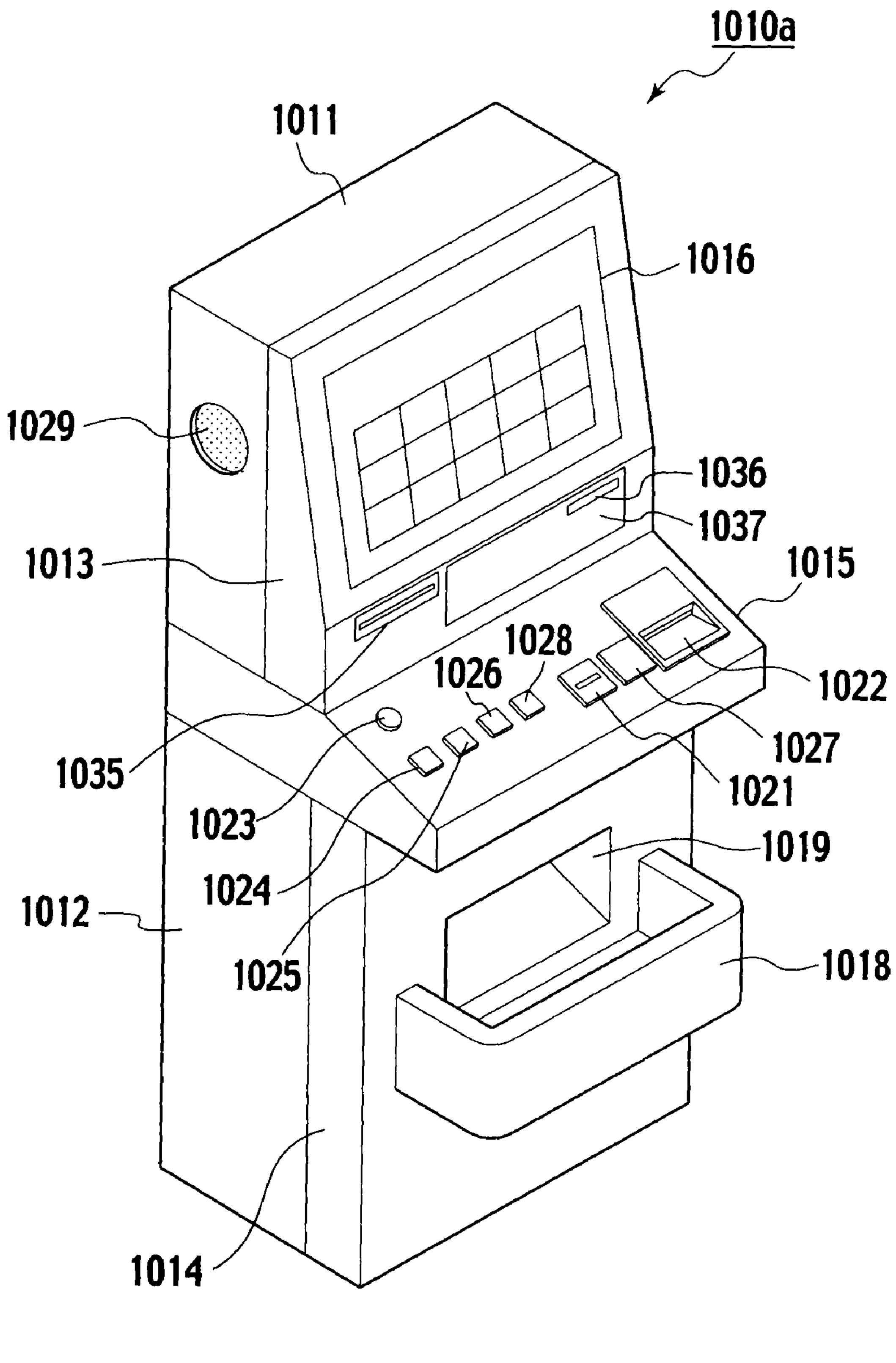
FIG. 32 is an entire configuration view of a slot machine for use in the gaming system according to the other embodiment.
Figure 33:
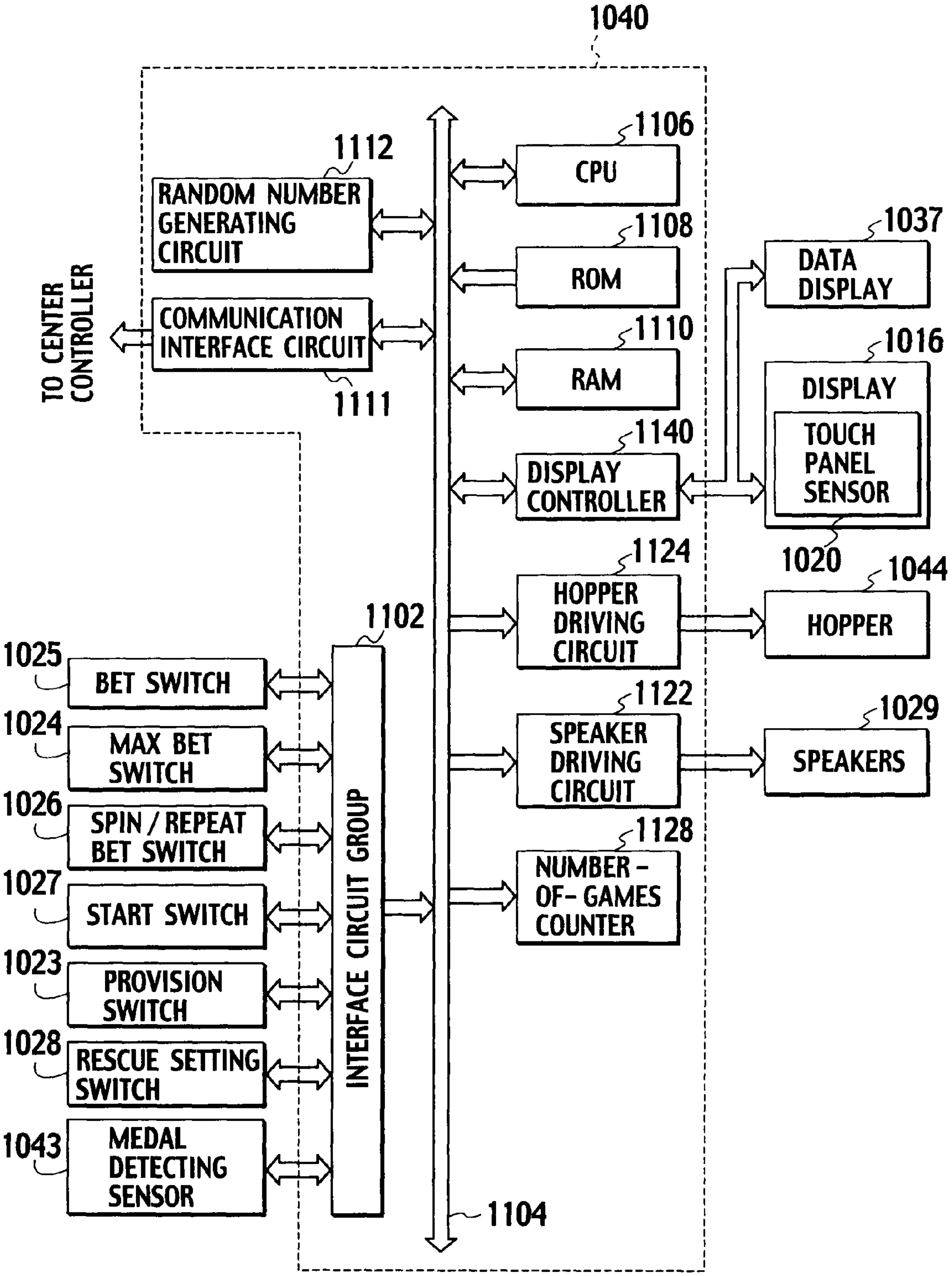
FIG. 33 is a block diagram showing an internal configuration of the slot machine for use in the gaming system according to the other embodiment.

FIG. 29 is a flowchart showing a schematic processing procedure of slot game execution processing executed by a slot machine provided in a gaming system according to the fourth embodiment, FIG. 32 is an exterior appearance view of the slot machine 1010, a plurality (1010*a* to 1010*e*) of which is provided in the gaming system according to the fourth embodiment, and FIG. 33 is a block diagram showing an internal configuration of the slot machine 1010 (1010*a* to 1010*e*). A description will be made below of the schematic processing procedure in the gaming system according to the fourth embodiment with reference to the respective drawings.

First, a controller 1040 (refer to FIG. 33) determines whether or not an accumulated count value N of a progressive bonus counter 1077 (refer to FIG. 34), which is accumulated following execution of slot games, has reached a predetermined value Nmax (Step S1001). Then, in the case where the accumulated count value N has not reached Nmax (NO in Step S1001), the controller 1040 executes a usual slot game. Specifically, the controller 1040 receives betting made by a player (Step S1002), and accumulates a part of a bet thus made to the progressive bonus counter 1077 (Step S1003).

Moreover, the controller 1040 scrolls a plurality of symbols on a display 1016 (refer to FIG. 33), and thereafter stops the symbols thereon (arranged symbols were rearranged) (Step S1004). Then, based on a combination of the stopped symbols, the controller 1040 determines whether or not a winning is established. In the case where the winning is established, provision processing for providing medals or credits to the player is performed (Step S1005).

Meanwhile, in the case where the accumulated count value N of the progressive bonus counter 1077 has reached the predetermined value Nmax (YES in Step S1001), event game start processing is executed in the slot machines 1010 in each of which such a play is being executed among the respective slot machines 1010 (1010*a* to 1010*e*) (Step S1006).

In the event game start processing, an event game is executed in the case where a plurality of the players participate in the slot game. Moreover, in the case where only one player participates in the slot game, a mystery bonus is generated in the slot machine of this player. Note that a determination as to whether or not each player participates in the slot game is made based on a behavior in each of such gaming terminals. For example, in the case where a START switch 1027 is pressed, it is determined that the player participates in the slot game by the gaming terminal until a predetermined time thereafter elapses.

In the case where the event game is executed, as will be described later, a game for acquiring a progressive bonus is executed by each slot machine 1010 that participates therein. Specifically, an award corresponding to a part or entirety of the accumulated count value N of the progressive bonus counter 1077 is provided to the slot machine 1010 that has won the event game among the slot machines 1010 which have participated therein.

Then, the above-described event game is executed, thus making it possible to allow each player to enhance interest in executing the slot game, and possible to enhance an entertainment factor of the gaming system.

Figure 30:
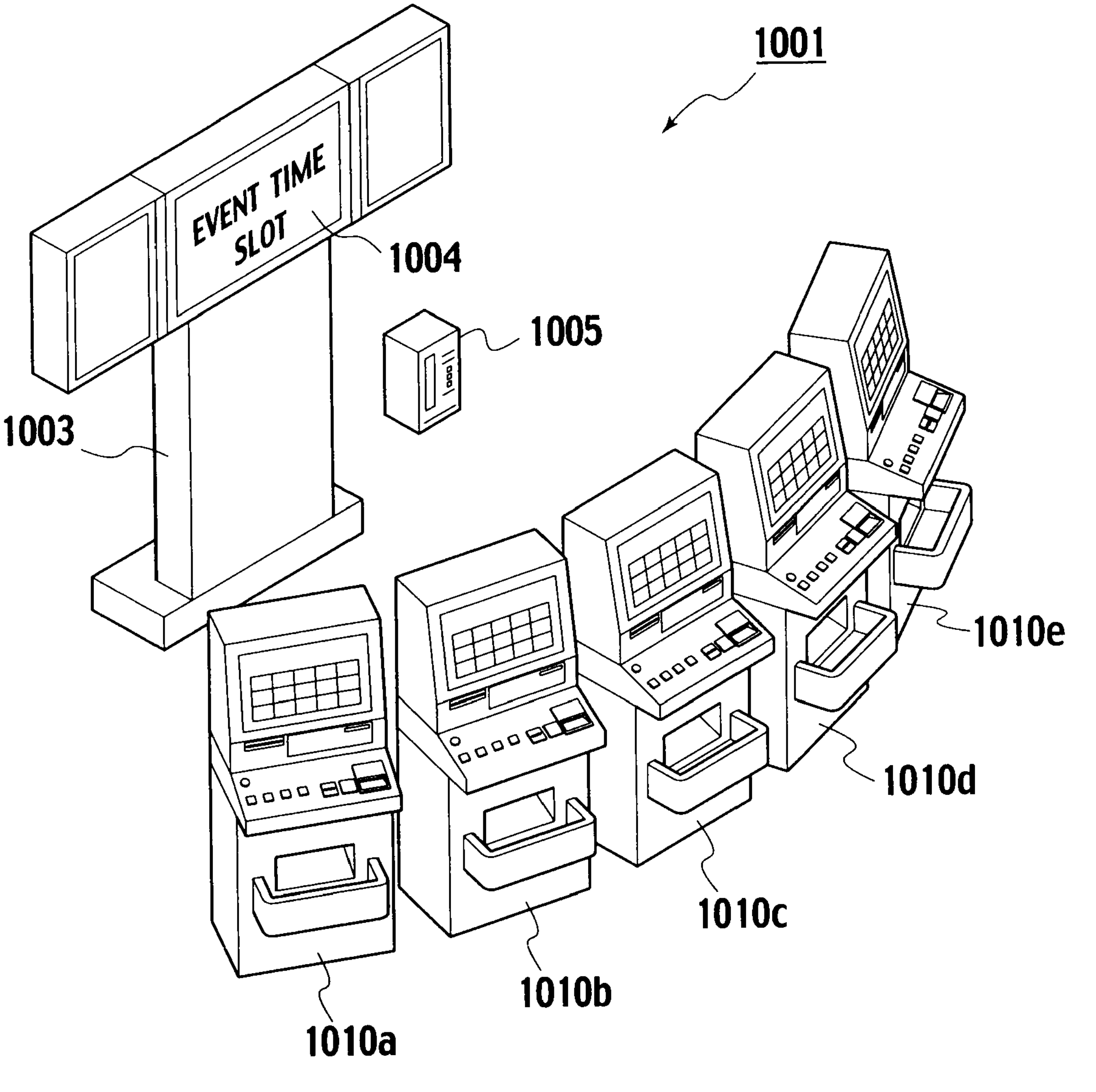
FIG. 30 is an entire configuration view of a gaming system according to the other embodiment.

Next, a description will be made of the gaming system 1001 according to the fourth embodiment. As shown in FIG. 30, in the gaming system 1001 according to the fourth embodiment, a common display 1004 is provided on a support member 1003, and further, the plurality (five in the drawing) of slot machines 1010 (1010*a* to 101*e*) are arranged so as to surround the common display 1004 concerned. Moreover, a center controller 1005 that comprehensively controls the respective slot machines 1010 (1010*a* to 1010*e*) and performs a display control for the common display 1004 is provided.

Each of the slot machines 1010 is adapted to be capable of executing the slot game, and as will be described later, in the case where the accumulated count value N of the progressive bonus counter 1077 provided commonly to the respective slot machines 1010 becomes the predetermined value Nmax, and a plurality of the players participate in the slot game, the event game common to the respective slot machines 1010 is executed.

Figure 31:
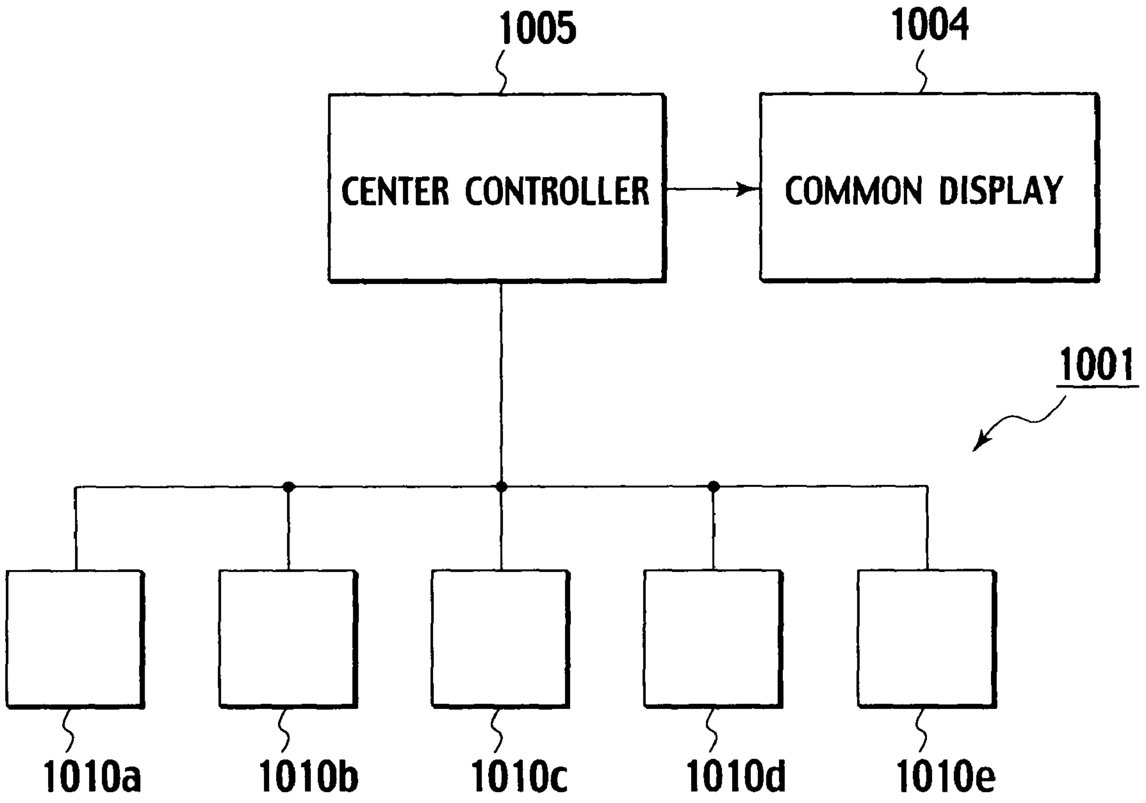
FIG. 31 is a network connection diagram of the gaming system according to the other embodiment.

FIG. 31 is a network connection diagram of the gaming system 1001 according to the fourth embodiment. As shown in FIG. 31, the plurality of slot machines 1010 (1010*a* to 1010*e*) are connected through a network to the center controller 1005. Moreover, the center controller 1005 is connected to the common display 1004.

Next, a description will be made of a configuration of the slot machine 1010 with reference to FIG. 32. Note that the respective slot machines 1010 (1010*a* to 1010*e*) have the same configuration, and accordingly, the description will be made by taking the slot machine 101010*a* as an example. As shown in FIG. 32, the slot machine 101010*a* according to the fourth embodiment includes: an upper cabinet 1011; a lower cabinet 1012; and an operation table 1015 provided so as to protrude forward between the upper cabinet 1011 and the lower cabinet 1012.

An upper door 1013 is provided on the upper cabinet 1011, and is adapted to be openable and closable by a hinge (not shown). In a similar way, a lower door 1014 is provided on the lower cabinet 1012, and is adapted to be openable and closable by a hinge (not shown). At a usual time, the slot game is executed in a state where the upper door 1013 and the lower door 1014 are closed, and at the time when a failure occurs in the slot machine 1010 and the slot machine 1010 is maintained, the upper door 1013 and the lower door 1014 are opened and closed by an administrator who owns an exclusive key.

Moreover, in the upper cabinet 1011, there are provided a variety of constituent members including: the controller 1040 (refer to FIG. 33) for electrically controlling this slot machine 1010; a hopper 1044 (refer to FIG. 33) for controlling insertion, storage and provision of the medals; and the like. Furthermore, on side surfaces of the upper cabinet 1011, speakers 1029 for outputting an effect sound that follows the execution of the slot game are provided.

The display 1016 is provided on a front surface of the upper door 1013, which faces to the player. On the display 1016, images regarding the game are displayed. Specifically, in the slot machine 1010*a* for use in this embodiment, totally 15 symbols with a matrix of three rows and five columns are displayed, and when the slot game is executed, the respective symbols start to be scrolled, and are then stopped after a predetermined time has elapsed. Then, it is determined whether or not winning is established in response to the combination of the stopped symbols, and a predetermined amount of provision will be generated in the case where the winning is generated. Moreover, besides the above-described symbols, a variety of effect images are displayed on the display 1016 as the slot game advances.

Moreover, on a surface of the display 1016, a touch panel sensor 1020 (refer to FIG. 33) that detects a touching operation performed by the player is provided. By using the touch panel sensor 1020, the player can perform an input operation by touching the image displayed on the display 1016.

Furthermore, below the display 1016, a ticket printer 1035, a card reader 1036 and a data display 1037 are provided.

The ticket printer 1035 prints, on a ticket, a bar code in which respective data such as the number of credits, a date and an identification number of the slot machine 1010*a* are encoded, and outputs the ticket as a bar code-added ticket. The player allows another slot machine to read the bar code-added ticket, and thereby can play the game on the slot machine concerned, or can exchange the bar code-added ticket with bills and the like at a predetermined spot (for example, a cashier in a casino) of a game facility.

The card reader 1036 is capable of receiving a smart card, and reads data from the smart card thus inserted thereinto, and writes data into the smart card. The smart card is a card carried by the player, in which data for identifying the player, data regarding a history of the games played by the player, and the like are stored.

On the data display 1037, a variety of data regarding the slot game is displayed. For example, data on such a play history, the number of credits, the number of provision and the like is displayed on the data display 1037.

Note that, though the medals are mentioned as an example of the bet for use in the case of executing the game in this embodiment, the bet is not limited to the medals. For example, coins, tokens, electronic money, or electronic valuable information (credits) equivalent to these can be mentioned.

Moreover, on the operation table 1015, there are provided: a PROVISION switch 1023; a MAX BET switch 1024; a BET switch 1025; a SPIN/REPEAT BET switch 1026; the START switch 1027; and a RESCUE SETTING switch 1028. Moreover, on the operation table 1015, there are provided: a medal insertion slot 1021 for inserting therethrough the medals for use in the case of executing the game; and a bill validator 1022 for identifying whether or not the bills are real ones and receiving the real bills.

The PROVISION switch 1023 is a switch for providing the inserted medals. The medals to be provided are discharged from a medal provision port 1019 open on a front surface of the lower door 1014. The medals thus provided are accumulated in a medal tray 1018.

The MAX BET switch 1024 is a switch for betting, by one operation, the maximum number (for example, equivalent to 10 medals) of credits bettable in one slot game. Note that it is possible to change the maximum number of credits bettable in one slot game by an operation of the administrator. For example, a setting can also be made so that, for example, betting equivalent to 50 medals to the maximum can be enabled.

The BET switch 1025 is a switch for deciding the number of credits to be bet on the slot game executed on the display 1016. Every time when the BET switch 1025 is pressed, a credit equivalent to one medal is bet.

The SPIN/REPEAT BET switch 1026 is a switch for betting credits again without changing the number of credits bet by the above-described BET switch 1025 in the game executed last time, thereby playing the slot game.

The START switch 1027 is a switch for starting the slot game on the display 1016 after the credits are bet. When the START switch 1027 is pressed after the medals are inserted into the medal insertion slot 1021 or after the credits are bet by the BET switch 1025, the slot game is started, in which the symbols are stopped after being scrolled on the respective display areas with the matrix of three rows and five columns on the display 1016.

The RESCUE SETTING switch 1028 is a switch for joining "rescue pay (insurance pay)". The rescue pay is a function to compensate for losses of the player by generating a predetermined amount of provision when the player does not win a bonus trigger continuously for a predetermined number of games (for example, 1000 times) at the time of executing the slot games. In the rescue pay, for example, one medal is collected with respect to betting of 10 medals, and at the time when the rescue pay is generated, for example, 2000 medals are provided. The player can determine by him/herself whether or not to join the rescue pay.

FIG. 33 is a block diagram showing an electric configuration of the controller 1040 provided in the slot machine 1010*a* according to this embodiment, and of the variety of instruments connected to the controller 1040. The controller 1040 shown in FIG. 33 is a microcomputer, and includes: an interface circuit group 1102; an input/output bus 1104; a CPU 1106; a ROM 1108; a RAM 1110; a communication interface circuit 1111; a random number generating circuit 1112; a speaker driving circuit 1122; a hopper driving circuit 1124; a number-of-games counter 1128; and a display controller 1140.

The interface circuit group 1102 is connected to the input/output bus 1104. The input/output bus 1104 transfers a data signal or an address signal with the CPU 1106.

The START switch 1027 is connected to the interface circuit group 1102. A starting signal outputted from the START switch 1027 is converted into a predetermined signal in the interface circuit group 1102, and is then transmitted to the CPU 1106 through the input/output bus 1104.

Moreover, to the interface circuit group 1102, there are connected: the BET switch 1025; the MAX BET switch 1024; the SPIN/REPEAT BET switch 1026; the PROVISION switch 1023; and the RESCUE SETTING switch 1028. The respective switching signals outputted from the respective switches 1025, 1024, 1026, 1023 and 1028 are supplied to the interface circuit group 1102, are converted into predetermined signals in the interface circuit group 1102, and are then transmitted to the CPU 1106 through the input/output bus 1104.

In addition, a medal detecting sensor 1043 is connected to the interface circuit group 1102. The medal detecting sensor 1043 is a sensor for detecting the medals inserted into the medal insertion slot 1021, and is provided in a medal insertion spot of the medal insertion slot 1021. A detection signal outputted from the medal detecting sensor 1043 is supplied to the interface circuit group 1102, is converted into a predetermined signal by the interface circuit group 1102, and is then transmitted to the CPU 1106 through the input/output bus 1104.

To the input/output bus 1104, there are connected: the ROM 1108 in which a system program is stored; and the RAM 1110 for storing a variety of data. Moreover, to the input/output bus 1104, there are connected: the random number generating circuit 1112; the communication interface circuit 1111; the display controller 1140; the hopper driving circuit 1124; the speaker driving circuit 1122; and the number-of-games counter 1128.

On an occasion that such a starting operation for the game has been received by the START switch 1027, the CPU 1106 reads out a game execution program, and executes the slot game. The game execution program is a program for executing the slot game on the display 1016 through the display controller 1140.

Specifically, the game execution program is programmed so as to execute the slot game that generates the provision when the totally 15 symbols are scrolled on the display areas of the display 1016 and are thereafter stopped, and symbols which form a winning combination consequently come from among the stopped symbols.

The communication interface circuit 1111 is connected to the center controller 1005 through the network, and transmits, to the center controller 1005, the data on the play history of the games executed by this slot machine 1010*a*. Moreover, the communication interface circuit 1111 receives a variety of data transmitted from the center controller 1005.

The random number generating circuit 1112 generates random numbers for deciding whether or not to generate the winning combination in the slot game executed on the display 1016.

The number-of-games counter 1128 is a counter for counting the number of times that the slot games are executed. The number-of-games counter 1128 starts to count the number on an occasion that the rescue pay is turned on, and resets a count value in the case where a bonus game to be described later is executed. Then, in the case where the count value has reached the predetermined value (for example, 1000), the rescue pay is generated. Note that it is also possible to set the number-of-games counter 1128 in the RAM 1110.

The speaker driving circuit 1122 outputs an audio signal to the speakers 1029. Specifically, the CPU 1106 reads out the audio data stored in the ROM 1108, and transmits the audio data to the speaker driving circuit 1122 through the input/output bus 1104. In such a way, a predetermined effect sound is emitted from the speakers 1029.

The hopper driving circuit 1124 outputs a provision signal to the hopper 1044 when provision occurs. Specifically, upon receiving a provision signal from the PROVISION switch 1023, the CPU 1106 outputs a drive signal to the hopper driving circuit 1124 through the input/output bus 1104. In such a way, the hopper 1044 provides the medals of the number equivalent to the remaining number of credits at that point of time, which is stored in a predetermined memory area of the RAM 1110.

The display controller 1140 performs a display control to execute the slot game on the display 1016. Specifically, the CPU 1106 generates a signal of an image display command, which corresponds to a state of the slot game and a result of the slot game, and outputs the signal of the image display command to the display controller 1140 through the input/output bus 1104. Upon receiving the signal of the image display command, which is outputted from the CPU 1106, the display controller 1140 generates a drive signal for driving the display 1016 based on the image display command concerned, and outputs the generated drive signal to the display 1016. In such a way, a variety of images such as the effect images and an image that explains the game are displayed on the display 1016. Moreover, the display controller 1140 performs a display control for the data display 1037. Furthermore, the display controller 1140 outputs, to the CPU 1106, an operation signal inputted from the touch panel sensor 1020.

Next, a description will be made of an electric configuration of the center controller 1005 with reference to a block diagram shown in FIG. 34. The center controller 1005 performs controls to accumulate, in the progressive bonus counter 1077, the count values of the progressive bonuses generated by executing the slot games by the respective slot machines 1010 (1010*a* to 1010*e*), and to display a variety of information regarding the event game on the common display 1004 when the event game is executed. Moreover, the center controller 1005 performs a control to provide the award, which corresponds to the accumulated count value N of the progressive bonus counter 1077, to the slot machine 1010 that has won the event game.

Figure 34:
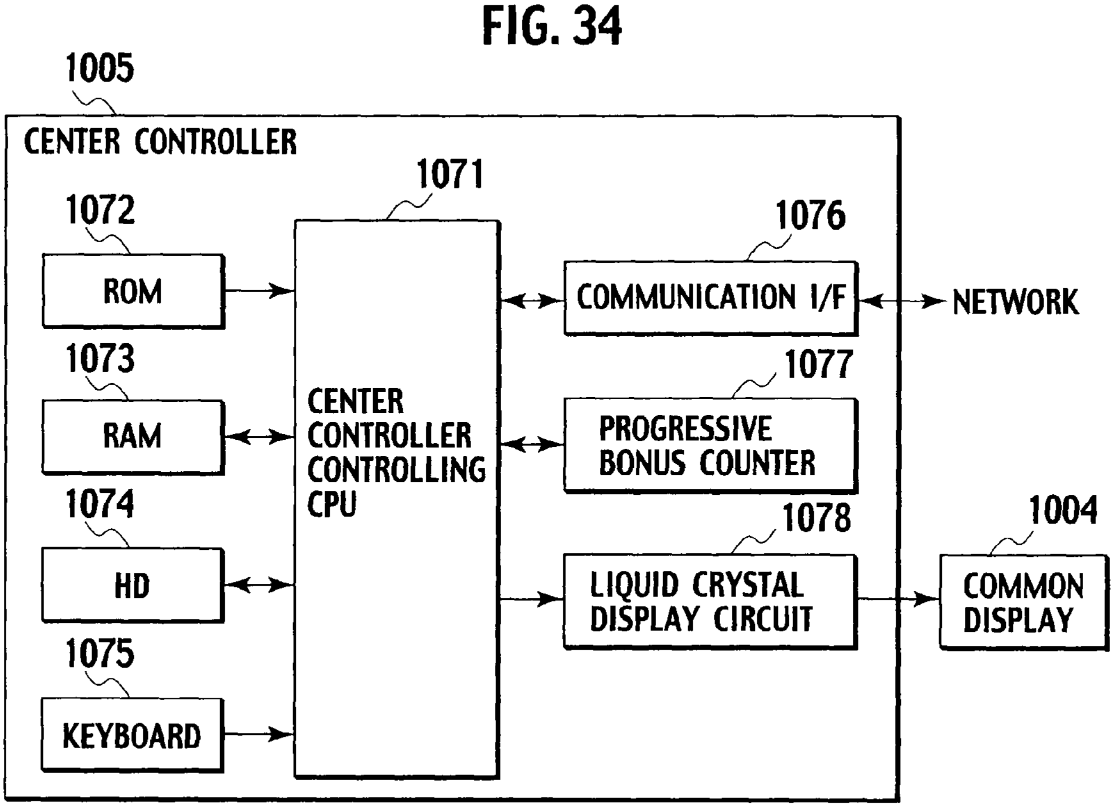
FIG. 34 is a block diagram showing an internal configuration of a center controller for use in the gaming system according to the other embodiment.

As shown in FIG. 34, the center controller 1005 includes: a center controller controlling CPU 1071 that comprehensively controls the slot game; a ROM 1072; a RAM 1073; a hard disk 1074 in which a variety of data such as image data displayed on the common display 1004 and a program are stored; a keyboard 1075 that receives an operation input of the administrator; a communication I/F 1076 that communicates with the respective slot machines 1010 (1010*a* to 1010*e*) through the network; the progressive bonus counter 1077 that accumulates and stores the count values of the progressive bonuses; and a liquid crystal driving circuit 1078 that performs a display control for the common display 1004.

The RAM 1073 is one to store a variety of data regarding the control performed by the center controller controlling CPU 1071, and stores the predetermined value Nmax of the accumulated count value N when the value Nmax is decided. Specifically, the predetermined value Nmax of the accumulated count value N can be appropriately changed in such a manner that the administrator operates the keyboard 1075, and the set predetermined value Nmax is stored in the RAM 1073. Moreover, the players of the respective slot machines 1010 are not usually notified of the set predetermined value Nmax and the accumulated count value N of the progressive bonuses.

Figure 35:
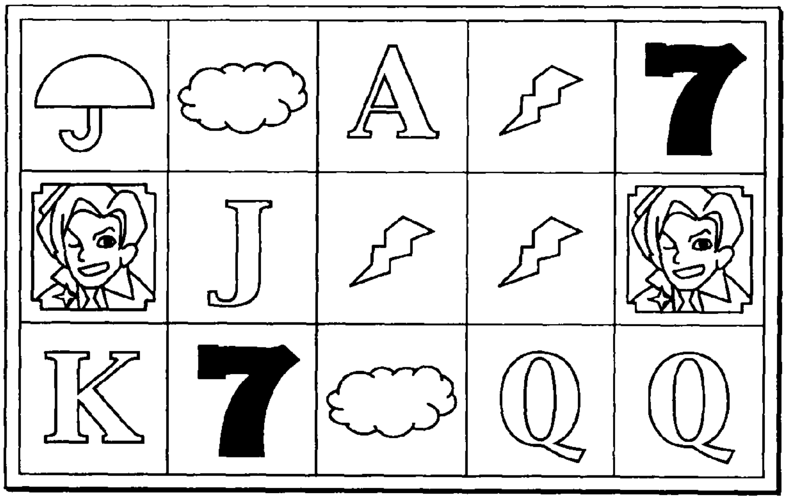
FIG. 35 is an explanatory view of symbols displayed on a display of the slot machine according to the other embodiment.

Next, a description will be made of the provision of the slot game executed by each of the slot machines 1010 (1010*a* to 1010*e*) with reference to FIG. 35 and FIG. 36. FIG. 35 is an explanatory view showing an example of the symbols displayed on the totally 15 areas with the matrix of three rows and five columns, which are set on the display 1016. As shown in FIG. 35, symbols of "A", "K", "Q", "J", "7" and the like are displayed on the respective display areas. Then, a provision amount is decided in response to the number of the variety of symbols displayed on the 15 display areas.

Specifically, as shown in FIG. 36, in the case where three symbols of "7" have appeared, provision of 30 medals is generated with respect to one bet. In the case where four symbols of "7" have appeared, provision of 60 medals is generated. In the case where five symbols of "7" have appeared, such an appearance becomes a bonus trigger, and the bonus game is executed. Details of the bonus game will be described later.

In a similar way, provision of 20 medals is generated in the case where three symbols of "A" have appeared, provision of 40 medals is generated in the case where four symbols of "A" have appeared, and provision of 60 medals is generated in the case where five symbols of "A" have appeared.

Next, a description will be made of execution processing for the slot game executed by the respective slot machines 1010 (1010*a* to 1010*e*) of the gaming system 1001 according to the fourth embodiment with reference to a flowchart shown in FIG. 37. Since the execution processing for the slot games by the respective slot machines 1010 (101*a* to 1010*e*) is similar thereamong, a description will be made of the execution processing for the slot game in the slot machine 1010*a*.

The controller 1040 shown in FIG. 33 determines whether or not the accumulated count value N of the progressive bonus counter has reached the predetermined value Nmax (Step S1031). Then, in the case where the accumulated count value N has reached the predetermined value Nmax (YES in Step S1031), the controller 1040 shifts the processing to the event game start processing (Step S1045). Details of the event game start processing will be described later.

Meanwhile, in the case where the accumulated count value N has not reached the predetermined value Nmax (NO in Step S1031), the controller 1040 determines whether a bonus flag B1 set in the RAM 1110 is "0" or "1" (Step S1032). In the case where the bonus flag B1 is "1", the controller 1040 shifts the processing to bonus game execution processing (Step S1046). Details of the bonus game execution processing will be described later. Note that the bonus flag B1 is initially "0".

In the case where the bonus flag B1 is "0", the controller 1040 receives a betting operation performed by the player (Step S1033). Specifically, the controller 1040 receives the betting operation performed in such a manner that the medals are inserted from the medal insertion slot 1021, or that any of the MAX BET switch 1024, the BET switch 1025 and the SPIN/REPEAT BET switch 1026 is pressed.

Then, in the case where the betting operation is received (YES in Step S1034), the controller 1040 performs subtraction processing for the credits. Specifically, the controller 1040 performs processing for subtracting the number of bet credits from the number of current credits (Step S1035).

To the center controller 1005, the controller 1040 transmits a predetermined ratio (for example, 2%) of the number of bets as the count value of the progressive bonus. The center controller 1005 accumulates the transmitted count value of the progressive bonus in the progressive bonus counter 1077 (Step S1036). Here, by an operation of the administrator, it is possible to appropriately change the ratio of the collected number of bets as the count value of the progressive bonus from the bets.

The controller 1040 determines whether or not the START switch 1027 is switched on (Step S1037). Then, in the case where the START switch 1027 is switched on (YES in Step S1037), the controller 1040 scrolls the 15 symbols displayed on the display 1016 (Step S1038).

The controller 1040 determines whether or not a predetermined time (for example, five seconds) has elapsed since the scroll of the symbols was started (Step S1039), and stops the symbols (Step S1040) when the predetermined time has elapsed (YES in Step S1039).

Based on the stopped 15 symbols, the controller 1040 determines whether or not the bonus trigger is established (Step S1041). Specifically, as shown in FIG. 36, the controller 1040 determines whether or not five symbols of "7" appear, and sets the bonus flag B1 at "1" (Step S1042) in the case where the five symbols of "7" appear (YES in Step S1041). Thereafter, the controller 1040 ends this processing.

Meanwhile, in the case where the bonus trigger is not established, that is, in the case where the five symbols of "7" do not appear (NO in Step S1041), the controller 1040 determines whether or not a winning is established by the stopped 15 symbols. Specifically, the controller 1040 determines whether or not any of the winnings shown in the provision table of FIG. 36 is established (Step S1043). Then, in the case where the winning is established (YES in Step S1043), the controller 1040 performs the provision processing (Step S1044). Specifically, the controller 1040 provides the medals of which number is based on the provision table. Meanwhile, in the case where the winning is not established (NO in Step S1043), the controller 1040 ends this processing without performing the provision processing.

As described above, when the slot game is executed, a part (for example, 2%) of the bets is accumulated as the count value of the progressive bonus in the progressive bonus counter 1077 provided in the center controller 1005. In the case where the accumulated count value N has reached the predetermined value Nmax, the event game is started. Moreover, in the case where the bonus flag B1 has become "1", the bonus game is executed.

Next, a description will be made of the event game start processing shown in Step S1045 of FIG. 37 with reference to a flowchart shown in FIG. 38.

When the accumulated count value N of the progressive bonus counter 1077 has reached the predetermined value Nmax, the controller 1040 monitors behaviors of the other slot machines 1010*b* to 1010*e* in order to determine whether or not the slot games are executed therein (Step S1050). For example, the controller 1040 monitors whether or not it is a point of time within a predetermined time after the START switch 1027 was pressed. Besides this, for each of the other slot machines 1010*b* to 1010*e*, the controller 1040 monitors behaviors such as to whether or not a predetermined value (for example, equivalent to 20 medals) or more is credited, whether or not a medal insertion operation is performed, whether or not the player is present, and the like. The behavior as to whether or not the player is present is monitored by using a sensor and the like.

Subsequently, the controller 1040 determines whether or not the slot game is being executed in any of the other slot machines 1010*b* to 1010*e* (Step S1051). In this processing, based on the above-described behaviors, the controller 1040 determines that the player participates in the slot game by the other slot machine concerned, for example, in the case where it is the point of time within the predetermined time after the START switch 1027 was pressed. In the case where the predetermined time or more has elapsed after the START switch 1027 was pressed, the controller 1040 determines that the player does not participate in the slot game by the other slot machine concerned.

Figure 41:
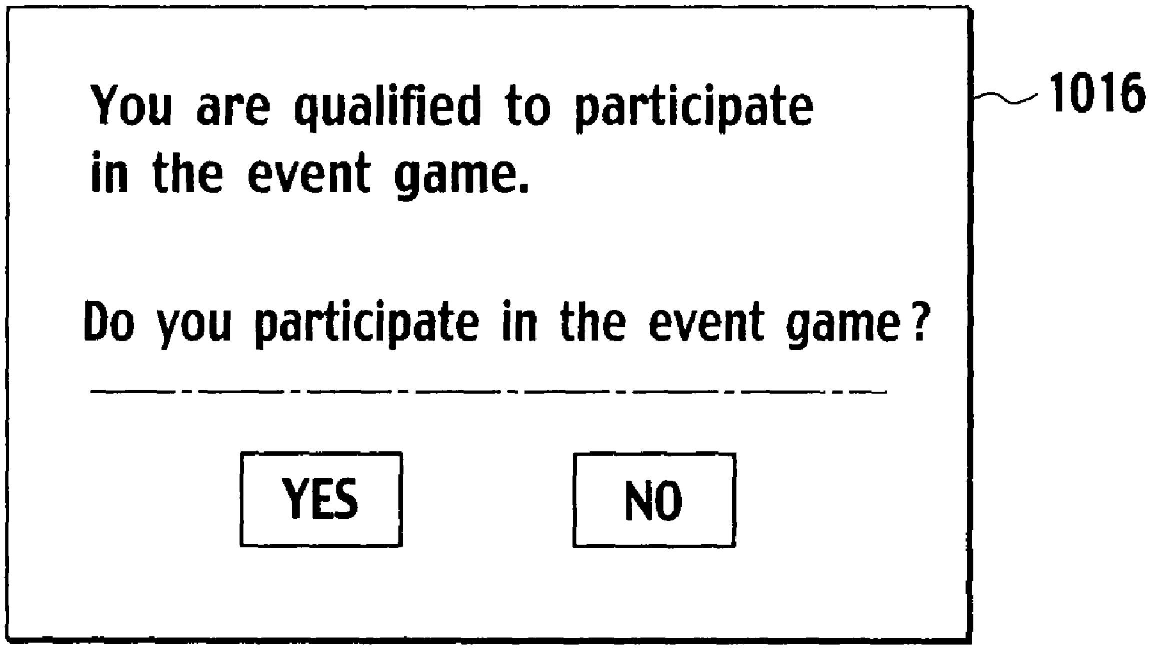
FIG. 41 is an explanatory view showing a display example of a display according to the fourth embodiment.

Then, in the case where the slot game is being executed in any of the other slot machines 1010*b* to 1010*e* (YES in Step S1051), the controller 1040 receives a selection input as to whether or not the player is to participate in the event game. For example, as shown in FIG. 41, the controller 1040 displays sentences saying "You are qualified to participate in the event game. Do you participate in the event game?", displays images of "YES" and "NO", and receives an input operation made by means of the touch panel sensor 1020 (Step S1052).

Figure 37:
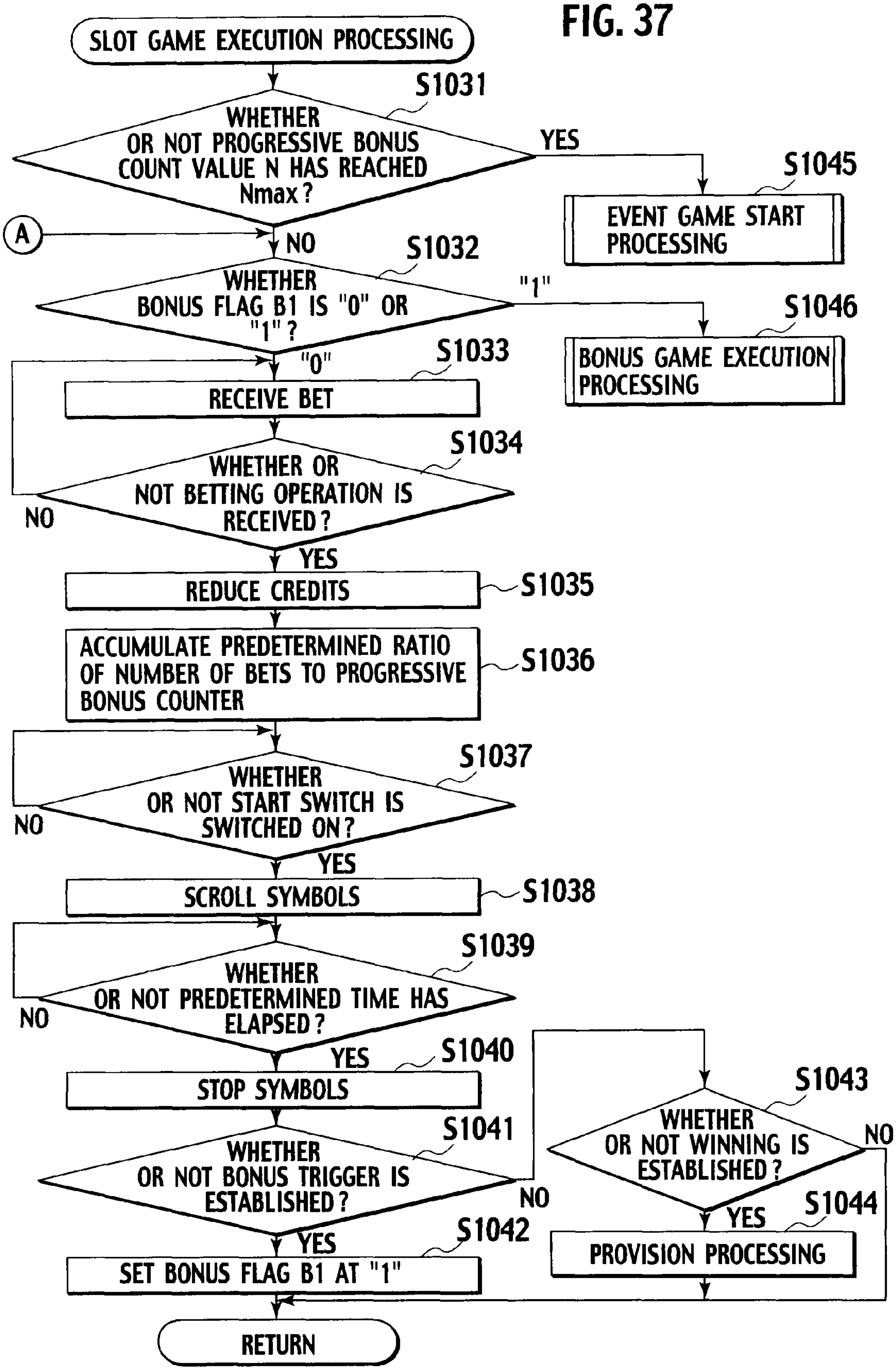
FIG. 37 is a flowchart showing slot game execution processing according to a fourth embodiment.
Figure 38:
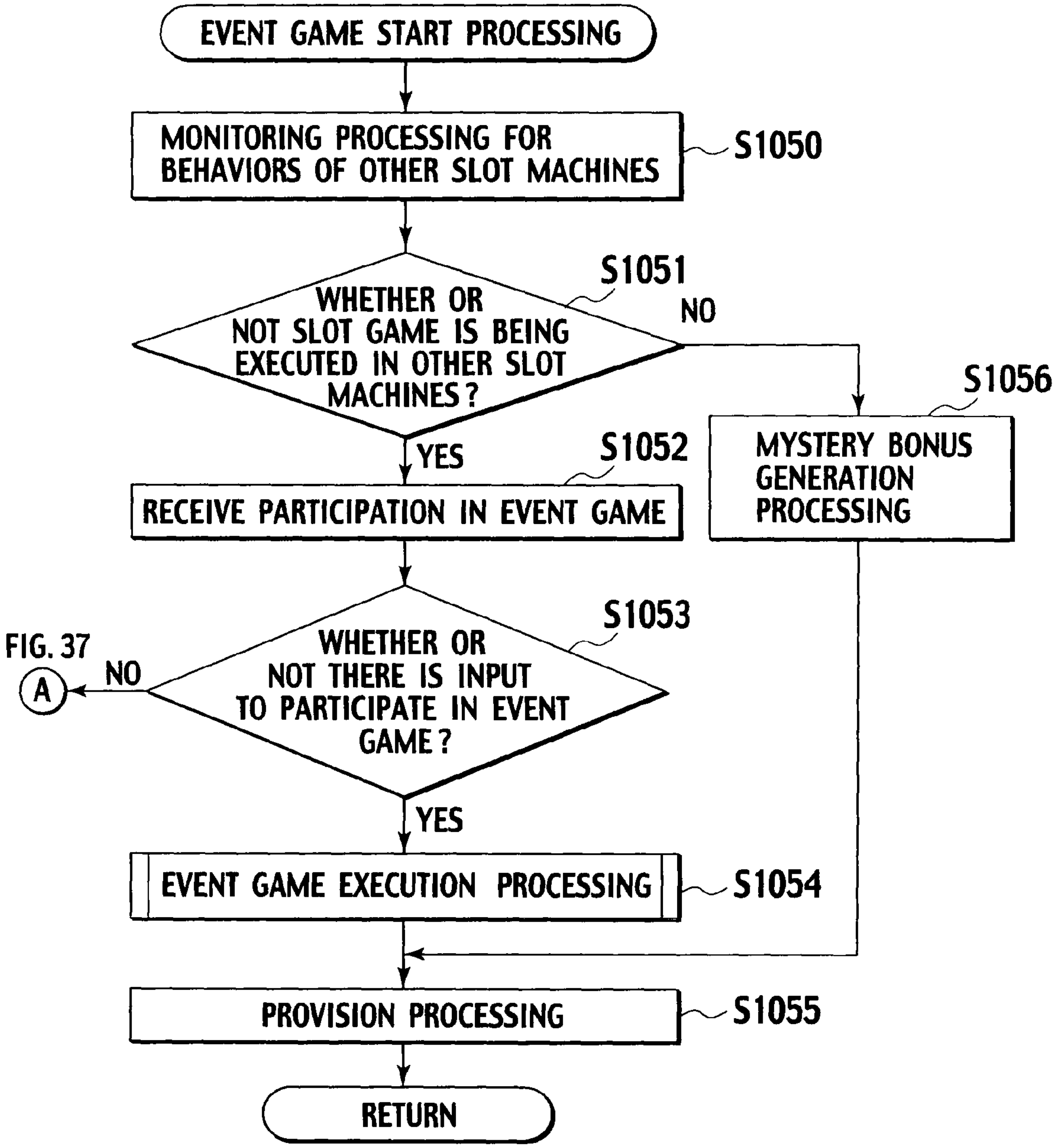
FIG. 38 is a flowchart showing event game start processing according to the fourth embodiment.

Then, in the case where "NO" is selected (NO in Step S1053), the controller 1040 shifts to the processing of Step S1032 of FIG. 37, and performs the slot game execution processing.

Meanwhile, in the case where "YES" is selected (YES in Step S1053), the controller 1040 performs event game execution processing (Step S1054). Details of the event game execution processing will be described later.

Moreover, in the case where the slot game is not executed in any of the other slot machines 1010*b* to 101*e*, that is, in the case where the accumulated count value N of the progressive bonus counter 1077 has reached the predetermined value Nmax when the slot game is being executed only in the slot machine 101010*a* (NO in Step S1051), mystery bonus generation processing is executed (Step S1056). In a mystery bonus, when the slot game is being executed in the slot machine 101010*a*, the winning is established regardless of the combination of the stopped symbols, and the award corresponding to a part or entirety of the accumulated count value N of the progressive bonus counter 1077 is generated.

Thereafter, the provision processing for providing the award generated by executing the event game and the award generated by the mystery bonus is executed (Step S1055).

Next, a description will be made of the event game execution processing shown in Step S1054 of FIG. 38 with reference to FIG. 39.

First, the center controller controlling CPU 1071 (refer to FIG. 34) decides the slot machines 1010 (some of 1010*a* to 1010*e*) which will participate in the event game (Step S1071). As described above, the slot machines, in each of which the slot game is being executed when the accumulated count value N of the progressive bonus counter 1077 has reached the predetermined value Nmax, and the input operation for participating in the event game is performed, are decided as the slot machines 1010 which will participate in the event game.

Subsequently, the center controller controlling CPU 1071 sets the number of continuation times of the event game (Step S1072). The number of continuation times of the event game is randomly selected from a plurality of the numbers (for example, 30 times, 60 times, 80 times and 100 times). Moreover, the number of continuation times of the event game may be always set at the same number (for example, 60 times). The center controller controlling CPU 1071 transmits information on the set number of continuation times of the event game to the slot machines 1010 (101*a* to 1010*e*) which participate in the event game. Each of the controllers 1040 decides the number of continuation times of the event game based on the information on the set number of continuation times of the event game. With regard to processing for randomly selecting the number of continuation times of the event game from the above-described plural numbers (for example, 30 times, 60 times, 80 times and 100 times), the number of continuation times of the event game is set by storing the inputted number of times in the memory of the center controller. Here, the inputted number of times is the number inputted by the administrator such as a clerk on the casino side by means of the keyboard 1075 or an input interface that receives the number from the outside. In comparison with the case where the value of the number of continuation times of the event game is set in an unchangeable state in such a manner that the number of continuation times is written into the mask ROM in the production line, the number of continuation times in this embodiment has a merit that a character of each of the casinos can be exhibited in such a manner as described above that the number of continuation times is made changeable by a person (administrator) on the casino side while being selected from plural values of the numbers. In addition, in this embodiment, in order to restrict the person capable of changing the number of continuation times only to the casino side, that is, to the administrator side, the number of times is allowed to be changeable after a security operation is performed. With regard to the security operation, it is assumed to execute, upon receiving a password, authentication processing based on an authentication program which the center controller controlling CPU 1071 stores in the memory, and to then execute processing for permitting the change of the number of times, which is attempted to be made by the outside, only after the case where it is determined that a real password has been entered. In addition, it is assumed to require such an operation that a physical key is inserted from a keyhole, is then turned, and thereby allows the keyhole to become a state that is capable of setting the number of continuation times of the event game.

The center controller controlling CPU 1071 sets a defined number of points Pmax for the event game (Step S1073). The defined number of points Pmax is the number of points, which is necessary to win the event game.

Moreover, the center controller controlling CPU 1071 resets a total number of points P0, which is set for each of the slot machines 1010 which will participate in the event game (Step S1074). The total number of points P0 is a total value of points generated by executing the event game, and details thereof will be described later.

Subsequently, when the START switch 1027 is pressed by the player, the controller 1040 of each of the slot machines 1010 scrolls the symbols on the display 1016 (Step S1075), and stops the symbols (Step S1077) after a predetermined time elapsed (YES in Step S1076). Specifically, in the event game, the medals or the credits are not lost since it is not necessary to bet the medals or the credits.

Figure 42:
FIG. 42 is a diagram showing relationships between symbols and acquired points in an event game according to the embodiment.
Figure 42:
Figure 42:
Figure 42:
Figure 42:

In the event game, the symbols which appear therein differ from those in the usual slot game, and five sorts of symbols, which are "BLUE 7", "RED 7", "3 BAR", "2 BAR" and "1 BAR", will appear as shown in FIG. 42. Then, the points to be generated are decided by the symbols stopped on a centerline L1 (refer to FIG. 43). Specifically, as shown in FIG. 42, the points become 300 points when the "BLUE 7" is stopped on the centerline L1, become 150 points when the "RED 7" is stopped thereon, become 30 points when the "3 BAR" is stopped thereon, become 20 points when the "2 BAR" is stopped thereon, become 10 points when the "1 BAR" is stopped thereon, and become 0 point when any of the symbols is not stopped thereon.

Figure 43A:
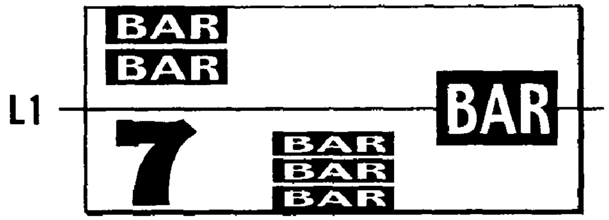
FIGS. 43A, 43B and 43C are display examples of the event game according to the embodiment.
Figure 43B:
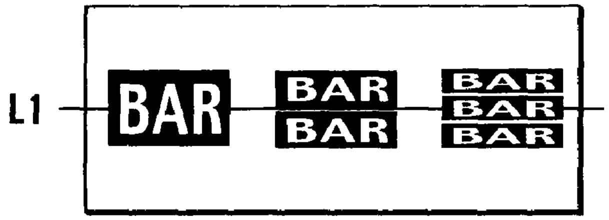
Figure 43C:
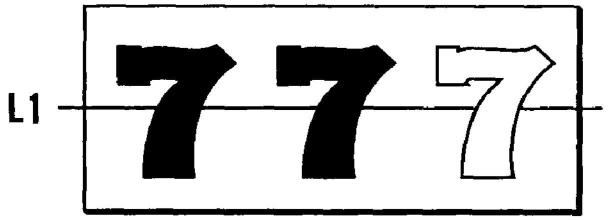

The controller 1040 recognizes points P1 from the stopped symbols (Step S1078). For example, as shown in FIG. 43A, when the symbols are stopped in a pattern of "None, None, 1 BAR", the points P1 become 10 points. As shown in FIG. 43B, when the symbols are stopped in a pattern of "1 BAR-2 BAR-3 BAR", the points P1 become 60 points. As shown in FIG. 43C, when the symbols are stopped in a pattern of "RED 7-RED 7-BLUE 7", the points P1 become 600 points.

Figure 44:
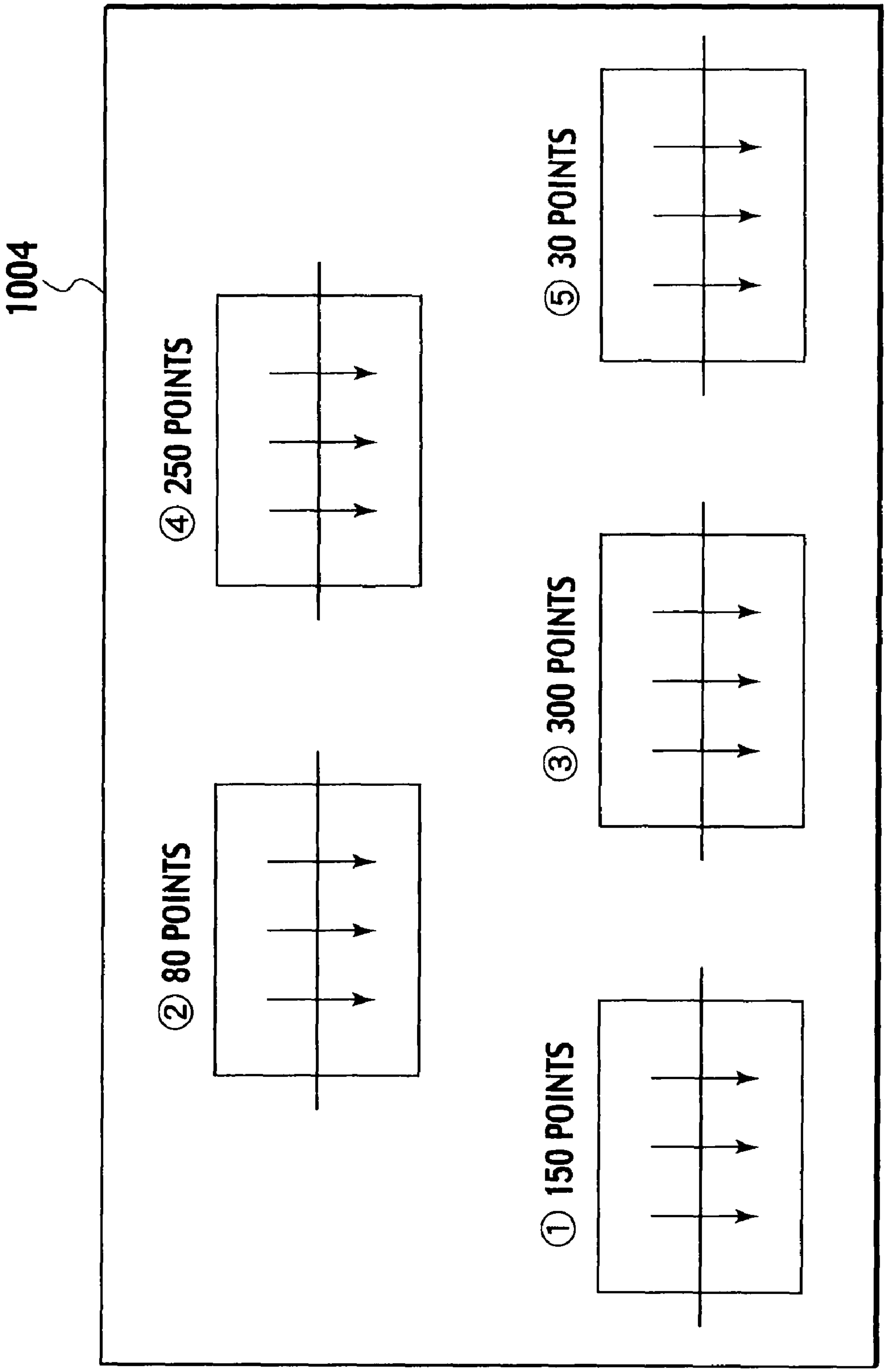
FIG. 44 is a display example of a common display according to the fourth embodiment.

The controller 1040 adds the recognized points P1 to the total number of points P0 (Step S1079). In this case, the center controller controlling CPU 1071 of the center controller 1005 displays, on the common display 1004, the symbols and total points of the respective slot machines 1010 which are participating in the event game, and notifies the respective players of the symbols and the total points. For example, as shown in FIG. 44, images of "No. 1, 150 points", "No. 2, 80 points", "No. 3, 300 points", "No. 4, 250 points" and "No. 5, 30 points" are displayed on the common display 1004. Note that Nos. 1 to correspond to the slot machines 1010*a* to 1010*e*. Hence, the players of the respective slot machines 1010 can recognize their current ranks by seeing the number of points, which is displayed on the common display 1004.

Thereafter, the controller 1040 of each of the slot machines 1010 determines whether or not the total number of points P0 has reached the defined number of points Pmax (for example, "8000 points") set by the processing of Step S1073 (Step S1080). Then, in the case where the total number of points P0 has not reached the defined number of points Pmax (NO in Step S1080), the controller 1040 determines whether or not the number of continuation times of the event game has been ended (Step S1083), and returns to the processing of Step S1075 in the case where the number of continuation times of the event game has not been ended (NO in Step S1083).

Meanwhile, in the case where the number of continuation times of the event game has been ended (YES in Step S1083), the controller 1040 ends the event game execution processing.

Moreover, in the case where the total number of points P0 has reached the defined number of points Pmax in the processing of Step S1080 (YES in Step S1080), the center controller controlling CPU 1071 determines whether or not the slot machine 1010 (101*a*) concerned therewith has won the first position among the respective slot machines 1010 which are participating in the event game (Step S1081).

Then, in the case where it is determined that the slot machine 1010*a* has won the first position, that is, in the case where the total number of points P0 of the slot machine 1010*a* has reached the defined number of points Pmax earliest among the slot machines 1010 which are participating in the event game (YES in Step S1081), the controller 1040 generates the progressive bonus for the slot machine 101010*a* (Step S1082). In the case where the progressive bonus is generated, the credits or the medals, which correspond to a part or entirety of the accumulated count value N accumulated in the progressive bonus counter 1077, are provided. For example, in the case where the accumulated count value N is $100, the credits or the medals, which are equivalent to $100, are provided.

Figure 45:
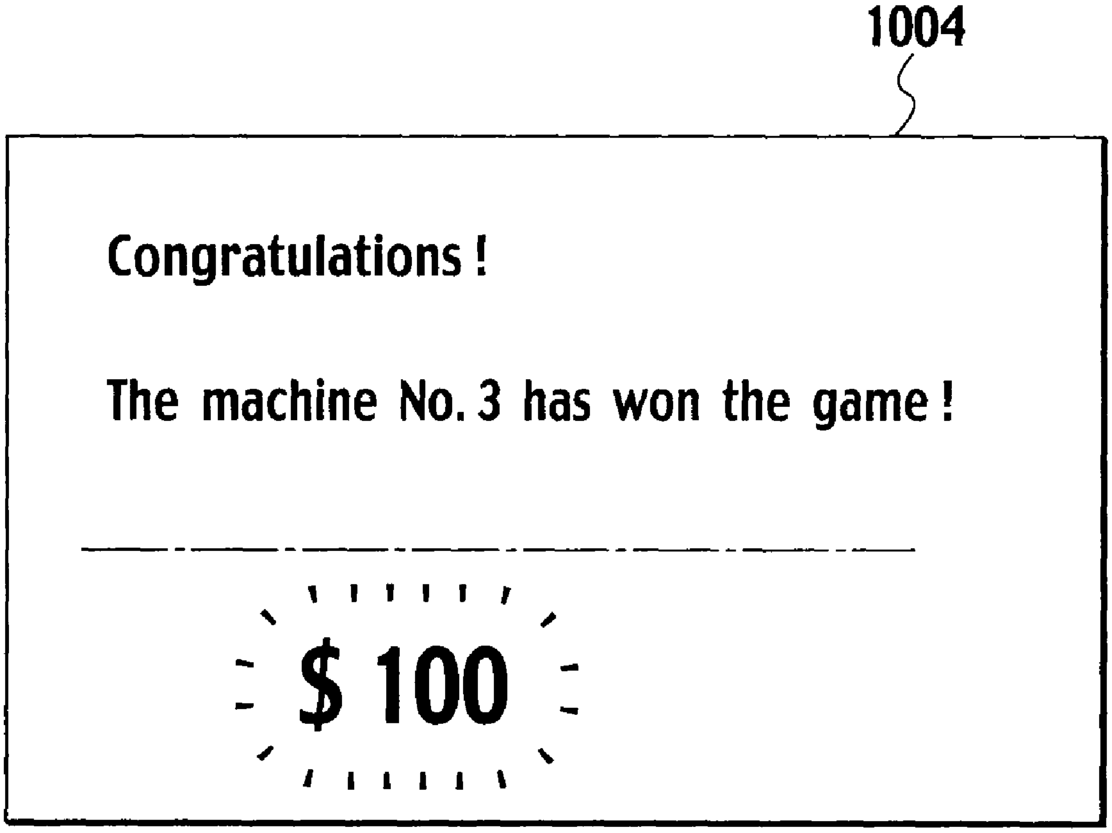
FIG. 45 is a display example of the common display according to the fourth embodiment.

As a result, for example, in the case where the player of "No. 3" has won the game, as shown in FIG. 45, sentences saying "Congratulations! The machine No. 3 has won the game!" and letters of "$100" as an amount to be provided are displayed on the common display 1004.

Figure 39:
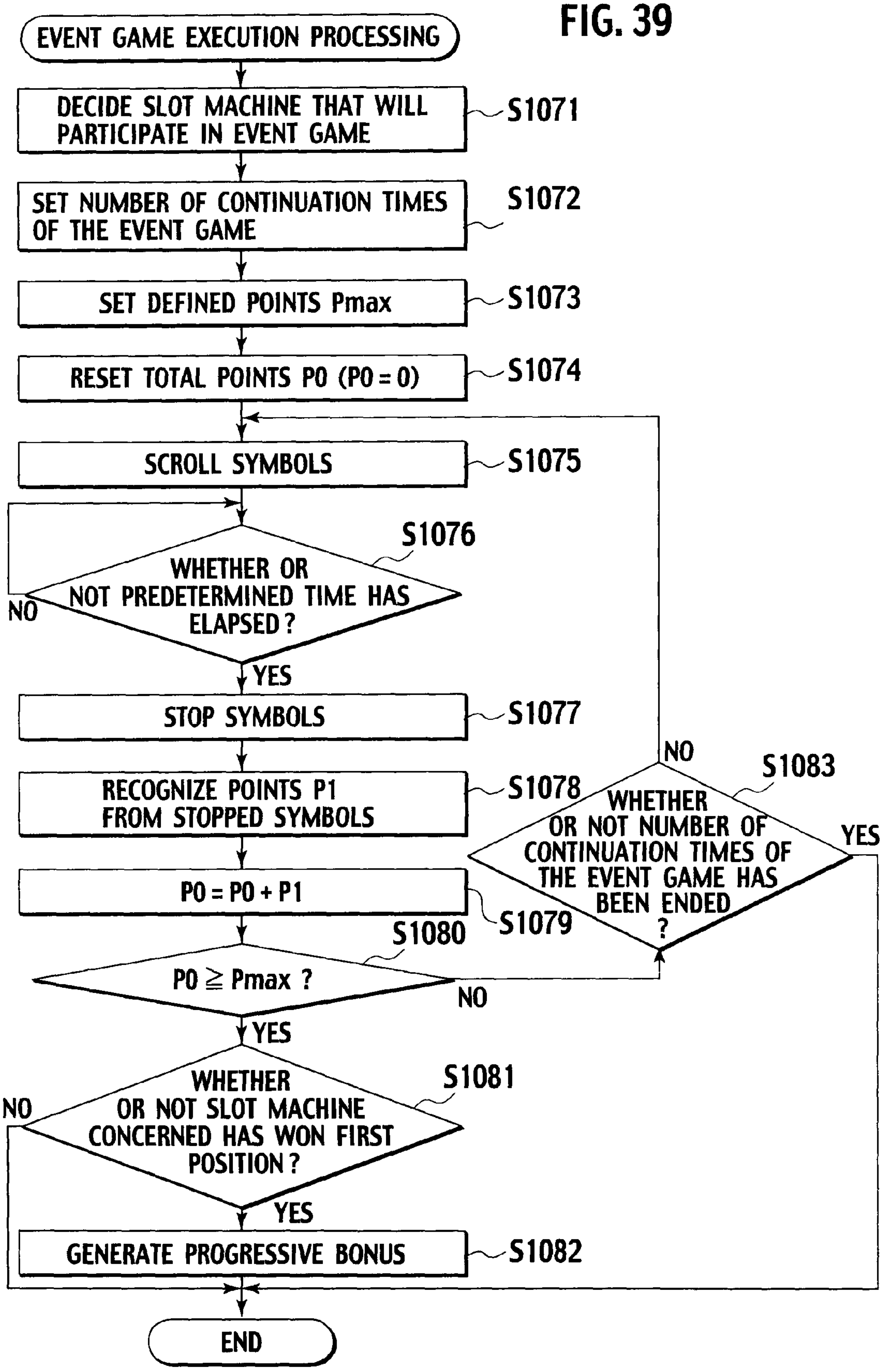
FIG. 39 is a flowchart showing event game execution processing according to the fourth embodiment.

Incidentally, in the case where the total number of points P0 of any of the slot machines 1010 which participate in the event game has reached the defined number of points Pmax in the processing of Step S1080 of FIG. 39 (YES in Step S1080), the center controller controlling CPU 1071 can also determine the current ranks of the total number of points P0 in the respective slot machines 1010 which participate in the event game, and the controllers 1040 of the respective slot machines 1010 selected at the first, second and third ranks can also generate progressive bonuses corresponding to the respective ranks.

Moreover, in the case where the number of continuation times of the event game is ended in the processing of Step S1083 of FIG. 39 (YES in Step S1083), the center controller controlling CPU 1071 can also determine the current ranks of the total number of points P0 in the respective slot machines 1010 which participate in the event game, and the controllers 1040 of the respective slot machines 1010 selected at the first, second and third ranks can also generate the progressive bonuses corresponding to the respective ranks.

In such a way, the event game is executed. Moreover, in the event game, the progressive bonus is provided only to the slot machine 1010 in which the total number of points P0 has reached the defined number of points Pmax earliest among the plurality of slot machines 1010, and accordingly, the player can be allowed to be interested in the matter that the event game takes place.

Moreover, in the case where the slot machine 1010 that is participating in the event game is only one, the mystery bonus is generated in the case where the accumulated count value N of the progressive bonus counter 1077 has reached the predetermined value Nmax, and accordingly, a profit made in such a manner that the accumulated count value N is accumulated can be returned to the player.

Figure 40:
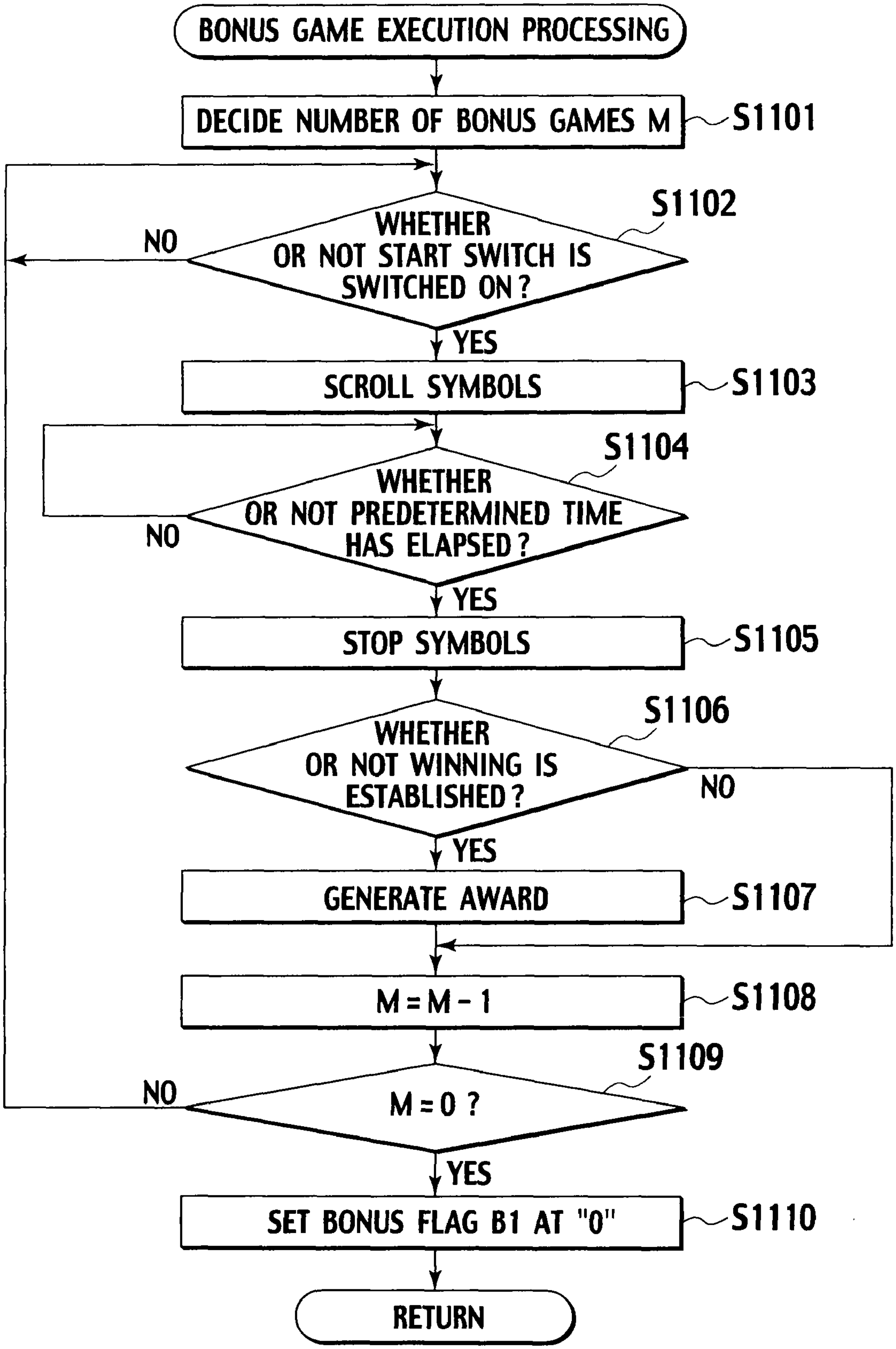
FIG. 40 is a flowchart showing bonus game execution processing according to the fourth embodiment.

Next, a description will be made of the bonus game execution processing shown in Step S1046 of FIG. 37 with reference to FIG. 40.

First, the controller 1040 decides the number of bonus games M (Step S1101). The number of bonus games M is randomly set, for example, from among 10 games, 20 games, 30 games and 50 games. Moreover, the number of bonus games M may be always set at the same number (for example, 30 games).

The controller 1040 determines whether or not the START switch 1027 is pressed (Step S1102). Then, in the case where the START switch 1027 is pressed (YES in Step S1102), the controller 1040 starts to scroll the symbols on the display 1016 (Step S1103).

Thereafter, the controller 1040 determines whether or not a predetermined time has elapsed (Step S1104), and stops the symbols (Step S1105) in the case where the predetermined time has elapsed (YES in Step S1104). As a result, for example as shown in FIG. 35, the variety of symbols are stopped on the respective 15 display areas.

The controller 1040 determines whether or not the winning is established based on the symbols stopped on the respective display areas (Step S1106). Then, in the case where the winning is established, that is, in the case where the symbols defined in the provision table of FIG. 36 have appeared (YES in Step S1106), the controller 1040 generates the award (Step S1107).

Thereafter, the controller 1040 reduces the number of bonus games M. Specifically, the controller 1040 makes such a reduction as: M=M−1 (Step S1108).

The controller 1040 determines whether or not the number of bonus games M is equal to 0 (Step S1109). In the case where M is not equal to 0, that is, in the case where all of the bonus games of which number of times is set at M are not ended (NO in Step S1109), the controller 1040 returns to the processing of Step S1102. Meanwhile, in the case where M is equal to 0 (YES in Step S1109), the controller 1040 sets the bonus flag B1 at "0", and ends the bonus game execution processing.

In such a way, the bonus games of which number of times is M are executed in the case where the bonus trigger is established in the usual game. In this bonus game, the betting is unnecessary, and accordingly, the medals or the credits are not lost, and it can be expected that a large amount of provision will be obtained.

As described above, in the gaming system 1001 according to the fourth embodiment, a part of the bets is accumulated as the count value of the progressive bonus at the time when the usual game is being executed. In the case where the accumulated count value N has reached the predetermined value Nmax, the event game in which the plurality of slot machines 1010 participate is executed. Then, the progressive bonus is provided to the slot machine 1010 that has won the event game. Hence, the player can be allowed to be interested in the matter that the event game will be started.

Figure 46:
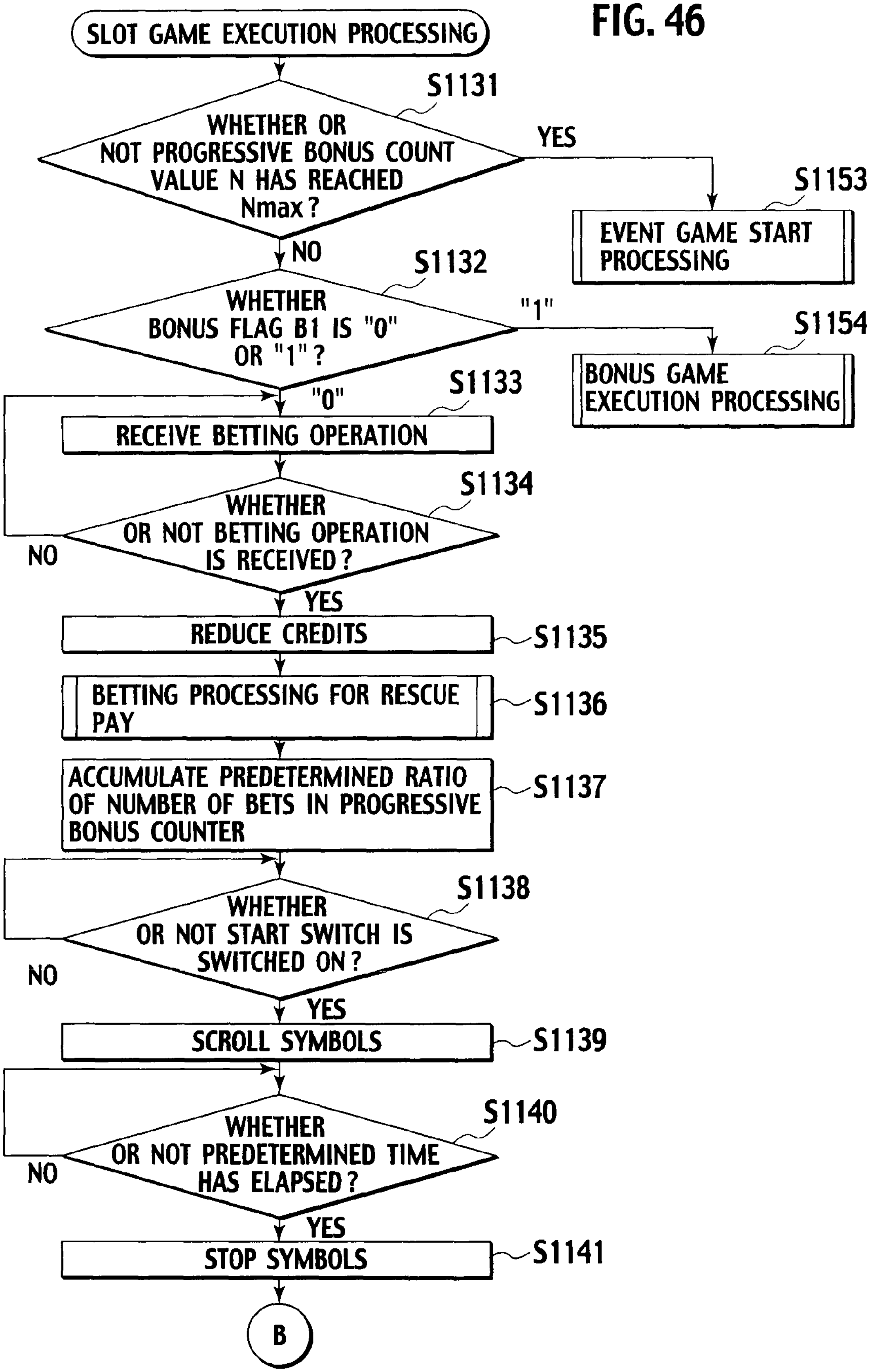
FIG. 46 is a flowchart showing slot game execution processing according to a fifth embodiment.
Figure 47:
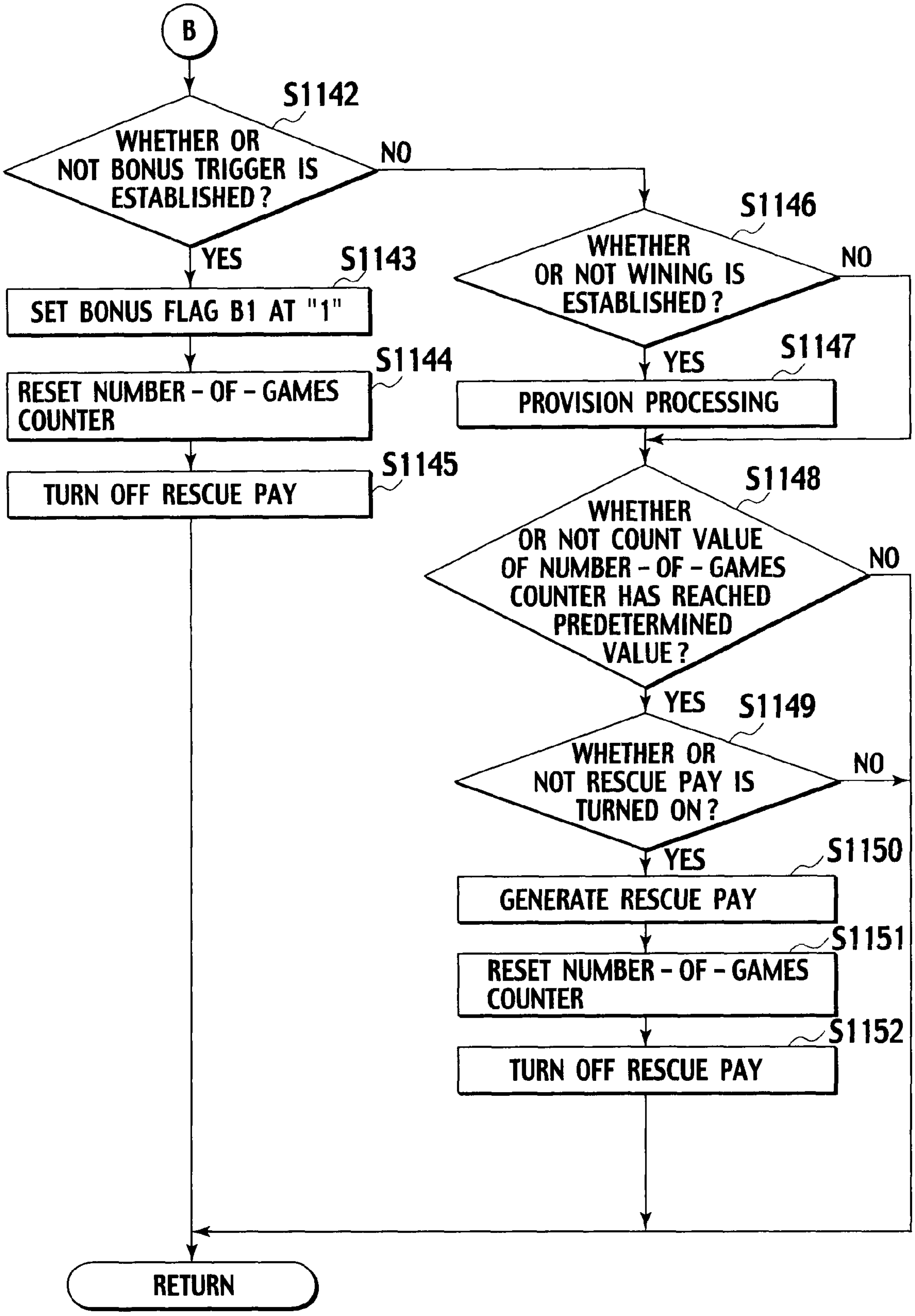
FIG. 47 is a flowchart showing the slot game execution processing according to the fifth embodiment.

Next, a description will be made of a fifth embodiment of the gaming system 1001. FIG. 46 and FIG. 47 are flowcharts showing slot game execution processing according to the fifth embodiment. In comparison with the processing of FIG. 37, which is described in the above-mentioned fourth embodiment, in the fifth embodiment, there is a difference in that a function of the rescue pay (insurance pay) is added thereto. Details will be described below.

First, the controller 1040 shown in FIG. 33 determines whether or not the accumulated count value N of the progressive bonus counter 1077 has reached the predetermined value Nmax (Step S1131). Then, in the case where the accumulated count value N has reached the predetermined value Nmax (YES in Step S1131), the controller 1040 shifts the processing to event game start processing (Step S1153). Details of the event game start processing are similar to those of the processing mentioned above with reference to FIG. 38, and accordingly, a description thereof will be omitted.

Meanwhile, in the case where the accumulated count value N has not reached the predetermined value Nmax, the controller 1040 determines whether the bonus flag B1 set in the RAM 1110 is "0" or "1" (Step S1132). In the case where the bonus flag B1 is "1", the controller 1040 shifts the processing to bonus game execution processing (Step S1154). Details of the bonus game execution processing are similar to those of the processing mentioned above with reference to FIG. 40, and accordingly, a description thereof will be omitted.

In the case where the bonus flag B1 is "0", the controller 1040 receives a betting operation performed by the player (Step S1133). Specifically, the controller 1040 receives the betting operation performed in such a manner that the medals are inserted from the medal insertion slot 1021, or that any of the MAX BET switch 1024, the BET switch 1025 and the SPIN/REPEAT BET switch 1026 is pressed.

Then, in the case where the betting operation is received (YES in Step S1134), the controller 1040 performs subtraction processing for the credits. Specifically, the controller 1040 performs processing for subtracting the number of bet credits from the number of current credits (Step S1135).

Subsequently, the controller 1040 executes betting processing for the rescue pay (Step S1136). The rescue pay is a function to receive a side bet different from the usual bet at the time when the slot game is being executed, and to generate a fixed amount of provision in order to compensate for the losses of the player in the case where the side bet is made and in the case where the bonus trigger is not won continuously for a predetermined number of games. Moreover, according to a preference of the player, it can be appropriately selected whether the rescue pay is to be turned on or off.

Figure 48:
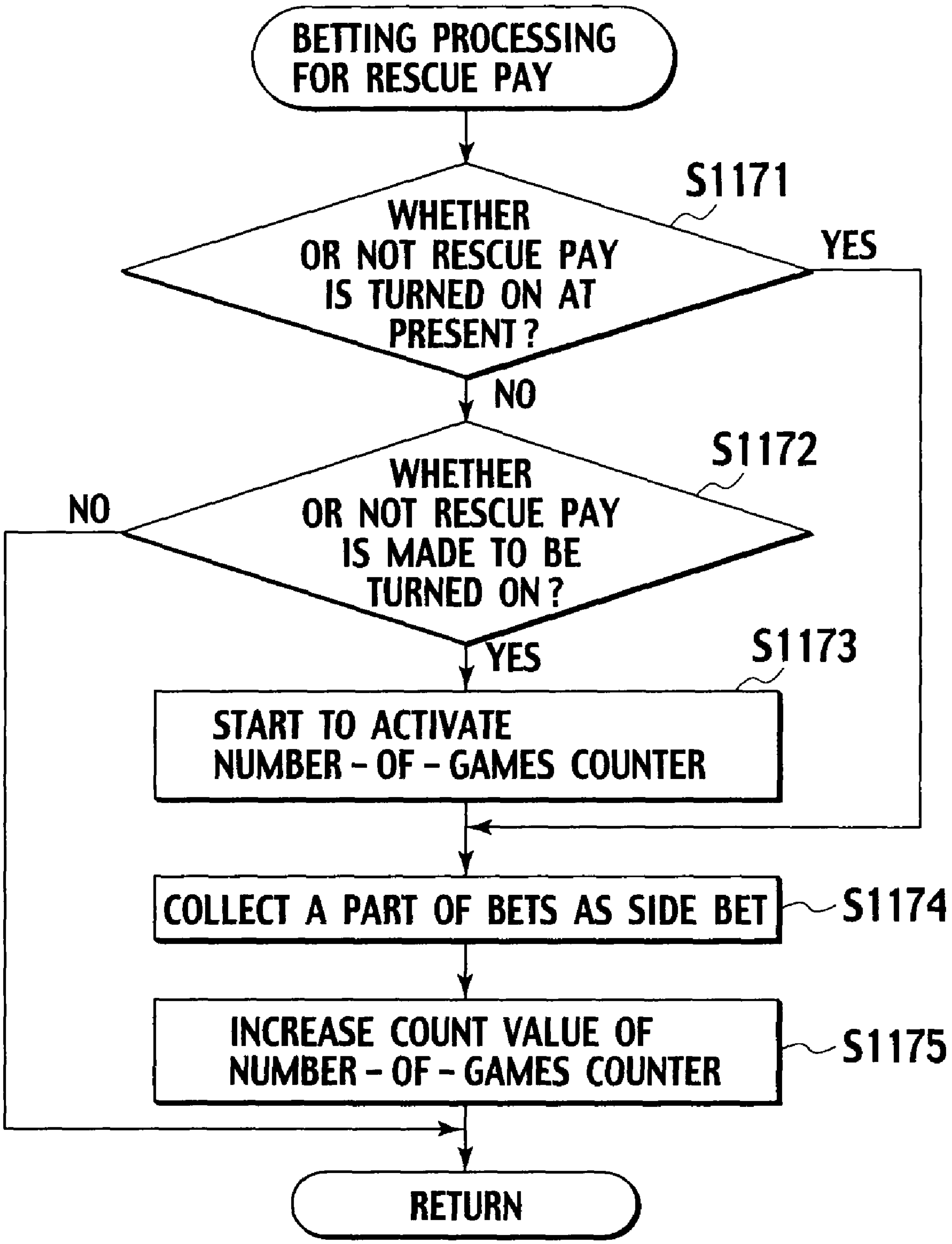
FIG. 48 is a flowchart showing bet processing for rescue pay according to the fifth embodiment.

Here, a description will be made of details of the betting processing for the rescue pay with reference to FIG. 48. The controller 1040 determines whether or not the rescue pay is turned on at present (Step S1171). In the case where the rescue pay is turned on (YES in Step S1171), the controller 1040 shifts the processing to Step S1174.

Figure 54:
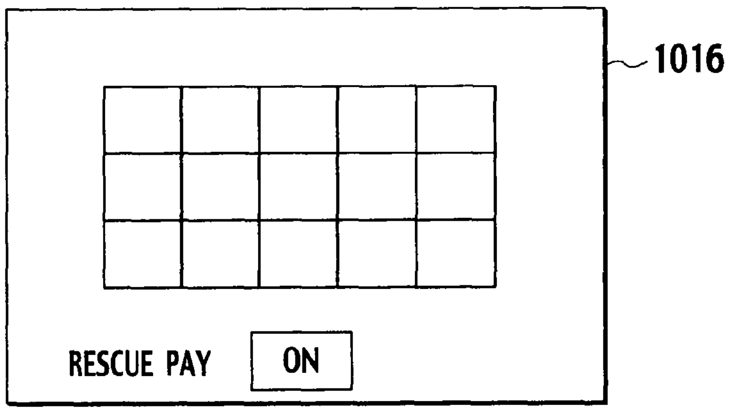
FIG. 54 is a display example of a display according to the sixth embodiment.

Moreover, in the case where the rescue pay is not turned on (NO in Step S1171), the controller 1040 determines whether or not the rescue pay is made to be turned on (Step S1172). As shown in FIG. 54, an image showing "ON" of the rescue pay is displayed on a lower portion of the display 1016. The player touches the image of "ON", and such a touching operation is detected by the touch panel sensor 1020, thus making it possible to turn on the rescue pay.

In the case where the rescue pay is not made to be turned on (NO in Step S1172), the controller 1040 maintains such a state where the rescue pay is off, and ends this processing.

Moreover, in the case where the rescue pay is made to be turned on (YES in Step S1172), the controller 1040 activates the number-of-games counter 1128 shown in FIG. 33 (Step S1173). Specifically, every time when one slot game is executed, the controller 1040 executes processing for increasing the count value of the number-of-games counter 1128 by one.

The controller 1040 collects, as the side bet, a part of the bets made in the event of executing the game (Step S1174). For example, in the case where 10 medals are bet, the controller 1040 collects, as the side bet, one of the medals thus bet. In this case, the betting made on the slot game becomes equivalent to 9 medals.

Thereafter, the controller 1040 increases the count value of the number-of-games counter 1128 by one (Step S1175), and ends this processing.

Returning to FIG. 46, the controller 1040 transmits a predetermined ratio (for example, 2%) of the number of bets as the count value of the progressive bonus to the center controller 1005. The center controller 1005 accumulates the transmitted count value of the progressive bonus in the progressive bonus counter 1077 (Step S1137).

The controller 1040 determines whether or not the START switch 1027 is switched on (Step S1138). Then, in the case where the START switch 1027 is switched on (YES in Step S1138), the controller 1040 scrolls the 15 symbols displayed on the display 1016 (Step S1139).

The controller 1040 determines whether or not a predetermined time (for example, five seconds) has elapsed since the scroll of the symbols was started (Step S1140), and stops the symbols (Step S1141) when the predetermined time has elapsed (YES in Step S1140).

Based on the stopped 15 symbols, the controller 1040 determines whether or not the bonus trigger is established (Step S1142 of FIG. 47). Specifically, as shown in FIG. 36, the controller 1040 determines whether or not five symbols of "7" appear, and sets the bonus flag B1 at "1" (Step S1143) in the case where the five symbols of "7" appear (YES in Step S1142).

Subsequently, the controller 1040 resets the number-of-games counter 1128 (Step S1144). Moreover, the controller 1040 turns off the rescue pay (Step S1145). Specifically, in the case where the bonus trigger is established when the rescue pay is turned on and the number-of-games counter 1128 counts the number of execution times of the slot games, the controller 1040 resets the number-of-games counter 1128, and turns off the rescue pay. Thereafter, the controller 1040 ends this processing.

Meanwhile, in the case where the bonus trigger is not established, that is, in the case where the five symbols of "7" do not appear (NO in Step S1142), the controller 1040 determines whether or not a winning is established by the stopped 15 symbols. Specifically, the controller 1040 determines whether or not any of the winnings shown in the provision table of FIG. 36 is established (Step S1146). Then, in the case where the winning is established (YES in Step S1146), the controller 1040 performs the provision processing (Step S1147). Specifically, the controller 1040 provides the medals of which number is based on the provision table.

Meanwhile, in the case where the winning is not established (NO in Step S1147), and in the case where the provision processing is ended, the controller 1040 determines whether or not the count value of the number-of-games counter 1128 has reached the predetermined value (for example, "1000") (Step S1148). In the case where the count value has reached the predetermined value (YES in Step S1148), the controller 1040 determines whether on not the rescue pay is turned on at present (Step S1149), and in the case where the rescue pay is turned on (YES in Step S1149), the controller 1040 generates the rescue pay (Step S1150). Specifically, the controller 1040 generates the rescue pay for the player who is turning on the rescue pay and has not won the bonus trigger for a long period, thereby compensating for some losses thereto.

Thereafter, the controller 1040 resets the number-of-games counter 1128 (Step S1151), and further, turns off the rescue pay (Step S1152). Thereafter, the controller 1040 ends this processing.

As described above, in the gaming system 1001 according to the fifth embodiment, similar effects to those of the above-mentioned fourth embodiment can be achieved. Moreover, in the case where the rescue pay is turned on, the predetermined amount of the bets is collected as the side bet, and instead of this, the fixed number of medals are provided in the case where the bonus trigger is not established continuously for the predetermined number of times (for example, 1000 times). Hence, the losses of the player can be reduced.

Figure 49:
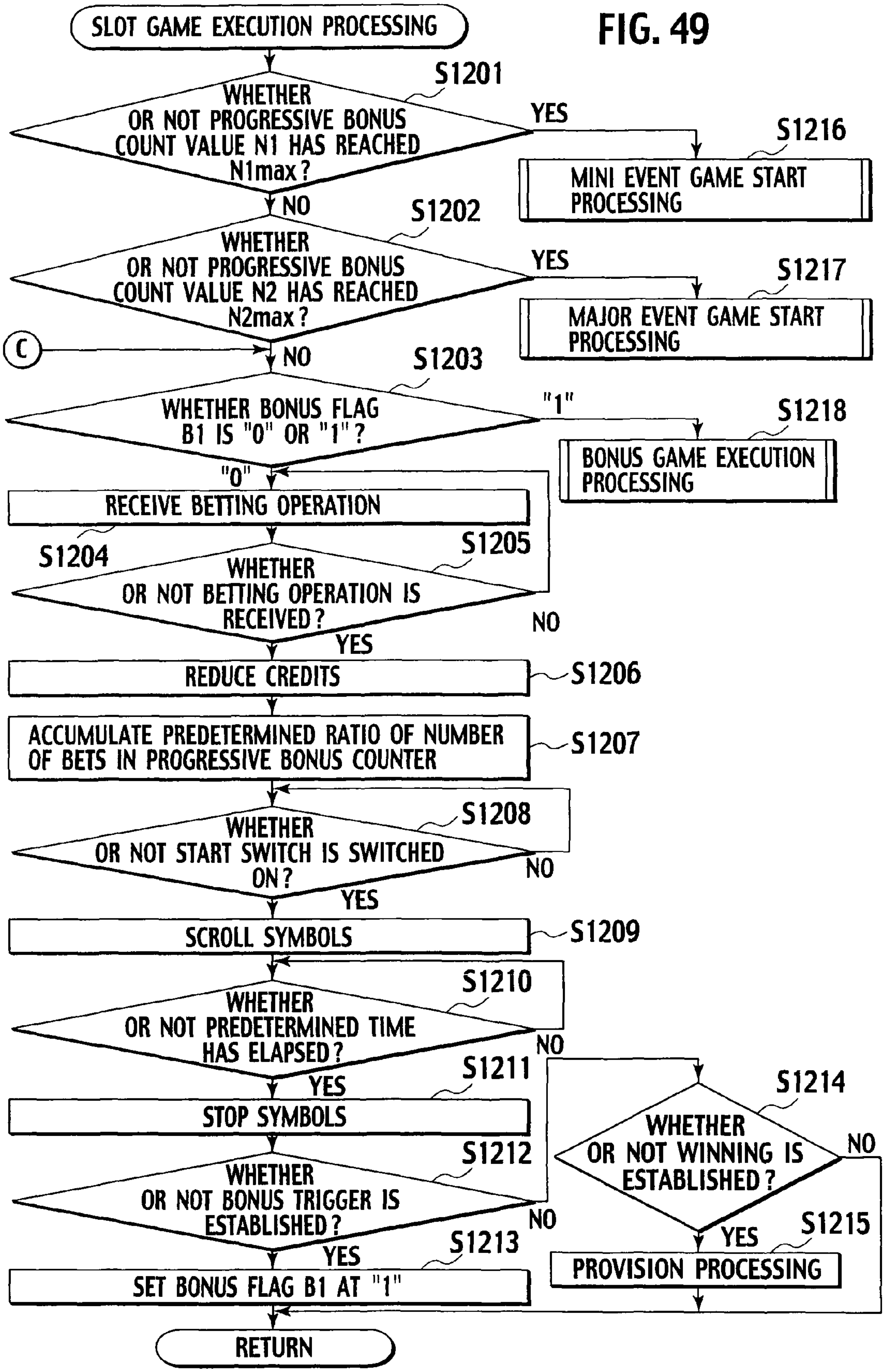
FIG. 49 is a flowchart showing slot game execution processing according to a sixth embodiment.

Next, a description will be made of a sixth embodiment of the gaming system 1001 with reference to FIG. 49. FIG. 49 is a flowchart showing slot game execution processing according to the sixth embodiment. In the sixth embodiment, the progressive bonus counter 1077 counts both of a first count value and a second count value, which are different from each other. Then, in the case where a first accumulated count value N1 as an accumulated value of the first count value has reached a predetermined value N1max, a mini event game is executed, and in the case where a second accumulated count value N2 as an accumulated value of the second count value has reached a predetermined value N2max (where N2max>N1max), a major event game is executed. Specifically, the sixth embodiment is different from the above-mentioned fourth embodiment in that two event games exist. Details will be described below.

The controller 1040 shown in FIG. 33 determines whether or not the first accumulated count value N1 of the progressive bonus counter 1077 has reached the predetermined value N1max (Step S1201). Then, in the case where the first accumulated count value N1 has reached the predetermined value N1max (YES in Step S1201), the controller 1040 shifts the processing to mini event game start processing (Step S1216). Details of the mini event game start processing will be described later.

Meanwhile, in the case where the first accumulated count value N1 has not reached the predetermined value N1max (NO in Step S1201), the controller 1040 determines whether or not the second accumulated count value N2 of the progressive bonus counter 1077 has reached the predetermined value N2max (where N2max>N1max) (Step S1202). Then, in the case where the second accumulated count value N2 has reached the predetermined value N2max (YES in Step S1202), the controller 1040 shifts the processing to major event game start processing (Step S1217). Details of the major event game start processing will be described later.

In the case where the second accumulated count value N2 has not reached the predetermined value N2max (NO in Step S1202), the controller 1040 determines whether the bonus flag B1 set in the RAM 1110 is "0" or "1" (Step S1203). In the case where the bonus flag B1 is "1", the controller 1040 shifts the processing to bonus game execution processing (Step S1218). Details of the bonus game execution processing are similar to those of the processing mentioned above with reference to FIG. 40, and accordingly, a description thereof will be omitted.

In the case where the bonus flag B1 is "0", the controller 1040 receives a betting operation performed by the player (Step S1204). Specifically, the controller 1040 receives the betting operation performed in such a manner that the medals are inserted from the medal insertion slot 1021, or that any of the MAX BET switch 1024, the BET switch 1025 and the SPIN/REPEAT BET switch 1026 is pressed.

Then, in the case where the betting operation is received (YES in Step S1205), the controller 1040 performs subtraction processing for the credits. Specifically, the controller 1040 performs processing for subtracting the number of bet credits from the number of current credits (Step S1206).

To the center controller 1005, the controller 1040 transmits a predetermined ratio (for example, 2%) of the number of bets as the count value of the progressive bonus. Specifically, the controller 1040 transmits 1.5% of the number of bets as a first count value to the center controller 1005, and transmits 0.5% of the number of bets as a second count value to the center controller 1005. Hence, in the progressive bonus counter 1077 of the center controller 1005, 1.5% of the number of bets is accumulated in the first accumulated count value N1, and 0.5% of the number of bets is accumulated in the second accumulated count value N2 (Step S1207). Note that these ratios are not limited to 1.5% and 0.5%, and are appropriately changeable.

The controller 1040 determines whether or not the START switch 1027 is switched on (Step S1208). Then, in the case where the START switch 1027 is switched on (YES in Step S1208), the controller 1040 scrolls the 15 symbols displayed on the display 1016 (Step S1209).

The controller 1040 determines whether or not a predetermined time (for example, five seconds) has elapsed since the scroll of the symbols was started (Step S1210), and stops the symbols (Step S1211) when the predetermined time has elapsed (YES in Step S1210).

Based on the stopped 15 symbols, the controller 1040 determines whether or not the bonus trigger is established (Step S1212). Specifically, as shown in FIG. 36, the controller 1040 determines whether or not five symbols of "7" appear, and sets the bonus flag B1 at "1" (Step S1213) in the case where the five symbols of "7" appear (YES in Step S1212). Thereafter, the controller 1040 ends this processing.

Meanwhile, in the case where the bonus trigger is not established, that is, in the case where the five symbols of "7" do not appear (NO in Step S1212), the controller 1040 determines whether or not a winning is established by the stopped 15 symbols. Specifically, the controller 1040 determines whether or not any of the winnings shown in the provision table of FIG. 36 is established (Step S1214). Then, in the case where the winning is established (YES in Step S1214), the controller 1040 performs the provision processing (Step S1215). Specifically, the controller 1040 provides the medals of which number is based on the provision table. Meanwhile, in the case where the winning is not established (NO in Step S1214), the controller 1040 ends this processing.

As described above, when the slot game is executed, a part (for example, 1.5%) of the bets is accumulated as the first count value of the progressive bonus in the progressive bonus counter 1077 provided in the center controller 1005. In addition, a part (for example, 0.5%) of the bets is accumulated as the second count value of the progressive bonus in the progressive bonus counter 1077 provided in the center controller 1005.

Then, in the case where the first accumulated count value N1 has reached the predetermined value N1max, the mini event game is started, and in the case where the second accumulated count value N2 has reached the predetermined value N2max, the major event game is started. Moreover, in the case where the bonus flag B1 has become "1", the bonus game is executed.

Figure 50:
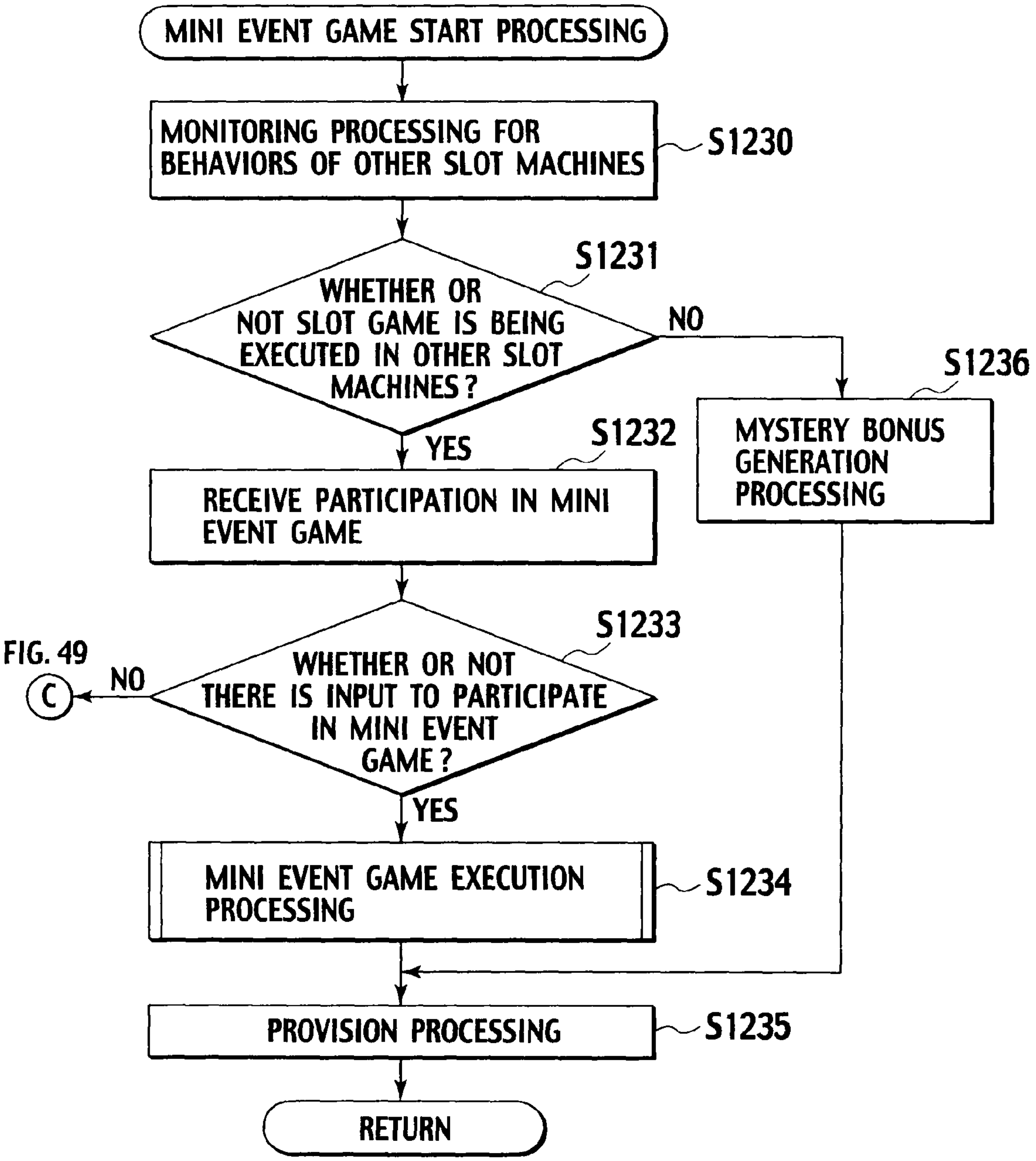
FIG. 50 is a flowchart showing mini event game start processing according to the sixth embodiment.

Next, a description will be made of the mini event game start processing shown in Step S1216 of FIG. 49 with reference to a flowchart shown in FIG. 50.

When the first accumulated count value N1 of the progressive bonus counter 1077 has reached the predetermined value N1max, the controller 1040 performs monitoring processing for the behaviors in the other slot machines 1010*b* to 1010*e*. Specifically, as mentioned above, the controller 1040 monitors such behaviors as to whether or not the START switches 1027 have been pressed (Step S1230).

Subsequently, based on the above-described behaviors, the controller 1040 determines whether or not the slot game is being executed in any of the other slot machines 1010*b* to 1010*e* (Step S1231).

Figure 55:
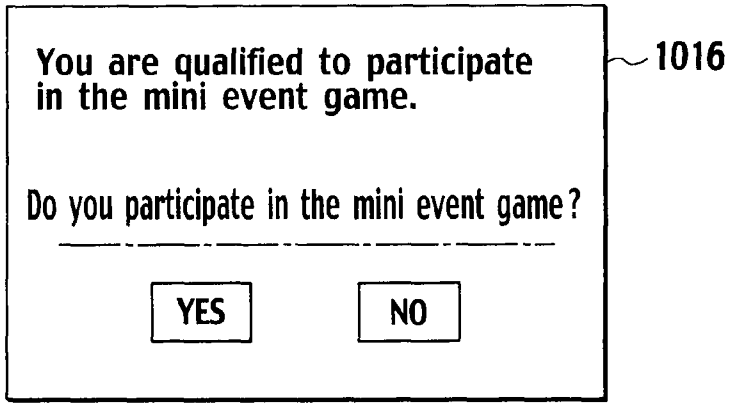
FIG. 55 is a display example of a display according to the sixth embodiment.

Then, in the case where the slot game is being executed in any of the other slot machines 1010*b* to 1010*e* (YES in Step S1231), the controller 1040 receives a selection input as to whether or not the player is to participate in the mini event game. For example, as shown in FIG. 55, the controller 1040 displays sentences saying "You are qualified to participate in the mini event game. Do you participate in the mini event game?", displays images of "YES" and "NO", and receives an input operation made by means of the touch panel sensor 1020 (Step S1232). Then, in the case where “NO” is selected (NO in Step S1233), the controller 1040 shifts to the processing of Step S1203 of FIG. 49, and returns to the slot game execution processing.

Meanwhile, in the case where “YES” is selected (YES in Step S1233), the controller 1040 performs mini event game execution processing (Step S1234). Details of the mini event game execution processing will be described later.

Moreover, in the case where the slot game is not executed in any of the other slot machines 1010*b* to 1010*e*, that is, in the case where the first accumulated count value N1 of the progressive bonus counter 1077 has reached the predetermined value N1max when the slot game is being executed only in the slot machine 101010*a* (NO in Step S1231), mystery bonus generation processing is executed (Step S1236). In a mystery bonus, when the slot game is being executed in the slot machine 101010*a*, the winning is established regardless of the combination of the stopped symbols, and an award corresponding to a part or entirety of the first accumulated count value N1 of the progressive bonus counter 1077 is generated.

Thereafter, the provision processing for providing the award generated by executing the mini event game and the award generated by the mystery bonus is executed (Step S1235).

Next, a description will be made of the mini event game execution processing shown in Step S1234 of FIG. 50 with reference to FIG. 51.

First, the center controller controlling CPU 1071 (refer to FIG. 34) decides the slot machines 1010 (some of 1010*a* to 1010*e*) which will participate in the mini event game (Step S1251). As described above, the slot machines, in each of which the slot game is being executed when the first accumulated count value N1 of the progressive bonus counter 1077 has reached the predetermined value N1max, and the input operation for participating in the mini event game is performed, are decided as the slot machines 1010 which will participate in the mini event game.

Subsequently, the center controller controlling CPU 1071 sets the number of continuation times of the mini event game (Step S1252). The number of continuation times of the mini event game is randomly selected from a plurality of the numbers (for example, 30 times, 60 times, 80 times and 100 times). Moreover, the number of continuation times of the mini event game may be always set at the same number (for example, 60 times). The center controller controlling CPU 1071 transmits information on the set number of continuation times of the mini event game to the slot machines 1010 (1010*a* to 1010*e*) which participate in the mini event game. Each of the controllers 1040 decides the number of continuation times of the mini event game based on the information on the set number of continuation times of the mini event game. With regard to processing for randomly selecting the number of continuation times of the mini event game from the above-described plural numbers (for example, 30 times, 60 times, 80 times and 100 times), the number of continuation times of the mini event game is set by storing the inputted number of times in the memory of the center controller. Here, the inputted number of times is the number inputted by the administrator such as a clerk on the casino side by means of the keyboard 1075 or an input interface that receives the number from the outside. In comparison with the case where the value of the number of continuation times of the mini event game is set in an unchangeable state in such a manner that the number of continuation times is written into the mask ROM in the production line, the number of continuation times in this embodiment has a merit that the character of each of the casinos can be exhibited in such a manner as described above that the number of continuation times is made changeable by the person (administrator) on the casino side while being selected from plural values of the numbers. In addition, in this embodiment, in order to restrict the person capable of changing the number of continuation times only to the casino side, that is, to the administrator side, the number of times is allowed to be changeable after a security operation is performed. With regard to the security operation, it is assumed to execute, upon receiving a password, authentication processing based on an authentication program which the center controller controlling CPU 1071 stores in the memory, and to then execute processing for permitting the change of the number of times, which is attempted to be made by the outside, only after the case where it is determined that a real password has been entered. In addition, it is assumed to require such an operation that a physical key is inserted from a keyhole, is then turned, and thereby allows the keyhole to become a state that is capable of setting the number of continuation times of the mini event game.

The center controller controlling CPU 1071 sets a defined number of points P1max for the mini event game (Step S1253). The defined number of points P1max is the number of points, which is necessary to win the mini event game.

Moreover, the center controller controlling CPU 1071 resets a total number of points P0, which is set for each of the slot machines 1010 which will participate in the mini event game (Step S1254). The total number of points P0 is a total value of points generated by executing the mini event game.

Subsequently, when the START switch 1027 is pressed by the player, the controller 1040 of each of the slot machines 1010 scrolls the symbols on the display 1016 (Step S1255), and stops the symbols (Step S1257) after a predetermined time elapsed (YES in Step S1256).

In the mini event game, the symbols which appear therein differ from those in the usual slot game, and five sorts of symbols, which are “BLUE 7”, “RED 7”, “3 BAR”, “2 BAR” and “1 BAR”, will appear as shown in FIG. 42. Then, the points to be generated are decided by the symbols stopped on the centerline L1. Specifically, as shown in FIG. 42, the points become 300 points when the “BLUE 7” is stopped on the centerline L1, become 150 points when the “RED 7” is stopped thereon, become 30 points when the “3 BAR” is stopped thereon, become 20 points when the “2 BAR” is stopped thereon, become 10 points when the “1 BAR” is stopped thereon, and become 0 point when any of the symbols is not stopped thereon.

The controller 1040 recognizes the points P1 from the stopped symbols (Step S1258). For example, as shown in FIG. 43A, in the case where the symbols are stopped in the pattern of “None, None, 1 BAR”, the points P1 become 10 points. As shown in FIG. 43B, in the case where the symbols are stopped in the pattern of “1 BAR-2 BAR-3 BAR”, the points P1 become 60 points. As shown in FIG. 43C, in the case where the symbols are stopped in the pattern of “RED 7-RED 7-BLUE 7”, the points P1 become 600 points.

The controller 1040 adds the recognized points P1 to the total number of points P0 (Step S1259). In this case, the center controller controlling CPU 1071 of the center controller 1005 displays, on the common display 1004, the symbols and the total points of the respective slot machines 1010 which are participating in the mini event game, and notifies the respective players of the symbols and the total points. A specific display example is as shown in FIG. 44. Hence, the players of the respective slot machines 1010 can recognize their current ranks by seeing the number of points, which is displayed on the common display 1004.

Thereafter, the controller 1040 of each of the slot machines 1010 determines whether or not the total number of points P0 has reached the defined number of points P1max (for example, "8000 points") set by the processing of Step S1253 (Step S1260). Then, in the case where the total number of points P0 has not reached the defined number of points P1max (NO in Step S1260), the controller 1040 determines whether or not the number of continuation times of the mini event game has been ended (Step S1263), and returns to the processing of Step S1255 in the case where the number of continuation times of the mini event game has not been ended (NO in Step S1263).

Meanwhile, in the case where the number of continuation times of the mini event game has been ended (YES in Step S1263), the controller 1040 ends the mini event game execution processing.

Moreover, in the case where the total number of points P0 has reached the defined number of points P1max in the processing of Step S1260 (YES in Step S1260), the center controller controlling CPU 1071 determines whether or not the slot machine 1010 (101*a*) concerned therewith has won the first position among the respective slot machines 1010 which are participating in the mini event game (Step S1261).

Then, in the case where it is determined that the slot machine 101*a* has won the first position, that is, in the case where the total number of points P0 of the slot machine 101*a* has reached the defined number of points P1max earliest among the plurality of slot machines 1010 (YES in Step S1261), the controller 1040 generates a mini progressive bonus (Step S1262). In the mini progressive bonus, the credits or the medals, which correspond to a part or entirety of the first accumulated count value N1 accumulated in the progressive bonus counter 1077, are provided. For example, in the case where the first accumulated count value N1 is $100, the credits or the medals, which are equivalent to $100, are provided. In such a way, the mini event game is executed.

Figure 51:
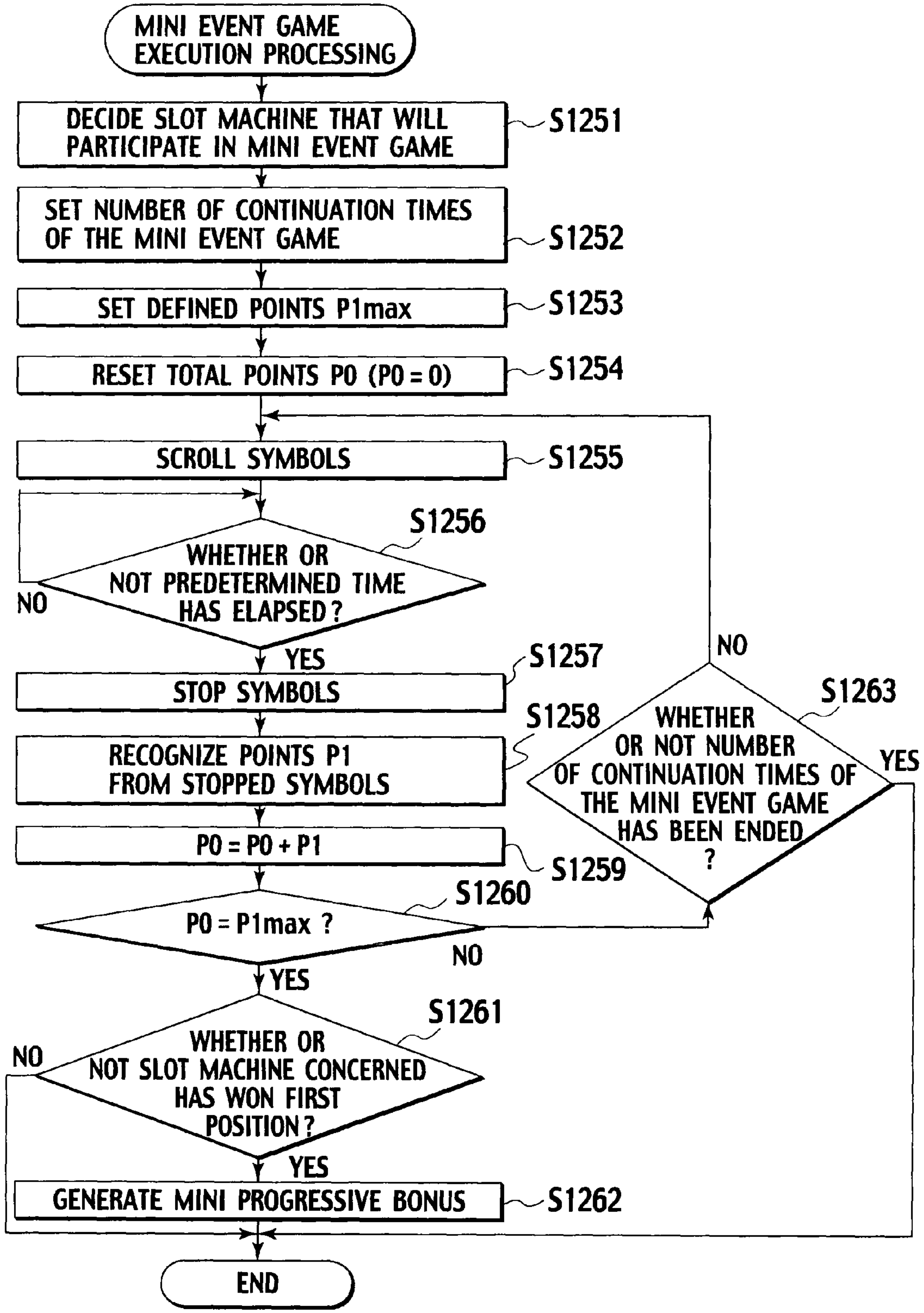
FIG. 51 is a flowchart showing mini event game execution processing according to the sixth embodiment.

Incidentally, in the case where the total number of points P0 of any of the slot machines 1010 which participate in the mini event game has reached the defined number of points Pmax in the processing of Step S1260 of FIG. 51 (YES in Step S1260), the center controller controlling CPU 1071 can also determine the current ranks of the total number of points P0 in the respective slot machines 1010 which participate in the mini event game, and the controllers 1040 of the respective slot machines 1010 selected at the first, second and third ranks can also generate progressive bonuses corresponding to the respective ranks.

Moreover, in the case where the number of continuation times of the mini event game is ended in the processing of Step S1263 of FIG. 51 (YES in Step S1263), the center controller controlling CPU 1071 can also determine the current ranks of the total number of points P0 in the respective slot machines 1010 which participate in the mini event game, and the controllers 1040 of the respective slot machines 1010 selected at the first, second and third ranks can also generate the progressive bonuses corresponding to the respective ranks.

Figure 52:
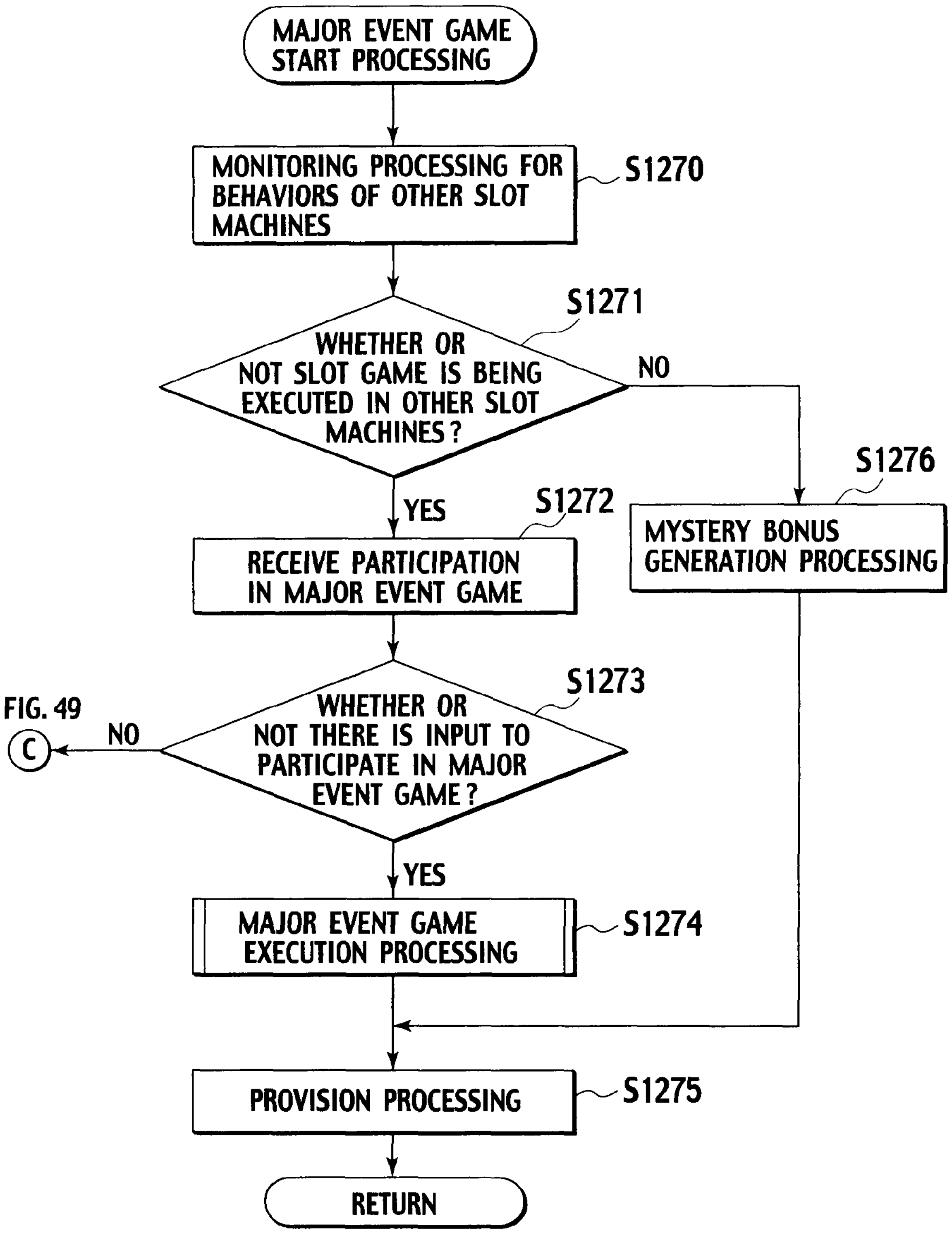
FIG. 52 is a flowchart showing major event game start processing according to the sixth embodiment.

Next, a description will be made of the major event game start processing shown in Step S1217 of FIG. 49 with reference to a flowchart shown in FIG. 52.

When the second accumulated count value N2 of the progressive bonus counter 1077 has reached the predetermined value N2max, the controller 1040 performs the monitoring processing for the behaviors in the other slot machines 1010*b* to 1010*e*. Specifically, as mentioned above, the controller 1040 monitors such behaviors as to whether or not the START switches 1027 have been pressed (Step S1270).

Subsequently, based on the above-described behaviors, the controller 1040 determines whether or not the slot game is being executed in any of the other slot machines 1010*b* to 1010*e* (Step S1271).

Figure 56:
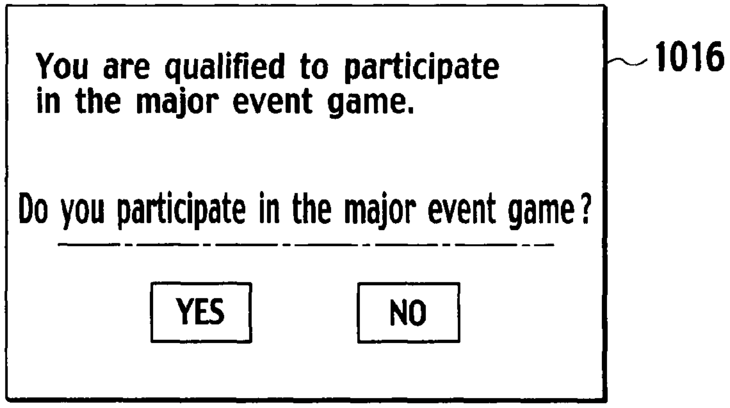
FIG. 56 is a display example of the display according to the sixth embodiment.

Then, in the case where the slot game is being executed in any of the other slot machines 1010*b* to 1010*e* (YES in Step S1271), the controller 1040 receives a selection input as to whether or not the player is to participate in the major event game. For example, as shown in FIG. 56, the controller 1040 displays sentences saying "You are qualified to participate in the major event game. Do you participate in the major event game?", displays images of "YES" and "NO", and receives an input operation made by means of the touch panel sensor 1020 (Step S1272).

Then, in the case where "NO" is selected (NO in Step S1273), the controller 1040 shifts to the processing of Step S1203 of FIG. 49, and returns to the slot game execution processing.

Meanwhile, in the case where "YES" is selected (YES in Step S1273), the controller 1040 performs major event game execution processing (Step S1274). Details of the major event game execution processing will be described later.

Moreover, in the case where the slot game is not executed in any of the other slot machines 1010*b* to 1010*e*, that is, in the case where the second accumulated count value N2 of the progressive bonus counter 1077 has reached the predetermined value N2max when the slot game is being executed only in the slot machine 1010*a* (NO in Step S1271), mystery bonus generation processing is executed (Step S1276). In a mystery bonus, when the slot game is being executed in the slot machine 1010*a*, the winning is established regardless of the combination of the stopped symbols, and an award corresponding to a part or entirety of the second accumulated count value N2 of the progressive bonus counter 1077 is generated.

Thereafter, the provision processing for providing the award generated by executing the major event game and the award generated by the mystery bonus is executed (Step S1275).

Next, a description will be made of the major event game execution processing shown in Step S1274 of FIG. 52 with reference to FIG. 53.

First, the center controller controlling CPU 1071 (refer to FIG. 34) decides the slot machines 1010 (some of 1010*a* to 1010*e*) which will participate in the major event game (Step S1301). As described above, the slot machines, in each of which the slot game is being executed when the second accumulated count value N2 of the progressive bonus counter 1077 has reached the predetermined value N2max, and the input operation for participating in the major event game is performed, are decided as the slot machines 1010 which will participate in the major event game.

Subsequently, the center controller controlling CPU 1071 sets the number of continuation times of the major event game (Step S1302). The number of continuation times of the major event game is randomly selected from a plurality of the numbers (for example, 30 times, 60 times, 80 times and 100 times). Moreover, the number of continuation times of the major event game may be always set at the same number (for example, 60 times). The center controller controlling CPU 1071 transmits information on the set number of continuation times of the major event game to the slot machines 1010 (1010*a* to 1010*e*) which participate in the major event game. Each of the controllers 1040 decides the number of continuation times of the major event game based on the information on the set number of continuation times of the major event game. With regard to processing for randomly selecting the number of continuation times of the major event game from the above-described plural numbers (for example, 30 times, 60 times, 80 times and 100 times), the number of continuation times of the major event game is set by storing the inputted number of times in the memory of the center controller. Here, the inputted number of times is the number inputted by the administrator such as a clerk on the casino side by means of the keyboard 1075 or an input interface that receives the number from the outside. In comparison with the case where the value of the number of continuation times of the major event game is set in an unchangeable state in such a manner that the number of continuation times is written into the mask ROM in the production line, the number of continuation times in this embodiment has a merit that the character of each of the casinos can be exhibited in such a manner as described above that the number of continuation times is made changeable by the person (administrator) on the casino side while being selected from plural values of the numbers. In addition, in this embodiment, in order to restrict the person capable of changing the number of continuation times only to the casino side, that is, to the administrator side, the number of times is allowed to be changeable after a security operation is performed. With regard to the security operation, it is assumed to execute, upon receiving a password, authentication processing based on an authentication program which the center controller controlling CPU 1071 stores in the memory, and to then execute processing for permitting the change of the number of times, which is attempted to be made by the outside, only after the case where it is determined that a real password has been entered. In addition, it is assumed to require such an operation that a physical key is inserted from a keyhole, is then turned, and thereby allows the keyhole to become a state that is capable of setting the number of continuation times of the major event game.

The center controller controlling CPU 1071 sets a defined number of points P2max for the major event game (Step S1303). The defined number of points P2max is the number of points, which is necessary to win the major event game.

Moreover, the center controller controlling CPU 1071 resets a total number of points P0, which is set for each of the slot machines 1010 which will participate in the major event game (Step S1304). The total number of points P0 is a total value of points generated by executing the major event game.

Subsequently, when the START switch 1027 is pressed by the player, the controller 1040 of each of the slot machines 1010 scrolls the symbols on the display 1016 (Step S1305), and stops the symbols (Step S1307) after a predetermined time elapsed (YES in Step S1306).

In the major event game, the symbols which appear therein differ from those in the usual slot game, and five sorts of symbols, which are “BLUE 7”, “RED 7”, “3 BAR”, “2 BAR” and “1 BAR”, will appear as shown in FIG. 42. Then, the points to be generated are decided by the symbols stopped on the centerline L1. Specifically, as shown in FIG. 42, the points become 300 points when the “BLUE 7” is stopped on the centerline L1, become 150 points when the “RED 7” is stopped thereon, become 30 points when the “3 BAR” is stopped thereon, become 20 points when the “2 BAR” is stopped thereon, become 10 points when the “1 BAR” is stopped thereon, and become 0 point when any of the symbols is not stopped thereon.

The controller 1040 recognizes the points P2 from the stopped symbols (Step S1308). For example, as shown in FIG. 43A, in the case where the symbols are stopped in the pattern of “None, None, 1 BAR”, the points P2 become 10 points. As shown in FIG. 43B, in the case where the symbols are stopped in the pattern of “1 BAR-2 BAR-3 BAR”, the points P2 become 60 points. As shown in FIG. 43C, in the case where the symbols are stopped in the pattern of “RED 7-RED 7-BLUE 7”, the points P2 become 600 points.

The controller 1040 adds the recognized points P2 to the total number of points P0 (Step S1309). In this case, the center controller controlling CPU 1071 of the center controller 1005 displays, on the common display 1004, the symbols and the total points of the respective slot machines 1010 which are participating in the major event game, and notifies the respective players of the symbols and the total points. A specific display example is as shown in FIG. 44. Hence, the players of the respective slot machines 1010 can recognize their current ranks by seeing the number of points, which is displayed on the common display 1004.

Thereafter, the controller 1040 of each of the slot machines 1010 determines whether or not the total number of points P0 has reached the defined number of points P2max (for example, “8000 points”) set by the processing of Step S1303 (Step S1310). Then, in the case where the total number of points P0 has not reached the defined number of points P2max (NO in Step S1310), the controller 1040 determines whether or not the number of continuation times of the major event game has been ended (Step S1313), and returns to the processing of Step S1305 in the case where the number of continuation times of the major event game has not been ended (NO in Step S1313).

Meanwhile, in the case where the number of continuation times of the major event game has been ended (YES in Step S1313), the controller 1040 ends the major event game execution processing.

Moreover, in the case where the total number of points P0 has reached the defined number of points P2max in the processing of Step S1310 (YES in Step S1310), the center controller controlling CPU 1071 determines whether or not the slot machine 1010 (1010*a*) concerned therewith has won the first position among the respective slot machines 1010 which are participating in the major event game (Step S1311).

Then, in the case where it is determined that the slot machine 1010*a* has won the first position, that is, in the case where the total number of points P0 of the slot machine 1010*a* has reached the defined number of points P2max earliest among the plurality of slot machines 1010 (YES in Step S1311), the controller 1040 generates a major progressive bonus (Step S1312). In the major progressive bonus, the credits or the medals, which correspond to a part or entirety of the second accumulated count value N2 accumulated in the progressive bonus counter 1077, are provided. For example, in the case where the second accumulated count value N2 is $5000, the credits or the medals, which are equivalent to $5000, are provided. In such a way, the major event game is executed.

Figure 53:
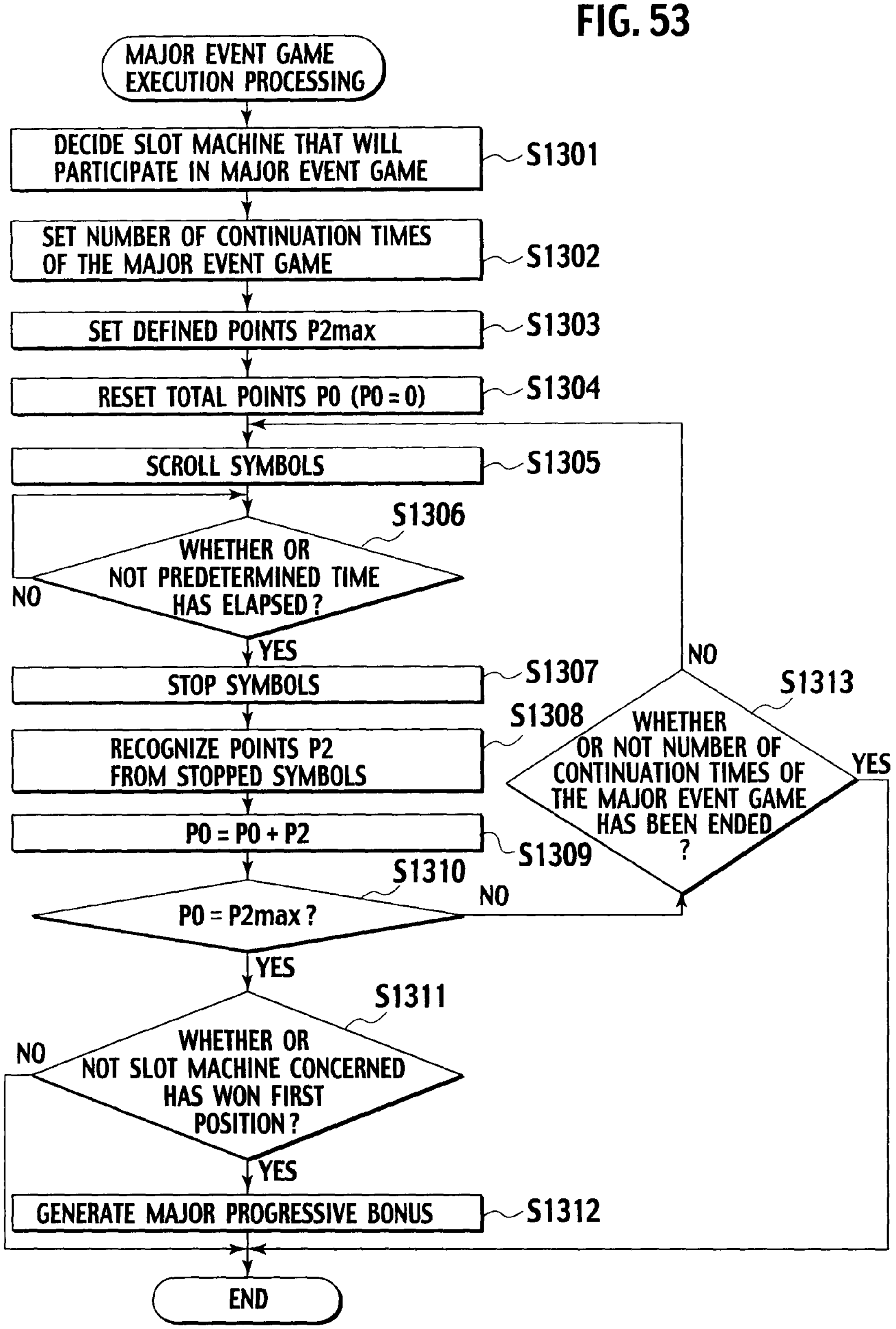
FIG. 53 is a flowchart showing major event game execution processing according to the sixth embodiment.

Incidentally, in the case where the total number of points P0 of any of the slot machines 1010 which participate in the major event game has reached the defined number of points Pmax in the processing of Step S1310 of FIG. 53 (YES in Step S1310), the center controller controlling CPU 1071 can also determine the current ranks of the total number of points P0 in the respective slot machines 1010 which participate in the major event game, and the controllers 1040 of the respective slot machines 1010 selected at the first, second and third ranks can also generate progressive bonuses corresponding to the respective ranks.

Moreover, in the case where the number of continuation times of the major event game is ended in the processing of Step S1313 of FIG. 53 (YES in Step S1313), the center controller controlling CPU 1071 can also determine the current ranks of the total number of points P0 in the respective slot machines 1010 which participate in the major event game, and the controllers 1040 of the respective slot machines 1010 selected at the first, second and third ranks can also generate the progressive bonuses corresponding to the respective ranks.

Then, in the above-described mini event game and major event game, the progressive bonuses are provided only to the slot machine 1010 in which the total number of points P0 has reached the defined number of points P1max and the defined number of points P2max earliest among the plurality of slot machines 1010, and accordingly, the player can be allowed to be interested in the matter that the event game takes place.

Moreover, in the case where the slot machine 1010 that is participating in the event game is only one, the mini event game or the major event game is not executed, but instead, the mystery bonus is generated. Accordingly, the profit made in such a manner that the accumulated count values of the progressive bonus counter 1077 are accumulated can be returned to the player.

The description has been made above of the embodiments. However, the embodiments merely illustrate specific examples, and do not particularly limit the present invention. It is possible to appropriately change designs of specific configurations of the respective means and the like. Moreover, the effects described in the embodiments merely list the most suitable effects generated from the present invention, and the effects by the present invention are not limited to those described in the embodiments.

Furthermore, the description has been made of the fourth and fifth embodiments mentioned above by taking the slot game machines as examples; however, the present invention is also applicable to other gaming machines, for example, such as machines for a bingo game and a roulette game.

Moreover, in the detailed description mentioned above, characteristic portions have been mainly described so that the present invention can be understood more easily. The present invention is not limited to the embodiments described in the detailed description mentioned above, and can be applied to other embodiments, and an application range of the present invention is various. Furthermore, the terms and the idioms, which are used in this specification, are used for properly describing the present invention, and are not used for limiting the interpretation of the present invention. Furthermore, it is considered easy for those skilled in the art to contrive other configurations, systems, methods and the like, which are included in the concept of the present invention, from the concept of the invention described in this specification. Hence, the description of the scope of claims must be regarded as one including equilibrium configurations within the range without departing from the scope of the technical idea of the present invention. Moreover, the object of the abstract is to enable the patent offices, general public institutions, engineers who belong to this technical field and are not fully conversant in the patent and legal terms or the technical terms, and the like to rapidly determine the technical contents of this application and the essence thereof by a simple investigation. Hence, the abstract is not intended to limit the scope of the invention to be evaluated by the description of the scope of claims. Moreover, in order that the object of the present invention and the effects intrinsic to the present invention can be fully understood, it is desired that the present invention be interpreted in full consideration for the already disclosed documents and the like.

The above-mentioned detailed description includes the processing executed by a computer. The above description and expression are described for the purpose of allowing those skilled in the art to understand the present invention most efficiently. In this specification, the respective steps for use in deriving one result should be understood as processes in which no self-contradiction is inherent. Moreover, in the respective steps, electric or magnetic signals are transmitted/received, recorded, and so on. In the processes in the respective steps, such signals are expressed by bits, values, symbols, characters, terms, numeric characters, and the like; however, it is necessary to note that these are used since they are convenient for the description. Furthermore, in some case, the processes in the respective steps are described by expressions common to those for human actions; however, in principle, the processes described in this specification are executed by a variety of devices. Furthermore, other configurations required for performing the respective steps will be self-evident from the above-description.

The above-described fourth to sixth embodiments may contain the subject matter of a future divisional application or an invention that may be newly presented or introduced by future amendment. Examples are shown as follows.

(12) A gaming system, comprising:

a plurality of gaming terminals;

a common display; and a progressive bonus counter, wherein each of the gaming terminal includes:

a terminal display that displays thereon an image regarding a progress of a slot game;

a number-of-games counter that is counted following execution of the slot game and is reset when a specific game result is obtained; and a controller configured to execute:

(A) processing for executing the game upon receiving a bet, and accumulating a part of the bet in the progressive bonus counter;

(B) processing for receiving a side bet serving as a condition for obtaining insurance pay;

(C) processing for generating the insurance pay when the side bet is made and the number-of-games counter has reached a predetermined value;

(D) processing for determining whether or not the game is being executed in the plurality of gaming terminals;

(E) processing for determining whether or not an accumulated count value of the progressive bonus counter has reached a predetermined value;

(F) processing for displaying an image on the common display and deciding execution of an event game in which the plurality of gaming terminals participate in a case where it is determined that the game is being executed in the plurality of gaming terminals in the processing for determining whether or not the game is being executed in the plurality of gaming terminals, and it is determined that the accumulated count value of the progressive bonus counter has reached the predetermined value in the processing for determining whether or not an accumulated count value of the progressive bonus counter has reached a predetermined value;

(G) processing for determining a number of continuation times for continuing the event game based on an external input;

(H) processing for cumulatively adding up points in each of the gaming terminals in response to symbols rearranged in the event game, the points being set individually for the symbols;

(I) processing for determining whether or not each of the gaming terminals wins the event game in accordance with the points individually added up in each of the gaming terminals; and (J) processing for providing an award corresponding to a part or entirety of the accumulated count value to the gaming terminal that has won the event game.

(13) The gaming system according to the above-mentioned (12), wherein, in a case where it is determined that the game is not being executed in the plurality of gaming terminals in the processing for determining whether or not the game is being executed in the plurality of gaming terminals, and it is determined that the accumulated count value of the progressive bonus counter has reached the predetermined value in the processing for determining whether or not an accumulated count value of the progressive bonus counter has reached a predetermined value, the controller executes processing for determining whether or not the gaming terminal including the controller wins a mystery bonus, and provides the award corresponding to a part or entirety of the accumulated count value to the gaming terminal when the gaming terminal has won the mystery bonus game.

(14) The gaming system according to the above-mentioned (12), wherein the controller monitors a behavior of the gaming terminal, and executes processing for determining that the slot game is being executed in the gaming terminal in a case of having detected an input operation by a player.

(15) The gaming system according to the above-mentioned (12), wherein the controller executes processing for changing a ratio of the bet to be accumulated in the progressive bonus counter.

(16) A control method of a gaming system including a plurality of gaming terminals, a common display, and a progressive bonus counter, comprising:

(A) processing for executing a game upon receiving a bet, and accumulating a part of a bet in the progressive bonus counter;

(B) processing for determining whether or not the game is being executed in the plurality of gaming terminals;

(C) processing for determining whether or not an accumulated count value of the progressive bonus counter has reached a predetermined value;

(D) processing for displaying an image on the common display and deciding execution of an event game in which the plurality of gaming terminals participate in a case where it is determined that the game is being executed in the plurality of gaming terminals in the processing for determining whether or not the game is being executed in the plurality of gaming terminals, and it is determined that the accumulated count value of the progressive bonus counter has reached the predetermined value in the processing for determining whether or not an accumulated count value of the progressive bonus counter has reached a predetermined value;

(E) processing for deciding a number of continuation times that the event game is to be continued based on an input from an outside;

(F) processing for cumulatively adding up points in each of the gaming terminals in response to symbols rearranged in the event game, the points being set individually for the symbols;

(G) processing for determining whether or not each of the gaming terminals wins the event game in accordance with the points individually added up in each of the gaming terminals; and (H) processing for providing an award corresponding to a part or entirety of the accumulated count value to the gaming terminal that has won the event game.

(17) The control method of a gaming system according to the above-mentioned (16), wherein, in a case where it is determined that the game is not being executed in the plurality of gaming terminals in the processing for determining whether or not the game is being executed in the plurality of gaming terminals, and it is determined that the accumulated count value of the progressive bonus counter has reached the predetermined value in the processing for determining whether or not an accumulated count value of the progressive bonus counter has reached a predetermined value, processing for determining whether or not the gaming terminal wins a mystery bonus is executed, and the award corresponding to a part or entirety of the accumulated count value is provided to the gaming terminal when the gaming terminal has won the mystery bonus game.

(18) The control method of a gaming system according to the above-mentioned (12), wherein a behavior of the gaming terminal is monitored, and processing for determining that the slot game is being executed in the gaming terminal is executed in a case where an input operation by a player is detected.

(19) The control method of a gaming system according to the above-mentioned (12), wherein processing for changing a ratio of the bet to be accumulated in the progressive bonus counter is executed.

(20) The control method of a gaming system according to the above-mentioned (12), wherein the event game is executed without performing the betting.

(21) A control method of a gaming system including a plurality of gaming terminals, a common display, a progressive bonus counter, and a number-of-games counter that is counted following execution of a slot game and is reset when a specific game result is obtained, comprising:

(A) processing for executing a game upon receiving a bet, and accumulating a part of the bet in the progressive bonus counter;

(B) processing for receiving a side bet serving as a condition for obtaining insurance pay;

(C) processing for generating the insurance pay when the side bet is made and the number-of-games counter has reached a predetermined value;

(D) processing for determining whether or not the game is being executed in the plurality of gaming terminals;

(E) processing for determining whether or not an accumulated count value of the progressive bonus counter has reached a predetermined value;

(F) processing for displaying an image on the common display and deciding execution of an event game in which the plurality of gaming terminals participate in a case where it is determined that the game is being executed in the plurality of gaming terminals in the processing for determining whether or not the game is being executed in the plurality of gaming terminals, and it is determined that the accumulated count value of the progressive bonus counter has reached the predetermined value in the processing for determining whether or not an accumulated count value of the progressive bonus counter has reached a predetermined value;

(G) processing for deciding a number of continuation times that the event game is to be continued based on an input from an outside;

(H) processing for cumulatively adding up points in each of the gaming terminals in response to symbols rearranged in the event game, the points being set individually for the symbols;

(I) processing for determining whether or not each of the gaming terminals wins the event game in accordance with the points individually added up in each of the gaming terminals; and (J) processing for providing an award corresponding to a part or entirety of the accumulated count value to the gaming terminal that has won the event game.

(22) The control method of a gaming system according to the above-mentioned (21), wherein, in a case where it is determined that the game is not being executed in the plurality of gaming terminals in the processing for determining whether or not the game is being executed in the plurality of gaming terminals, and it is determined that the accumulated count value of the progressive bonus counter has reached the predetermined value in the processing for determining whether or not an accumulated count value of the progressive bonus counter has reached a predetermined value, processing for determining whether or not the gaming terminal wins a mystery bonus is executed, and the award corresponding to a part or entirety of the accumulated count value is provided to the gaming terminal when the gaming terminal has won the mystery bonus game.

(23) The control method of a gaming system according to the above-mentioned (21), wherein a behavior of the gaming terminal is monitored, and processing for determining that the slot game is being executed in the gaming terminal is executed in a case where an input operation by a player is detected.

(24) The control method of a gaming system according to the above-mentioned (21), wherein processing for changing a ratio of the bet to be accumulated in the progressive bonus counter is executed.

(25) The control method of a gaming system according to the above-mentioned (21), wherein the event game is executed without performing the betting.

Figure 57:
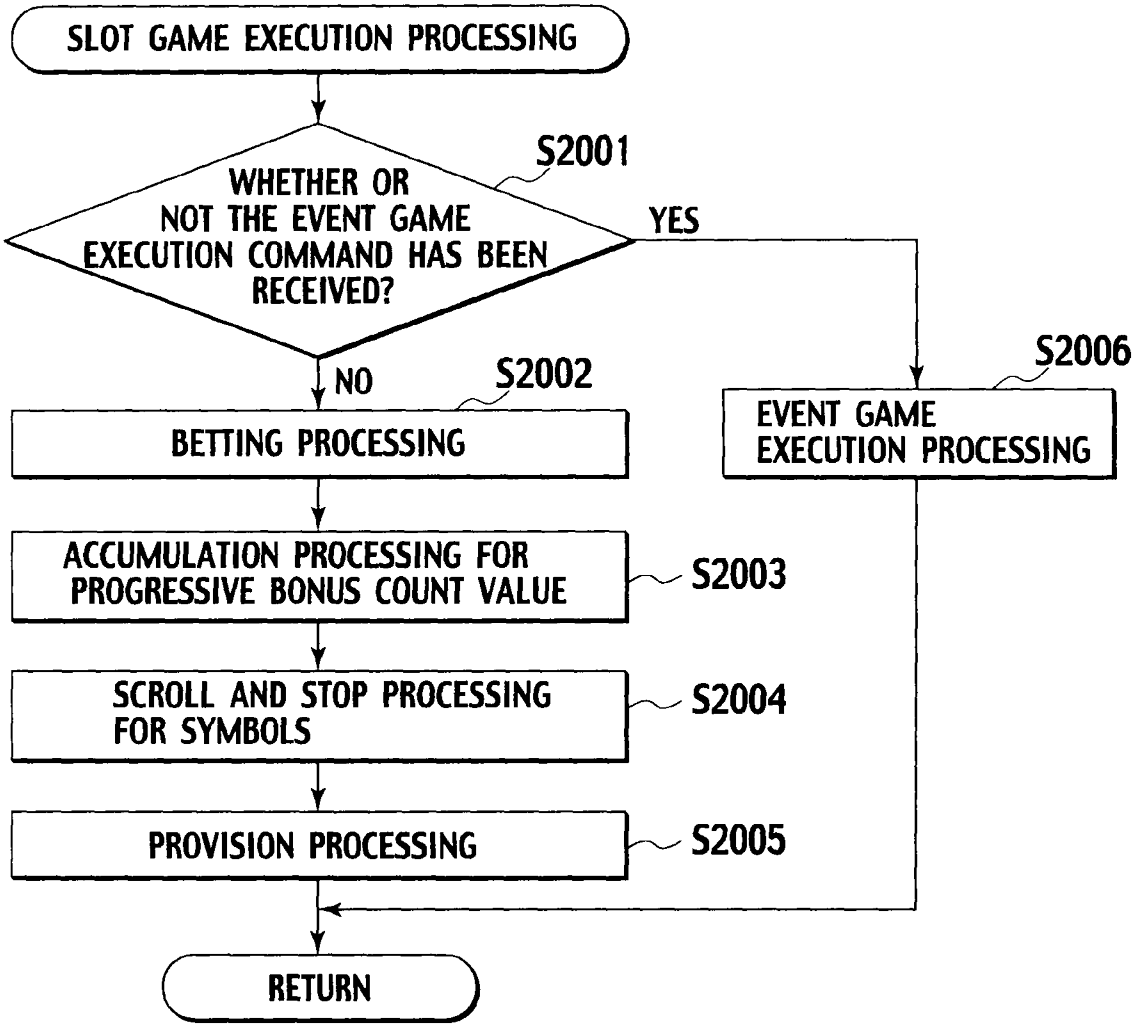
FIG. 57 is a flowchart showing a schematic processing procedure of a slot game executed by a gaming system according to further embodiment.

FIG. 57 is a flowchart showing a schematic processing procedure of slot game execution processing executed by a slot machine as a gaming terminal provided in a gaming system of a seventh embodiment.

First, while referring to FIG. 57, a description will be made of the schematic processing procedure of the slot machine 2010 as the gaming terminal.

A controller 2040 (refer to FIG. 61) of the slot machine 2010 determines whether or not to have received an event game execution command from a server 2005 (refer to FIG. 62) as a main controller (Step S2001). Then, in the case of not having received the event game execution command (NO in Step S1), the controller 2040 executes a usual slot game. Specifically, the controller 2040 receives a bet made by a player (Step S2002), and accumulates a part (a predetermined ratio) of the bet thus made to a progressive bonus counter 2077 (Step S2003).

When a START switch 2027 (refer to FIG. 61) is pressed by the player in this state, the controller 2040 scrolls a plurality of symbols on a display 2016 (refer to FIG. 61), and thereafter stops the symbols thereon (Step S2004). Then, based on a combination of the stopped symbols, the controller 2040 determines whether or not a winning is established. In the case where the winning is established, provision processing for providing medals or credits to the player is performed (Step S2005).

Meanwhile, in the case where the event game execution command is received from the server 2005 as the main controller (YES in Step S2001), event game execution processing is executed in the respective slot machines 2010 (2010*a* to 2010*e*) (Step S2006).

In the event game execution processing, the same game is played by the slot machines, which participate in an event game, for the purpose of competing to win a progressive bonus game. In the case where the event game is executed, an award corresponding to a part or entirety of an accumulated count value N of the progressive bonus counter 2077 (refer to FIG. 62) is provided to the winning slot machine 2010 among the slot machines 2010 which participate in the event game.

As described above, the event game is executed, thus making it possible to allow each player to enhance interest in executing the slot game, and possible to enhance an entertainment factor of the gaming system.

Figure 58:
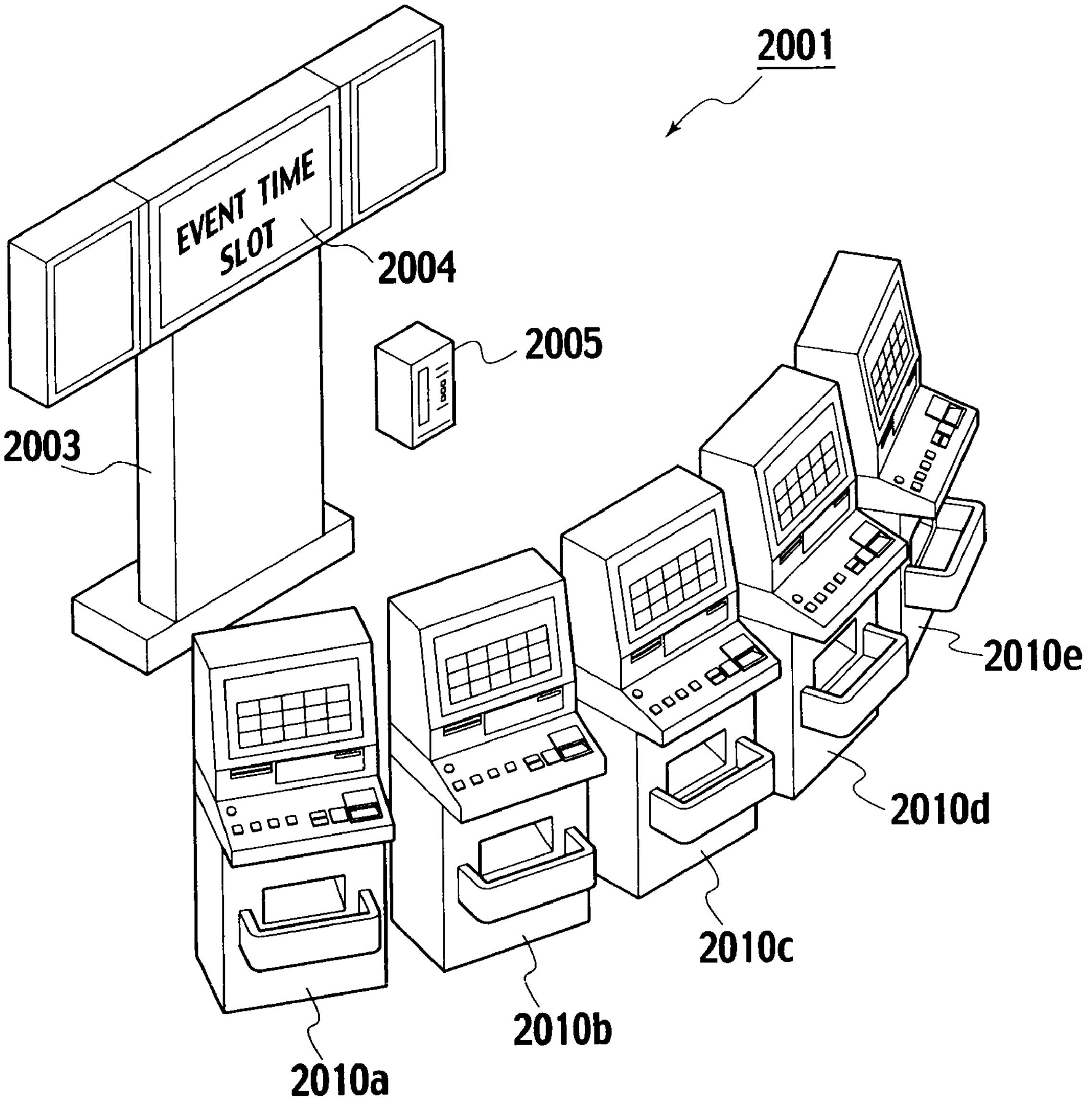
FIG. 58 is an entire configuration view of a gaming system according to the further embodiment.

Next, a description will be made of the gaming system 2001 according to this embodiment. As shown in FIG. 58, in the gaming system 2001 according to this embodiment, a common display 2004 is provided on a support member 2003, and further, the plurality (five in the example) of slot machines 2010 (2010*a* to 2010*e*) are arranged so as to surround the common display 2004 concerned. Moreover, a server 2005, as a main controller, that comprehensively controls the respective slot machines 2010 (2010*a* to 2010*e*) and performs a display control for the common display 2004 is provided.

Figure 59:
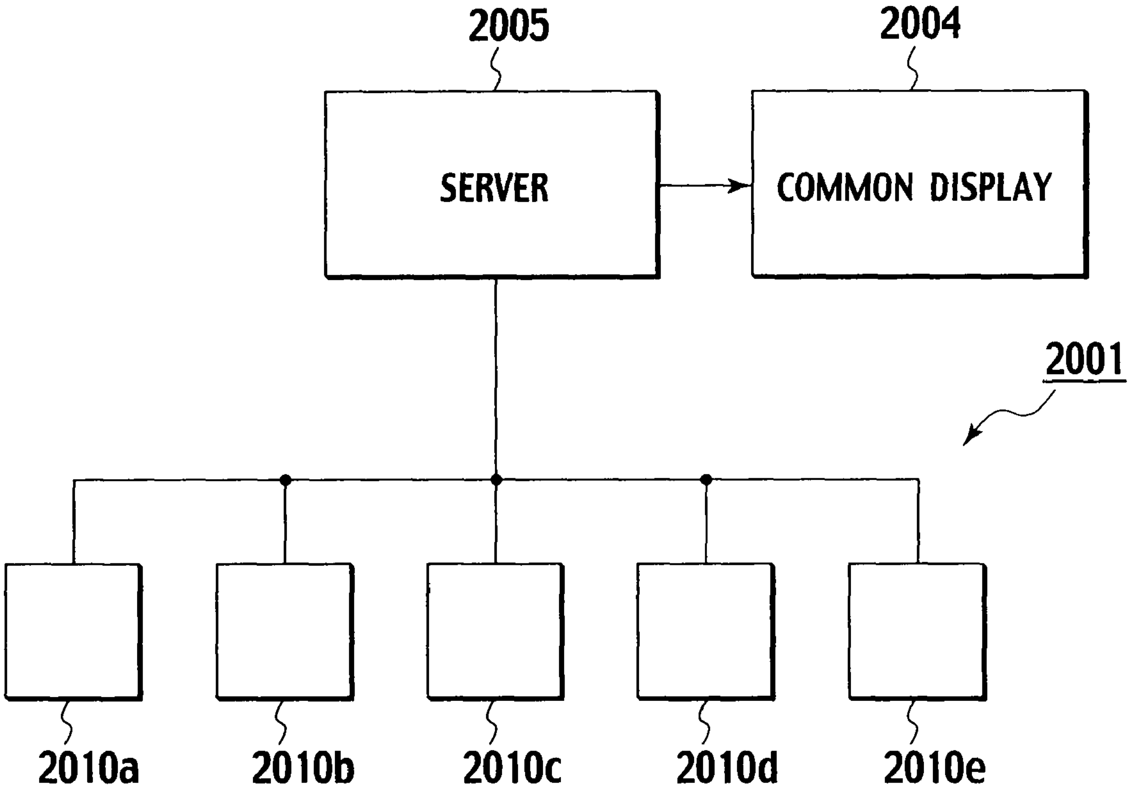
FIG. 59 is a network connection diagram of the gaming system according to the further embodiment.

FIG. 59 is a network connection diagram of the gaming system 2001 according to this embodiment. As shown in FIG. 59, the plurality of slot machines 2010 (2010*a* to 2010*e*) are connected through a network to the server 2005. Moreover, the server 2005 is connected to the common display 2004.

Figure 60:
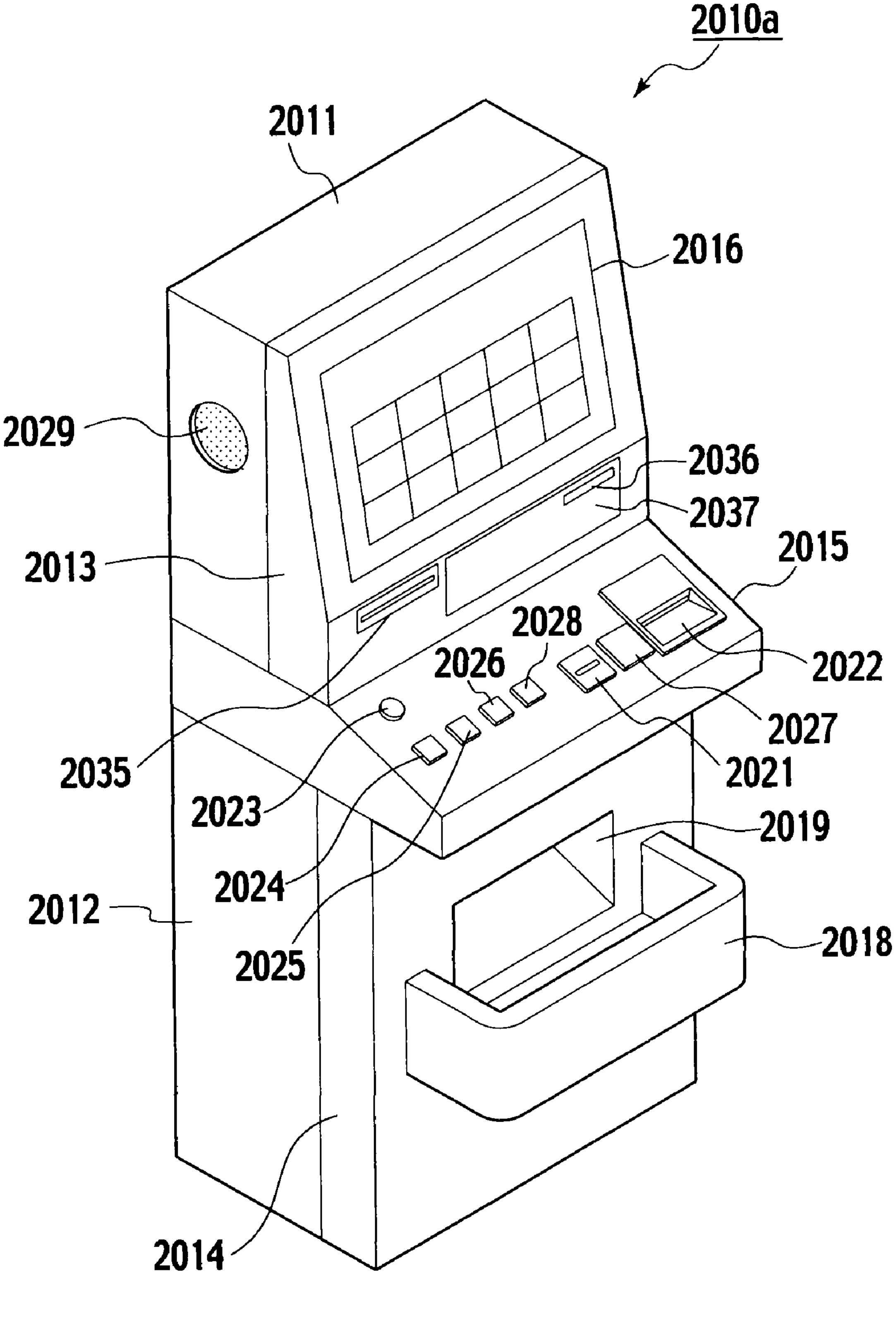
FIG. 60 is an entire configuration view of a slot machine for use in the gaming system according to the further embodiment.

Next, a description will be made of a configuration of the slot machine 2010 with reference to FIG. 60. Note that the respective slot machines 2010 (2010*a* to 2010*e*) have the same configuration, and accordingly, the description will be made by taking the slot machine 2010*a* as an example. As shown in FIG. 60, the slot machine 2010*a* according to this embodiment includes: an upper cabinet 2011; a lower cabinet 2012; and an operation table 2015 provided so as to protrude forward between the upper cabinet 2011 and the lower cabinet 2012.

An upper door 2013 is provided on the upper cabinet 2011, and is adapted to be openable and closable by a hinge (not shown). In a similar way, a lower door 2014 is provided on the lower cabinet 2012, and is adapted to be openable and closable by a hinge (not shown). At a usual time, the slot game is executed in a state where the upper door 2013 and the lower door 2014 are closed, and at the time when a failure occurs in the slot machine 2010 and the slot machine 2010 is maintained, the upper door 2013 and the lower door 2014 are opened and closed by an administrator who owns an exclusive key. When the upper door 2013 or the lower door 2014 is opened, it is seen that input keys 2045 (refer to FIG. 61) are provided in the upper cabinet 2011 or the lower cabinet 2012. Through the input keys 2045, it is made possible to change a control program of the slot machine in various ways. In this example, through the input keys 2045 of the slot machine, it is also made possible to change setting of a set operating ratio stored in a set operating ratio storage unit 2079 of the server 2005 to be described later.

Moreover, in the upper cabinet 2011, there are provided a variety of constituent members including: the controller 2040 (refer to FIG. 61) for electrically controlling this slot machine 2010*a*; a hopper 2044 (refer to FIG. 61) for controlling insertion, storage and provision of the medals; and the like. Furthermore, on side surfaces of the upper cabinet 2011, speakers 2029 for outputting an effect sound that follows the execution of the slot game are provided.

The display 2016 is provided on a front surface of the upper door 2013, which faces to the player. On the display 2016, images regarding the game are displayed. Specifically, in the slot machine 2010*a* for use in this embodiment, totally 15 symbols with a matrix of three rows and five columns are displayed, and when the slot game is executed, the respective symbols start to be scrolled, and are then stopped after a predetermined time has elapsed. Then, it is determined whether or not winning is established in response to the combination of the stopped symbols, and a predetermined amount of provision will be generated in the case where the winning is generated. Moreover, besides the above-described symbols, a variety of effect images are displayed on the display 2016 as the slot game advances.

Moreover, on a surface of the display 2016, a touch panel sensor 2020 (refer to FIG. 61) that detects a touching operation performed by the player is provided. By using the touch panel sensor 2020, the player can perform an input operation by touching the image displayed on the display 2016.

Furthermore, below the display 2016, a ticket printer 2035, a card reader 2036 and a data display 2037 are provided.

The ticket printer 2035 prints, on a ticket, a bar code in which respective data such as the number of credits, a date and an identification number of the slot machine 2010*a* are encoded, and outputs the ticket as a bar code-added ticket. The player allows another slot machine to read the bar code-added ticket, and thereby can play the game on the slot machine concerned, or can exchange the bar code-added ticket with bills and the like at a predetermined spot (for example, a cashier in a casino) of a game facility.

The card reader 2036 is capable of receiving a smart card, and reads data from the smart card thus inserted thereinto, and writes data into the smart card. The smart card is a card carried by the player, in which data for identifying the player, data regarding a history of the games played by the player, and the like are stored.

On the data display 2037, a variety of data regarding the slot game is displayed. For example, data on such a play history, the number of credits, the number of provision and the like is displayed on the data display 2037.

Note that, though the medals are mentioned as an example of the bet for use in the case of executing the game in this embodiment, the bet is not limited to the medals. For example, coins, tokens, electronic money, or electronic valuable information (credits) equivalent to these can be mentioned.

Moreover, on the operation table 2015, there are provided: a PROVISION switch 2023; a MAX BET switch 2024; a BET switch 2025; a SPIN/REPEAT BET switch 2026; the START switch 2027; and a RESCUE SETTING switch 2028. Moreover, on the operation table 2015, there are provided: a medal insertion slot 2021 for inserting therethrough the medals for use in the case of executing the game; and a bill validator 2022 for identifying whether or not the bills are real ones and receiving the real bills.

The PROVISION switch 2023 is a switch for providing the inserted medals. The medals to be provided are discharged from a medal provision port 2019 open on a front surface of the lower door 2014. The medals thus provided are accumulated in a medal tray 2018.

The MAX BET switch 2024 is a switch for betting, by one operation, the maximum number (for example, equivalent to 10 medals) of credits bettable in one slot game. Note that it is possible to change the maximum number of credits bettable in one slot game by an operation of the administrator. For example, a setting can also be made so that, for example, betting equivalent to 50 medals to the maximum can be enabled.

The BET switch 2025 is a switch for deciding the number of credits to be bet on the slot game executed on the display 2016. Every time when the BET switch 2025 is pressed, a credit equivalent to one medal is bet.

The SPIN/REPEAT BET switch 2026 is a switch for betting credits again without changing the number of credits bet by the above-described BET switch 2025 in the game executed last time, thereby playing the slot game.

The START switch 2027 is a switch for starting the slot game on the display 2016 after the credits are bet. When the START switch 2027 is pressed after the medals are inserted into the medal insertion slot 2021 or after the credits are bet by the BET switch 2025, the slot game is started, in which the symbols are stopped after being scrolled on the respective display areas with the matrix of three rows and five columns on the display 2016.

The RESCUE SETTING switch 2028 is a switch for joining "rescue pay (insurance pay)". The rescue pay is a function to compensate for losses of the player by generating a predetermined amount of provision when the player does not win a bonus trigger continuously for a predetermined number of games (for example, 1000 times) at the time of executing the slot games. In the rescue pay, for example, one medal is collected with respect to betting of 10 medals, and at the time when the rescue pay is generated, for example, 2000 medals are provided. The player can determine by him/herself whether or not to join the rescue pay.

Figure 61:
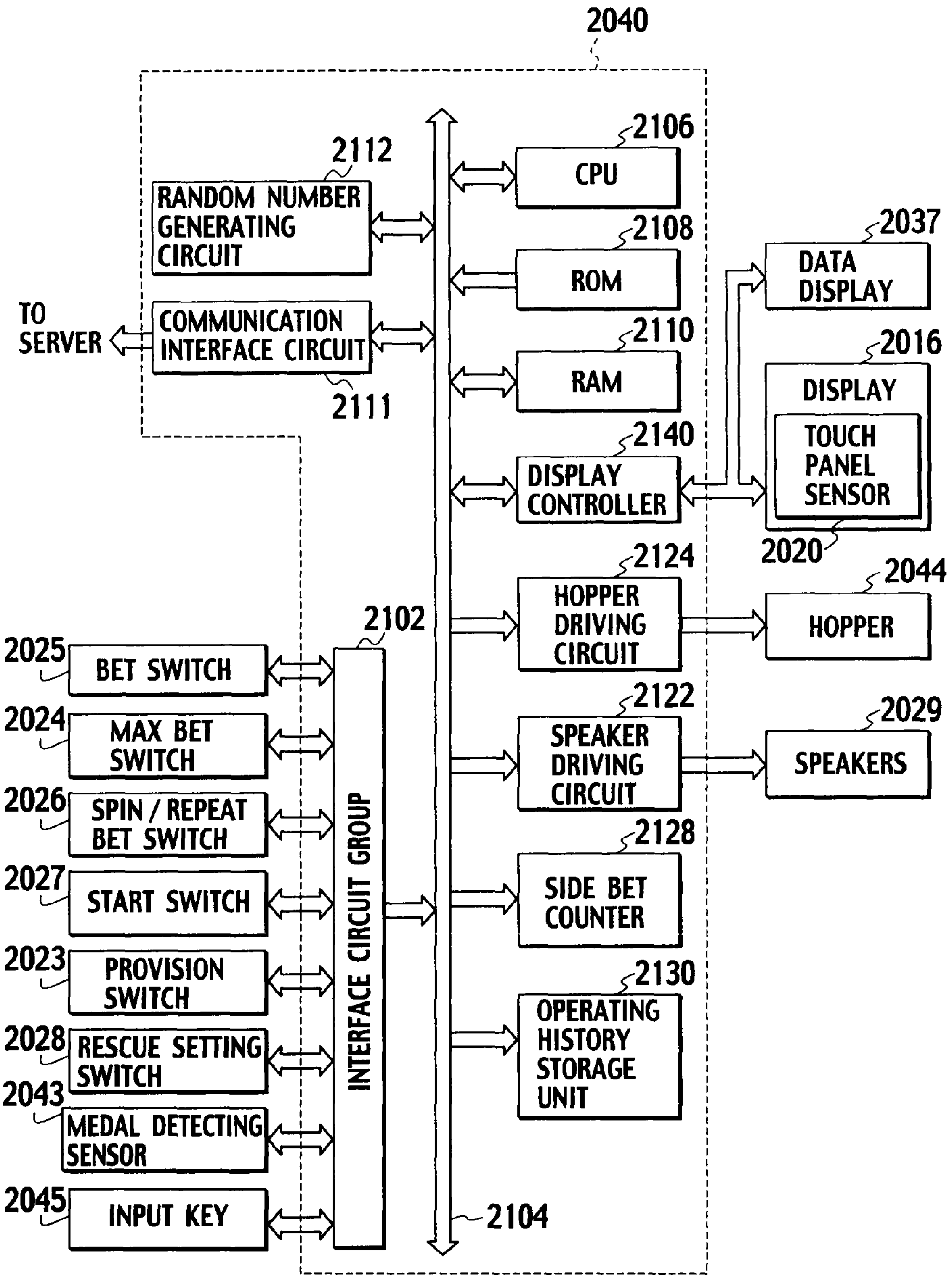
FIG. 61 is a block diagram showing an internal configuration of the slot machine for use in the gaming system according to the further embodiment.

FIG. 61 is a block diagram showing an electric configuration of the controller 2040 provided in the slot machine 2010 according to this embodiment, and of the variety of instruments connected to the controller 2040. The controller 2040 shown in FIG. 61 is a microcomputer, and includes: an interface circuit group 2102; an input/output bus 2104; a CPU 2106; a ROM 2108; a RAM 2110; a communication interface circuit 2111; a random number generating circuit 2112; a speaker driving circuit 2122; a hopper driving circuit 2124; a side bet counter 2128; a operating history storage unit 2130; and a display controller 2140.

The interface circuit group 2102 is connected to the input/output bus 2104. The input/output bus 2104 transfers a data signal or an address signal with the CPU 2106.

The START switch 2027 is connected to the interface circuit group 2102. A starting signal outputted from the START switch 2027 is converted into a predetermined signal in the interface circuit group 2102, and is then transmitted to the CPU 2106 through the input/output bus 2104.

Moreover, to the interface circuit group 2102, there are connected: the BET switch 2025; the MAX BET switch 2024; the SPIN/REPEAT BET switch 2026; the PROVISION switch 2023; the RESCUE SETTING switch 2028; and the input keys 2045. The respective switching signals outputted from the respective switches 2025, 2024, 2026, 2023 and 2028 are supplied to the interface circuit group 2102, are converted into predetermined signals in the interface circuit group 2102, and are then transmitted to the CPU 2106 through the input/output bus 2104.

In addition, a medal detecting sensor 2043 is connected to the interface circuit group 2102. The medal detecting sensor 2043 is a sensor for detecting the medals inserted into the medal insertion slot 2021, and is provided in a medal insertion spot of the medal insertion slot 2021. A detection signal outputted from the medal detecting sensor 2043 is supplied to the interface circuit group 2102, is converted into a predetermined signal by the interface circuit group 2102, and is then transmitted to the CPU 2106 through the input/output bus 2104.

To the input/output bus 2104, there are connected: the ROM 2108 in which a system program is stored; and the RAM 2110 for storing a variety of data. Moreover, to the input/output bus 2104, there are connected: the random number generating circuit 2112; the communication interface circuit 2111; the display controller 2140; the hopper driving circuit 2124; the speaker driving circuit 2122; the side bet counter 2128; and the operating history storage unit 2130.

On an occasion that such a starting operation for the game has been received by the START switch 2027, the CPU 2106 reads out a game execution program, and executes the slot game. The game execution program is a program for executing the slot game on the display 2016 through the display controller 2140.

Specifically, the game execution program is programmed so as to execute the slot game that generates the provision when the totally 15 symbols are scrolled on the display areas of the display 2016 and are thereafter stopped, and symbols which form a winning combination consequently come from among the stopped symbols.

The communication interface circuit 2111 is connected to the server 2005 through the network, and transmits, to the server 2005, the data on the play history of the games executed by this slot machine 2010. Moreover, the communication interface circuit 2111 receives a variety of data transmitted from the server 2005.

The random number generating circuit 2112 generates random numbers for deciding whether or not to generate the winning combination in the slot game executed on the display 2016.

Note that the side bet counter 2128 and the RESCUE SETTING switch 2028 do not function in this seventh embodiment but function in a third embodiment to be described later. The side bet counter 2128 and the RESCUE SETTING switch 2028 will be described in detail in the third embodiment.

The speaker driving circuit 2122 outputs an audio signal to the speakers 2029. Specifically, the CPU 2106 reads out the audio data stored in the ROM 2108, and transmits the audio data to the speaker driving circuit 2122 through the input/output bus 2104. In such a way, a predetermined effect sound is emitted from the speakers 2029.

The hopper driving circuit 2124 outputs a provision signal to the hopper 2044 when provision occurs. Specifically, upon receiving a provision signal from the PROVISION switch 2023, the CPU 2106 outputs a drive signal to the hopper driving circuit 2124 through the input/output bus 2104. In such a way, the hopper 2044 provides the medals of the number equivalent to the remaining number of credits at that point of time, which is stored in a predetermined memory area of the RAM 2110.

The display controller 2140 performs a display control to execute the slot game on the display 2016. Specifically, the CPU 2106 generates a signal of an image display command, which corresponds to a state of the slot game and a result of the slot game, and outputs the signal of the image display command to the display controller 2140 through the input/output bus 2104. Upon receiving the signal of the image display command, which is outputted from the CPU 2106, the display controller 2140 generates a drive signal for driving the display 2016 based on the image display command concerned, and outputs the generated drive signal to the display 2016. In such a way, a variety of images such as the effect images and an image that explains the game are displayed on the display 2016. Moreover, the display controller 2140 performs a display control for the data display 2037. Furthermore, the display controller 2140 outputs, to the CPU 2106, an operation signal inputted from the touch panel sensor 2020.

The operating history storage unit 2130 stores an operating history (a game history) for the past several hours in the slot machine 2010 to which the operating history storage unit 2130 belongs. Specifically, the operating history storage unit 2130 is one to record and accumulate times when the START switch 2027 is pressed, and is used for calculating an operating ratio of each slot machine 2010. Based on the operating history of the operating history storage unit 2130, the operating ratio (a game density) of each slot machine 2010 can be calculated. Note that, for the operating history, times when the BET switches 2024, 2025 and 2026 are pressed or times when the medal sensor 2043 senses the medals may be recorded, or other information by which the operating ratio can be calculated may be stored.

Next, a description will be made of an electric configuration of the server 2005 with reference to a block diagram shown in FIG. 62. The server 2005 performs controls to accumulate, in the progressive bonus counter 2077, the count values N of the progressive bonuses generated by executing the slot games by the respective slot machines 2010 (2010*a* to 2010*e*), and to display a variety of information regarding the event game on the common display 2004 when the event game is executed. Moreover, the server 2005 performs a control to provide the award, which corresponds to the accumulated count value N of the progressive bonus counter 2077, to the slot machine 2010 that has won the event game.

Figure 62:
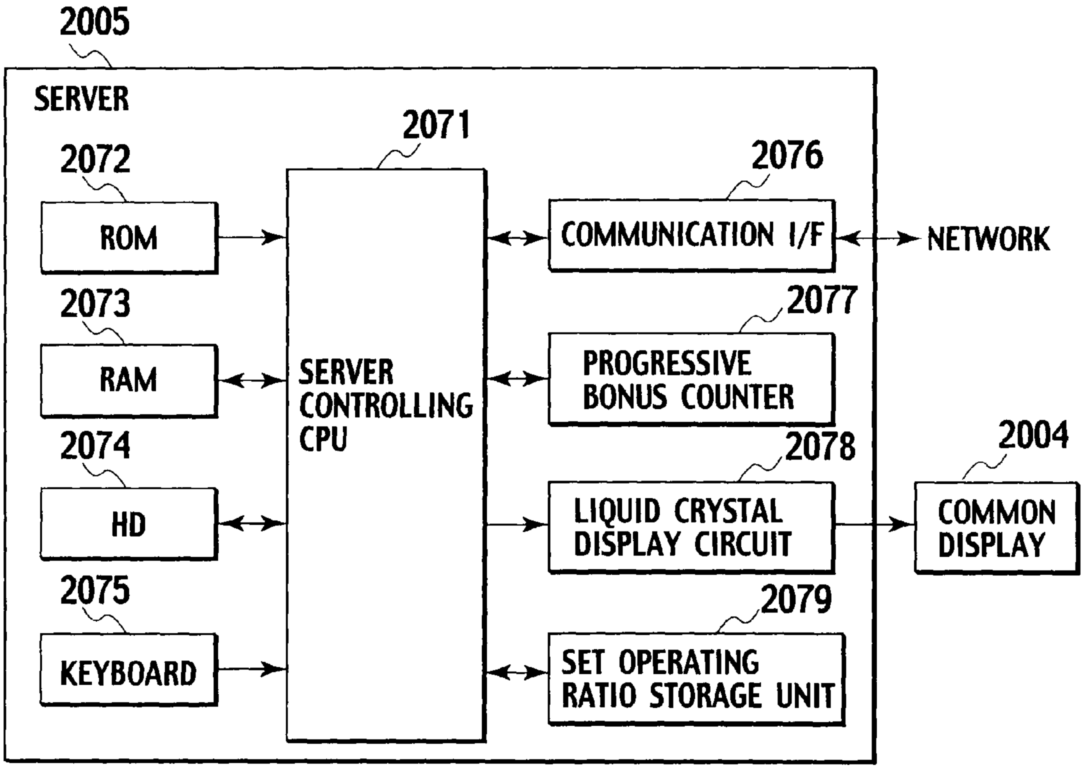
FIG. 62 is a block diagram showing an internal configuration of a server for use in the gaming system according to the further embodiment.

As shown in FIG. 62, the server 2005 includes: a server controlling CPU 2071 that comprehensively controls the slot game; a ROM 2072; a RAM 2073; a hard disk 2074 in which a variety of data such as image data displayed on the common display 2004 and a program are stored; a keyboard 2075 that receives an operation input of the administrator; a communication I/F 2076 that communicates with the respective slot machines 2010 (2010*a* to 2010*e*) through the network; the progressive bonus counter 2077 that accumulates and stores the count values of the progressive bonuses; and a liquid crystal driving circuit 2078 that performs a display control for the common display 2004; and a set operating ratio storage unit 2079 that stores the set operating ratio for use in determining an event game qualification to be described later. Note that the set operating ratio storage unit 2079 may also be provided in the RAM 2073.

The RAM 2073 is one to store a variety of data regarding the control performed by the server controlling CPU 2071, and stores the predetermined value Nmax of the accumulated count value N when the value Nmax is decided. Specifically, the predetermined value Nmax of the accumulated count value N can be appropriately changed in such a manner that the administrator operates the keyboard 2075, as an input unit, and the set predetermined value Nmax is stored in the RAM 2073. Moreover, the players of the respective slot machines 2010 are not usually notified of the set predetermined value Nmax and the accumulated count value N of the progressive bonuses.

Figure 63:
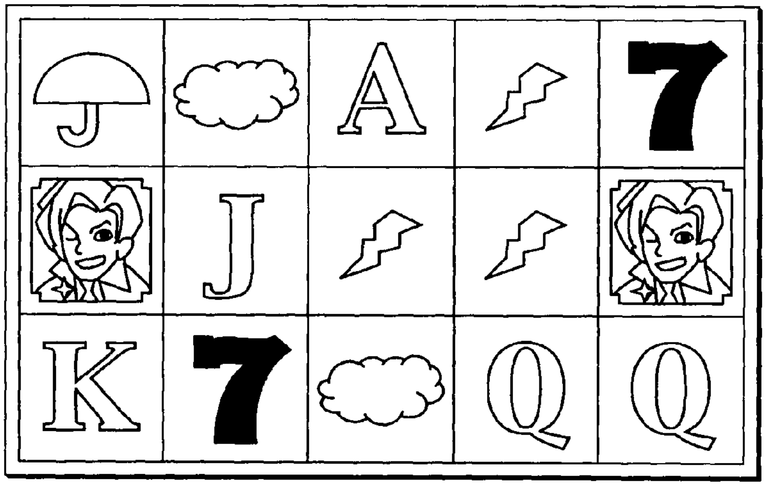
FIG. 63 is an explanatory view of symbols displayed on a display of the slot machine according to the further embodiment.

Next, a description will be made of the provision of the slot game executed by each of the slot machines 2010 (2010*a* to 2010*e*) with reference to FIG. 63 and FIG. 64. FIG. 63 is an explanatory view showing an example of the symbols displayed on the totally 15 areas with the matrix of three rows and five columns, which are set on the display 2016. As shown in FIG. 63, symbols of "A", "K", "Q", "J", "7" and the like are displayed on the respective display areas. Then, a provision amount is decided in response to the number of the variety of symbols displayed on the 15 display areas.

Specifically, as shown in FIG. 64, in the case where three symbols of "7" have appeared, provision of 30 medals is generated with respect to one bet. In the case where four symbols of "7" have appeared, provision of 60 medals is generated. In the case where five symbols of "7" have appeared, such an appearance becomes a bonus trigger, and the bonus game is executed. Details of the bonus game will be described later.

In a similar way, provision of 20 medals is generated in the case where three symbols of "A" have appeared, provision of 40 medals is generated in the case where four symbols of "A" have appeared, and provision of 60 medals is generated in the case where five symbols of "A" have appeared.

Next, a description will be made of execution processing for the slot game executed by the respective slot machines 2010 (2010*a* to 2010*e*) of the gaming system 2001 according to the seventh embodiment with reference to a flowchart shown in FIG. 65. Since the execution processing for the slot games by the respective slot machines 2010 (2010*a* to 2010*e*) is similar thereamong, a description will be made of the execution processing for the slot game in the one slot machine 2010.

The controller 2040 shown in FIG. 61 first determines whether or not to have received an event game execution command from the server 2005 (Step S2031). Then, in the case of having received the event game execution command (YES in Step S2031), the controller 2040 shifts the processing to the event game execution processing (Step S2045). Details of the event game execution processing will be described later.

Meanwhile, in the case of not having received the event game execution command (NO in Step S2031), the controller 2040 determines whether a bonus flag B1 set in the RAM 2110 is "0" or "1" (Step S2032). In the case where the bonus flag B1 is "1", the controller 2040 shifts the processing to bonus game execution processing (Step S2046). Details of the bonus game execution processing will be described later. Note that the bonus flag B1 is initially In the case where the bonus flag B1 is "0", the controller 2040 receives a betting operation performed by the player (Step S2033). Specifically, the controller 2040 receives the betting operation performed in such a manner that the medals are inserted from the medal insertion slot 2021, or that any of the MAX BET switch 2024, the BET switch 2025 and the SPIN/REPEAT BET switch 2026 is pressed.

Then, in the case where the betting operation is received (YES in Step S2034), the controller 2040 performs subtraction processing for the credits. Specifically, the controller 2040 performs processing for subtracting the number of bet credits from the number of current credits (Step S2035).

The controller 2040 transmits a predetermined ratio (for example, 2%) of the number of medals bet as a count value of progressive bonuses to the server 2005. At this time, the server 2005 accumulates the transmitted count value of the progressive bonuses to the progressive bonus counter 2077 (Step S2036). Here, the ratio of the number of medals bet to be collected as the count value of the progressive bonuses from the made bets can be changed in setting, for example, in such a manner that the administrator operates the keyboard 2075 as an input unit. The ratio thus set is stored in the RAM 2073.

The controller 2040 determines whether or not the START switch 2027 is switched on (Step S2037). Then, in the case where the START switch 2027 is switched on (YES in Step S2037), the controller 2040 scrolls the 15 symbols displayed on the display 2016 (Step S2038).

The controller 2040 determines whether or not a predetermined time (for example, five seconds) has elapsed since the scroll of the symbols was started (Step S2039), and stops the symbols (Step S2040) when the predetermined time has elapsed (YES in Step S2039).

Based on the stopped 15 symbols, the controller 2040 determines whether or not the bonus trigger is established (Step S2041). Specifically, as shown in FIG. 64, the controller 2040 determines whether or not five symbols of "7" appear, and sets the bonus flag B1 at "1" (Step S2042) in the case where the five symbols of "7" appear (YES in Step S2041). Thereafter, the controller 2040 ends this processing.

Meanwhile, in the case where the bonus trigger is not established, that is, in the case where the five symbols of "7" do not appear (NO in Step S2041), the controller 2040 determines whether or not a winning is established by the stopped 15 symbols. Specifically, the controller 2040 determines whether or not any of the winnings shown in the provision table of FIG. 64 is established (Step S2043). Then, in the case where the winning is established (YES in Step S2043), the controller 2040 performs the provision processing (Step S2044). Specifically, the controller 2040 provides the medals of which number is based on the provision table. Note that, in Step S2043, the controller 2040 also determines whether or not to have received a mystery bonus generation command to be described later. In the case of having received the mystery bonus generation command (YES in Step S2043), the controller 2040 performs provision processing for a mystery bonus (Step S2044).

Meanwhile, in the case where the winning is not established (NO in Step S2043), the controller 2040 ends this processing without performing the provision processing.

As described above, when the slot game is executed, a part (for example, 2%) of the made bet is accumulated as the count value of the progressive bonuses in the progressive bonus counter 2077 provided in the server 2005. Moreover, in the case where the bonus flag B1 has become "1", the bonus game is executed.

Next, a description will be made of a control flow of the server 2005 with reference to a flowchart shown in FIG. 66.

First, the server controlling CPU 2071 determines whether or not the accumulated count value N of the progressive bonus counter 2077 has reached the predetermined value Nmax (Step S2051). In the case where the accumulated count value N of the progressive bonus counter 2077 has reached the predetermined value Nmax (YES in Step S2051), the server controlling CPU 2071 monitors a behavior of each of the slot machines 2010 which is used as an information for determining whether or not the slot game is executed therein (Step S2052). For example, the server controlling CPU 2071 monitors whether or not it is a point of time within a predetermined time after the START switch 2027 was pressed.

Subsequently, in order to calculate the operating ratio of each of the slot machines 2010, the server controlling CPU 2071 reads an up-to-date history stored in the operating history storage unit 2130 of each slot machine 2010 (Step S2053). Then, the server controlling CPU 2071 determines the slot machine 2010 that currently executes the slot game and operates at the set operating ratio stored in the set operating ratio storage unit 2079 or more (Step S2053). Note that, with regard to the determination as to whether or not the slot machine 2010 is under operation, in the case where it is the point of time within the predetermined time after the START switch 2027 was pressed, it is determined that the player is executing the slot game in this slot machine, and in the case where the time longer than the predetermined time has elapsed since the START switch 2027 was pressed, it is determined that the player is not executing the slot game in this slot machine.

In this example, the operating ratio of the slot machine 2010 is defined by the number of games in the slot machine concerned during a period until the accumulated count value N reached the above-described predetermined value Nmax from zero.

Note that the operating ratio of the slot machine may be the number of games in the slot machine concerned during a preset set period (for example, 1 hour) going back from the point of time when the accumulated count value N reached the predetermined value Nmax. Moreover, the operating ratio of the slot machine may be a ratio of an operating time of the slot machine during the following period with respect to the period concerned until the accumulated count value N of the progressive bonus counter 2077 reached the predetermined value Nmax from zero. Furthermore, the operating ratio of the slot machine may be a ratio of an operating time of the slot machine during the following set period with respect to the set period (for example, 1 hour) concerned going back from the point of time when the accumulated count value N reached the predetermined value Nmax. Note that, in calculating the operating time, in the case where the predetermined time or more (for example, 1 minute or more) has elapsed since the START switch 2027 was pressed, the operating time is calculated while defining, as a stopped time, a time since the START switch 2027 was pressed the last time until the START switch 2027 is pressed the next time.

Then, the server controlling CPU 2071 determines whether or not two or more of the slot machines exist, which are under operation, in which the operating ratios are the set operating ratio or more (Step S2055). In the case where the two or more of slot machines exist (YES in Step S2055), the server controlling CPU 2071 transmits the event game execution command to the two or more of slot machines 2010 (Step S2057). A processing procedure of each of the slot machines 2010 which have received the event game execution command will be described later while referring to FIG. 67.

Next, the server controlling CPU 2071 receives a result of the event game concerned from each of the slot machines 2010 which participated in the event game (Step S2059). Then, based on the received result, the server controlling CPU 2071 determines a rank of each of the slot machines 2010, and decides the slot machine 2010 that has won the award. In this example, only the slot machine 2010 ranked in the first rank is decided to win the award.

Then, the server controlling CPU 2071 transmits a progressive bonus generation command to the one slot machine 2010 that has won the award (Step S2060). Note that, in the slot machine 2010 that has received the progressive bonus generation command, the award corresponding to a part or entirety of the accumulated count value N of the progressive bonus counter 2077 will be generated. Next, the server controlling CPU 2071 resets, to zero, the accumulated count value N of the progressive bonus counter 2077 (Step S2061), and then ends this processing.

Meanwhile, in the case of having determined that the slot machines, which are under operation, in which the operating ratios are the set operating ratio or more, are less than two (NO in Step S2055), the server controlling CPU 2071 proceeds to Step S2062. In Step S2062, the server controlling CPU 2071 determines whether or not the slot machines 2010, which are under operation, in which the operating ratios are the set operating ratio or more, are one. In the case of having determined that the slot machines 2010 are one (YES in Step S2062), the server controlling CPU 2071 transmits the mystery bonus generation command to the one slot machine 2010 concerned (Step S2063), resets, to zero, the accumulated count value N of the progressive bonus counter 2077 (Step S2061), and then ends this processing. Note that, in the slot machine 2010 that has received the mystery bonus generation command, the winning is established regardless of the combination of the stopped symbols when the slot game is executed, and the award corresponding to a part or entirety of the accumulated count value N of the progressive bonus counter 2077 is generated.

Moreover, in the case of having determined that the slot machines 2010, which are under operation, in which the operating ratios are the set operating ratio or more, are none (NO in Step S2062), the server controlling CPU 2071 does not generate the progressive bonus or the mystery bonus for any of the slot machines 2010, resets, to zero, the accumulated count value N of the progressive bonus counter 2077 (Step S2061), and then ends this processing.

As described above, in the case where the accumulated count value N of the progressive bonus counter 2077 has reached the target accumulated value Nmax, the server controlling CPU 2071 determines whether or not the two or more of slot machines 2010 exist, which are under operation, in which the operating ratios are the set operating ratio or more. In the case of having determined that the two or more of slot machines 2010 concerned exist, the server controlling CPU 2071 allows the two or more of slot machines 2010 concerned to execute the event game. Specifically, the server controlling CPU 2071 is adapted not to give the event game qualification to the slot machine 2010 in which a contribution margin to the accumulation of the accumulated count value N of the progressive bonus counter 2077 is low.

Therefore, the accumulated count value N can be prevented from being intercepted by a player of the slot machine 2010 that has started the game immediately before the accumulated count value N concerned has reached the predetermined value Nmax.

Figure 67:
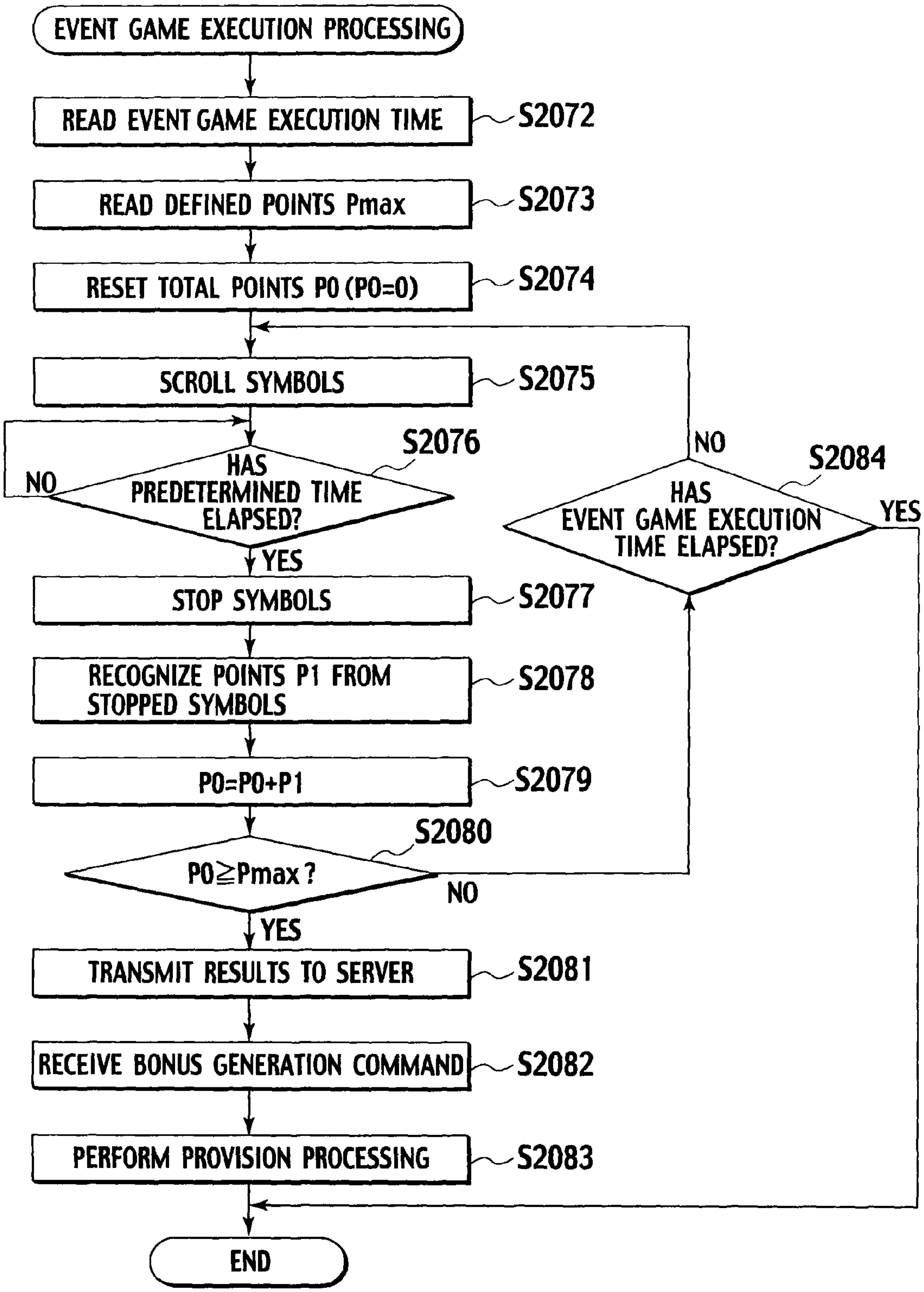
FIG. 67 is a flowchart showing event game execution processing according to the seventh embodiment.

Next, a description will be made of the event game execution processing of each of the slot machines 2010 with reference to FIG. 67.

Figure 65:
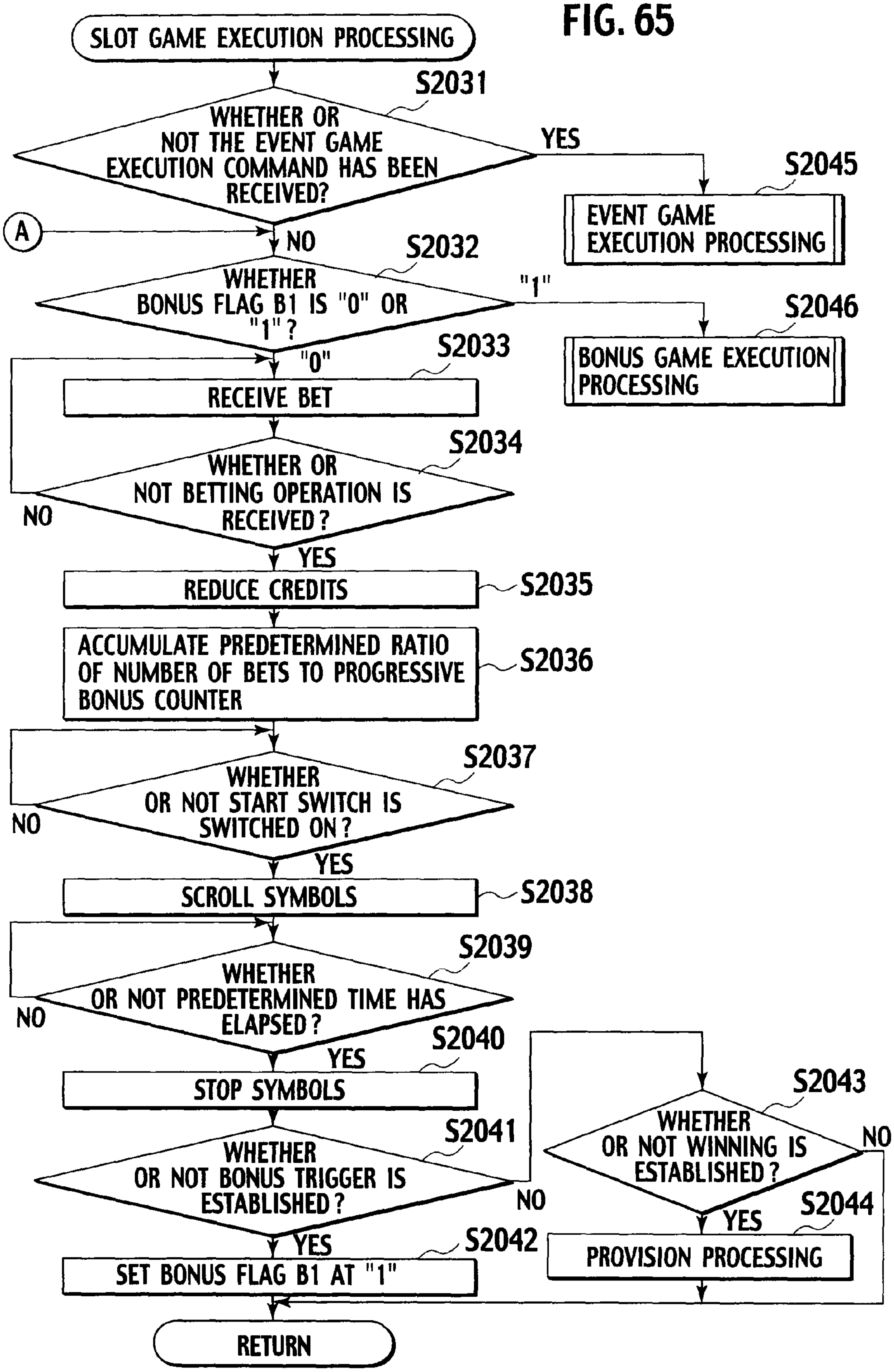
FIG. 65 is a flowchart showing slot game execution processing according to a seventh embodiment.

First, the controller 2040 of the slot machine 2010 that has received the event game execution command in Step S2031 of FIG. 65 (Step S2031) and has started the event game execution processing reads an execution time of the event game from the RAM 2073 of the server 2005, and sets the execution time in the slot machine 2010 (Step S2072). The execution time of the event game is randomly selected from a plurality of times (for example, 3 minutes, 5 minutes, 7 minutes and 10 minutes). Moreover, the execution time may be always set at the same time (for example, 5 minutes).

Next, the controller 2040 reads the defined number of points Pmax for the event game from the RAM 2073 of the server 2005, and sets the defined number of points Pmax in the slot machine 2010 (Step S2073). The defined number of points Pmax is the number of points, which is necessary to win the event game.

Moreover, the controller 2040 resets the total number of points P0, and starts the event game so that the slot machines which participate in the event game synchronize with one another (Step S2074). Note that the total number of points P0 is a total value of the points generated by executing the event game, and details of the total umber of points P0 will be described later.

Next, when the START switch 2027 is pressed by the player without the bet being collected, the controller 2040 scrolls the symbols on the display 2016 (Step S2075), and stops the symbols (Step S2077) after a predetermined time has elapsed (YES in Step S2076). Specifically, the event game is adapted to advance without collecting the medals or the credits, and in the event game, the medals or the credits are not lost.

In the event game, the symbols which appear therein differ from those in the usual slot game, and five sorts of symbols, which are "BLUE 7", "RED 7", "3 BAR", "2 BAR" and "1 BAR", will appear as shown in FIG. 69. Then, the points to be generated are decided by the symbols stopped on a centerline L1 (refer to FIG. 70A, 14B, 14C). Specifically, as shown in FIG. 69, the points become 300 points when the "BLUE 7" is stopped on the centerline L1, become 150 points when the "RED 7" is stopped thereon, become 30 points when the "3 BAR" is stopped thereon, become 20 points when the "2 BAR" is stopped thereon, become 10 points when the "1 BAR" is stopped thereon, and become 0 point when any of the symbols is not stopped thereon.

Figure 70A:
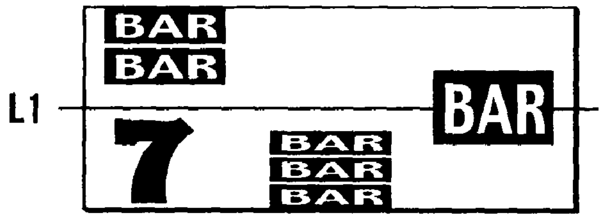
FIGS. 70A, 70B and 70C are display examples of the event game according to the further embodiment.
Figure 70B:
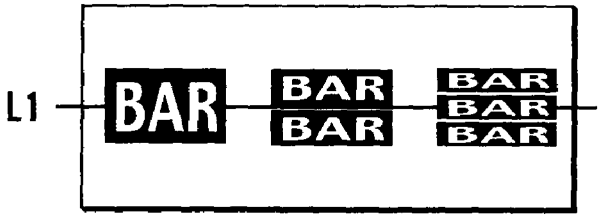
Figure 70C:
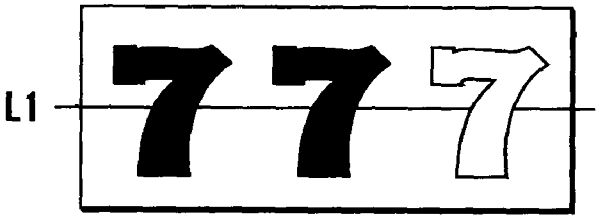

The controller 2040 recognizes points P1 from the stopped symbols (Step S2078). For example, as shown in FIG. 70A, when the symbols are stopped in a pattern of "None, None, 1 BAR", the points P1 become 10 points. As shown in FIG. 70B, when the symbols are stopped in a pattern of "1 BAR-2 BAR-3 BAR", the points P1 become 60 points. As shown in FIG. 70C, when the symbols are stopped in a pattern of "RED 7-RED 7-BLUE 7", the points P1 become 600 points.

Figure 71:
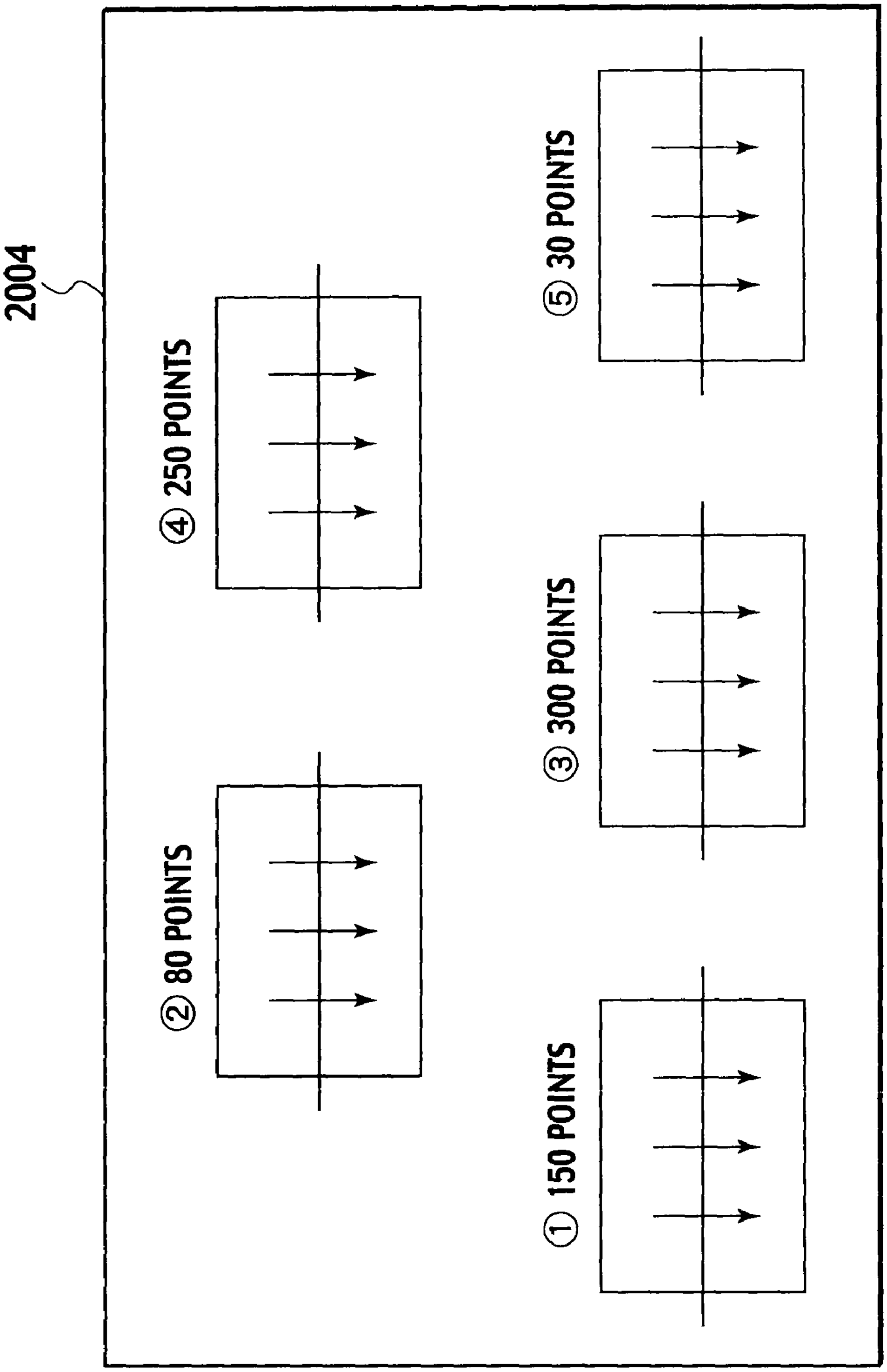
FIG. 71 is a display example of a common display according to the seventh embodiment.

The controller 2040 adds the recognized points P1 to the total number of points P0 (Step S2079). In this case, the server controlling CPU 2071 of the server 2005 displays, on the common display 2004, the symbols and total points of the respective slot machines 2010 which are participating in the event game, and notifies the players of respective slot machines 2010 of the symbols and the total points. For example, as shown in FIG. 71, images of "No. 1, 150 points", "No. 2, 80 points", "No. 3, 300 points", "No. 4, 250 points" and "No. 5, 30 points" are displayed on the common display 2004. Note that Nos. 1 to 5 correspond to the slot machines 202010*a* to 2010*e*. Hence, the players of the respective slot machines 2010 can recognize their current ranks by seeing the number of points, which is displayed on the common display 2004.

Thereafter, the controller 2040 of each of the slot machines 2010 determines whether or not the total number of points P0 has reached the defined number of points Pmax (for example, "8000 points") set by the processing of Step S2073 (Step S2080). Then, in the case where the total number of points P0 has not reached the defined number of points Pmax (NO in Step S2080), the controller 2040 determines whether or not the execution time of the event game has elapsed (Step S2083), and returns to the processing of Step S2075 in the case where the execution time of the event game has not elapsed (NO in Step S2083).

Meanwhile, in the case where the execution time of the event game has elapsed (YES in Step S2083), the controller 2040 ends the event game execution processing.

Moreover, in the case where the total number of points P0 has reached the defined number of points Pmax in the processing of Step S2080 (YES in Step S2080), the controller 2040 transmits a message that the total number of points P0 has reached the defined number of points Pmax to the server controlling CPU 2071 (Step S2081).

Figure 66:
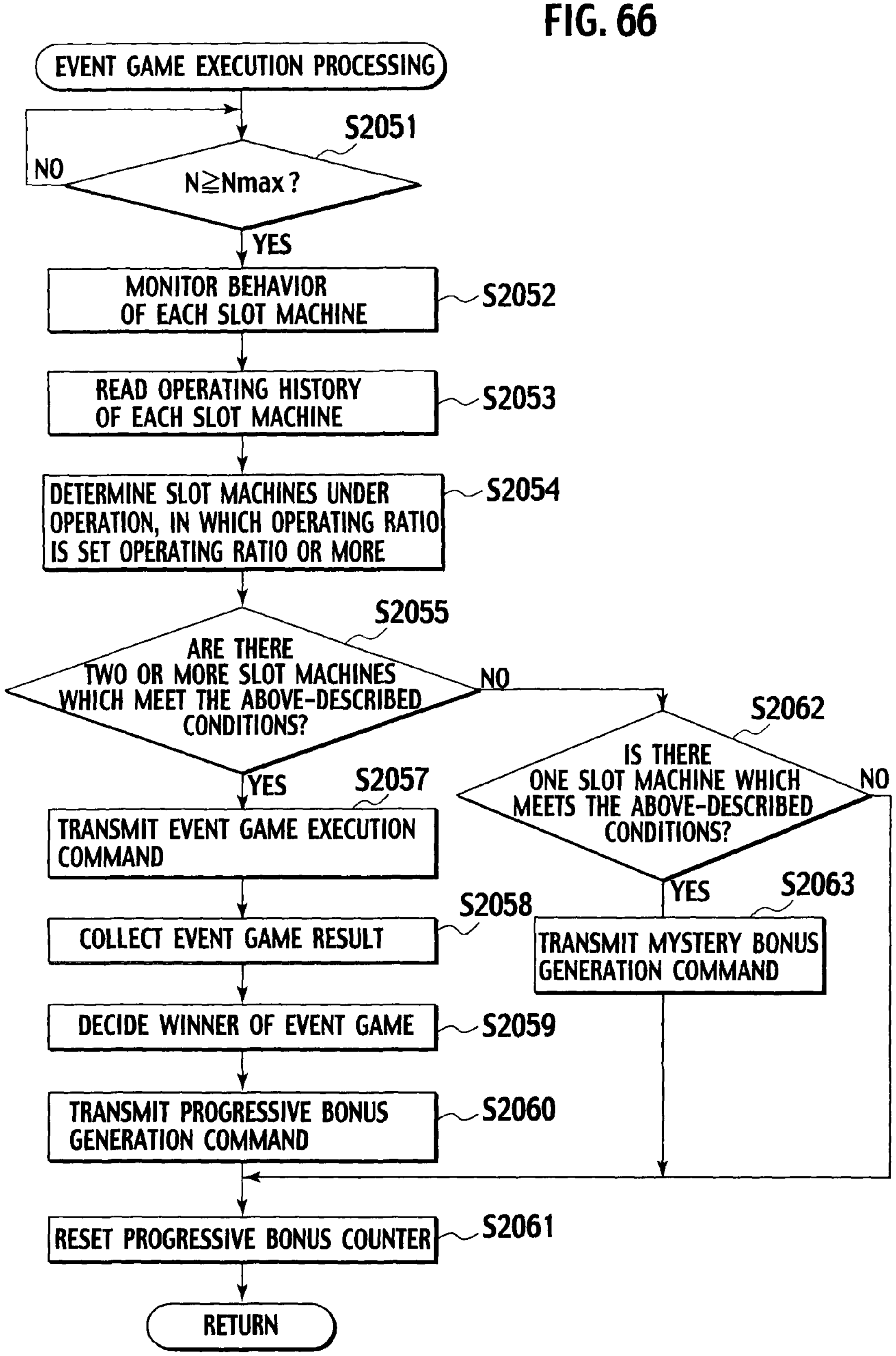
FIG. 66 is a flowchart showing processing flow of server according to the seventh embodiment.

The server controlling CPU 2071 sequentially receives such messages, each of which tells that the total number of points P0 has reached the defined number of points Pmax, from the respective slot machines 2010 which participate in the event game (Step S2058 of FIG. 66), decides the ranks for the slot machines 2010 in a sequence where the total number of points P0 has reached the defined number of points Pmax earlier, and decides a winner (the winning slot machine 2010) (Step S2059 of FIG. 66). Then, the server controlling CPU 2071 transmits the progressive bonus generation command to the winning slot machine 2010 (Step S2060 of FIG. 66). Upon receiving the progressive bonus generation command (Step S2082), the controller 2040 provides the credits or the medals, which correspond to a part or entirety of the accumulated count value N accumulated in the progressive bonus counter 2077 (Step S2083). For example, in the case where the accumulated count value N is $100, credits or medals, which are equivalent to $100, will be provided.

Figure 72:
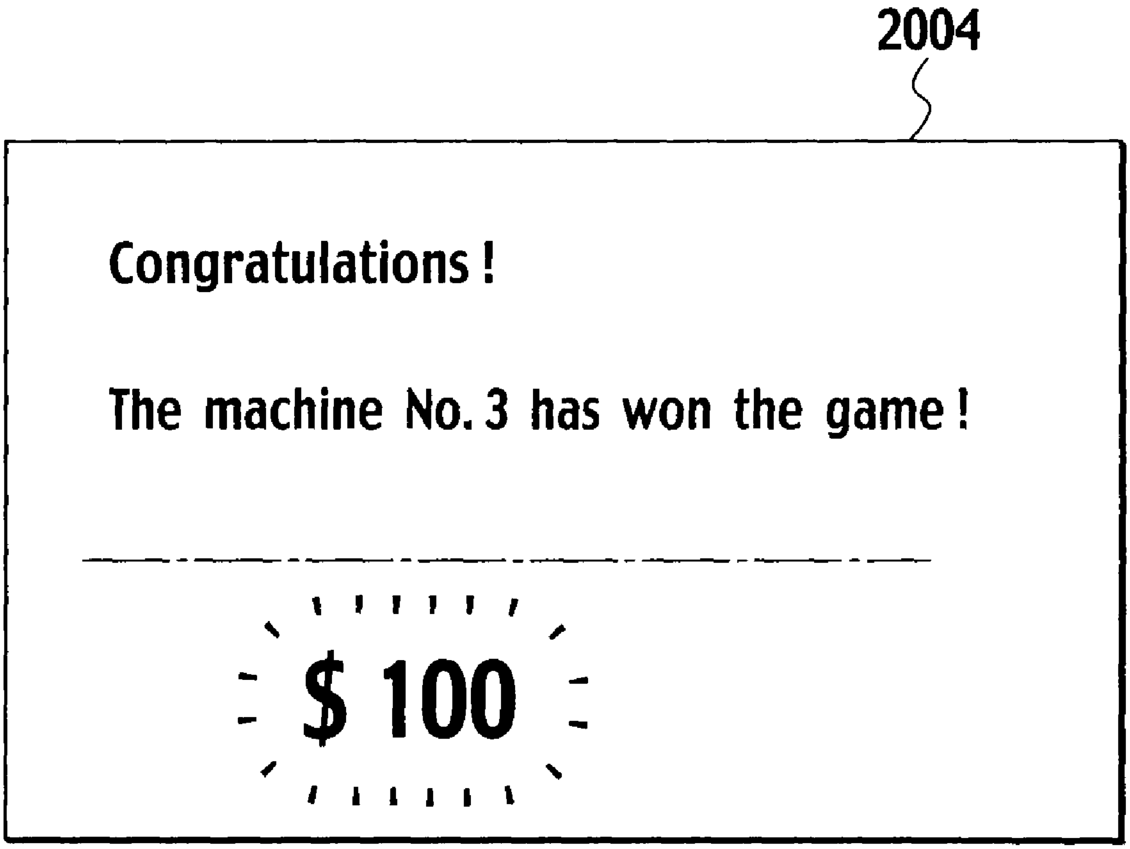
FIG. 72 is a display example of a common display according to the seventh embodiment.

At this time, for example, in the case where the player "No. 3" has won the event game, as shown in FIG. 72, the server controlling CPU 2071 displays, on the common display 2004, sentences saying "Congratulations! The machine No. 3 has won the game!", and letters of "$100" as an amount to be provided.

In such a way, the event game is executed. Moreover, in the event game, the progressive bonus is provided only to the slot machine 2010 in which the total number of points P0 has reached the defined number of points Pmax earliest among the plurality of slot machines 2010, and accordingly, the players can be interested in the matter that the event game takes place.

At this time, the event game qualifications are given only to the slot machines 2010, which are under operation, in which the operating ratios are the set operating ratio or more, when the accumulated count value N of the progressive bonus counter 2077 has reached the predetermined value Nmax. Accordingly, the accumulated count value N concerned can be prevented from being intercepted by the player of the slot machine 2010 that does not contribute very much to the accumulation to the accumulated count value N.

Moreover, in the case where the slot machines 2010, which are under operation, in which the operating ratios are the set operating ratio or more, are only one when the accumulated count value N of the progressive bonus counter 2077 has reached the predetermined value Nmax, the mystery bonus is generated. Accordingly, the loss can be returned to the player who has contributed much to the accumulation of the accumulated count value N.

Figure 68:
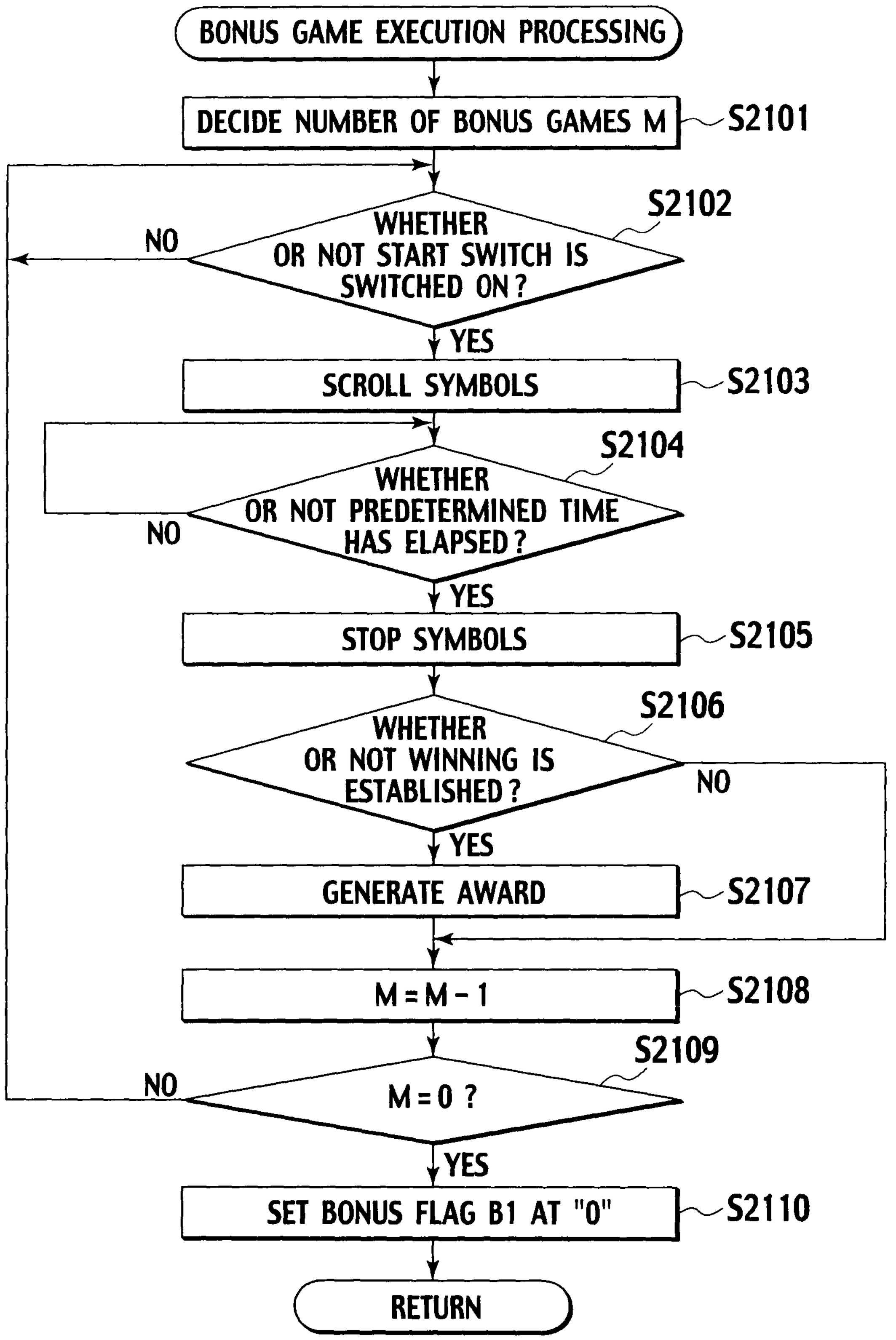
FIG. 68 is a flowchart showing bonus game execution processing according to the seventh embodiment.

Next, a description will be made of the bonus game execution processing shown in Step S2046 of FIG. 65 with reference to FIG. 68.

First, the controller 2040 decides the number of bonus games M (Step S2101). The number of bonus games M is randomly set, for example, from among 10 games, 20 games, 30 games and 50 games. Moreover, the number of bonus games M may be always set at the same number (for example, 30 games).

The controller 2040 determines whether or not the START switch 2027 is pressed (Step S2102). Then, in the case where the START switch 2027 is pressed (YES in Step S2102), the controller 2040 starts to scroll the symbols on the display 2016 (Step S2103).

Thereafter, the controller 2040 determines whether or not a predetermined time has elapsed (Step S2104), and stops the symbols (Step S2105) in the case where the predetermined time has elapsed (YES in Step S2104). As a result, for example as shown in FIG. 63, the variety of symbols are stopped on the respective 15 display areas.

The controller 2040 determines whether or not the winning is established based on the symbols stopped on the respective display areas (Step S2106). Then, in the case where the winning is established, that is, in the case where the symbols defined in the provision table of FIG. 64 have appeared (YES in Step S2106), the controller 2040 generates the award (Step S2107).

Thereafter, the controller 2040 reduces the number of bonus games M. Specifically, the controller 2040 makes such a reduction as: M=M−1 (Step S2108).

The controller 2040 determines whether or not the number of bonus games M is equal to 0 (Step S2109). In the case where M is not equal to 0, that is, in the case where all of the bonus games of which number of times is set at M are not ended (NO in Step S2109), the controller 2040 returns to the processing of Step S2102. Meanwhile, in the case where M is equal to 0 (YES in Step S2109), the controller 2040 sets the bonus flag B1 at "0", and ends the bonus game execution processing.

In such a way, the bonus games of which number of times is M are executed in the case where the bonus trigger is established in the usual game. In this bonus game, the betting is unnecessary, and accordingly, the medals or the credits are not lost, and it can be expected that a large amount of provision will be obtained.

As described above, in the gaming system 2001 according to the seventh embodiment, a part of the bets is accumulated as the count value of the progressive bonus at the time when the usual game is being executed. In the case where the accumulated count value N has reached the predetermined value Nmax, the event game in which the plurality of slot machines 2010 participate is executed. Then, the progressive bonus is provided to the slot machine 2010 that has won the event game. Hence, the player can be allowed to be interested in the matter that the event game will be started.

Moreover, the event game qualifications are given only to the slot machines 2010, which are under operation, in which the operating ratios are the set operating ratio or more, when the accumulated count value N of the progressive bonus counter 2077 has reached the predetermined value Nmax. Accordingly, the accumulated count value N can be prevented from being intercepted by the player of the slot machine 2010 in which the contribution margin to the accumulation of the accumulated count value N is low.

Furthermore, in the case where the slot machines 2010, which are under operation, in which the operating ratios are the set operating ratio or more, are only one when the accumulated count value N of the progressive bonus counter 2077 has reached the predetermined value Nmax, the mystery bonus is generated. Accordingly, the loss can be returned to the player who has contributed much to the accumulation of the accumulated count value N.

In particular, in order to prevent the accumulated count value N from being intercepted by the player who has started to play the game immediately before the accumulated count value N has reached the predetermined value Nmax, the operating ratio just needs to be defined as the ratio of the operating time of the slot machine during the following period with respect to the period concerned until the accumulated count value N of the progressive bonus counter 2077 reached the predetermined value Nmax from zero, or alternatively, as the ratio of the operating time of the slot machine during the following set period with respect to the set period (for example, 1 hour) concerned going back from the point of time when the accumulated count value N reached the predetermined value Nmax, and the set operating ratio needs to be set at 100%.

Eighth Embodiment

Figure 73:
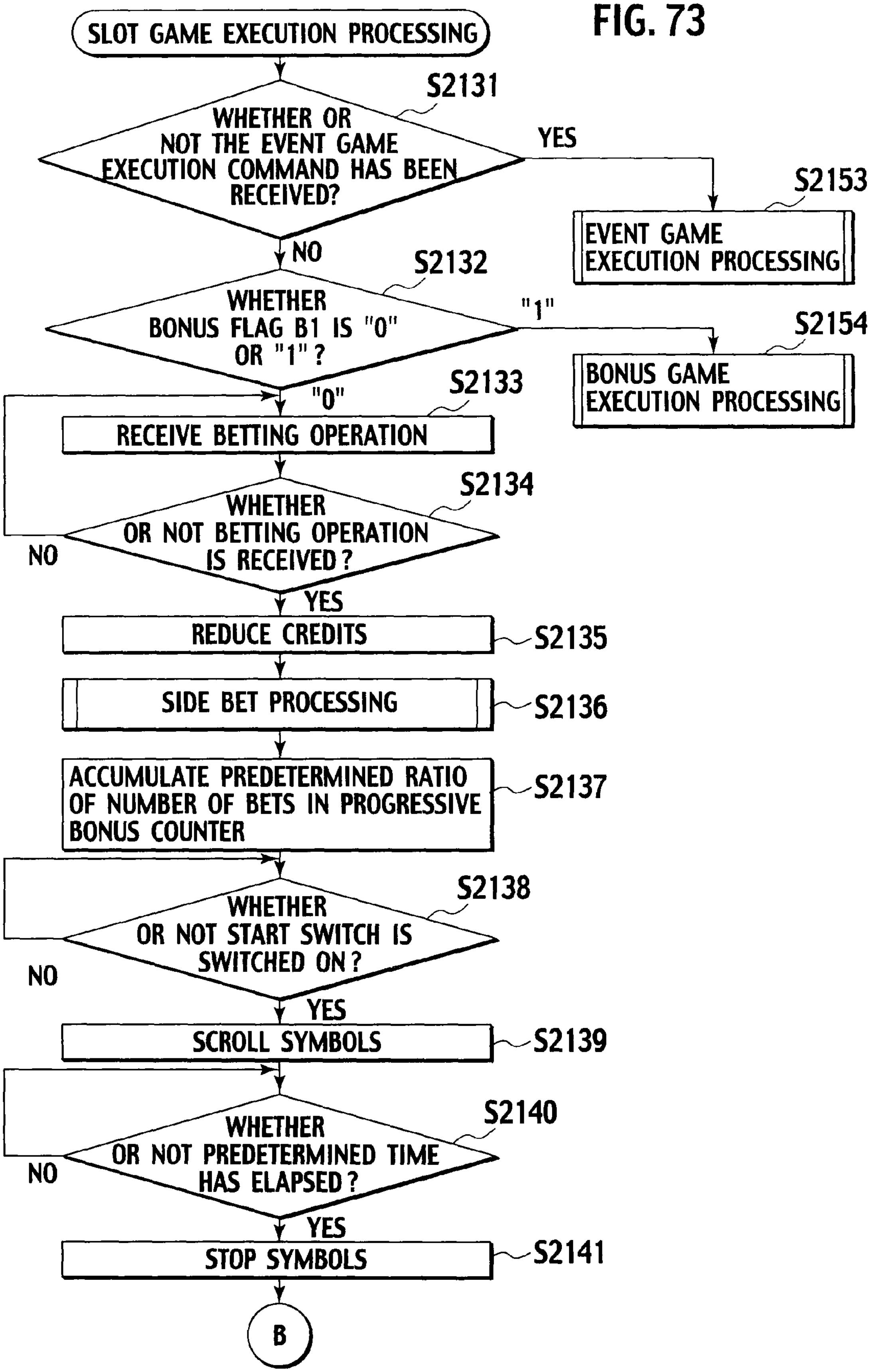
FIG. 73 is a flowchart showing slot game execution processing according to an eighth embodiment.
Figure 74:
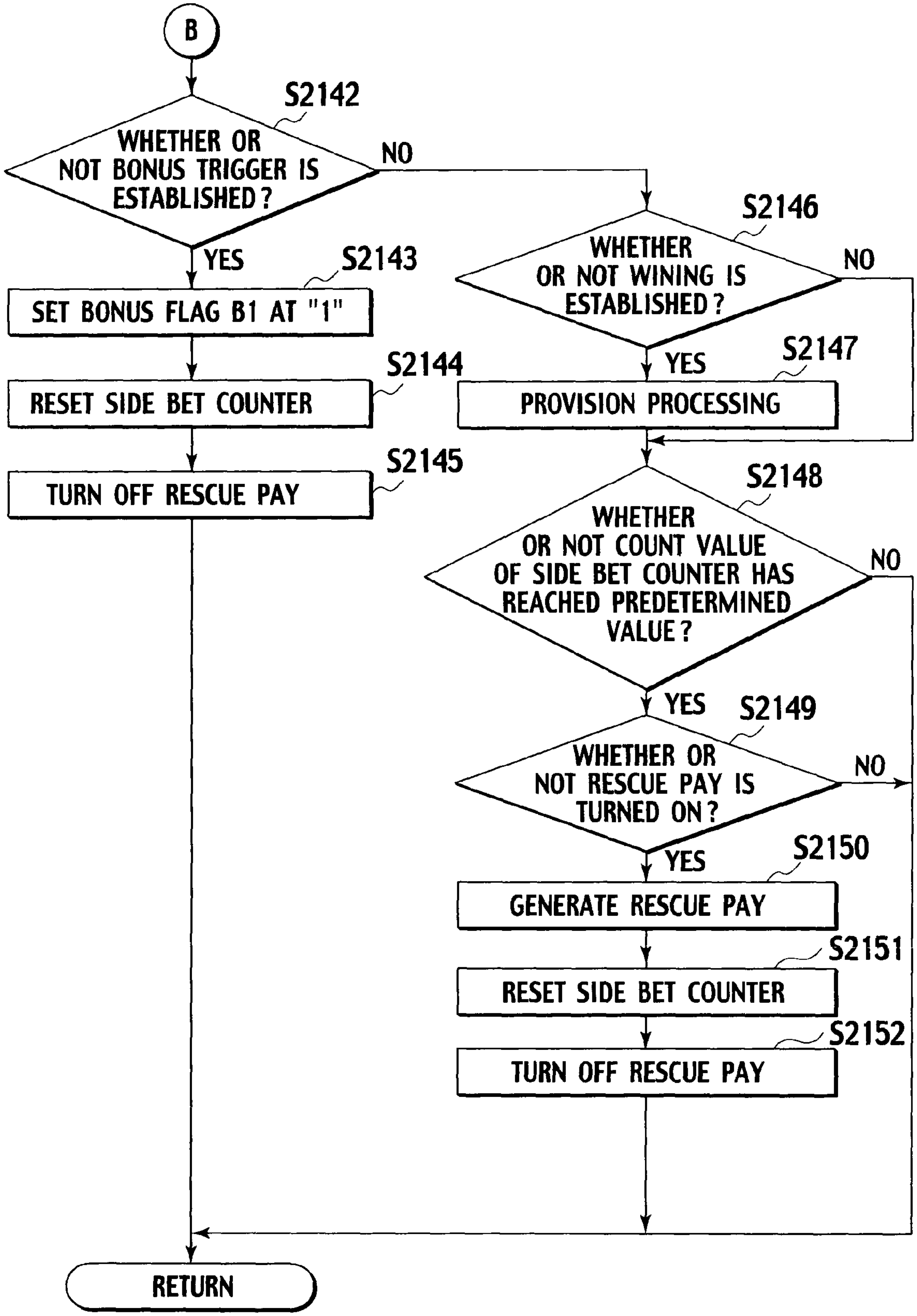
FIG. 74 is a flowchart showing slot game execution processing according to an eighth embodiment.

Next, a description will be made of an eighth embodiment of the gaming system 2001. FIGS. 73 and 74 are flowcharts showing slot game execution processing according to the eighth embodiment. The eighth embodiment is different from the seventh embodiment in that a function of rescue (insurance) is added to the processing of FIG. 65, which is described in the above-described seventh embodiment.

Specifically, in this eighth embodiment, the RESCUE SETTING switch 2028 (refer to FIG. 61) of the slot machine 2010 and the side bet counter 2128 of the controller 2040 thereof function (refer to FIG. 61).

The RESCUE SETTING switch 2028 is a switch for joining a rescue pay mode (an insurance pay mode). The rescue pay mode is a function to compensate for the losses of the player by generating a predetermined amount of provision when the player does not win a bonus trigger continuously for a predetermined number of games (for example, 1000 times) at the time of executing the slot games. In the betting at the time of the rescue pay mode, for example, one medal is collected with respect to betting of 10 medals, and at the time when the rescue pay is generated, for example, 2000 medals are provided. The player can determine by him/herself whether or not to join the rescue pay mode.

The side bet counter 2128 is a counter for counting the number of times that the slot game has been executed. The side bet counter 2128 starts to count the number of times on an occasion that the rescue pay mode is turned on, and resets a count value thereof in the case where the bonus game to be described later has been executed. Then, the rescue pay is generated when the count value has reached a predetermined value (for example, 1000). Note that it is also possible to set the side bet counter 2128 in the RAM 2110.

A description will be specifically made below of a processing flow.

First, the controller 2040 shown in FIG. 61 determines whether or not the accumulated count value N of the progressive bonus counter 2077 has reached the predetermined value Nmax (Step S2131). Then, in the case where the accumulated count value N has reached the predetermined value Nmax (YES in Step S2131), the controller 2040 shifts the processing to event game start processing (Step S2153). Details of the event game start processing are similar to those of the processing mentioned above with reference to FIG. 66, and accordingly, a description thereof will be omitted.

Meanwhile, in the case where the accumulated count value N has not reached the predetermined value Nmax, the controller 2040 determines whether the bonus flag B1 set in the RAM 2110 is "0" or "1" (Step S2132). In the case where the bonus flag B1 is "1", the controller 2040 shifts the processing to bonus game execution processing (Step S2154). Details of the bonus game execution processing are similar to those of the processing mentioned above with reference to FIG. 68, and accordingly, a description thereof will be omitted.

In the case where the bonus flag B1 is "0", the controller 2040 receives a betting operation performed by the player (Step S2133). Specifically, the controller 2040 receives the betting operation performed in such a manner that the medals are inserted from the medal insertion slot 2021, or that any of the MAX BET switch 2024, the BET switch 2025 and the SPIN/REPEAT BET switch 2026 is pressed.

Then, in the case where the betting operation is received (YES in Step S2134), the controller 2040 performs subtraction processing for the credits. Specifically, the controller 2040 performs processing for subtracting the number of bet credits from the number of current credits (Step S2135).

Subsequently, the controller 2040 executes side bet processing (Step S2136). The rescue pay mode is a function to receive a side bet different from the usual bet at the time when the slot game is being executed, and to generate a fixed amount of provision in order to compensate for the losses of the player in the case where the bonus trigger is not won continuously for the predetermined number of games. Moreover, it can be appropriately selected whether the rescue pay mode is to be turned on or off by switching on or off the above-described RESCUE SETTING switch 2028 according to a preference of the player.

Figure 75:
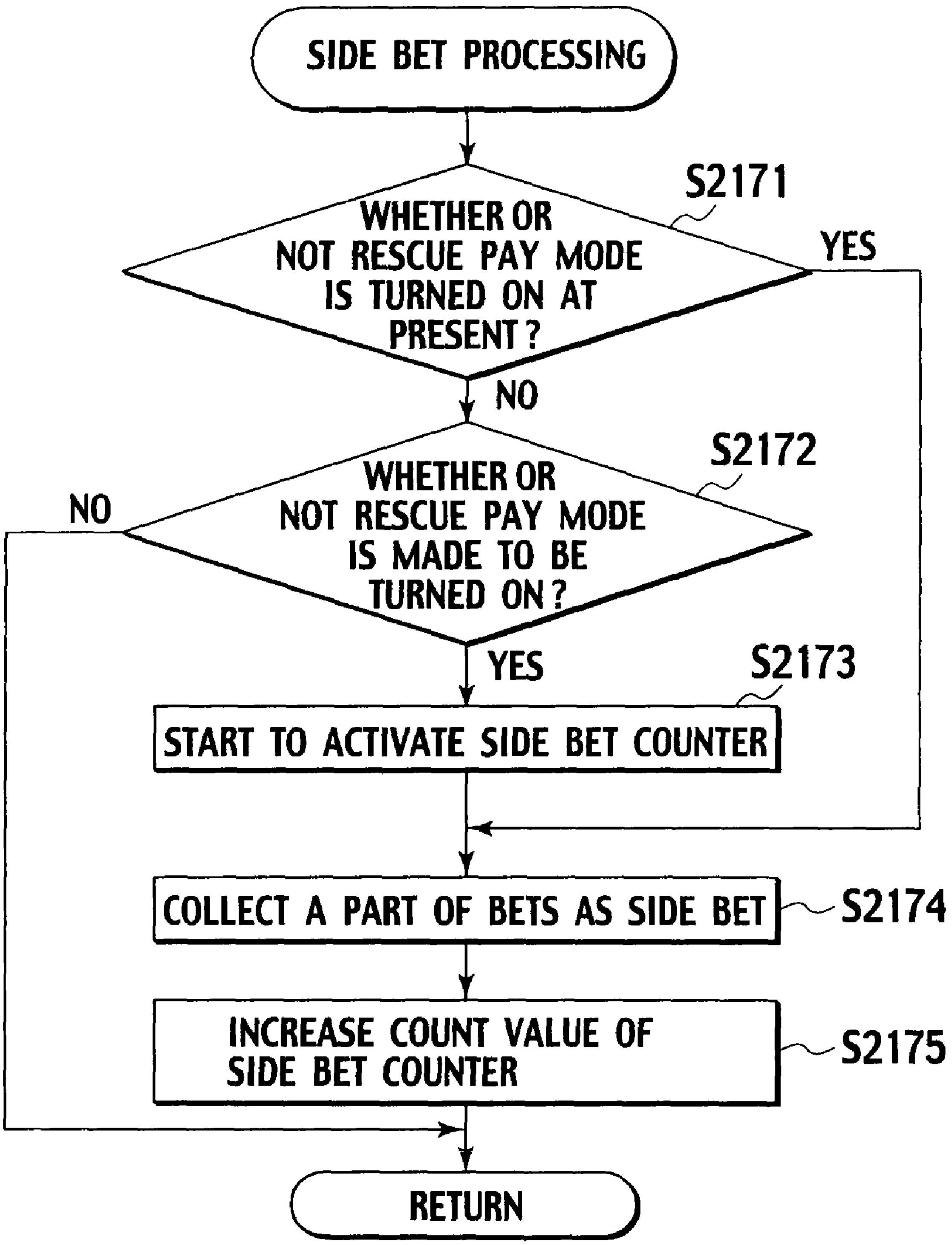
FIG. 75 is a flowchart showing the side bet processing according to the eighth embodiment.

Here, a description will be made of details of the side bet processing with reference to FIG. 75. The controller 2040 determines whether or not the rescue pay mode is currently turned on (Step S2171). In the case where the rescue pay mode is turned on (YES in Step S2171), the controller 2040 shifts the processing to Step S2174.

Figure 76:
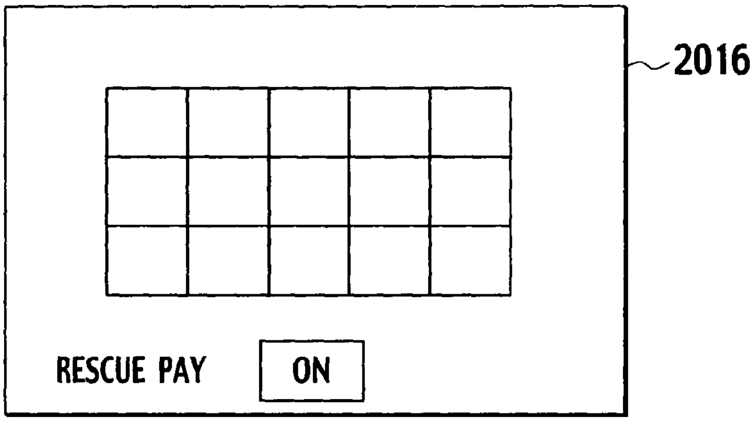
FIG. 76 is a display example of a display according to the eighth embodiment.

Meanwhile, in the case where the rescue pay mode is not turned on (NO in Step S2171), the controller 2040 determines whether or not the rescue pay mode is made to be turned on (Step S2172). Whether the rescue pay mode is made to be turned on or off can be set by the above-described RESCUE SETTING switch 2028. However, for example as shown in FIG. 76, the rescue pay mode can also be turned on in such a manner that an image showing "ON" of the rescue pay is displayed on a lower portion of the display 2016, and the player then touches this image of "ON" to allow the touch panel sensor 2020 to detect such a touching operation.

In the case where the rescue pay mode is not made to be turned on (NO in Step S2172), the controller 2040 maintains an off state of the rescue pay mode, and ends this processing.

Moreover, in the case where the rescue pay mode is made to be turned on (YES in Step S2172), the controller 2040 activates the side bet counter shown in FIG. 61 (Step S2173). Specifically, every time when one slot game is executed, the controller 2040 executes processing for increasing the count value by one.

The controller 2040 collects, as the side bet, a part of the bet made in the event of executing the game (Step S2174). For example, in the case where 10 medals are bet, the controller 2040 collects, as the side bet, one of the medals thus bet. In this case, the bets made on the slot game become equivalent to 9 medals.

Thereafter, the controller 2040 increases the count value of the side bet counter 2128 by one (Step S2175), and ends this processing.

Returning to FIG. 73, the controller 2040 transmits a predetermined ratio (for example, 2%) of the number of bets as the count value of the progressive bonus to the server 2005. The server 2005 accumulates the transmitted count value of the progressive bonus in the progressive bonus counter 2077 (Step S2137).

The controller 2040 determines whether or not the START switch 2027 is switched on (Step S2138). Then, in the case where the START switch 2027 is switched on (YES in Step S2138), the controller 2040 scrolls the 15 symbols displayed on the display 2016 (Step S2139).

The controller 2040 determines whether or not a predetermined time (for example, five seconds) has elapsed since the scroll of the symbols was started (Step S2140), and stops the symbols (Step S2141) when the predetermined time has elapsed (YES in Step S2140).

Based on the stopped 15 symbols, the controller 2040 determines whether or not the bonus trigger is established (Step S2142 of FIG. 74). Specifically, as shown in FIG. 64, the controller 2040 determines whether or not five symbols of "7" appear, and sets the bonus flag B1 at "1" (Step S2143) in the case where the five symbols of "7" appear (YES in Step S2142).

Subsequently, the controller 2040 resets the side bet counter 2128 (Step S2144). Moreover, the controller 2040 turns off the rescue pay mode (Step S2145). Specifically, in the case where the bonus trigger is established when the rescue pay mode is turned on and the side bet counter 2128 counts the number of execution times of the slot games, the controller 2040 resets the side bet counter 2128, and turns off the rescue pay mode. Thereafter, the controller 2040 ends this processing.

Meanwhile, in the case where the bonus trigger is not established, that is, in the case where the five symbols of "7" do not appear (NO in Step S2142), the controller 2040 determines whether or not a winning is established by the stopped 15 symbols. Specifically, the controller 2040 determines whether or not any of the winnings shown in the provision table of FIG. 64 is established (Step S2146). Then, in the case where the winning is established (YES in Step S2146), the controller 2040 performs the provision processing (Step S2147). Specifically, the controller 2040 provides the medals of which number is based on the provision table.

Meanwhile, in the case where the winning is not established (NO in Step S2147), and in the case where the provision processing is ended, the controller 2040 determines whether or not the count value of the side bet counter 2128 has reached the predetermined value (for example, "1000") (Step S2148). In the case where the count value has reached the predetermined value (YES in Step S2148), the controller 2040 determines whether on not the rescue pay mode is turned on at present (Step S2149), and in the case where the rescue pay mode is turned on (YES in Step S2149), the controller 2040 generates the rescue pay (Step S2150). Specifically, the controller 2040 generates the rescue pay for the player who is turning on the rescue pay mode and has not won the bonus trigger for a long period, thereby compensating for some losses thereto.

Thereafter, the controller 2040 resets the side bet counter 2128 (Step S2151), and further, turns off the rescue pay mode (Step S2152). Thereafter, the controller 2040 ends this processing.

As described above, in the gaming system 2001 according to the eighth embodiment, similar effects to those of the above-mentioned seventh embodiment can be achieved. Moreover, in the case where the rescue pay mode is turned on, the predetermined amount of the bets is collected as the side bet, and instead of this, the fixed number of medals are provided in the case where the bonus trigger is not established continuously for the predetermined number of times (for example, 1000 times). Hence, the losses of the player can be reduced.

The description has been made above of the embodiments. However, the embodiments merely illustrate specific examples, and do not particularly limit the present invention. It is possible to appropriately change designs of specific configurations of the respective means and the like. Moreover, the effects described in the embodiments merely list the most suitable effects generated from the present invention, and the effects by the present invention are not limited to those described in the embodiments.

For example, in the above-described seventh and eighth embodiments, the predetermined ratio of the bets made in each of the gaming terminals 10 is accumulated in the progressive bonus counter 2077; however, a predetermined ratio of the award obtained based on the result of the game in each of the gaming terminals 10 may be accumulated in the progressive bonus counter.

Moreover, in the above-described seventh and eighth embodiments, the winner of the event game is only the first rank; however, it is possible to set the number of winners at a plurality, for example, at upper three ranks and the like.

Furthermore, the description has been made of the seventh and eighth embodiments mentioned above by taking the slot game machines as examples; however, the present invention is also applicable to other gaming machines, for example, such as machines for a bingo game and a roulette game.

Moreover, in the detailed description mentioned above, characteristic portions have been mainly described so that the present invention can be understood more easily. The present invention is not limited to the embodiments described in the detailed description mentioned above, and can be applied to other embodiments, and an application range of the present invention is various. Furthermore, the terms and the idioms, which are used in this specification, are used for properly describing the present invention, and are not used for limiting the interpretation of the present invention. Furthermore, it is considered easy for those skilled in the art to contrive other configurations, systems, methods and the like, which are included in the concept of the present invention, from the concept of the invention described in this specification. Hence, the description of the scope of claims must be regarded as one including equilibrium configurations within the range without departing from the scope of the technical idea of the present invention. Moreover, the object of the abstract is to enable the patent offices, general public institutions, engineers who belong to this technical field and are not fully conversant in the patent and legal terms or the technical terms, and the like to rapidly determine the technical contents of this application and the essence thereof by a simple investigation. Hence, the abstract is not intended to limit the scope of the invention to be evaluated by the description of the scope of claims. Moreover, in order that the object of the present invention and the effects intrinsic to the present invention can be fully understood, it is desired that the present invention be interpreted in full consideration for the already disclosed documents and the like.

The above-mentioned detailed description includes the processing executed by a computer. The above description and expression are described for the purpose of allowing those skilled in the art to understand the present invention most efficiently. In this specification, the respective steps for use in deriving one result should be understood as processes in which no self-contradiction is inherent. Moreover, in the respective steps, electric or magnetic signals are transmitted/received, recorded, and so on. In the processes in the respective steps, such signals are expressed by bits, values, symbols, characters, terms, numeric characters, and the like; however, it is necessary to note that these are used since they are convenient for the description. Furthermore, in some case, the processes in the respective steps are described by expressions common to those for human actions; however, in principle, the processes described in this specification are executed by a variety of devices. Furthermore, other configurations required for performing the respective steps will be self-evident from the above-description.

The above-described seventh to eighth embodiments may contain the subject matter of a future divisional application or an invention that may be newly presented or introduced by future amendment. Examples are shown as follows.

(26) A control method of a gaming system including a plurality of gaming terminals, the control method comprising:

(a) processing, in each of the gaming terminals, for executing a game upon receiving a bet, and then generating an award based on a result of the game;

(b) processing for accumulating a part of the bet of each of the gaming terminals or a part of the award of each of the gaming terminals in a progressive bonus counter;

(c) processing for determining whether or not an accumulated count value of the progressive bonus counter has reached a predetermined value;

(d) processing for determining whether or not two or more of the gaming terminals exist, the gaming terminals being under operation, in which operating ratios are a set operating ratio or more, when it has been determined that the accumulated count value of the progressive bonus counter has reached the predetermined value; and (e) processing, in a case where the two or more of gaming terminals exist, the gaming terminals being under operation, in which the operating ratios are the set operating ratio or more, for issuing an execution command of an event game for competing for a prize with the two or more of gaming terminals.

(27) The control method of a gaming system according to the above-mentioned (26), further comprising:

processing for deciding the gaming terminal that has won the prize based on a result of the event game; and processing for providing an award corresponding to a part or entirety of the accumulated count value to the gaming terminal that has won the prize.

(28) The control method of a gaming system according to the above-mentioned (26), further comprising:

processing, in a case where the gaming terminals being under operation, in which the operating ratios are the set operating ratio or more, are one, for providing an award corresponding to a part or entirety of the accumulated count value to the one gaming terminal without performing the event game.

(29) The control method of a gaming system according to the above-mentioned (26), wherein the operating ratio of each of the gaming terminals is a ratio of an operating time in the gaming terminal during a following period with respect to a preset set period until the accumulated count value reached a predetermined value.

(30) The control method of a gaming system according to the above-mentioned (26), wherein the operating ratio of each of the gaming terminals is a number of games in the gaming terminal during a preset set period until the accumulated count value reached a predetermined value.

(31) The control method of a gaming system according to the above-mentioned (26), wherein the operating ratio of each of the gaming terminals is a ratio of an operating time in the gaming terminal during a following counting period with respect to the counting period until the accumulated count value reached the predetermined value from zero.

(32) The control method of a gaming system according to the above-mentioned (26), wherein the operating ratio of each of the gaming terminals is a number of games in the gaming terminal during a counting period until the accumulated count value reached the predetermined value from zero.

(33) The control method of a gaming system according to the above-mentioned (26), wherein the game is executed without collecting the bets during the event game.

(34) The control method of a gaming system according to the above-mentioned (26), wherein, during the event game, an image regarding a progress of the game in each of the gaming terminals which participate in the event game is displayed on a common display.

(35) A gaming system, comprising:

a plurality of gaming terminals, each of which includes: a controller; a terminal display that displays thereon an image regarding a progress of a game; and a side bet counter; and a main controller that is connected to the controllers of the plurality of gaming terminals, and includes: a progressive bonus counter; and a set operating ratio storage unit that stores a set operating ratio, wherein the controller of each of the gaming terminals executes:

(A) processing for executing the game upon receiving a bet, and then generating an award based on a result of the game;

(B) processing for determining whether or not a current mode in the gaming terminal is an insurance mode;

(C) processing for accumulating a part of the bet as a side bet in the side bet counter when it has been determined that the current mode in the gaming terminal is the insurance mode;

(D) processing for determining whether or not the side bet counter has reached a predetermined value; and (E) processing for providing a part or entirety of the predetermined value as insurance pay when it has been determined that the side bet counter has reached the predetermined value, and wherein the main controller executes:

(F) processing for accumulating a part of the bets of the plurality of gaming terminals or a part of the awards of the plurality of gaming terminals in the progressive bonus counter;

(G) processing for determining whether or not an accumulated count value of the progressive bonus counter has reached a predetermined value;

(H) processing for determining whether or not two or more of the gaming terminals exist, the gaming terminals being under operation, in which operating ratios are the set operating ratio or more, when it has been determined that the accumulated count value of the progressive bonus counter has reached the predetermined value; and (I) processing, in a case where the two or more of gaming terminals exist, the gaming terminals being under operation, in which the operating ratios are the set operating ratio or more, for issuing an execution command of an event game for competing for a prize with the two or more of gaming terminals.

(36) A control method of a gaming system including a plurality of gaming terminals, the control method comprising:

(a) processing, in each of the gaming terminals, for executing a game upon receiving a bet, and then generating an award based on a result of the game;

(b) processing for determining whether or not a current mode in each of the gaming terminals is an insurance mode;

(c) processing for accumulating a part of the bet as a side bet in a side bet counter when it has been determined that the current mode in each of the gaming terminals is the insurance mode;

(d) processing for determining whether or not the side bet counter has reached a predetermined value;

(e) processing for providing a part or entirety of the predetermined value as insurance pay when it has been determined that the side bet counter has reached the predetermined value;

(f) processing for accumulating a part of the bet of each of the gaming terminals or a part of the award of each of the gaming terminals in a progressive bonus counter;

(g) processing for determining whether or not an accumulated count value of the progressive bonus counter has reached a predetermined value;

(h) processing for determining whether or not two or more of the gaming terminals exist, the gaming terminals being under operation, in which operating ratios are a set operating ratio or more, when it has been determined that the accumulated count value of the progressive bonus counter has reached the predetermined value; and (j) processing, in a case where the two or more of gaming terminals exist, the gaming terminals being under operation, in which the operating ratios are the set operating ratio or more, for issuing an execution command of an event game for competing for a prize with the two or more of gaming terminals.

What is claimed is:

1. A gaming system, comprising:
- a plurality of gaming terminals;
- a common display; and
- a progressive bonus counter,
- wherein each of the gaming terminals includes:
  - a terminal display that displays thereon an image regarding a progress of a game; and
  - a controller configured to:
    - execute the game by receiving a bet, and accumulate a part of the bet in the progressive bonus counter;
    - determine a number of the plurality of gaming terminals which the game is being executed in;
    - display an image on the common display and execute an event game which the plurality of gaming terminals participate in when the game is being executed in at least two of the plurality of gaming terminals and an accumulated count value of the progressive bonus counter has reached a predetermined value;
    - end the event game when a time duration of the event game reaches an event game execution time;
    - provide an award corresponding to a part or entirety of the accumulated count value to a specific gaming terminal that has won the event game; and
    - execute a bonus game different from the event game when the game is executed only one of the plurality of gaming terminals and the accumulated count value of the progressive bonus counter has reached the predetermined value, and provide an award corresponding to a part or entirety of the accumulated count value to the one of the plurality of gaming terminals in which the bonus game is executed.

2. The gaming system of claim 1, wherein the controller monitors a behavior of the gaming terminal, and determines that the game is being executed in the gaming terminal in a case of having detected an input operation by a player.

3. The gaming system of claim 1, wherein the controller changes a ratio of the bet to be accumulated in the progressive bonus counter.

4. A gaming system, comprising:
- a plurality of gaming terminals;
- a common display; and
- a progressive bonus counter,
- wherein each of the gaming terminals includes:
  - a terminal display that displays thereon an image regarding a progress of a game; and
  - a controller configured to execute:
    - processing for executing the game upon receiving a bet, and accumulating a part of the bet in the progressive bonus counter;
    - processing for determining a number of the plurality of gaming terminals which the game is being executed in;
    - processing for determining whether or not an accumulated count value of the progressive bonus counter has reached a predetermined value;

processing for displaying an image on the common display and deciding execution of an event game in which the plurality of gaming terminals participate in a case where it is determined that the game is being executed in at least two of the plurality of gaming terminals in the processing for determining a number of the plurality of gaming terminals which the game is being executed in, and it is determined that the accumulated count value of the progressive bonus counter has reached the predetermined value in the processing for determining whether or not an accumulated count value of the progressive bonus counter has reached a predetermined value;

processing for determining a number of continuation times for continuing the event game based on an external input;

processing for cumulatively adding up points in each of the gaming terminals in response to symbols rearranged in the event game, the points being set individually for the symbols;

processing for determining whether or not each of the gaming terminals wins the event game in accordance with the points individually added up in each of the gaming terminals;

processing for displaying an image on the common display and executing the event game which the plurality of gaming terminals participate in when the game is being executed in at least two of the plurality of gaming terminals and an accumulated count value of the progressive bonus counter has reached a predetermined value;

processing for ending the event game when a time duration of the event game reaches an event game execution time;

processing for providing an award corresponding to a part or entirety of the accumulated count value to a specific gaming terminal that has won the event game; and processing for executing a bonus game different from the event game when the game is executed only one of the plurality of gaming terminals and the accumulated count value of the progressive bonus counter has reached the predetermined value, and providing an award corresponding to a part or entirety of the accumulated count value to the one of the plurality of gaming terminals in which the bonus game is executed.

5. The gaming system of claim 4, wherein the controller monitors a behavior of the gaming terminal, and executes processing for determining that the game is being executed in the gaming terminal in a case of having detected an input operation by a player.

6. The gaming system of claim 4, wherein the controller executes processing for changing a ratio of the bet to be accumulated in the progressive bonus counter.

7. A gaming system, comprising:

a plurality of gaming terminals, each of which includes:

a controller that executes a game upon receiving a bet and then generates an award based on a result of the game; and a terminal display that displays thereon an image regarding a progress of the game; and a main controller that is connected to the controllers of the plurality of gaming terminals, and includes:

a progressive bonus counter; and a set operating ratio storage unit that stores a set operating ratio, wherein the main controller executes:

processing for accumulating a part of the bet of each of the plurality of gaming terminals or a part of the award of each of the plurality of gaming terminals in the progressive bonus counter;

processing for determining whether or not an accumulated count value of the progressive bonus counter has reached a predetermined value;

processing for determining whether or not two or more of the gaming terminals exist, the gaming terminals being under operation, in which operating ratios are the set operating ratio or more, when it has been determined that the accumulated count value of the progressive bonus counter has reached the predetermined value;

processing, in a case where the two or more of gaming terminals exist, the gaming terminals being under operation, in which the operating ratios are the set operating ratio or more, for issuing an execution command of an event game for competing for a prize with the two or more of gaming terminals, wherein the operating ratios are determined as a number of games executed on each of the plurality of gaming terminals during a set time period, or the operating ratios are determined as an operating time of each of the plurality of gaming terminals during the set time period;

processing for determining the number of the plurality of gaming terminals which the game is being executed in;

processing for displaying an image on the common display and executing the event game which the plurality of gaming terminals participate in when the game is being executed in at least two of the plurality of gaming terminals and an accumulated count value of the progressive bonus counter has reached a predetermined value;

processing for ending the event game when a time duration of the event game reaches an event game execution time;

processing for providing an award corresponding to a part or entirety of the accumulated count value to a specific game terminal that has won the event game; and processing for executing a bonus game different from the event game when the game is executed only one of the plurality of gaming terminals and the accumulated count value of the progressive bonus counter has reached the predetermined value, and providing an award corresponding to a part or entirety of the accumulated count value to the one of the plurality of gaming terminals in which the bonus game is executed.

8. The gaming system of claim 7, wherein the operating ratio of each of the gaming terminals is a ratio of an operating time in the gaming terminal during a following period with respect to a preset set period until the accumulated count value reached a predetermined value.

9. The gaming system of claim 7, wherein the operating ratio of each of the gaming terminals is a number of games in the gaming terminal during a preset set period until the accumulated count value reached a predetermined value.

10. The gaming system of claim 7, wherein the operating ratio of each of the gaming terminals is a ratio of an operating time in the gaming terminal during a following counting period with respect to the counting period until the accumulated count value reached the predetermined value from zero.

11. The gaming system of claim 7, wherein the operating ratio of each of the gaming terminals is a number of games in the gaming terminal during a counting period until the accumulated count value reached the predetermined value from zero.

12. The gaming system of claim 7, further comprising:

a common display, wherein, during the event game, the main controller displays thereon the image regarding the ranks of the game in each of the gaming terminals which participate in the event game.

13. The gaming system of claim 7, wherein the main controller includes an input unit that receives an input to change the set operating ratio stored in the set operating ratio storage unit.

14. The gaming system of claim 7, wherein each of the gaming terminals includes:

a cabinet that houses the controller therein and is freely openable/closable by a door; and an input unit that receives an input to change the set operating ratio stored in the set operating ratio storage unit, the input unit being provided in an inside of the cabinet.

15. The gaming system of claim 1, wherein the controller is configured to display on the terminal display an image regarding ranks of each of the plurality of each of the plurality of gaming terminals on the event game.

16. The gaming system of claim 1, wherein the controller is configured to end the event game when a total number of points of each of the plurality of gaming terminals on the event game exceeds a defined number of points.

17. The gaming system of claim 4, wherein the controller is configured to display on the terminal display an image regarding ranks of each of the plurality of each of the plurality of gaming terminals on the event game.

18. The gaming system of claim 4, wherein the controller is configured to end the event game when a total number of points of each of the plurality of gaming terminals on the event game exceeds a defined number of points.

* * * * *